US008823741B2

(12) United States Patent  
Lee et al.

(10) Patent No.: US 8,823,741 B2  
(45) Date of Patent: Sep. 2, 2014

(54) TRANSPARENT DISPLAY APPARATUS AND METHOD FOR OPERATING THE SAME

(75) Inventors: Byunghun Lee, Seoul (KR); Grami Ryu, Seoul (KR); Hyunmin Kim, Seoul (KR); Jisuk Chae, Seoul (KR); Kyunghee Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 13/418,604

(22) Filed: Mar. 13, 2012

(65) Prior Publication Data

US 2012/0256823 A1 Oct. 11, 2012

(30) Foreign Application Priority Data

| Mar. 13, 2011 | (KN) | 10-2011-0022166 |
| Mar. 13, 2011 | (KR) | 10-2011-0022152 |
| Mar. 13, 2011 | (KR) | 10-2011-0022157 |
| Mar. 13, 2011 | (KR) | 10-2011-0022158 |
| Mar. 13, 2011 | (KR) | 10-2011-0022160 |

(51) Int. Cl.  
G09G 5/00 (2006.01)  
G06F 3/0488 (2013.01)  
G06F 3/0481 (2013.01)  
G06F 3/01 (2006.01)

(52) U.S. Cl.  
CPC ............ *G06F 3/0488* (2013.01); *G06F 3/0481* (2013.01); *G06F 3/011* (2013.01)  
USPC .......................................... 345/633; 345/173

(58) Field of Classification Search  
None  
See application file for complete search history.

(56) References Cited

U.S. PATENT DOCUMENTS

| 5,772,593 | A | 6/1998 | Hakamata |
| 6,278,461 | B1 | 8/2001 | Ellenby et al. |
| 6,314,311 | B1 | 11/2001 | Williams et al. |
| 8,395,529 | B2 * | 3/2013 | Seder et al. .................. 340/905 |
| 2002/0082498 | A1 | 6/2002 | Wendt et al. |

FOREIGN PATENT DOCUMENTS

| DE | 10238011 A1 | 3/2004 |
| GB | 2465280 A | 5/2010 |

OTHER PUBLICATIONS

European Search Report dated Nov. 22, 2012 for Application No. 12159125.9, 7 pages.

* cited by examiner

*Primary Examiner* — Joseph Haley  
(74) *Attorney, Agent, or Firm* — Fish & Richardson P.C.

(57) ABSTRACT

A transparent display apparatus and a method for operating the same are disclosed. The method may include detecting an object located proximate to the transparent image display apparatus; determining a position of the detected object relative to the transparent image display apparatus; and selecting, from among multiple, different augmented object displays associated with the detected object, an augmented object display based on the determined position of the detected object relative to the transparent image display apparatus. A first augmented object display may be selected based on the determined position being a first position relative to the transparent image display apparatus, and a second augmented object display may be selected based on the determined position being a second position relative to the transparent image display apparatus. Display of the selected augmented object display is controlled on the transparent image display apparatus.

21 Claims, 115 Drawing Sheets

|    | TYPE 1      | TYPE 2       |
|----|-------------|--------------|
| R1 | VOLUME UP   | CHANNEL UP   |
| R2 | VOLUME DOWN | CHANNEL DOWN |

| MENU | FUNCTION |
|---|---|
| MAIN MEUN | VOLUME SETTING |
| SUB MENU1 | VOLUME UP |
| SUB MENU2 | VOLUME DOWN |
| SUB MENU3 | PREFERRED VOLUME |
| SUB MENU4 | RECOMMENDED VOLUME |

(A)

(B)

(A)

(B)

(a)

(b)

TRANSPARENT DISPLAY APPARATUS AND METHOD FOR OPERATING THE SAME

CROSS-REFERENCE TO RELATED APPLICATION

This application claims the priority benefit of Korean Patent Application Nos. 10-2011-0022160, 10-2011-0022166, 10-2011-0022158, 10-2011-0022152, and 10-2011-0022157, filed on Mar. 13, 2011, in the Korean Intellectual Property Office, the disclosure of which is incorporated herein by reference.

BACKGROUND OF THE INVENTION

1. Field of the Invention

The present invention relates to a transparent display apparatus and a method for operating the same.

2. Description of the Related Art

As the information technology market continues to expand, demand for display apparatuses has increased. Therefore, recently, various display apparatuses such as a liquid crystal display (LCD), a plasma display panel (PDP), an electroluminescent display (ELD) or a vacuum fluorescent display (VFD) have been researched.

In addition, transparent display panels capable of viewing an image at front and rear sides thereof have been developed.

SUMMARY OF THE INVENTION

Therefore, the present invention has been made in view of the above problems, and it is an object of the present invention to provide a transparent display apparatus and a method for operating the same which can be conveniently used.

In accordance with an aspect of the present invention, the above and other objects can be accomplished by the provision of a method for operating a transparent display apparatus, the method comprising: detecting an object located proximate to the transparent image display apparatus; determining a position of the detected object relative to the transparent image display apparatus; selecting, from among multiple, different augmented object displays associated with the detected object, an augmented object display based on the determined position of the detected object relative to the transparent image display apparatus, the selecting comprising: selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display; and controlling display of the selected augmented object display on the transparent image display apparatus.

In accordance with another aspect of the present invention, the above and other objects can be accomplished by the provision of a transparent display apparatus comprising: a transparent display panel configured to display an augmented object display; and a controller configured to control the transparent display panel, wherein the controller is configured to perform operations comprising: detecting an object located proximate to the transparent image display apparatus; determining a position of the detected object relative to the transparent image display apparatus; selecting, from among multiple, different augmented object displays associated with the detected object, an augmented object display based on the determined position of the detected object relative to the transparent image display apparatus, the selecting comprising: selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display; and controlling display of the selected augmented object display on the transparent image display panel.

In accordance with an aspect of the present invention, the above and other objects can be accomplished by the provision of a method for operating a transparent display apparatus for penetrating a real object and displaying an augmented object, the method including displaying information or menu associated with a first real object as a first augmented object if the first real object is located in a first direction of the transparent image display apparatus, and displaying information or menu associated with a second real object as a second augmented object if the second real object is located in a second direction opposed to the first direction of the transparent image display apparatus, wherein the information or menu associated with the first augmented object is different from the information or menu associated with the second augmented object.

BRIEF DESCRIPTION OF THE DRAWINGS

The above and other objects, features and other advantages of the present invention will be more clearly understood from the following detailed description taken in conjunction with the accompanying drawings, in which:

FIGS. 54 to 77 are diagrams illustrating double-sided touch;

DETAILED DESCRIPTION OF THE PREFERRED EMBODIMENTS

A transparent display apparatus and a method for operating the same according to the present invention will be described with reference to the attached drawings.

The present invention may have various embodiments and various modifications. Specific embodiments are shown in the figures and are described in detail in the detailed description. The present invention is not limited to the specific embodiments and may include modifications, equivalents and substitutions within the spirit and scope of the present invention.

In description of the present invention, the terms "first" and "second" may be used to describe various components, but the components are not limited by the terms. The terms may be used to distinguish one component from another component. For example, a first component may be called a second component and a second component may be called a first component without departing from the scope of the present invention.

The term "and/or" may include a combination of a plurality of items or any one of a plurality of items.

In the case in which a component is "connected" or "coupled" to another component, the components may be connected or coupled to each other directly or via an interposing component. In the case in which a component is "directly connected or coupled" to another component, it will be understood that an interposing component is not present.

The terms used in the present application are merely used to describe specific embodiments and are not intended to limit the present invention. A singular expression may include a plural expression unless otherwise stated in the context.

In the present application, the terms "including" or "having" are used to indicate that features, numbers, steps, operations, components, parts or combinations thereof described in the present specification are present and presence or addition of one or more other features, numbers, steps, operations, components, parts or combinations are not excluded.

Unless otherwise defined, all terms used herein, including technical or scientific terms, have the same meaning as those understood by those skilled in the art. Terms defined in a generally used dictionary may be analyzed to have the same meaning as the context of the relevant art and may not be analyzed to have ideal meaning or excessively formal meaning unless clearly defined in the present application.

In addition, the following embodiments are provided to enable those skilled in the art to thoroughly understand the present invention and the shapes and sizes of the elements of the figures may be exaggerated for clearer description.

Figure 1:
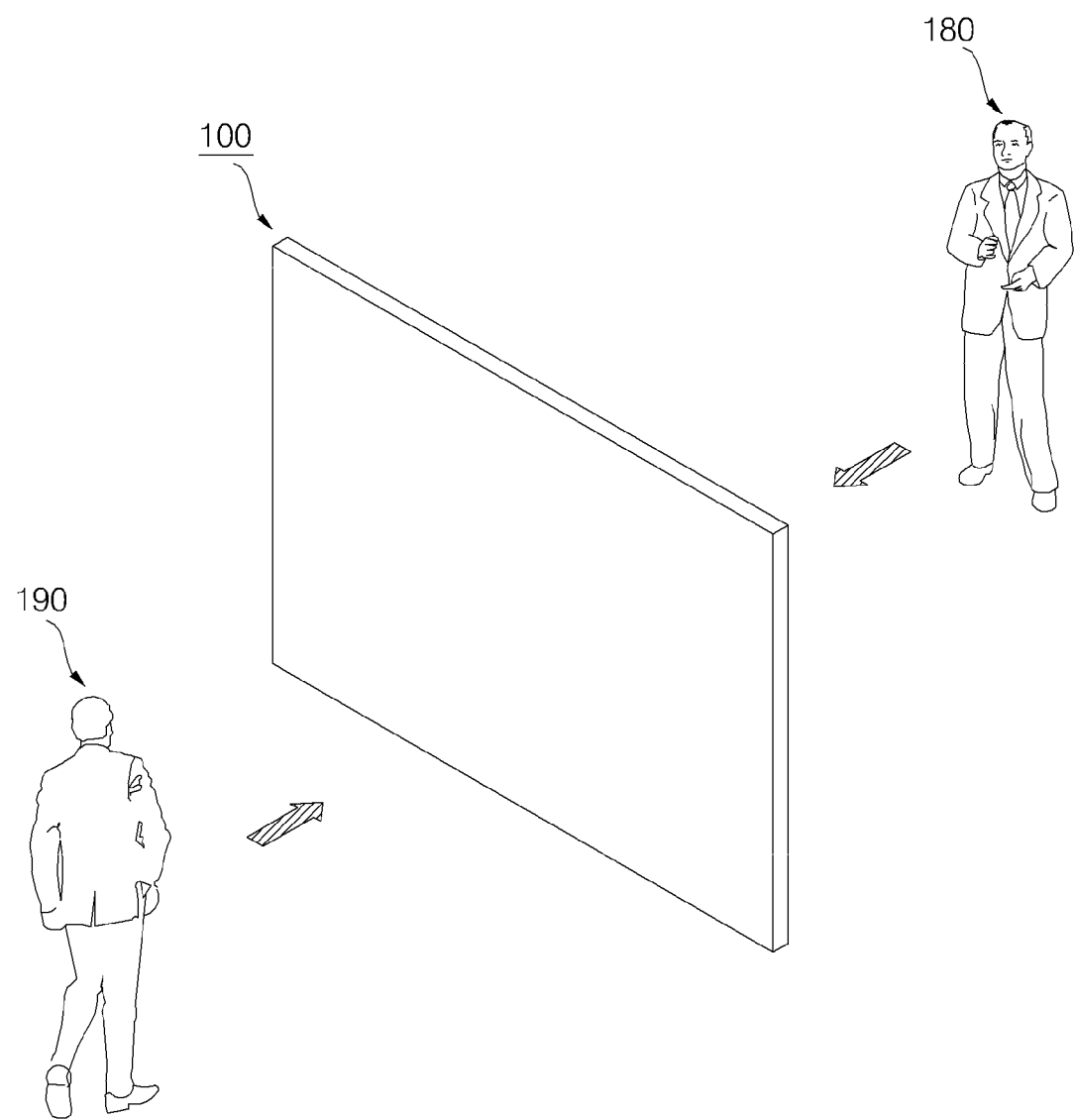
FIGS. 1 and 2 are diagrams illustrating the configuration of a transparent display panel.
Figure 2:
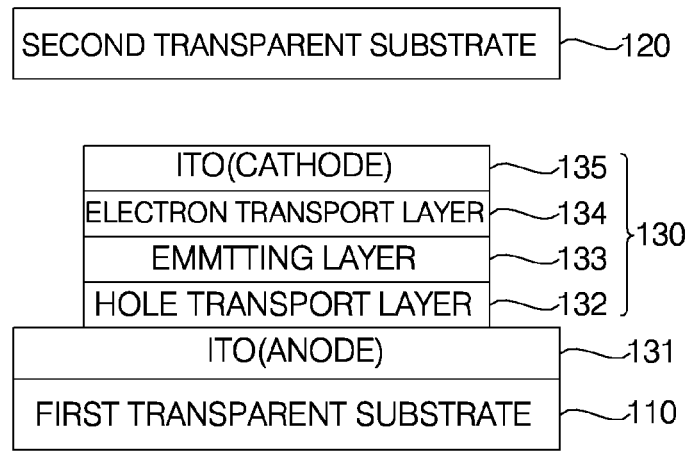

FIGS. 1 and 2 are diagrams illustrating the configuration of a transparent display panel.

Referring to FIG. 1, a transparent display apparatus according to the present invention may include a transparent display panel 100.

The transparent display panel 100 transmits light while displaying a predetermined image on a screen. Thus, a user can view an object located at the opposite side of the transparent display panel 100.

For example, a first user 190 located at one side of the transparent display panel 100 can view an image displayed on the transparent display panel 100 or observe a second user 180 located at the other side of the transparent display panel 100.

As such a transparent display panel 100, an inorganic thin film electroluminescent display, an organic light emitting diode (OLED), etc. may be used.

These panels may be operated using a passive matrix method and may have a sufficiently high light transmission property because it does not have a thin film transistor (TFT). Thus, these panels may be used as the transparent display panel 100.

Even in the case in which a TFT is used as in an active matrix OLED, it is possible to sufficiently increase a light transmission property if a TFT is manufactured using a transparent material such as a composite oxide semiconductor.

FIG. 2 shows an example of a cross section of a transparent display panel 100 using an OLED.

As shown in FIG. 2, the transparent display panel 100 may include a first transparent substrate 110, a second transparent substrate 120 and an image layer 130 interposed between the first transparent substrate 110 and the second transparent substrate 120. The image layer 130 interposed between the first transparent substrate 110 and the second transparent substrate 120 may be an organic cell.

The first transparent substrate 110 and the second transparent substrate 120 may have a light transmission property.

The image layer 130 may include an anode 131, a hole transport layer 132, an emitting layer 133, an electron transport layer 134 and a cathode 135.

If voltage is applied to the cathode 135 and the anode 131, gray-scale current is supplied and thus electrons generated at the cathode 135 move to the emitting layer 133 via the electron transport layer 134.

In addition, holes generated at the anode 131 move to the emitting layer 133 via the hole transport layer 132.

At this time, in the emitting layer 133, the electrons supplied from the electron transport layer 134 and the holes supplied from the hole transport layer 132 collide with each other to be recombined. By collision between the electrons and the holes, light is generated in the emitting layer 133.

Luminance of light generated in the emitting layer 133 may be proportional to the level of the gray-level current supplied to the anode 131.

In such a structure, if light is generated in the emitting layer 133, light may be emitted toward the first transparent substrate 110 or the second transparent substrate 120.

Accordingly, a user may view an image through the first transparent substrate 110 or the second transparent substrate 120.

FIG. 2 shows an example of the transparent display panel 100, to which the present invention is not limited.

Figure 3:
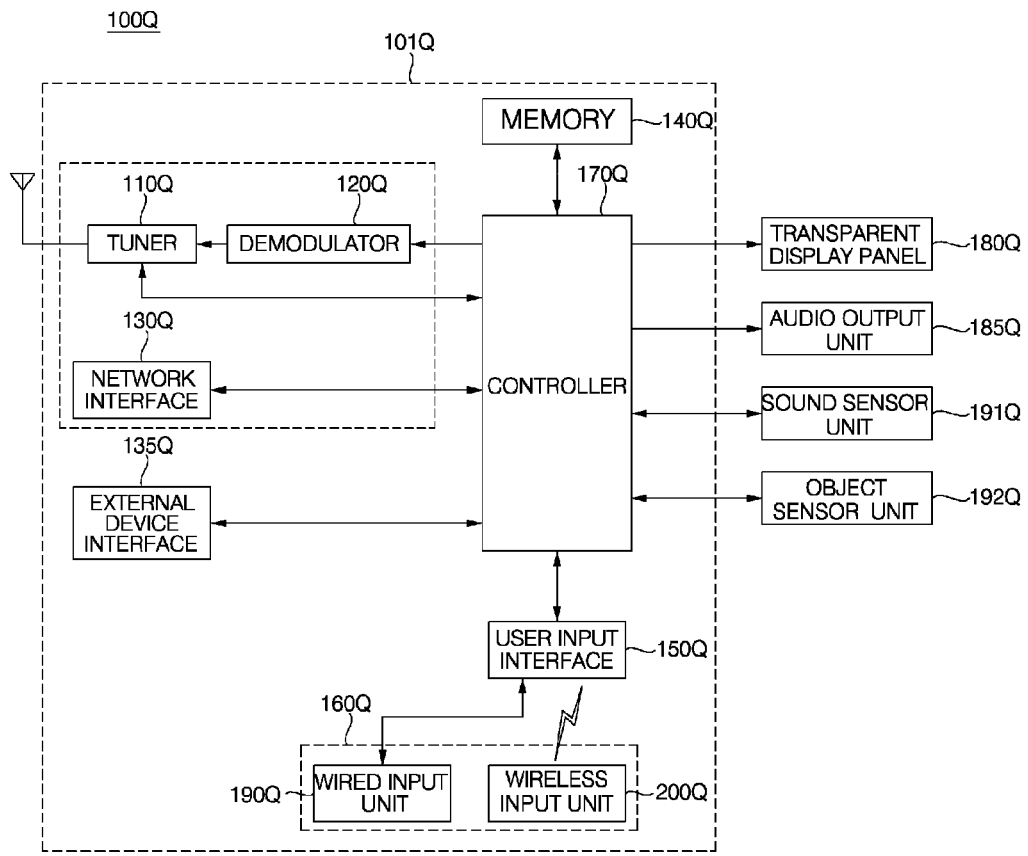
FIGS. 3 and 4 are diagrams illustrating an example of a transparent display apparatus including a transparent display panel according to the present invention.
Figure 4:
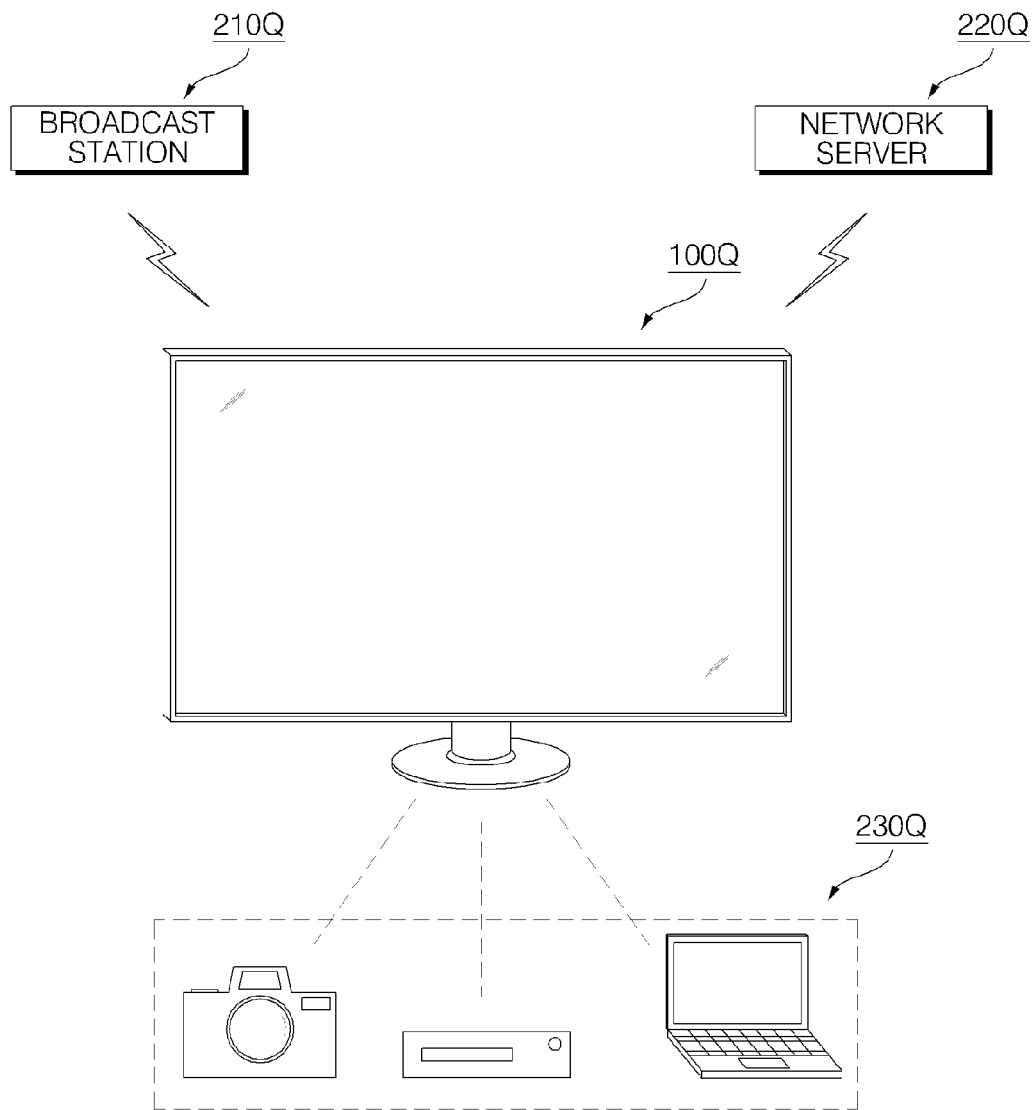

FIGS. 3 and 4 are diagrams illustrating an example of a transparent display apparatus including a transparent display panel according to the present invention. Hereinafter, a description of the above-described portions will be omitted.

The transparent display panel 100 according to the present invention is, for example, an intelligent image display apparatus including not only a broadcast reception function but also a computer support function and includes a more conveniently used interface, such as a handwriting type input device, a touchscreen or a remote controller, by adding an Internet function while accurately performing the broadcast reception function.

In addition, the transparent display panel 100 according to the present invention is connected to the Internet or a computer by a wired or wireless Internet module so as to perform functions such as email, web browsing, banking or games. For such various functions, a standardized general-purpose operating system (OS) may be used.

Accordingly, the transparent display panel 100 according to the present invention may perform various user-friendly functions because various applications may be freely added to or deleted from a general-purpose OS kernel. For example, the transparent display panel 100 according to the present invention is applicable to a network TV, an HBBTV, a smart TV, etc. Alternatively, the transparent display panel 100 according to the present invention is applicable to a smart phone.

FIG. 3 shows an example of the configuration of the transparent display panel 100 according to the present invention applied to a broadcast signal receiver. In this case, the transparent display apparatus 100Q according to the present invention may be a broadcast signal receiver.

Referring to FIG. 3, the transparent display apparatus 100Q according to an embodiment of the present invention may include a transparent display panel 100 for displaying an image and a drive unit 101Q for supplying a drive signal to the transparent display panel 100.

Even when the transparent display apparatus 100Q according to the present invention does not receive a broadcast signal, the drive unit 101Q may supply the drive signal for displaying the image to the transparent display panel 100.

The drive unit 101Q may control at least one of the object penetration, the image display, or the audio output of the transparent display apparatus 100Q.

The drive unit 101Q may include a reception unit 105Q, an external device interface unit 135Q, a memory 140Q, a user input interface unit 150Q, a controller 170Q and a command input unit 160Q.

The drive unit 101Q and the transparent display panel 100 may be integrally formed.

Alternatively, the drive unit 101Q and the transparent display panel 110 may be individually formed and communicate with each other in a wired or wireless manner.

In addition, the transparent display apparatus 100Q according to the present invention may include an audio output unit 185Q for outputting audio, a sound sensor unit 191Q for sensing sound, and an object sensor unit 192Q for sensing a user gesture, position and face, capturing a video/photo of a predetermined object or acquiring information about a predetermined object.

Hereinafter, the transparent display apparatus 100Q according to the present invention will be described in detail.

The reception unit 105Q may include a tuner 110Q, a demodulator 120Q and a network interface unit 130Q. As necessary, the reception unit 105Q may include only the tuner 110Q and the demodulator 120Q or may include only the network interface unit 130Q.

The tuner 110Q tunes to a Radio Frequency (RF) broadcast signal corresponding to a channel selected by a user from among RF broadcast signals received through an antenna or RF broadcast signals corresponding to all previously stored channels. The tuned RF broadcast signal is converted into an Intermediate Frequency (IF) signal or a baseband Audio/Video (AV) signal.

The demodulator 120Q receives and demodulates the digital IF signal DIF converted by the tuner 110Q.

The demodulator 120Q may perform demodulation and channel decoding and output a stream signal TS. The stream signal TS may be a signal in which a video signal, an audio signal and a data signal are multiplexed.

The stream signal output from the demodulator 120Q may be input to the controller 170Q. The controller 170Q performs demultiplexing and A/V signal processing with respect to the stream signal and respectively outputs the processed video and audio signals to the transparent display panel 100 and the audio output unit 185Q.

The external device interface unit 135Q may connect an external device to the transparent display apparatus 100Q according to the present invention. For connection, the external device interface unit 135Q may include an A/V input/output unit (not shown) or a wireless communication unit (not shown).

The external device interface unit 135Q may be connected to an external device such as a digital versatile disc (DVD) player, a Blu-ray player, a game console, a camcorder or a personal computer (laptop) in a wired/wireless manner. The external device interface unit 135Q may send a video, audio or data signal received from the external device to the controller 170Q of the transparent display apparatus 100Q. In addition, a video, audio or data signal processed by the controller 170Q may be output to the external device.

The network interface unit 130Q may provide an interface for connecting the transparent display apparatus 100Q to a wired/wireless network including the Internet.

The network interface unit 130Q may transmit or receive data to or from another user or another electronic apparatus via a connected network or another network linked to the connected network.

The network interface unit 130Q may access a predetermined web page via a connected network or another network linked to the connected network. That is, the network interface unit 130Q may access a predetermined web page via a network so as to transmit or receive data to or from a server. The network interface unit 130Q may receive data or content provided by a content provider or a content manager. That is, the network interface unit 130Q may receive content such as movies, advertisements, games, VOD, broadcast signals, etc. provided by a content provider or a network provider via network and information related thereto. The network interface unit 130Q may receive update information and an update file of firmware provided by a network manager. The network interface unit 130Q may transmit data to an Internet or content provider or a network manager.

The memory 140Q may store a program for processing or controlling signals in the controller 170Q or store the processed video, audio and data signals.

The memory 140Q may temporarily store the video, audio and data signals received from the external device interface unit 135Q or the network interface unit 130Q. The memory 140Q may store information about a predetermined broadcast channel via a channel storage function.

The memory 140Q may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM).

The transparent display apparatus 100Q may reproduce and provide a content file (a moving image file, a still image file, a music file, a text file, an application file, etc.) stored in the memory 140Q to a user.

The command input unit 160Q may include an input key for enabling a user to input a command. The command input unit 160Q may include a wired input unit 190Q for enabling a user to input a command in a wired manner and a wireless input unit 200Q for enabling a user to input a command in a wireless manner.

The command input unit 160Q may enable a user to input various commands such as power on/off, channel selection, screen settings, volume control, movement of a cursor on a screen and menu selection.

The wireless input unit 200Q may be a remote controller.

The user input interface unit 150Q may send a signal input by a user to the controller 170Q via the command input unit 160Q or send a signal from the controller 170Q to the command input unit 160Q.

If a user inputs a predetermined command via the wired input unit 190Q, the input command may be directly sent to the controller 170Q without using the user input interface unit 150Q.

The user input interface unit 150Q may receive and process a command input through the wireless input unit 200Q or transmit a control signal from the controller 170Q to the wireless input unit 200Q, according to various communication methods such as a radio frequency (RF) communication method and an infrared (IR) communication method.

In addition, for example, the user input interface unit 150Q may send a control signal received from a local key (not shown) such as a power key, a channel key, a volume key or a setting key of the command input unit 160Q to the controller 170Q.

The controller 170Q may control at least one of the object penetration, the image display, or the audio output of the transparent display apparatus 100Q.

The controller 170Q may demultiplex the stream received through the tuner 110Q, the demodulator 120Q or the external device interface unit 135Q or process the demultiplexed signals and generate and output a signal for outputting video or audio.

The video signal processed by the controller 170Q may be input to the transparent display panel 100 so as to display video corresponding to the video signal. In addition, the video signal processed by the controller 170Q may be input to an external output device through the external device interface unit 135Q.

The audio signal processed by the controller 170Q may be audibly output to the audio output unit 185Q. The audio signal processed by the controller 170Q may be input to an external output device through the external device interface unit 135Q.

In addition, the controller 170Q may control the overall operation of the transparent display device 100Q. For example, the controller 170Q may control the tuner 110Q to tune to an RF broadcast corresponding to a channel selected by a user or a previously stored channel.

In addition, the controller 170Q may control the transparent display apparatus 100Q by a user command input through the user input interface unit 150Q or an internal program. In particular, the controller 170Q may access a network and download an application or an application list desired by a user to the transparent display apparatus 100Q.

For example, the controller 170Q controls the tuner 110Q such that a signal of a selected channel is input according to a predetermined channel selection command received through the user input interface unit 150Q. The controller processes the video, audio or data signal of the selected channel. The controller 170Q may output channel information selected by a user through the transparent display panel 100 or the audio output unit 185Q along with the processed video or audio signal.

As another example, the controller 170Q may receive a video signal or an audio signal from an external device or a camcorder via the external device interface unit 135Q and output the video signal or the audio signal via the transparent display panel 100 or the audio output unit 185Q, according to an external device image reproduction command received through the user input interface unit 150Q.

The controller 170Q may control the transparent display panel 100 to display an image. For example, the controller 170Q may control display of a broadcast image received through the tuner 110Q, an externally input image received through the external interface unit 135Q, an image received through the network interface or an image stored in the memory 140Q on the transparent display panel 100. The image displayed on the transparent display panel 100 may be a still image or a moving image or may be a two-dimensional (2D) image or a three-dimensional (3D) image.

The controller 170Q may control reproduction of content. The content may be content stored in the transparent display apparatus 100Q, received broadcast content, or externally input content. The content may be at least one of a broadcast image, an externally input image, an audio file, a still image, an accessed web screen and a text file.

The controller 170Q may control search of user terminals connected to the transparent display apparatus through the network interface unit 130Q, output of a list of searched user terminals through the transparent display panel 100 and reception of a selection signal of a user terminal used as a user controller in the list of the searched user terminals through the user input interface unit 150Q.

The controller 170Q may control output of player information corresponding to each user terminal through the transparent display panel 100.

The controller 170Q may include a processor (not shown). The processor (not shown) may control at least one of the object penetration, the image display, or the audio output of the transparent display apparatus 100Q.

In addition, the processor (not shown) may control the overall operation of the transparent display apparatus 100Q or the controller 170Q. For example, the processor (not shown) controls the tuner 110Q to tune to a RF broadcast corresponding to a channel selected by a user or a previously stored channel.

The processor (not shown) may control the transparent display apparatus 100Q by a user command input through the user input interface 150Q or an internal program.

The processor (not shown) may control transmission or reception of data to or from the network interface 130Q or the external device interface unit 135Q.

The transparent display panel 100 converts a video signal, a data signal or an OSD signal processed by the controller 170Q or a video signal and a data signal received by the external device interface unit 135Q into RGB signals and generates a drive signal.

A touchscreen may be disposed on the transparent display panel 100.

The audio output unit 185Q receives the audio signal processed by the controller 170Q, for example, a stereo signal, a 3.1-channel signal or a 5.1-channel signal, and outputs the received audio signal as sound. The audio output unit 185Q may be implemented as various types of speakers.

The sound sensor unit 191Q may sense sound generated inside or outside the transparent display device 100Q. The sound sensor unit 191Q may include a sound sensor or a microphone.

The object sensor unit 192Q may sense a user gesture, position or face. The object sensor unit 192Q may include a sensor unit (not shown) including at least one of a touch sensor, a sound sensor, a position sensor and a motion sensor. The signal sensed by the sensor unit may be sent to the controller 170Q.

The object sensor unit 192Q may include an image capture unit (not shown) such as a camera. Image information captured by the image capture unit (not shown) may be input to the controller 170Q.

Alternatively, the object sensor unit 192Q may include both a sensor unit and an image capture unit.

The controller 170Q may acquire information such as a user gesture, face and position using an image captured by the image capture unit (not shown), a signal sensed by the sensor unit (not shown) or a combination thereof.

The object sensor unit 192Q may sense user motion, a user face shape or a user face direction.

FIG. 4 shows a process of performing communication between a transparent display apparatus according to the present invention and an external device. Hereinafter, a description of the above-described portions will be omitted.

As shown in FIG. 4, the transparent display apparatus 100Q according to an embodiment of the present invention may communicate with a broadcast station 210Q, a network server 220Q or an external device 230Q.

The transparent display apparatus 100Q may receive a broadcast signal including a video signal transmitted from the broadcast station 210Q. The transparent display apparatus 100Q may process a video signal and an audio signal or a data signal included in the broadcast signal into an output format of the transparent display apparatus 100Q. The transparent display apparatus 100Q may output video or audio based on the processed video signal.

The transparent display apparatus 100Q may communicate with the network server 220Q. The network server 220Q may transmit and receive a signal to and from the transparent display apparatus 100Q via a certain network. For example, the network server 220Q may be a mobile telephone which may be connected to the transparent display apparatus 110Q via a wired or wireless base station. The network server 220Q may provide content to the transparent display apparatus 100Q via an Internet protocol network. A content provider may provide content to the transparent display apparatus 100Q using the network server.

The transparent display apparatus 100Q may communicate with the external device 230Q. The external device 230Q may directly transmit and receive a signal to and from the transparent display apparatus 100Q in a wired or wireless manner. For example, the external device 230Q may be a media storage or reproduction device used by a user. That is, the external device 230Q may include, for example, a camera, a DVD player, a Blu-ray player, a personal computer, etc.

The broadcast station 210Q, the network server 220Q or the external device 230Q may transmit a signal including a video signal to the transmit display apparatus 100Q. The transparent display apparatus 100Q may display video based on a video signal included in an input signal. The transparent display apparatus 100Q may receive a signal from the broadcast station 210Q or the network server 220Q and transmit the signal to the external device 230Q. The transparent display apparatus 100Q may receive a signal from the external device 230Q and transmit the signal to the broadcast station 210Q or the network server 220Q. That is, the transparent display apparatus 100Q includes not only a function for directly reproducing content included in a signal transmitted from the broadcast station 210Q, the network server 220Q or the external device 230Q but also a function for delivering the signal.

FIGS. 5 to 42 are diagrams illustrating an augmented reality mode. Hereinafter, a description of the above-described portions will be omitted. The following transparent display panel and transparent display apparatus may include the above-described structure and configuration.

Augmented reality is generally derived from a virtual environment and virtual reality and means a mixture of a real-world image and a virtual image, obtained by inserting a computer graphic image into a real environment. That is, augmented reality is a combination of the real world and a virtual world.

In the transparent display apparatus according to the present invention, it is possible to select at least one object located in a second space area corresponding to a first space area, in which a user is located, on a screen of the transparent display panel 100, move the position of at least one object or display information about at least object on the transparent display panel 100.

Figure 5:
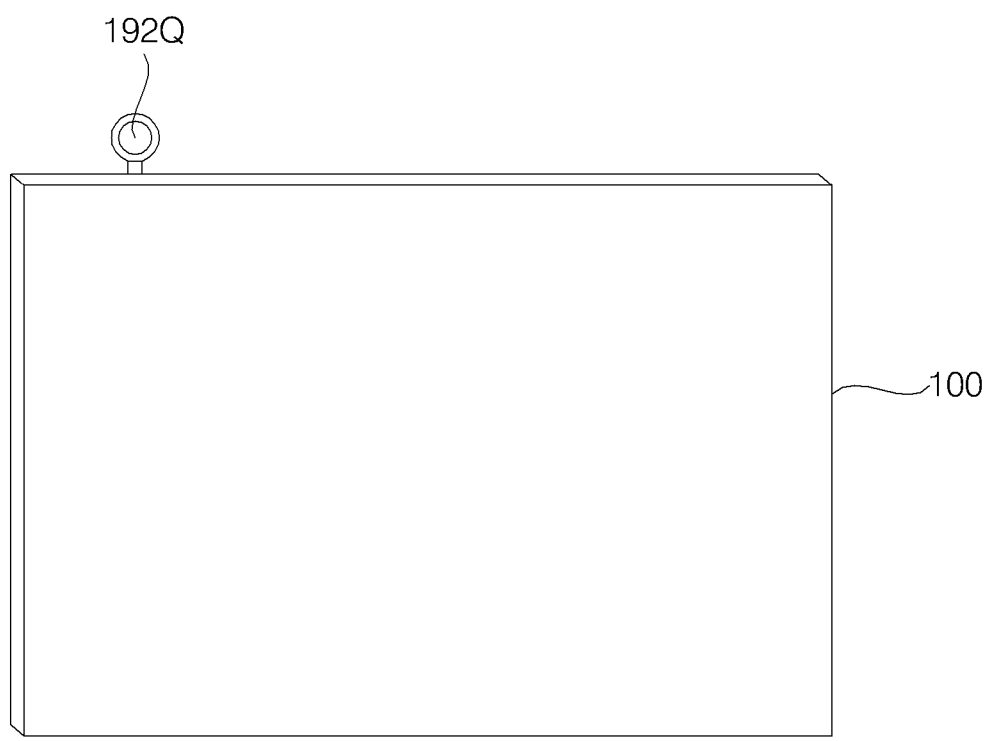
FIGS. 5 to 42 are diagrams illustrating an augmented reality mode.

In order to realize an augmented reality function, the transparent display apparatus according to the present invention may further include the object sensor unit 192Q as shown in FIG. 5. The object sensor unit 192Q is described with reference to FIG. 3.

The object sensor unit 192Q may acquire user position information or predetermined object information or capture a video/photo of an object.

The object sensor unit 192Q may include at least one of a position sensor, a motion sensor, a camera and a scanner.

The object sensor unit 192Q may be disposed at an edge of the transparent display panel 100.

Figure 6:
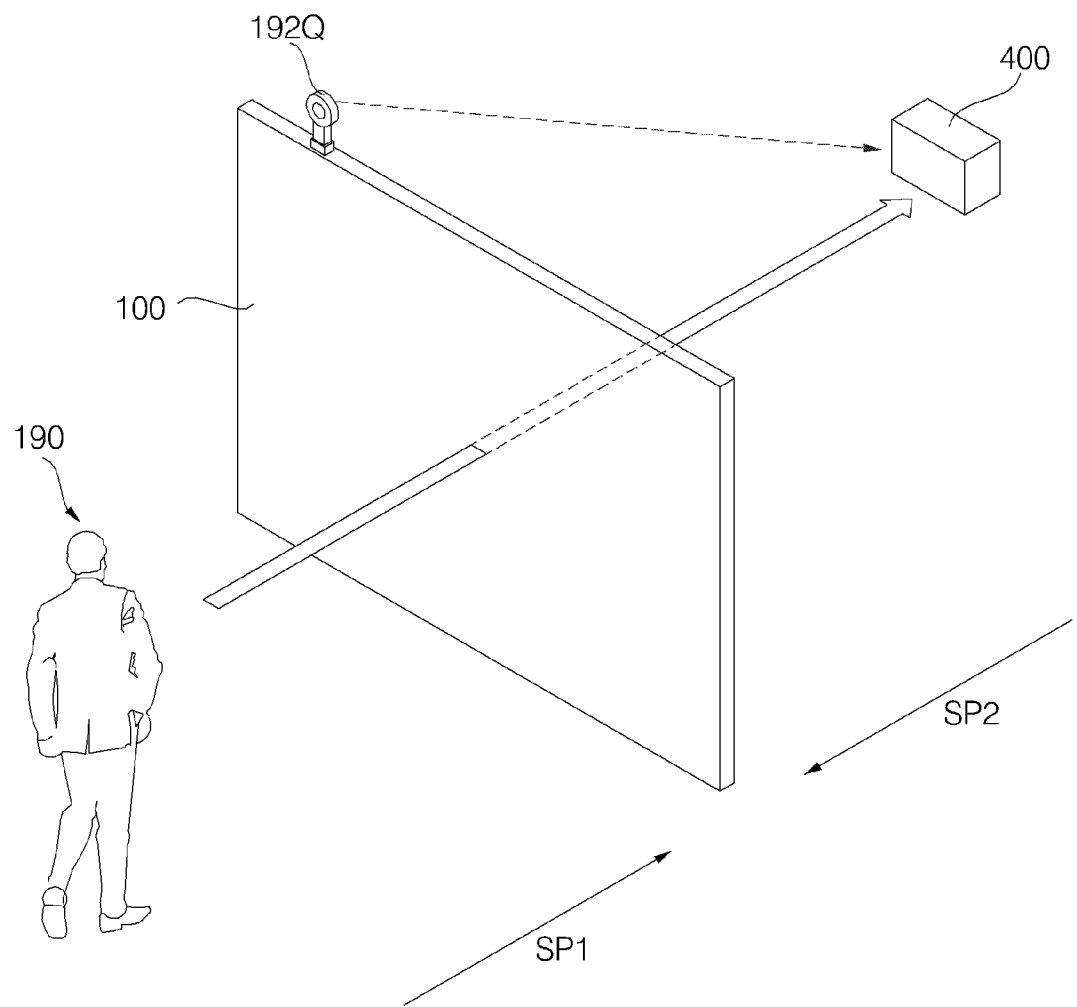

As shown in FIG. 6, it is assumed that a user 190 is located at the left side of the transparent display panel 100, that is, is located in a first space area SP1 and a predetermined object 400 is located at the right side of the transparent display panel 100, that is, is located in a second space area SP2 corresponding to the first space area SP1.

In this case, the user 190 can view the object 400 through the transparent display panel 100. If a predetermined image is displayed on the transparent display panel 100, the user 190 can view the object 400 and the image displayed on the transparent display panel 100.

That is, the transparent display panel 100 may penetrate a real object and display an augmented object associated with the real object. The augmented object may include various information or menu.

Figure 7:
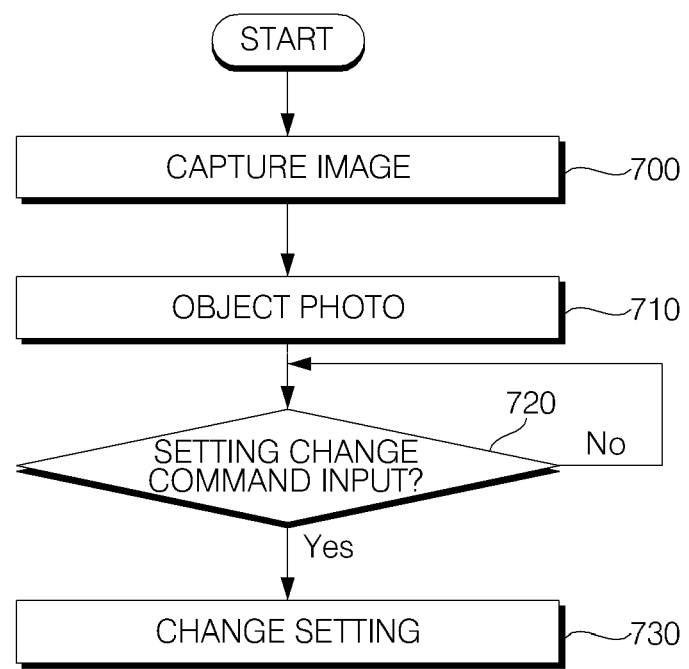

Referring to FIG. 7, in the transparent display apparatus according to the present invention, the object sensor unit 192Q captures an image of the object 400 located in the second space area SP2 (700) and acquire the photo of the object 400, that is, an object photo (710). In addition, the object sensor unit 192Q may acquire position information of the object 400.

Thereafter, the controller of the transparent display apparatus according to the present invention determines whether a user inputs a setting change command (720).

If it is determined that the setting change command is input, image display setting may be changed. This will now be described in detail.

Figure 8:
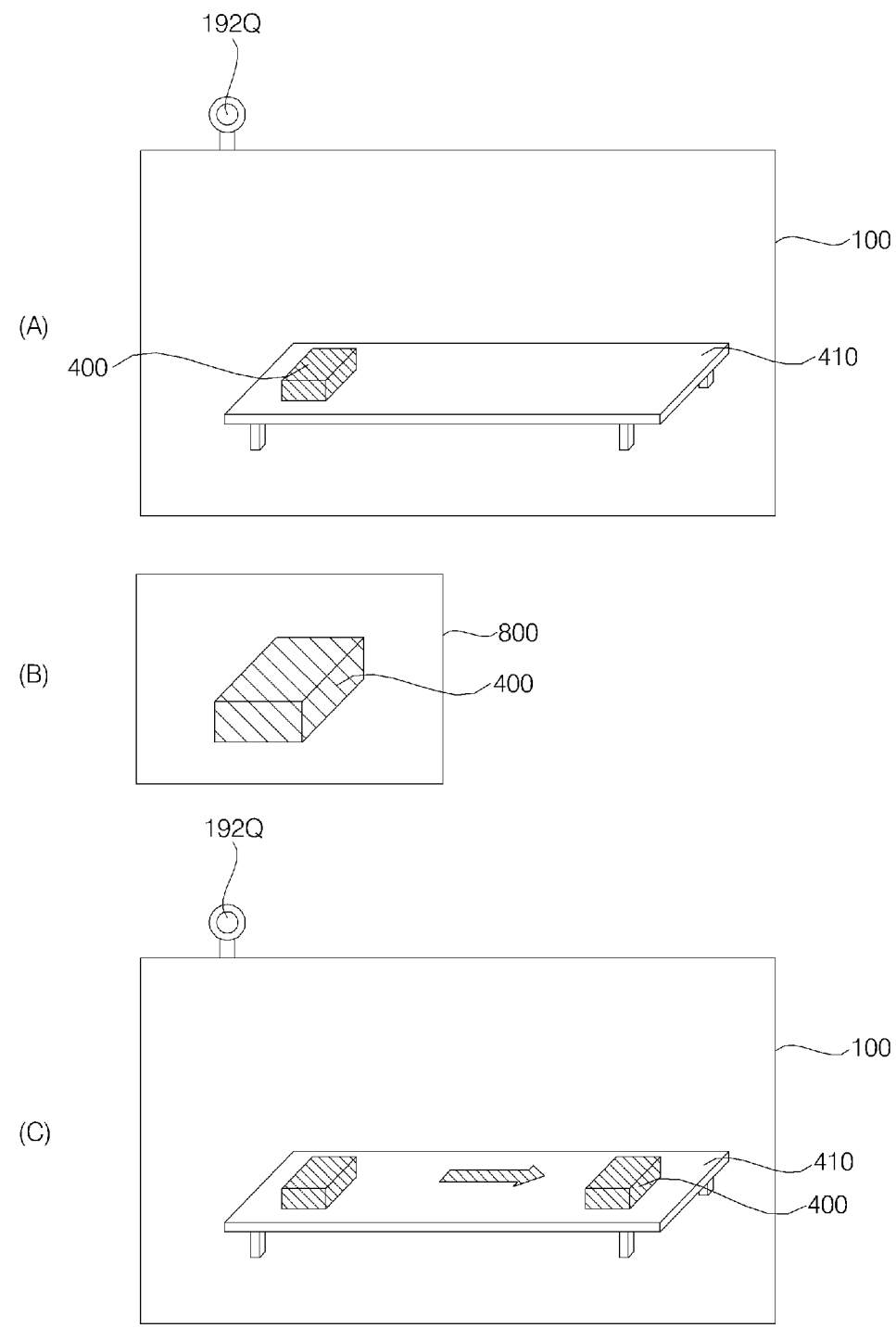

As shown in FIG. 8, it is assumed that, when the user 190 views the second space area SP2 through the transparent display panel 100, the object 400 is laid at the left upper side of the predetermined table 410.

In this case, as shown in FIG. 8(C), if the user inputs a setting change command for changing the position of the object 400, the controller of the transparent display apparatus may display a photo 800 of the object 400 captured by the object sensor unit 192Q shown in FIG. 8(B) at a position, to which the object will be moved, for example, at a right upper side of the table 410, on the screen of the transparent display panel 100. At this time, the position where the photo of the object 400 will be displayed on the transparent display panel 100 may be selected in consideration of a user position (viewing direction).

In this case, the user may perceive the object 400 as being located at the right upper side of the table 410.

In addition, since the transparent display panel 100 according to the present invention transmits light, the user may view the actual object 400 located at the left upper side of the table 410.

In the transparent display apparatus according to the present invention, the position of the object 400 may be virtually moved on the screen of the transparent display panel 100 using the image information (photo) and position information of the object 400 acquired by the object sensor unit 192Q and user position information.

Figure 9:
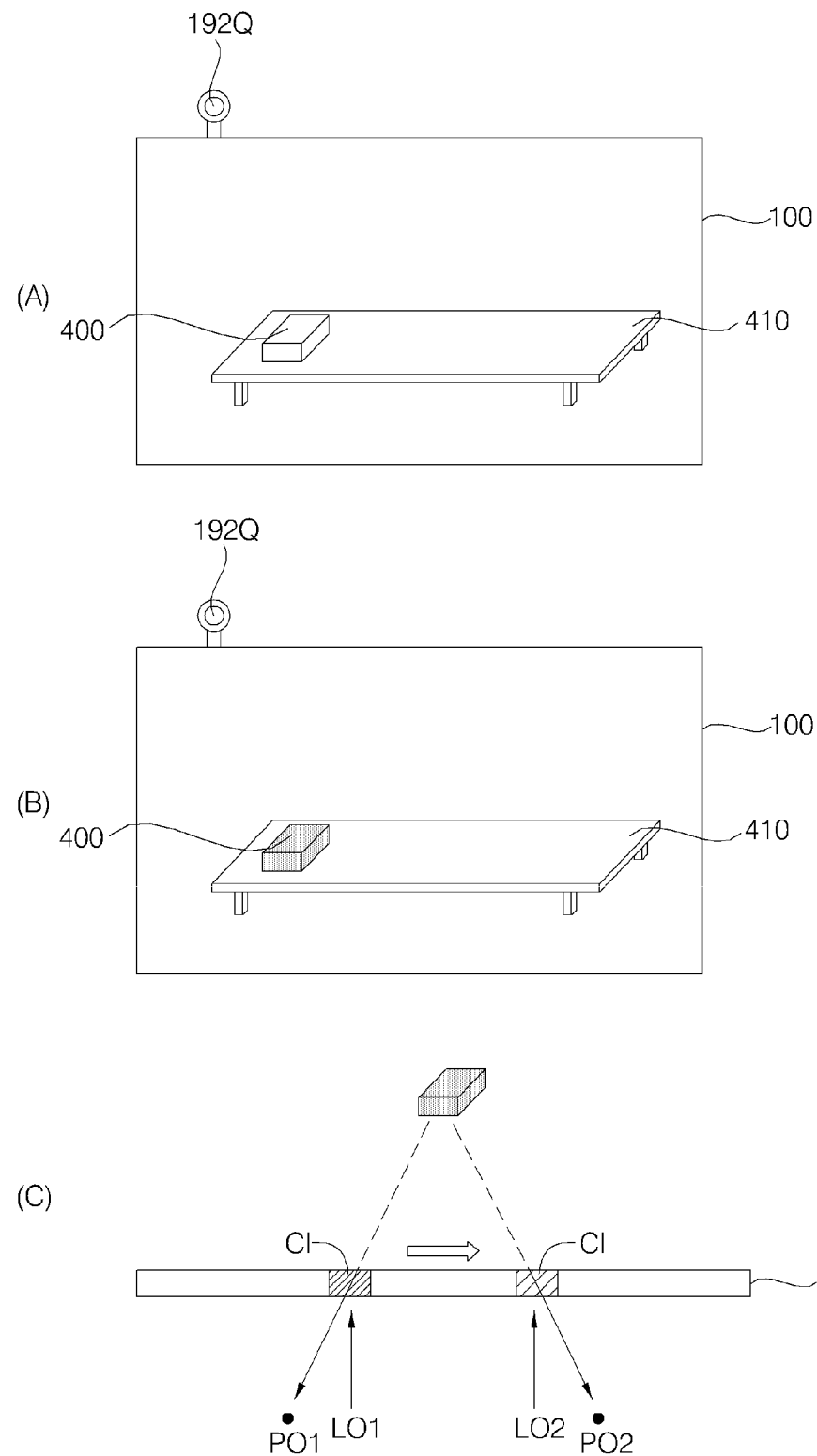

Alternatively, as shown in FIG. 9, in the transparent display apparatus according to the present invention, the color of the object 400 may be virtually changed on the screen of the transparent display panel 100 using a variety of information about the object 400 acquired by the object sensor unit 192Q.

In this case, the object sensor unit 192Q can detect the color of the object 400.

That is, the object sensor unit 192Q may analyze the video/photo of the object 400 to acquire color information of the object 400 and display a predetermined first color image at a first position on the transparent display panel 100 corresponding to the user position information and the position information of the object 400.

When the user views the object 400 at a current user position, the first position on the transparent display panel 100 and the object 400 may overlap or match each other. In this case, the user may view a first color image displayed at the first position on the transparent display panel 100 at a current position along with the object 400 located at the opposite side of the transparent display panel 100, thereby acquiring a visual effect for enabling the user to perceive the color of the object 400 as being changed.

If a user position is changed from Po1 to Po2 as shown in FIG. 9(C), a position where a first color image CI is displayed may be changed from a first position Lo1 to a second position Lo2 such that the first color image CI and the actual object 400 overlap or match each other.

In other words, the first color image CI may be located on a line connecting the user located in the first space area SP1 and the object 400 located in the second space area SP2.

Figure 10:
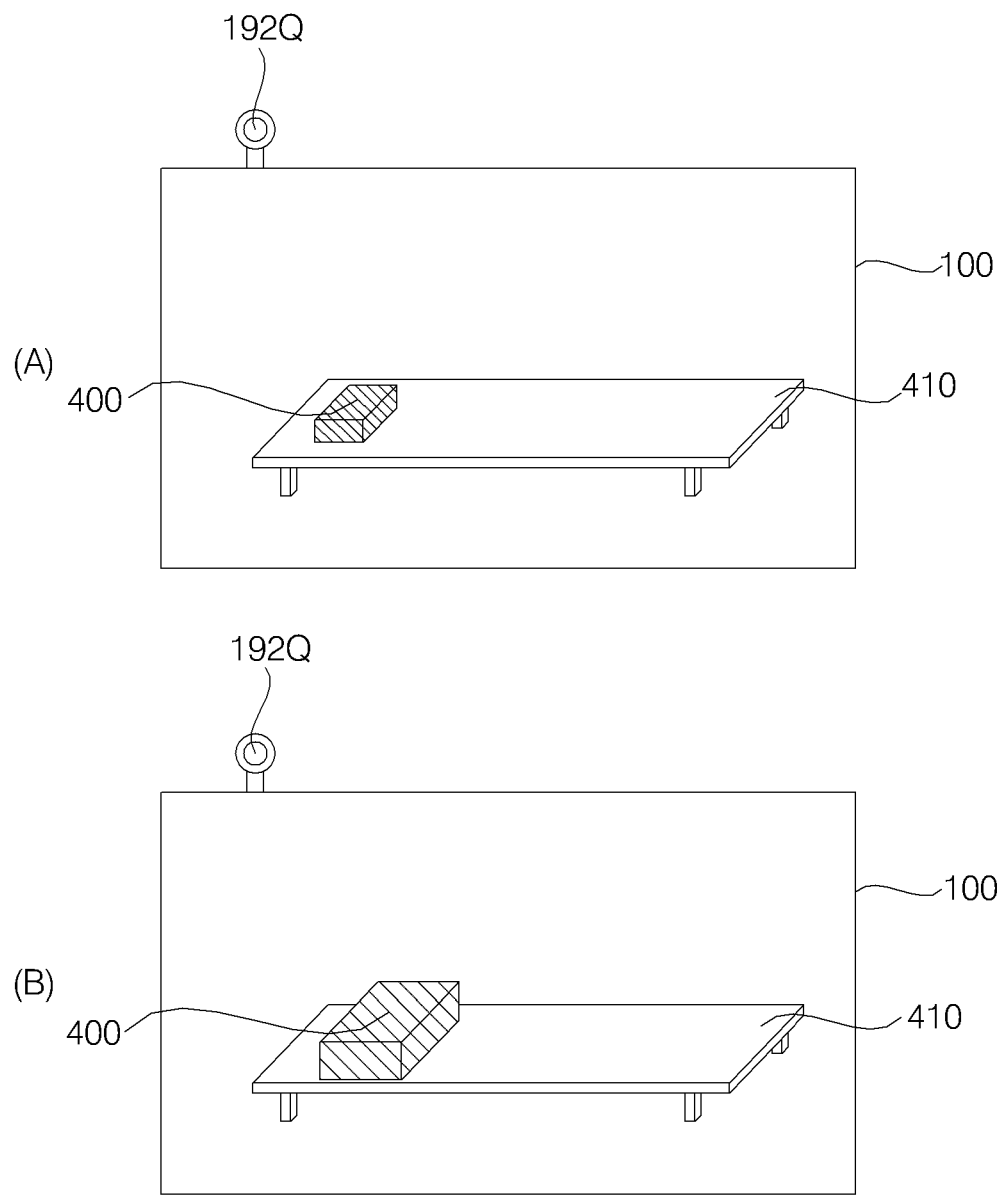

Alternatively, as shown in FIG. 10, in the transparent display apparatus according to the present invention, the size of the object 400 may be virtually changed on the screen of the transparent display panel 100 using a variety of information about the object 400 acquired by the object sensor unit 192Q.

In this case, the object sensor unit 192Q may detect the size and shape information of the object 400.

That is, the object sensor unit 192Q may analyze the video/photo of the object 400 to acquire size/shape information of the object 400 and display the enlarged image of the object 400 at a predetermined position on the transparent display panel 100 corresponding to the user position information and the position information of the object 400.

That is, as shown in FIG. 10(B), the controller of the transparent display apparatus may display the enlarged photo of the object 400 at a position corresponding to the position information of the object 400 on the transparent display panel 100 in consideration of the user position.

In this case, it is possible to acquire a visual effect for enabling the user to perceive the object 400 as being enlarged.

The augmented reality function will now be described.

Figure 11:
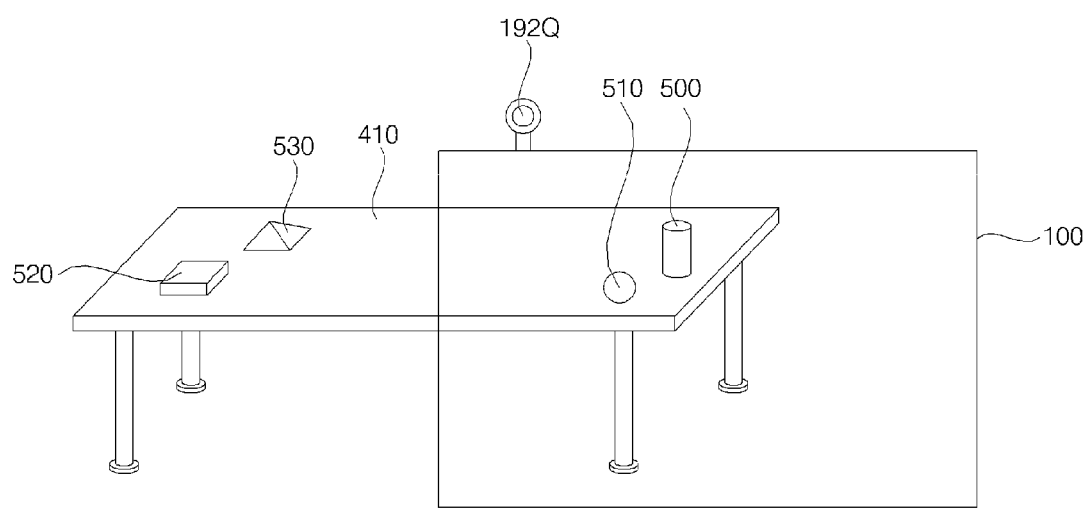
Figure 12:
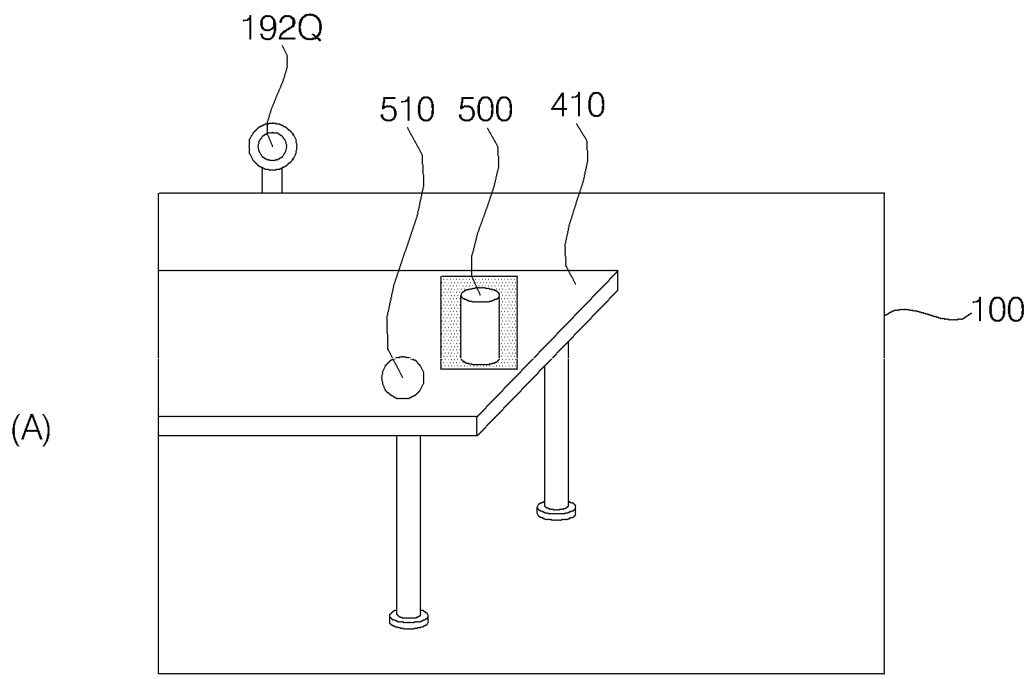
Figure 12:
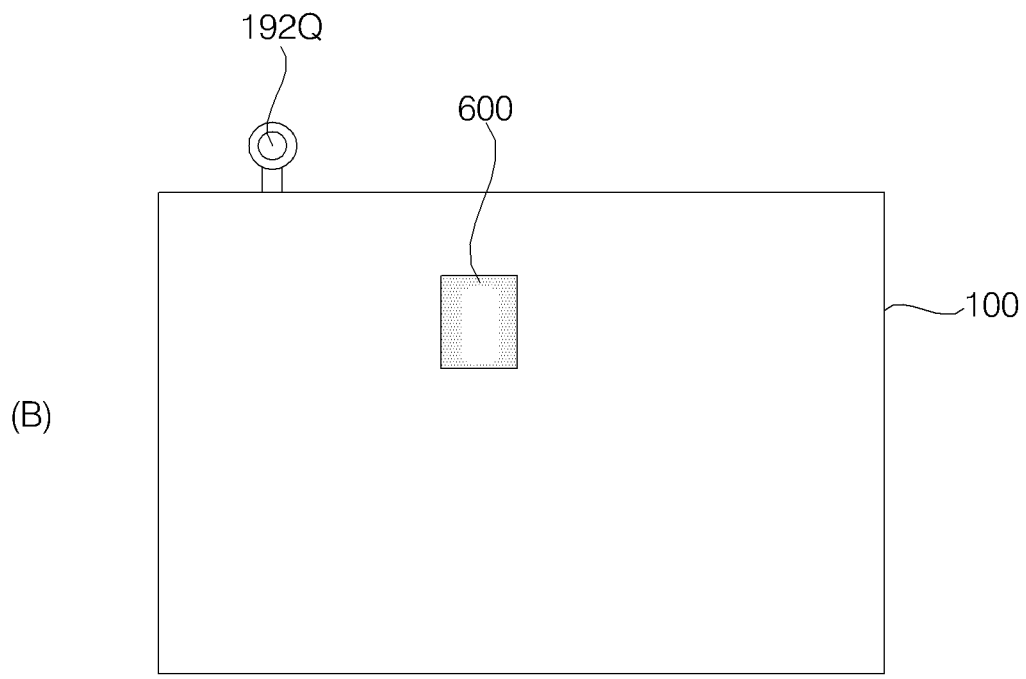

For example, as shown in FIG. 11, it is assumed that first, second, third and fourth objects 500 to 530 are disposed on the table 410.

If the user observes a right portion of the table 410 using the transparent display panel 100, the first and second objects 500 and 510 among the first, second, third and fourth objects 500 to 530 may correspond to the transparent display panel 100.

That is, only the first and second objects 500 and 510 are displayed on the screen of the transparent display panel 100.

In this case, as shown in FIG. 12(A), if the user inputs an object selection signal for selecting the first object 500, the first object 500 may be selected from among the plurality of objects 500 to 530.

In addition, a selection mark 600 indicating that the first object 500 is selected by the user may be displayed around the first object 500 on the transparent display panel 100.

In order to enable the user to select the first object 500, it is necessary to acquire the position information of the first object 500 and the user position information. For example, a user vision direction, position information such as the altitude of the user's eyes, a distance between the user and the transparent display panel 100, position information such as the altitude of the first object 500, and a distance between the first object 500 and the transparent display panel 100 may be acquired.

The controller of the transparent display apparatus according to the present invention may determine which portion of the transparent display panel 100 appears to overlap the first object 500 when considering the current position, eye level and vision direction of the user.

Thereafter, if the selection mark 600 is displayed at a predetermined position of the transparent display panel 100 according to the determined result, the user may recognize that the first object 500 is selected.

Although only the selection mark 600 may be displayed on the transparent display panel 100 as shown in FIG. 12(B), since the user may view the first object located at the opposite side of the transparent display panel 100 and the selection mark 600 together, the user perceives the selection mark 600 as being formed around the first object 500 such that the user recognizes that the first object 500 is selected.

In the present invention, as described above, at least one object may be selected from among the plurality of objects on the transparent display panel 100 using the selection mark 600.

Information about the selected object may be displayed on the screen of the transparent display panel 100.

Figure 13:
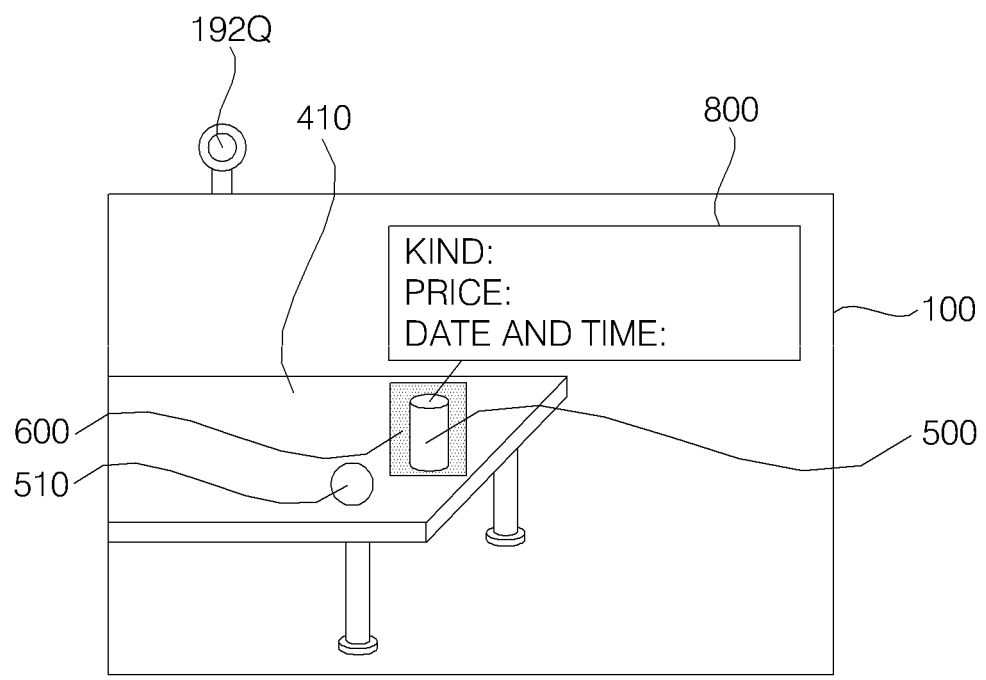

For example, as shown in FIG. 13, if the first object 500 is selected from the plurality of objects, information about the first object 500, such as a kind, a price, or a date and time, may be displayed on the screen of the transparent display panel 100.

If the first object 500 corresponding to the transparent display panel 100 is selected, the information about the selected first object 500 may be displayed on the transparent display panel 100 using various methods.

For example, the transparent display apparatus according to the present invention may access a predetermined first server for storing the information about the first object 500.

In this case, the transparent display apparatus may capture the video/photo of the first object 500 and transmit the video/photo to the first server.

Then, the first server transmits information corresponding to the video/photo transmitted by the transparent display apparatus according to the present invention to the transparent display apparatus and the transparent display apparatus displays the information on the transparent display panel 100.

Alternatively, if the transparent display apparatus according to the present invention has a sufficiently large memory capacity, the information about the first object 500 may be stored in the memory.

In this case, the transparent display apparatus can acquire and display the information about the first object 500 without accessing the first server.

Alternatively, an information code for information recognition may be displayed on the object.

Figure 14:
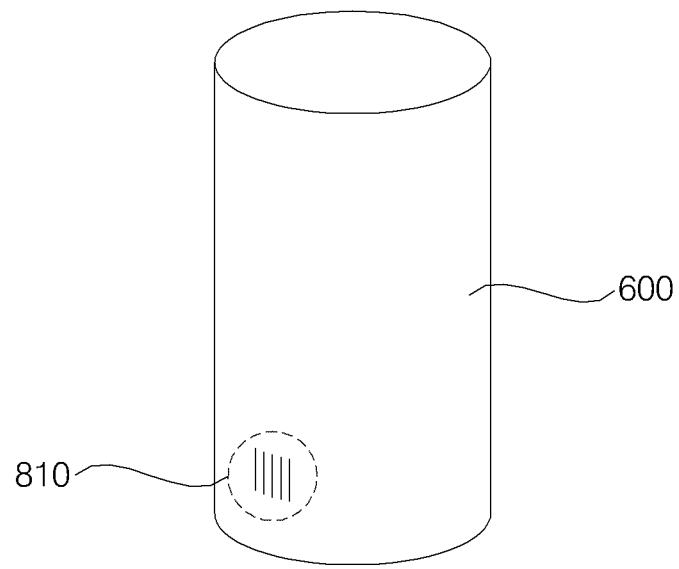
Figure 15:
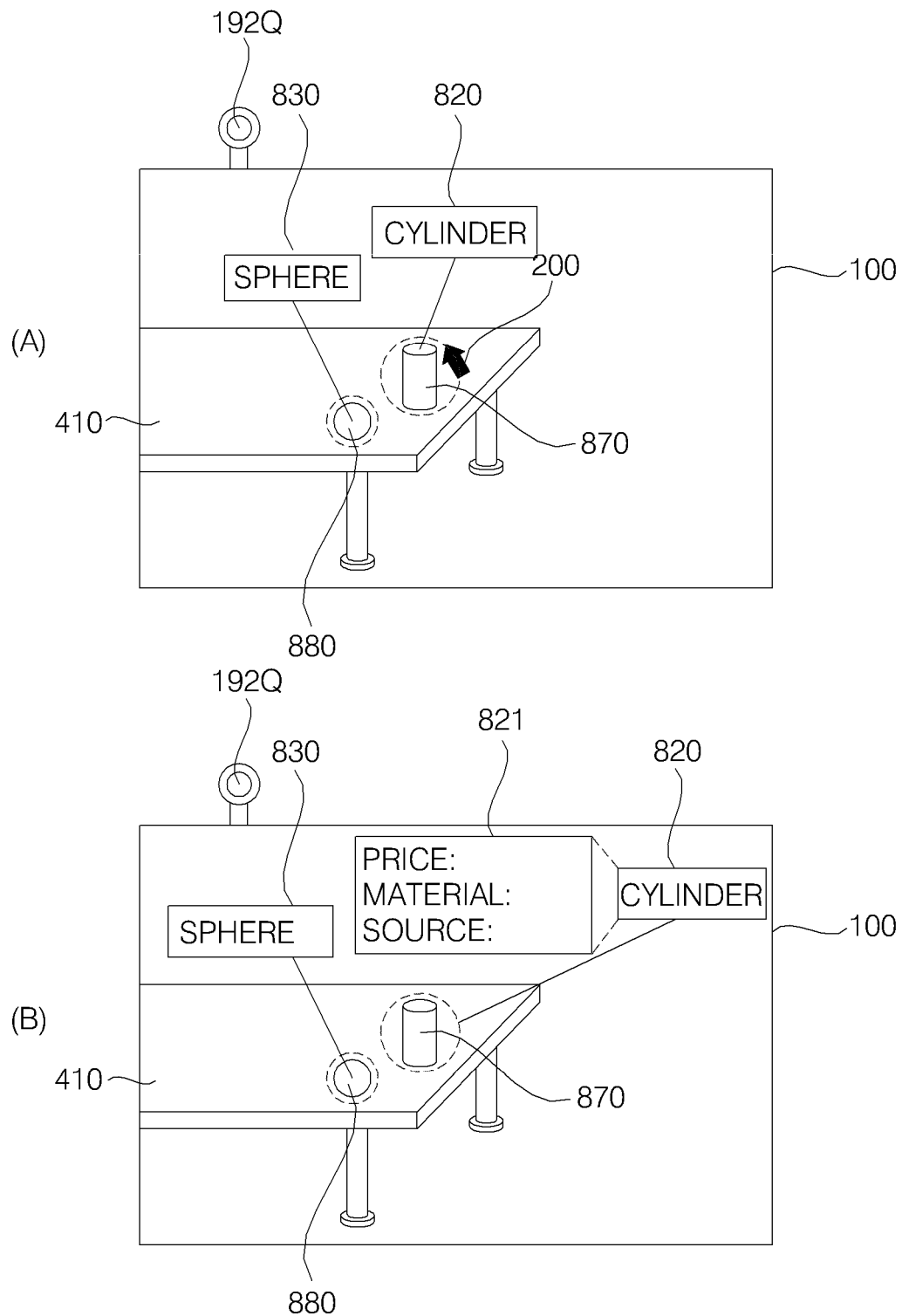

For example, as shown in FIG. 14, on a predetermined object 600, an information code including the information about the object 600, such as a bar code or a QR code, may be displayed. The information code which may be displayed on the object 600 is not limited to the bar code or the QR code.

In this case, the transparent display apparatus according to the present invention may acquire and display the information about the object 600 by scanning the information code displayed on the object 600.

The object sensor unit 192Q of the transparent display apparatus preferably includes a scanner, such as a laser scanner, for scanning the information code displayed on the object 600.

In addition, if an object is selected or object information is selected in a state in which object information is displayed on the transparent display panel 100, detailed information (low-level information) of the object may be displayed on the transparent display panel 100.

For example, as shown in FIG. 15(A), it is assumed that a first object 870 and a second object 880 are displayed on the transparent display panel 100.

If the user selects the first object 870 and the second object 880, first information 820 of the first object 870 and first information 830 of the second object 880 may be displayed on the transparent display panel 100.

The first information 820 of the first object 870 may be name or kind information of the first object 870 and the first information 830 of the second object 880 may be name or kind information of the second object 880.

Although the user does not directly select the first object 870 and the second object 880, if the first object 870 and the second object 880 correspond to the transparent display panel 100, the first information 820 and 830 of the first objet 870 and the second object 880 may be displayed on the screen of the transparent display panel 100.

As shown in FIG. 15(B), if the user selects the first object 870 using a pointer 200 in a state in which the first information 820 and 830 of the first object 870 and the second object 880 is displayed on the screen of the transparent display panel 100, second information 821 which is detailed information (low-level information) of the first information 820 of the first object 870 may further be displayed on the screen of the transparent display panel 100.

The second information 821 which is the detailed information (low-level information) of the first information 820 of the first object 870 may include price information, material information, source information, etc. of the first object 870.

Alternatively, if the user selects the first information 820 of the first object 870 using the pointer 200 in a state in which the first information 820 and 830 of the first object 870 and the second object 880 is displayed on the screen of the transparent display panel 100, the second information 821 of the detailed information (low-level information) of the first information 820 of the first object 870 may be displayed on the screen of the transparent display panel 100.

If at least one object is selected from among the plurality of objects, the information about at least one unselected object may be omitted in a state in which the information about the selected object is displayed on the transparent display panel 100.

Figure 16:
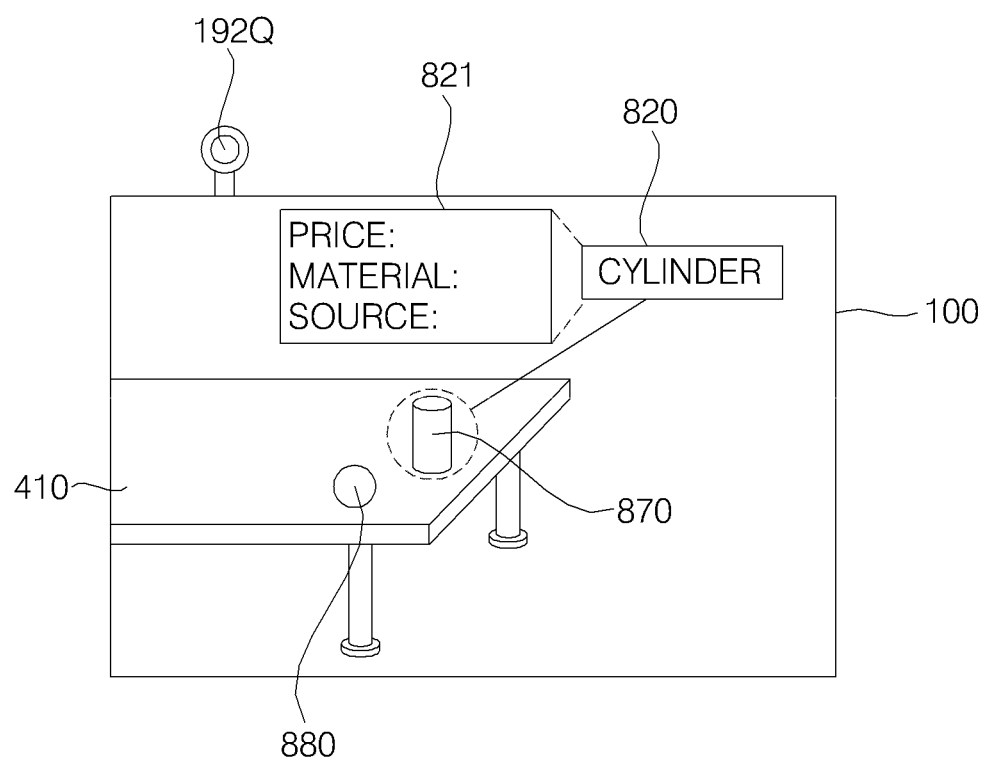

Alternatively, as shown in FIG. 16, if the second information 821 which is the detailed information (low-level information) of the first information 820 of the first object 870 is displayed on the screen of the transparent display panel 100, the first information 830 of the second object 880 may be omitted.

In this case, since the user selects the first object 870, the first information 830 of the second object 880 may be omitted.

In the case in which a plurality of objects is displayed on one screen and information about the plurality of objects is displayed on one screen, it is necessary to appropriately select the display positions of the information about the objects.

Figure 17:
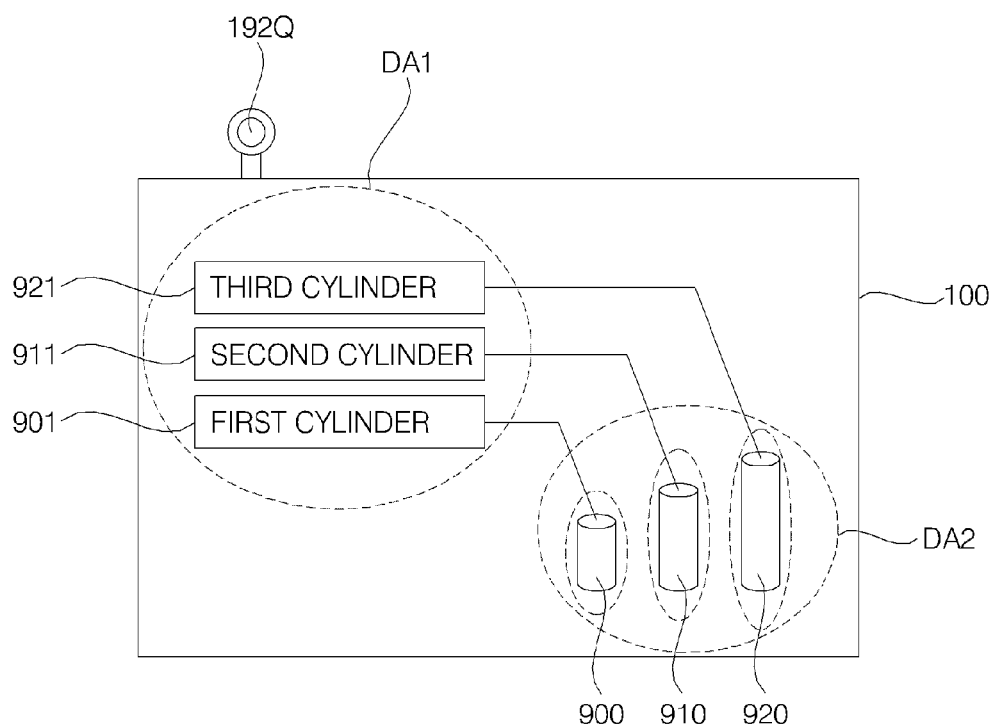

For example, as shown in FIG. 17, in the case in which first, second third objects 900 to 920 are displayed in a second screen area DA2 among screen areas of the transparent display panel 100, information 901, 911 and 921 of the first, second and third objects 900 to 920 may be displayed in a first screen area DA1 different from the second screen area DA2 and separated from the second screen area DA2.

Figure 18:
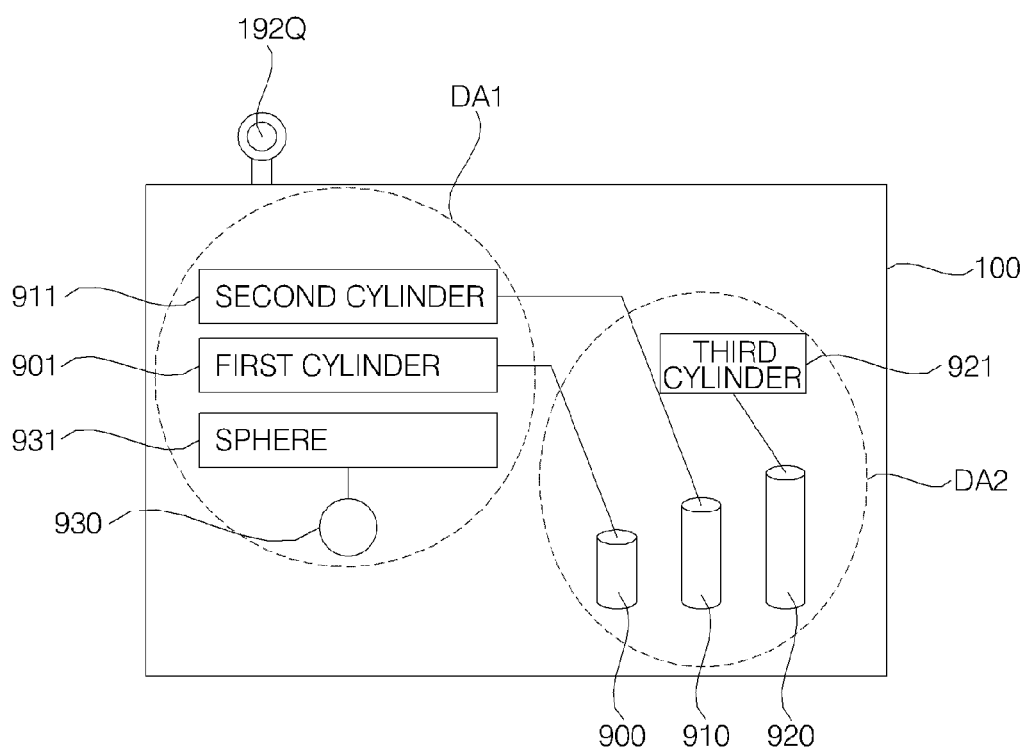
Figure 19:
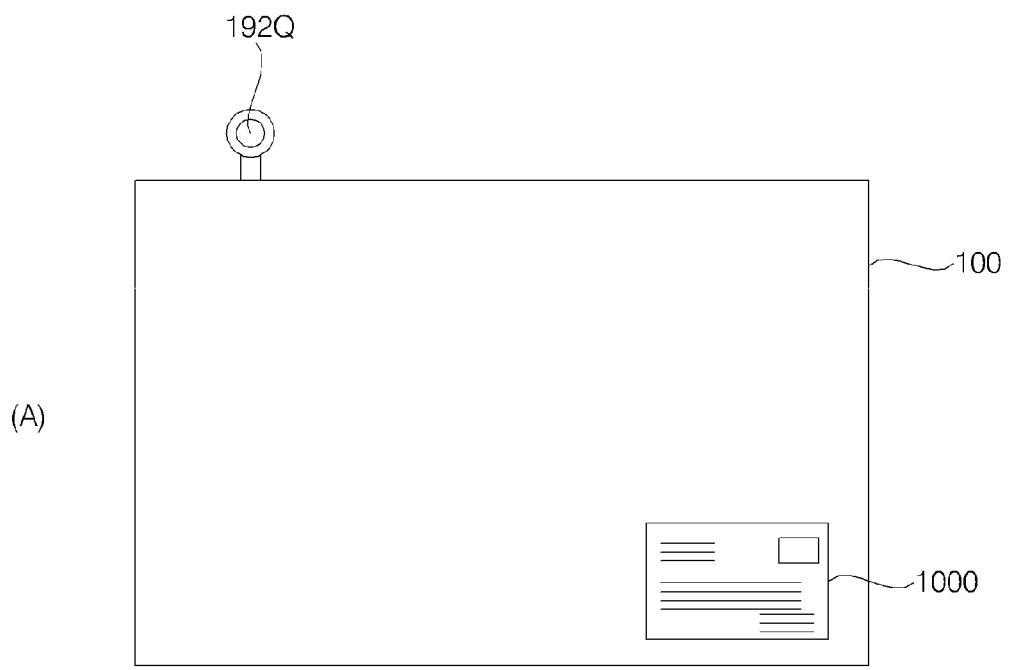
Figure 19:
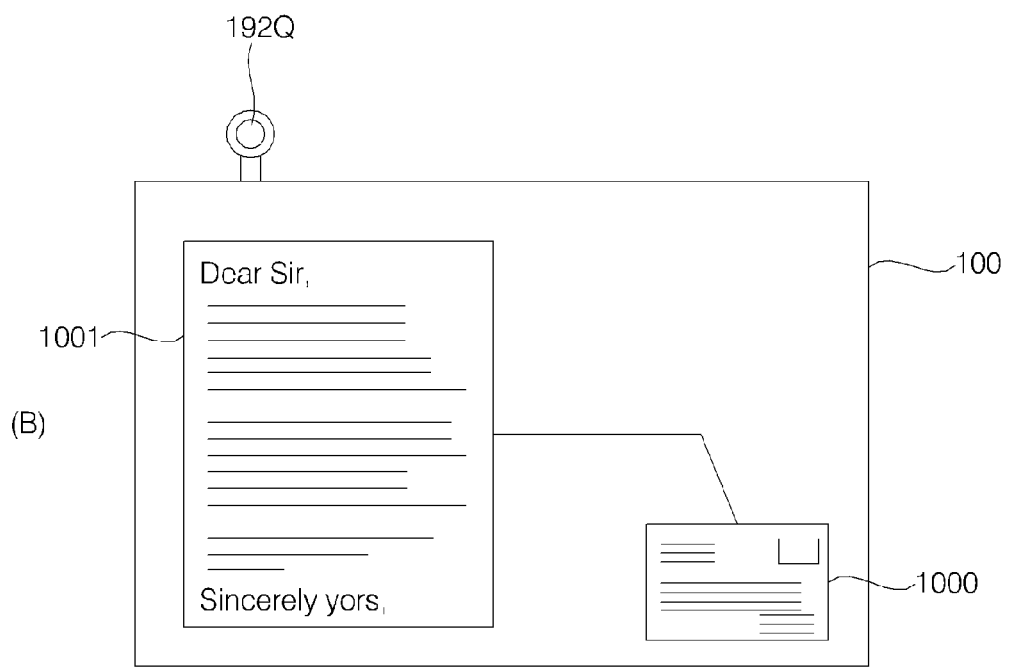

Alternatively, as shown in FIG. 18, it is assumed that first, second and third objects 900 to 920 are displayed in the second screen area DA2 among the screen areas of the transparent display panel 100 and a fourth object 930 is displayed in the first screen area DA1.

In this case, the information 901, 911 and 931 of the first, second and fourth objects 900, 910 and 930 may be displayed in the first screen area DA1 and the information 921 of the third object 920 may be displayed in the second screen area DA2.

In other words, if the number of objects corresponding to the first screen area among the screen areas of the transparent display panel 100 is less than the number of objects corresponding to the second screen area different from the first screen area, the number of pieces of object information displayed in the first screen area may be greater than the number of pieces of object information displayed in the second screen area.

That is, object information may be displayed in an area in which the number of objects is smaller.

The transparent display apparatus according to the present invention may select and use various objects such as a letter, a fax and a business card.

For example, as shown in FIG. 19(A), if a postcard 1000 is selected as an object, the transparent display apparatus according to the present invention may display information 1001 of the postcard 1000, that is, content of the postcard 1000, on the transparent display panel 100, as shown in FIG. 19(B).

In this case, the object sensor unit 192Q of the transparent display apparatus according to the present invention may scan text content of the postcard 1000 and display the scanned content as shown in FIG. 19B.

Alternatively, an information code including a message to be sent may be formed on the postcard 1000 and the transparent display apparatus according to the present invention may scan the information code formed on the postcard 1000 to confirm the content of the postcard 1000.

In this case, only a user who is allowed to access the message of the postcard 1000 may scan the information code.

For example, the information code formed on the postcard 1000 may include identification information of the user who is allowed to access the message, such as a password, a facial contour or a voice pattern.

In this case, a user who wishes to access the message of the postcard 1000 using the transparent display apparatus according to the present invention may access the content of the postcard 1000 using the identification information. For example, the user inputs a predetermined password, captures a facial contour using the object sensor unit 192Q and compares the captured facial contour with facial contour information included in the information code formed on the postcard 1000, or inputs voice using the sound sensor unit 191Q and compares the input voice pattern with voice information included in the information code formed on the postcard 1000, thereby displaying the information (content) of the postcard 1000 on the screen of the transparent display panel 100 as shown in FIG. 19(B) if access is allowed.

Figure 20:
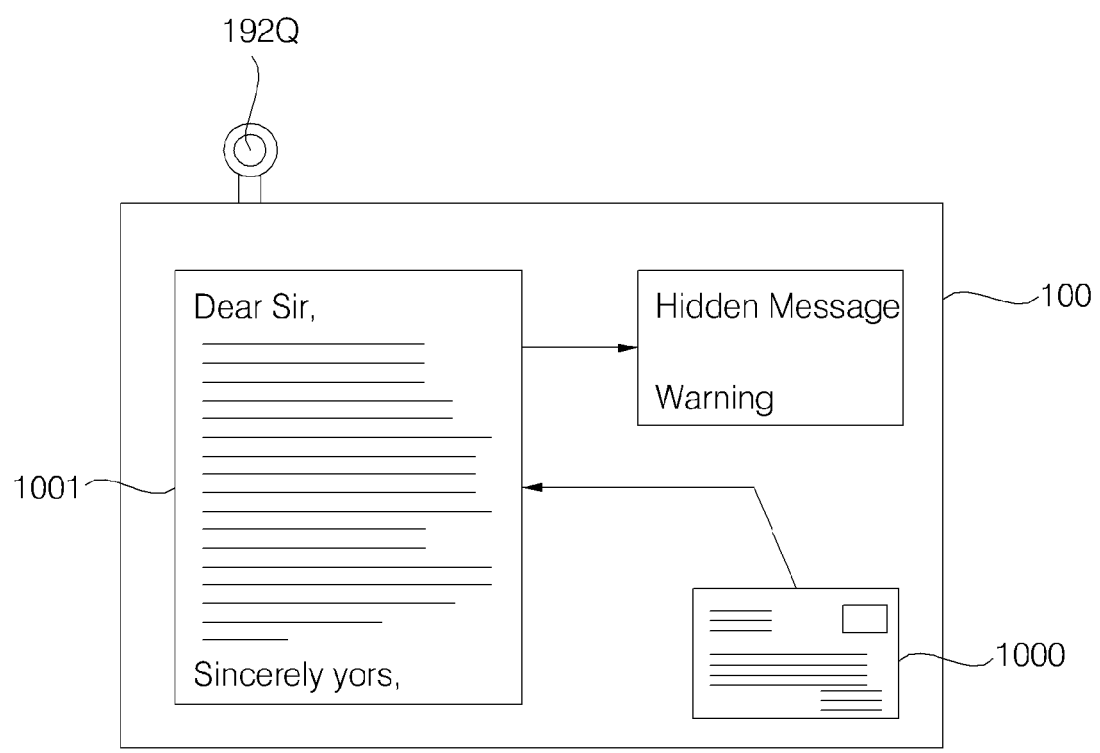
Figure 21:
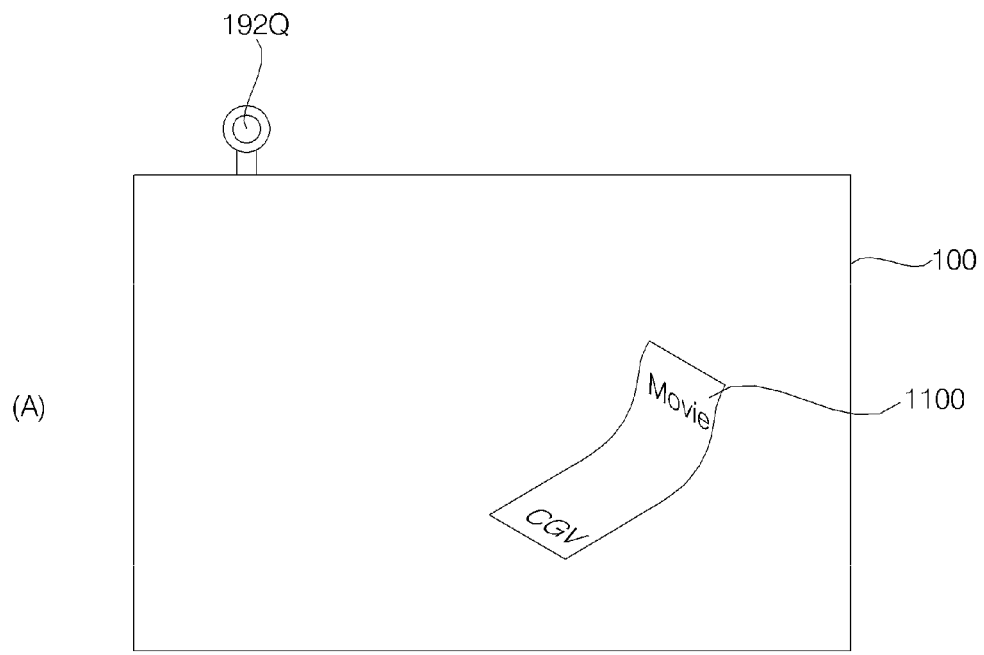
Figure 21:
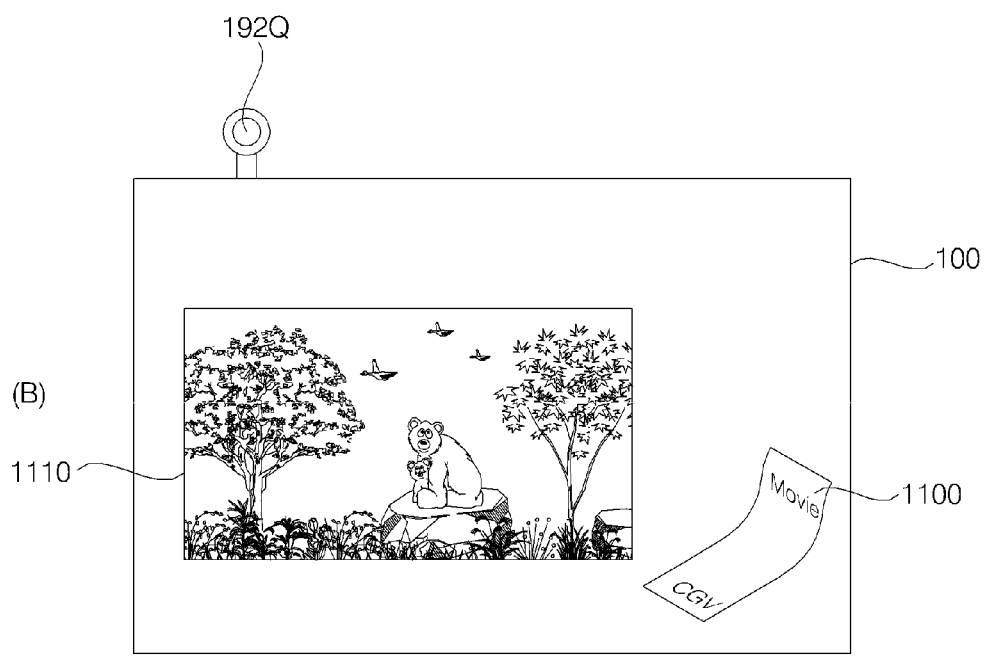
Figure 22:
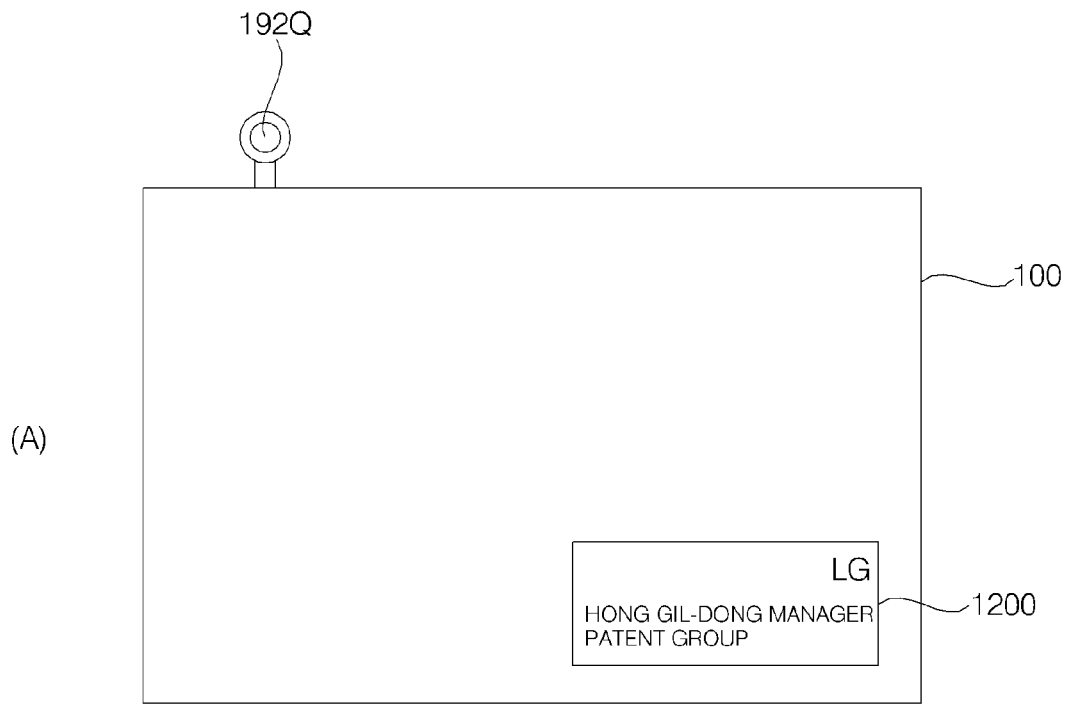
Figure 22:
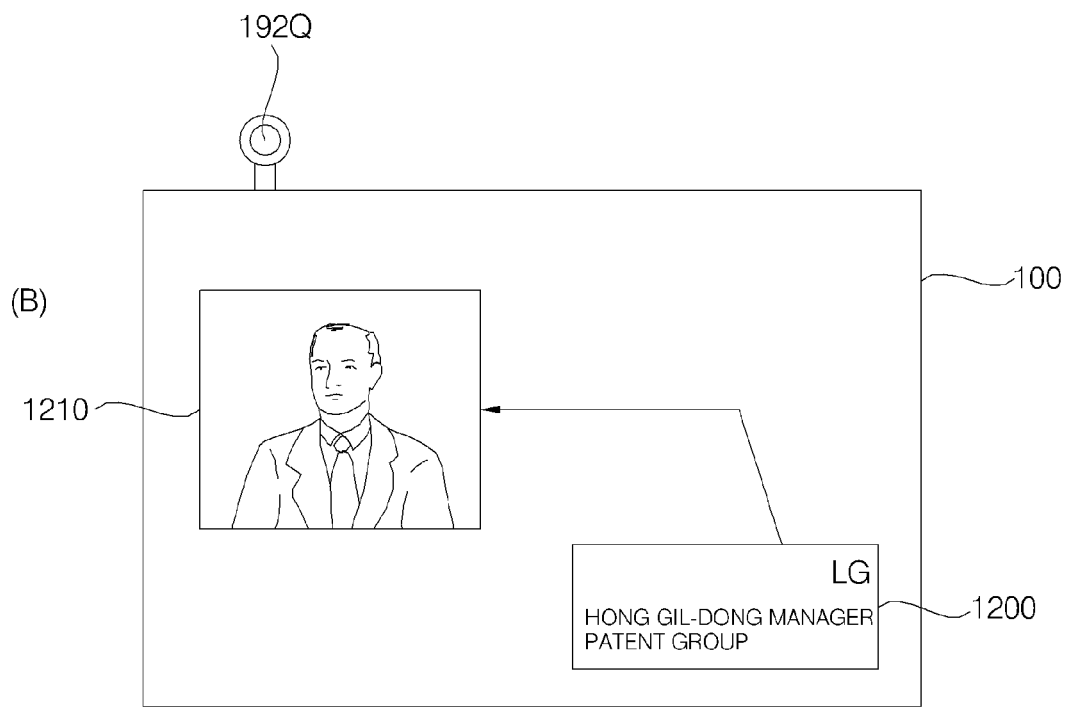
Figure 23:
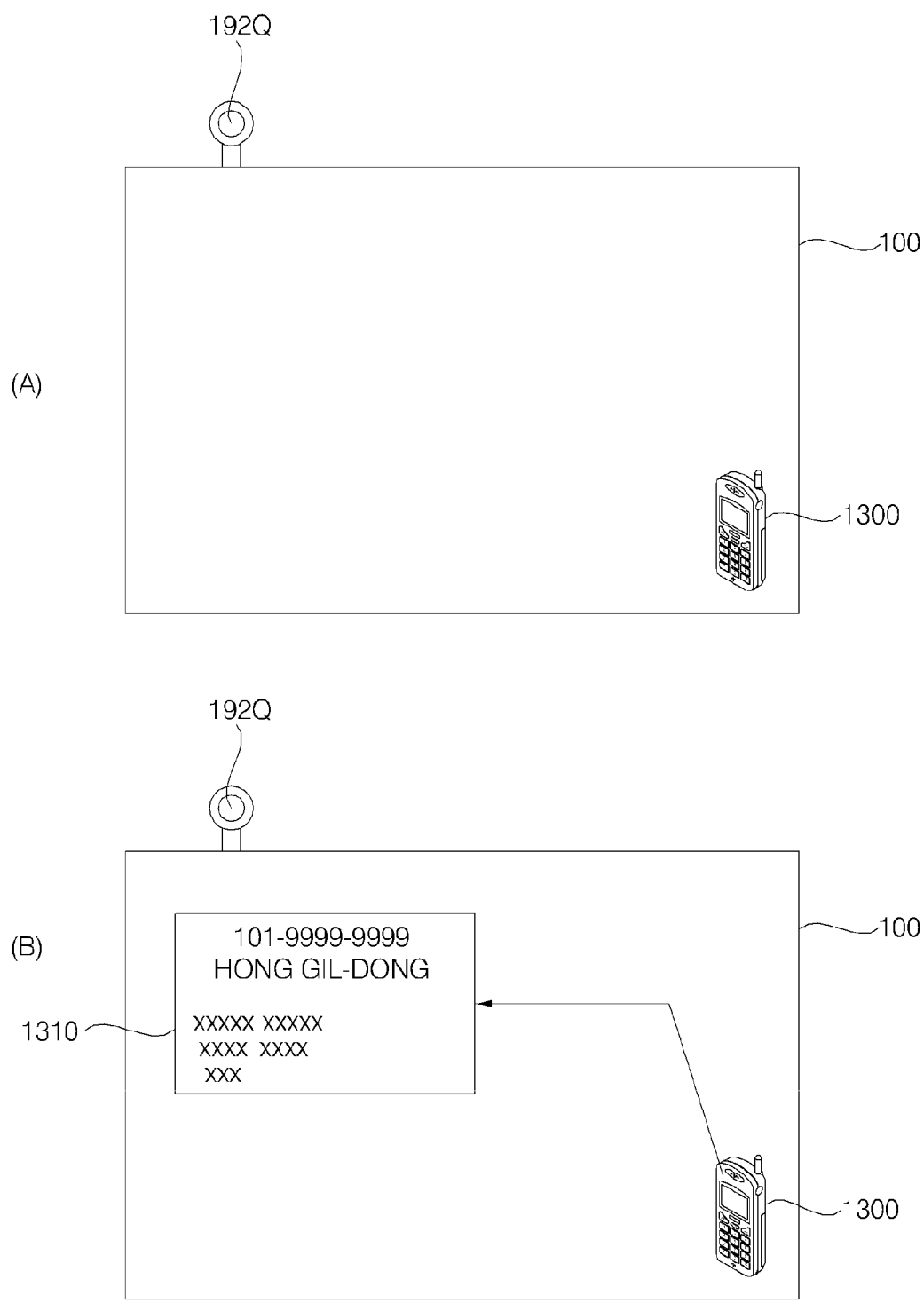
Figure 24:
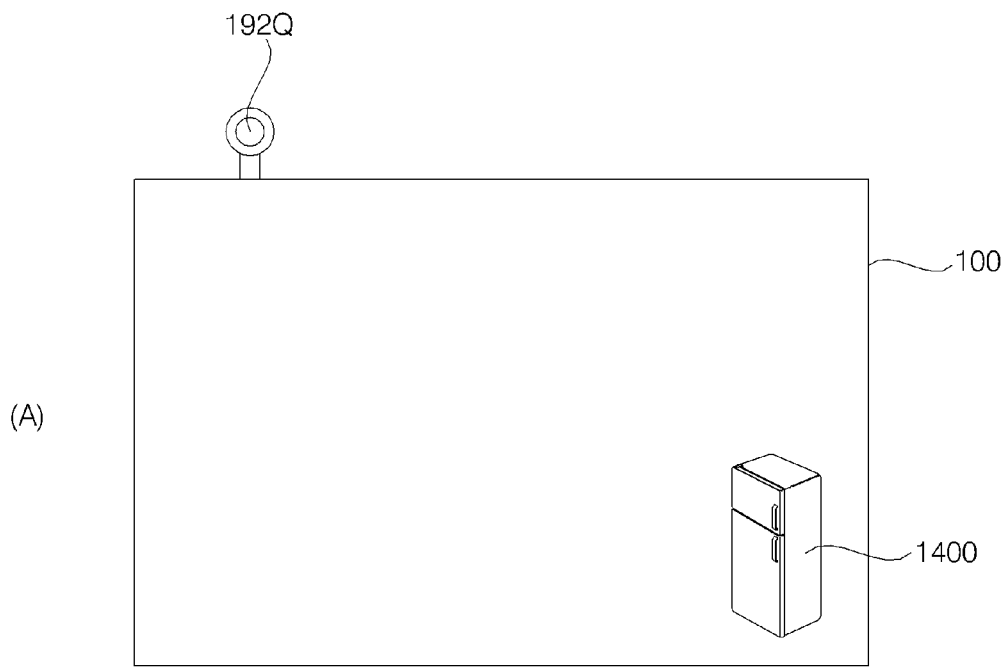
Figure 24:
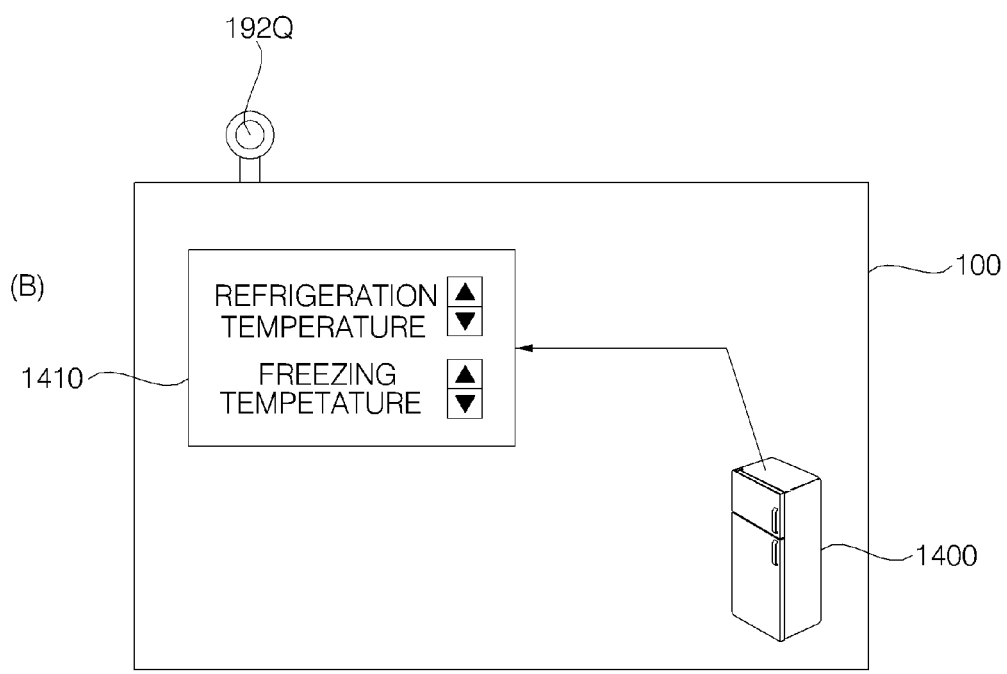

If the content of the postcard 1000 is confirmed using the identification information of the user, as shown in FIG. 20, a first user may include hidden information in the postcard 1000 and a second user may use the hidden information.

For example, as shown in FIG. 20, if the user inputs identification information in a state in which the content of the postcard 1000 is displayed on the transparent display panel 100, a hidden message different from the content of the already displayed postcard 1000 may be displayed on the transparent display panel 100.

If an object corresponding to the transparent display panel 100 is selected, image (video/photo) information of the selected object may be displayed on the transparent display panel 100.

For example, as shown in FIG. 21(A), if a movie ticket 1100 is selected as an object, the transparent display apparatus according to the present invention may display video information 1110 of the movie ticket 1100, e.g., a preview 1110 of the movie ticket 1100, on the transparent display panel 100, as shown in FIG. 21(B).

Audio information of the movie ticket 110 may be output through the audio output unit.

Alternatively, as shown in FIG. 22(A), if a business card 1200 is selected as an object, the transparent display apparatus according to the present invention may display information 1210 of the business card 1200, e.g., the photo 1210 of a person corresponding to the business card 1200 on the transparent display panel 100, as shown in FIG. 22(B).

In this case, in addition to the photo 1210 of the person corresponding to the business card 1200, a variety of information such as a tendency or a habit of the person may be on the transparent display panel 100.

If the object corresponding to the transparent display panel 100 is an electronic apparatus, the user of the electronic apparatus may acquire a control right of the electronic apparatus using the transparent display apparatus.

In other words, a control menu of at least one object corresponding to the transparent display panel 100 may be displayed on the transparent display panel 100.

For example, as shown in FIG. 23(A), if a mobile phone 1300 is selected as an object, the transparent display apparatus according to the present invention may display information about the mobile phone 1300 on the transparent display panel 100 as shown in FIG. 23(B).

For example, if a text message is received through the mobile phone 1300, the user may acquire the control right of the mobile phone 1300 using the transparent display apparatus according to the present invention and display the received text message 1310 on the transparent display panel 100 using the acquired control right as shown in FIG. 23(B).

In order to acquire the control right of the electronic apparatus as the object, the transparent display apparatus according to the present invention may display a control menu of the electronic apparatus as the object on the transparent display panel 100.

For example, as shown in FIG. 24(A), if a refrigerator 1400 is selected as an object, the transparent display apparatus according to the present invention may display a control menu 1410 of the refrigerator 1400 on the transparent display panel 100 as shown in FIG. 24(B).

The control menu 1410 of the refrigerator 1400 may include a menu for increasing or decreasing a refrigeration temperature and a menu for increasing or decreasing a freezing temperature.

In this case, if the user selects the menu for increasing the refrigeration temperature using a pointer, the transparent display apparatus according to the present invention may transmit a command for increasing the refrigeration temperature to the refrigerator 1400. In this way, it is possible to control the refrigerator 1400 using the transparent display apparatus according to the present invention.

The transparent display apparatus according to the present invention can remotely control various types of electronic apparatuses, such as an air conditioner or an oven, in addition to the refrigerator 1400 and the mobile phone 1300.

A plurality of objects corresponding to the transparent display panel 100 may be divided into a selectable type and an unselectable type.

Figure 25:
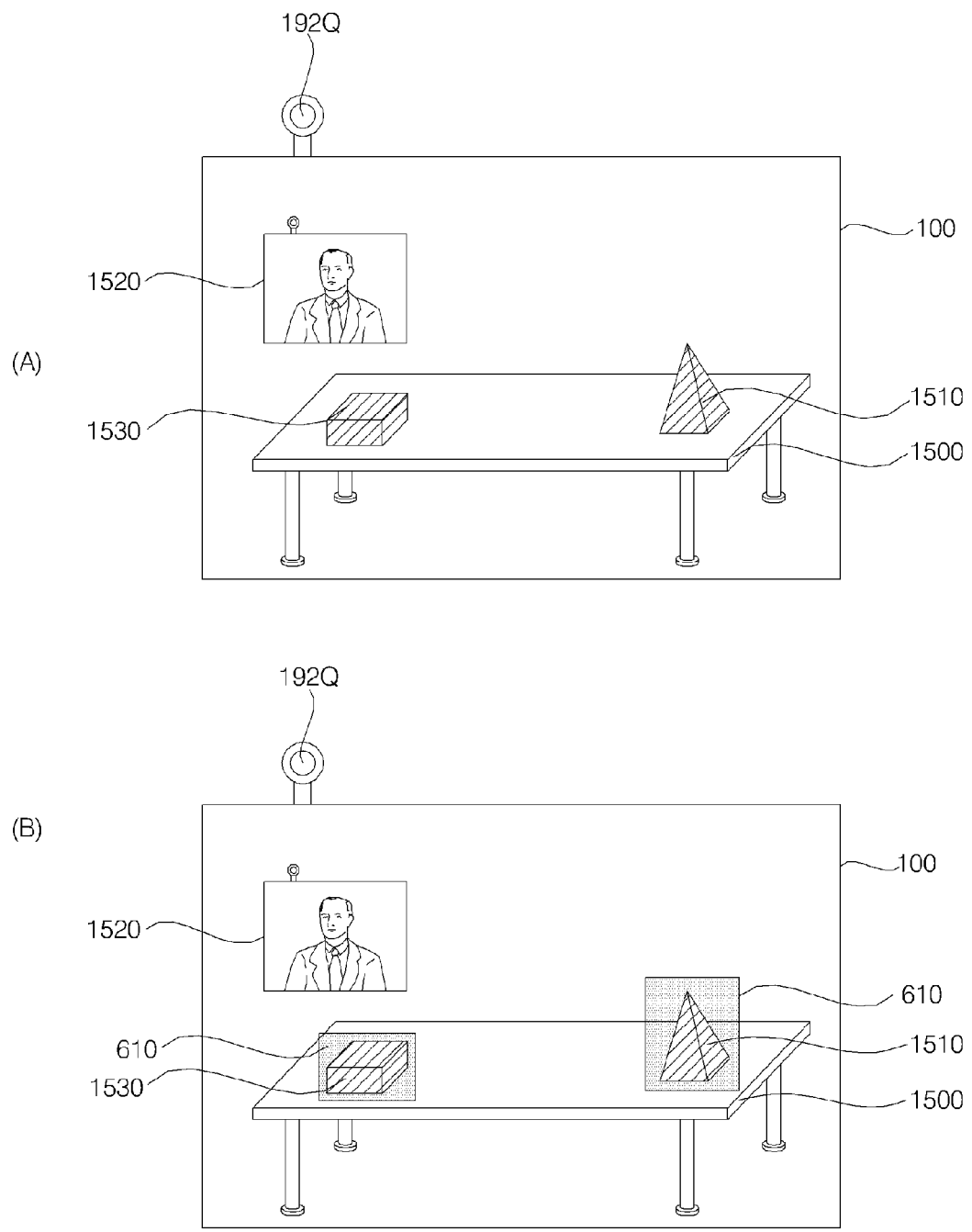
Figure 26:
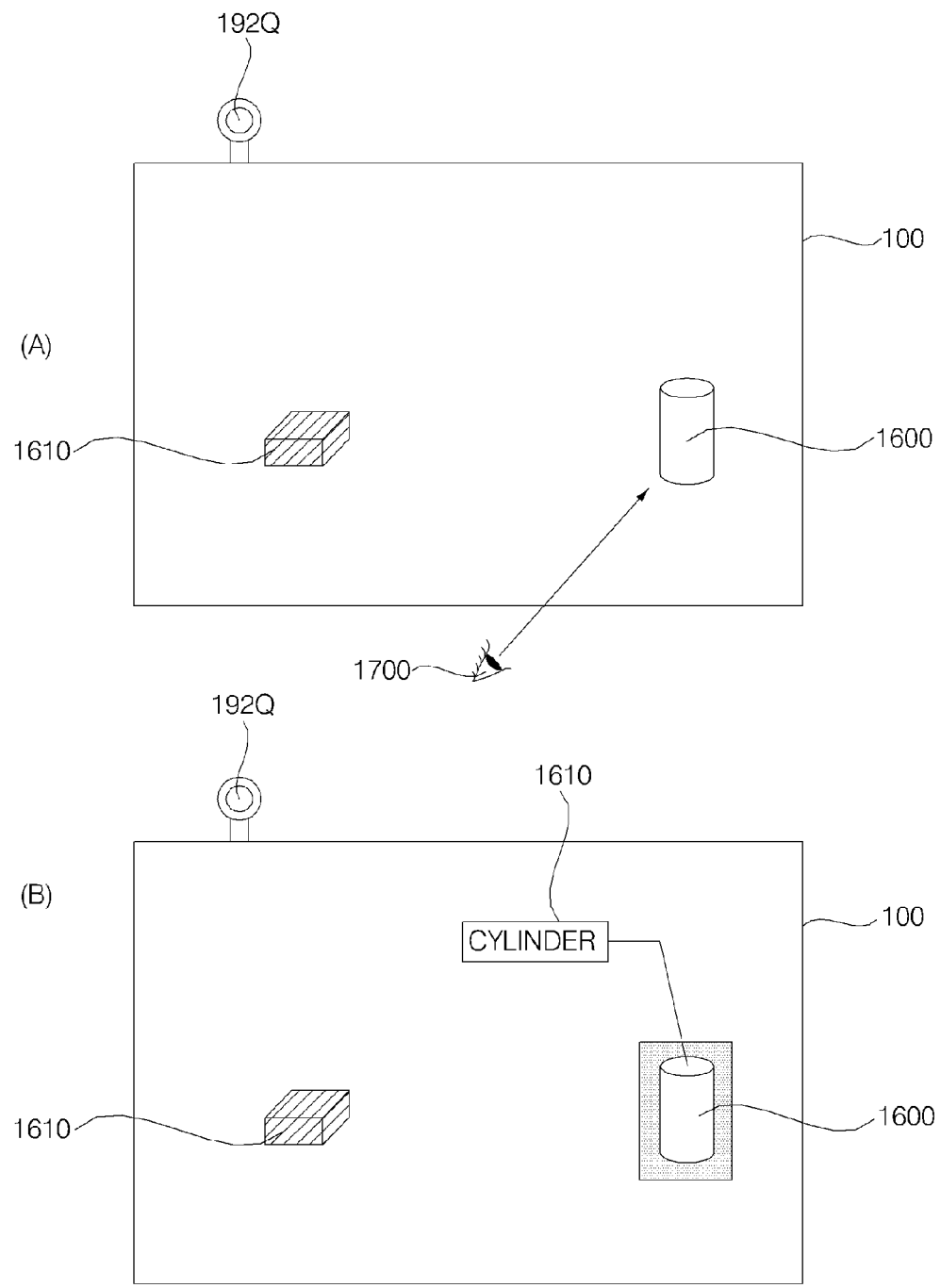
Figure 27:
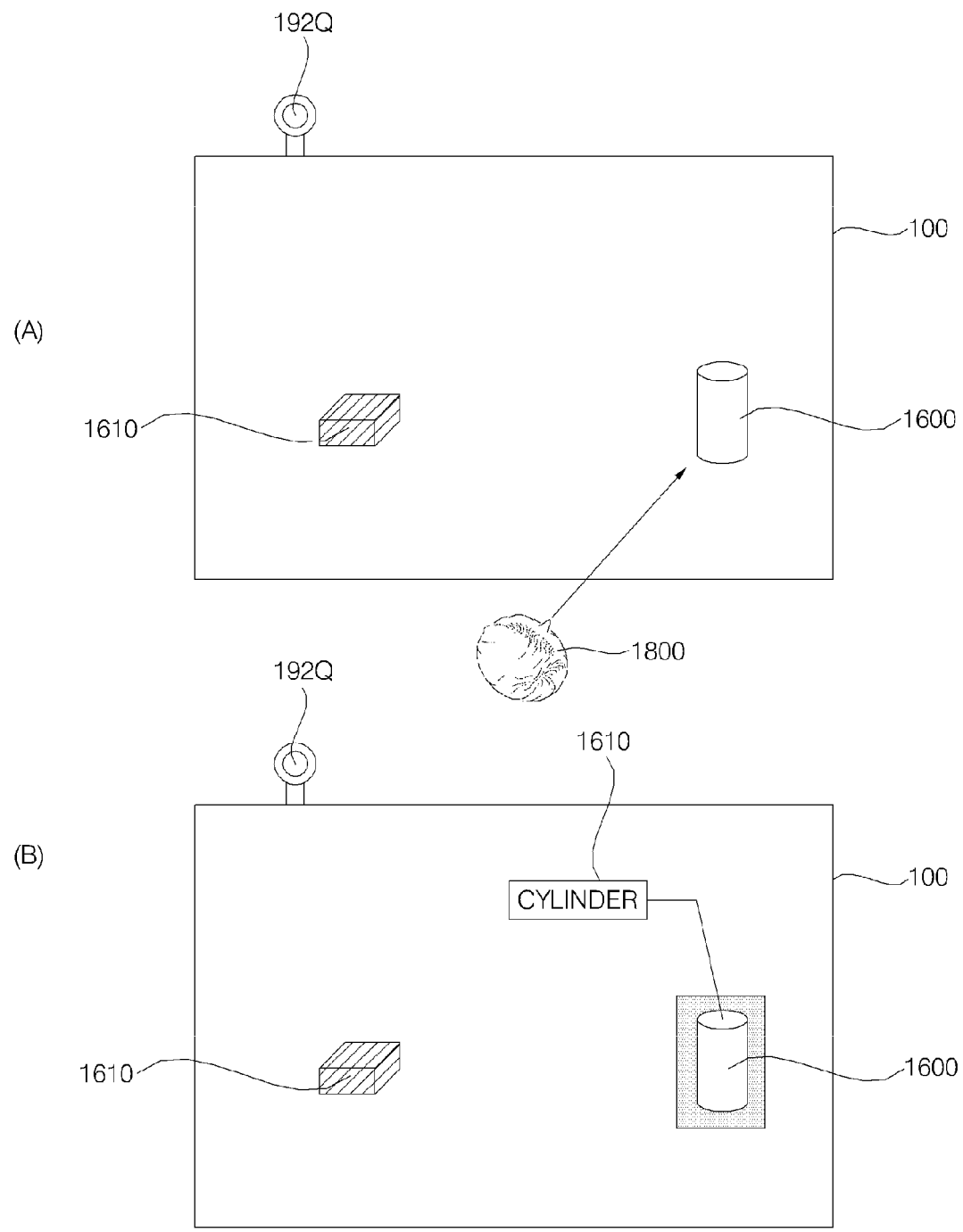

For example, as shown in FIG. 25, it is assumed that a first object 1510, a second object 1520 and a third object 1530 are displayed on the transparent display panel 100.

It is assumed that information about the first object 1510 and the third object 1530 is confirmed by scanning an information code such as a bar code or a QR code or comparing captured video/photo information with previously stored information or information stored in a server, but information about the second object 1520 is not confirmed. In this case, since an information code is not formed on the second object 1520 and information corresponding to a video/photo of the second object 1520 is not stored in a memory or a server, the second object 1520 may not be confirmed.

In this case, as shown in FIG. 25(B), a selection mark 610 may be displayed in an area corresponding to the first object 1510 and an area corresponding to a third object 1530. In contrast, a selection mark may not be assigned to the second object 1520 which may not be confirmed.

In this case, it is possible to confirm information corresponding to the first object 1510 and the third object 1530. Accordingly, if the user selects the first object 1510 and/or the third object 1530 to acquire the information about the first object 1510 and the third object 1530, the transparent display apparatus may display the information about the first object 1510 and the third object 1530 on the screen.

In contrast, even when the user selects the second object 1520 to acquire the information about the second object 1520, the transparent display apparatus may not provide the information about the second object 1520 on the screen.

As described above, in the transparent display apparatus according to the present invention, a selection mark 610 may be assigned in order to inform the user that an object, the information about which can be displayed, may be selected.

In the transparent display apparatus according to the present invention, it is possible to change a selected object according to an eye-gaze direction and a face direction of a user.

In other words, in the transparent display apparatus according to the present invention, a drive unit 101Q may select at least one object corresponding to an eye-gaze direction of a user from among one or more objects located in a second space area or display at least one piece of object information on the transparent display panel 100.

The drive unit 101Q may select at least one object corresponding to a face direction of a user from among at least one object located in a second space area or display at least one piece of object information on the transparent display panel 100.

In the transparent display apparatus according to the present invention, the object sensor unit 192Q may detect the eye-gaze direction of the user or the face direction of the user.

For example, as shown in FIG. 26(A), it is assumed that a first object 1600 and a second object 1610 correspond to the transparent display panel 100 and the gaze direction of a user eye 1700 corresponds to the first object 1600.

In this case, the object sensor unit 192Q may acquire information indicating that the user eye 1700 is directed toward the first object 1600 and select the first object 1600 from between the first object 1600 and the second object 1610 according to the acquired information.

As shown in FIG. 26(B), information 1601 about the first object 1600 selected according to the gaze direction of the user eye 1700 may be displayed on the transparent display panel 100.

Alternatively, as shown in FIG. 27(A), it is assumed that the first object 1600 and the second object 1610 correspond to the transparent display panel 100 and the user face 1800 is directed toward the first object 1600.

In this case, the object sensor unit 192Q may acquire information indicating that the user face 1800 is directed toward the first object 1600 and select the first object 1600 from between the first object 1600 and the second object 1610 according to the acquired information.

As shown in FIG. 27(B), information 1601 about the first object 1600 selected according to the direction of the user face 1800 may be displayed on the transparent display panel 100.

The display apparatus according to the present invention may select an object disposed not only in the second space area but also in the first space area or display information about the object.

Figure 28:
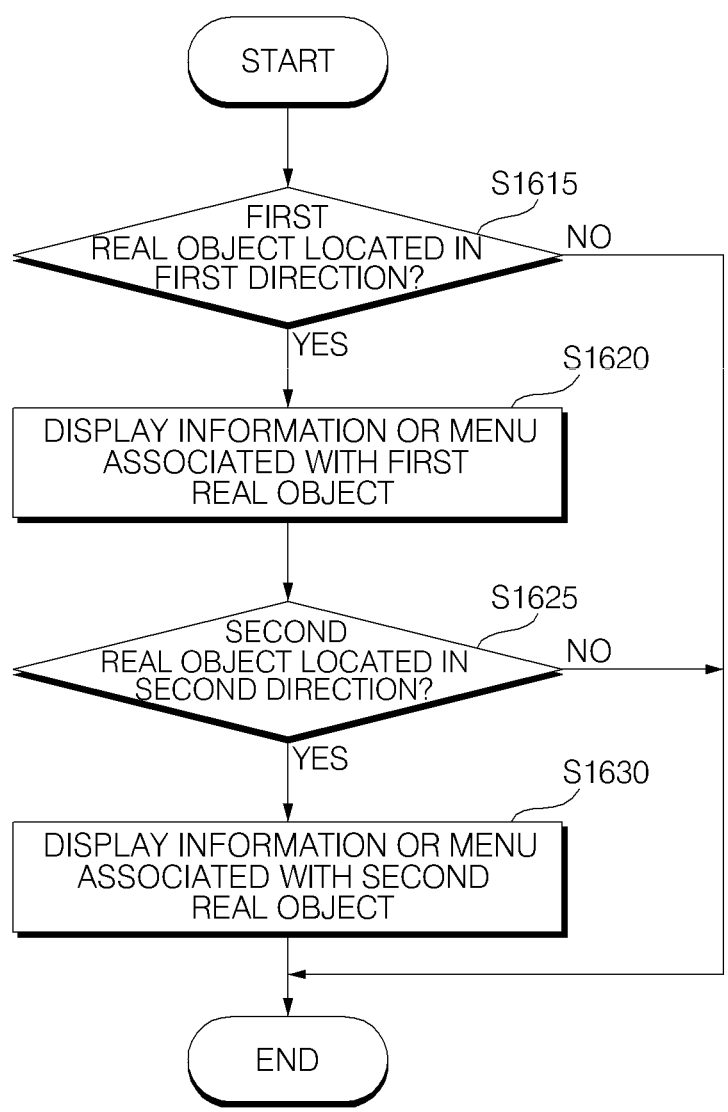

FIG. 28 is a flowchart illustrating a method for operating a transparent image display apparatus according to an embodiment of the present invention, and FIGS. 29 to 42 are views referred to for describing various examples of the method for operating the image display apparatus, illustrated in FIG. 28.

Referring to FIG. 28, first, the transparent image display apparatus determines whether a first real object is located in a first direction of the transparent image display apparatus (S1615) and if the first real object is located in the first direction, the transparent image display apparatus displays information or menu associated with the first real object as a first augmented object (S1620).

The controller 170Q may display of information or menu associated with a first real object as a first augmented object if the first real object is located in a first direction of the transparent image display apparatus.

Next, the transparent image display apparatus determines whether a second real object is located in a second direction of the transparent image display apparatus (S1625) and if the second real object is located in the second direction, the transparent image display apparatus displays information or menu associated with the second real object as a second augmented object (S1630).

The controller 170Q may display of information or menu associated with a second real object as a second augmented object if the first real object is located in a second direction of the transparent image display apparatus.

At this time, the information or menu associated with the first augmented object may be different from the information or menu associated with the second augmented object.

Figure 29:
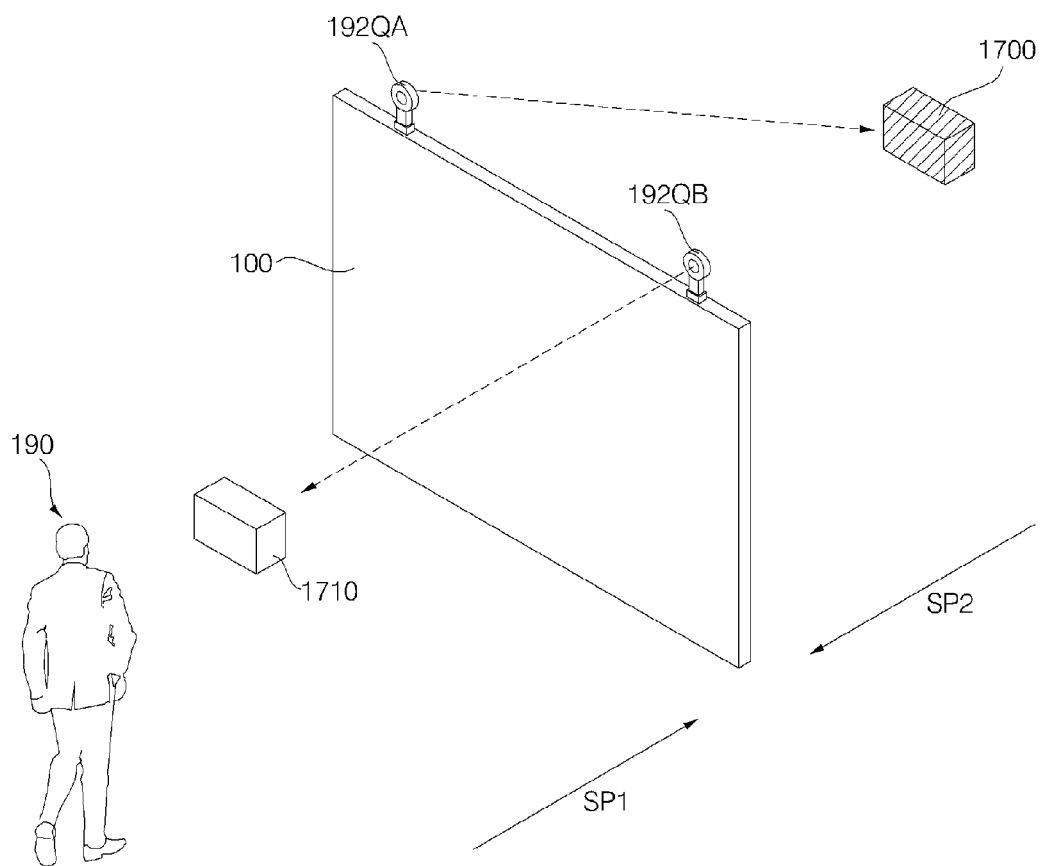

For example, as shown in FIG. 29, information about at least one second object 1700 located in the second space area SP2 corresponding to the first space area SP1 in which a user 180 is located may be displayed on the transparent display panel 100 and information about at least one first object 1710 located between the user 190 and the transparent display panel 100 may be displayed on the transparent display panel 100.

The transparent display apparatus according to the present invention may include a first object sensor unit 192QA and a second object sensor unit 192QB.

The first object sensor unit 192QA may acquire position information of the user 190 and position information of the first object 1710 and the second object sensor unit 192QB may acquire position information of the second object 1700.

The first object sensor unit 192QA and the second object sensor unit 192QB may be combined into one module. Hereinafter, for convenience of description and understanding, it is assumed that the first object sensor unit 192QA acquires the position information of the user 190 and the position information of the first object 1710 and the second object sensor unit 192QB acquires the position information of the second object 1700.

Although the first object sensor unit 192QA and the second object sensor unit 192QB may be camera modules for capturing an image, they are not limited thereto and may include at least one of a camera module, a proximity sensor module and a near field communication (NFC) module. It is possible to detect a real object based on a signal received from at least one module.

Figure 30:
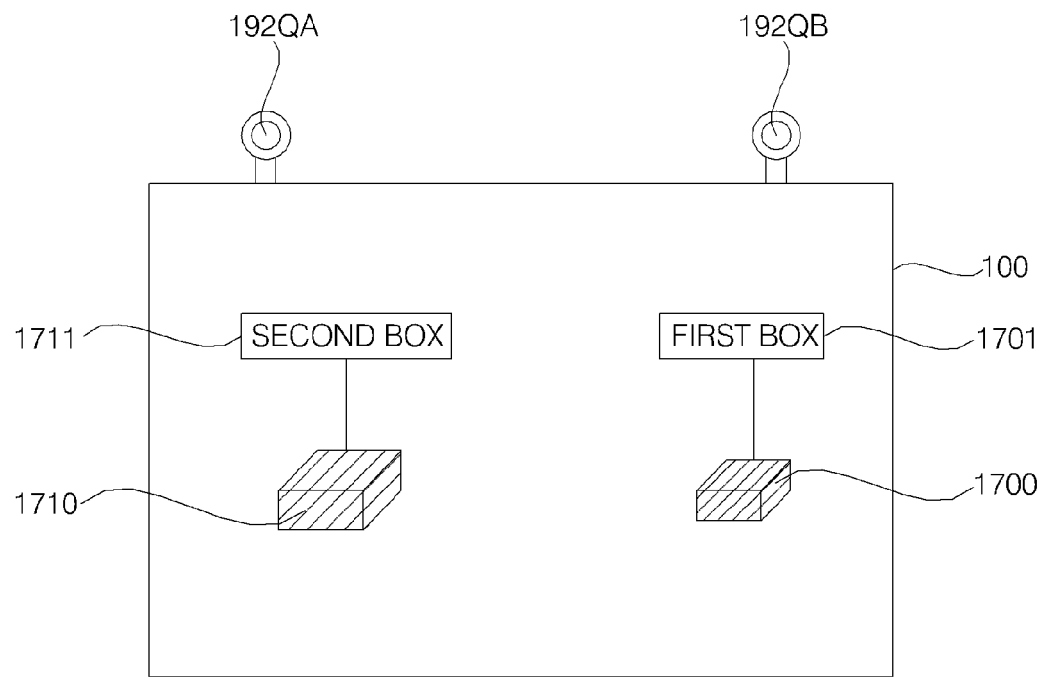
Figure 31:
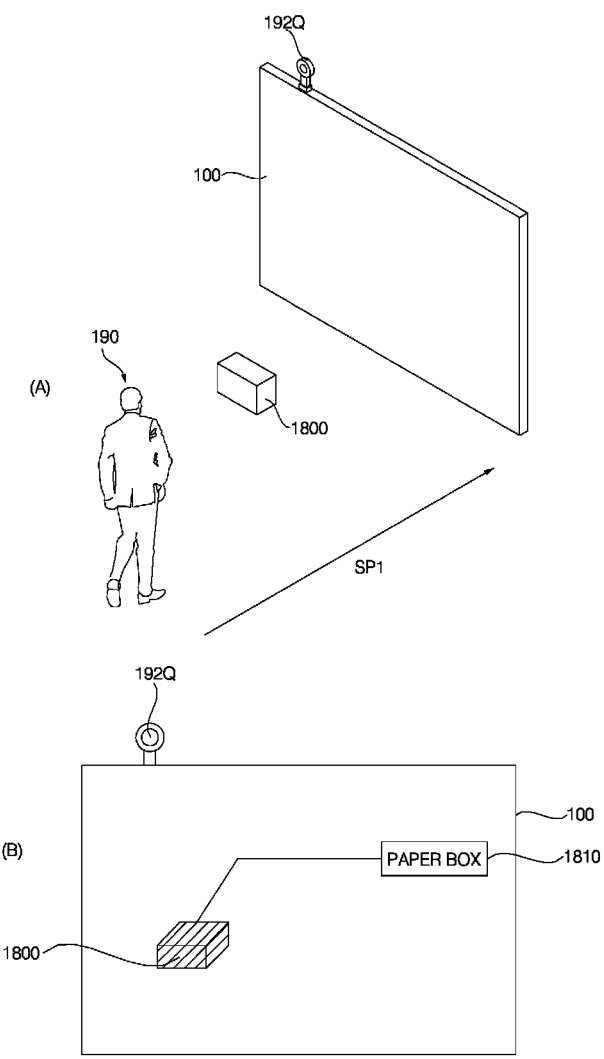
Figure 32:
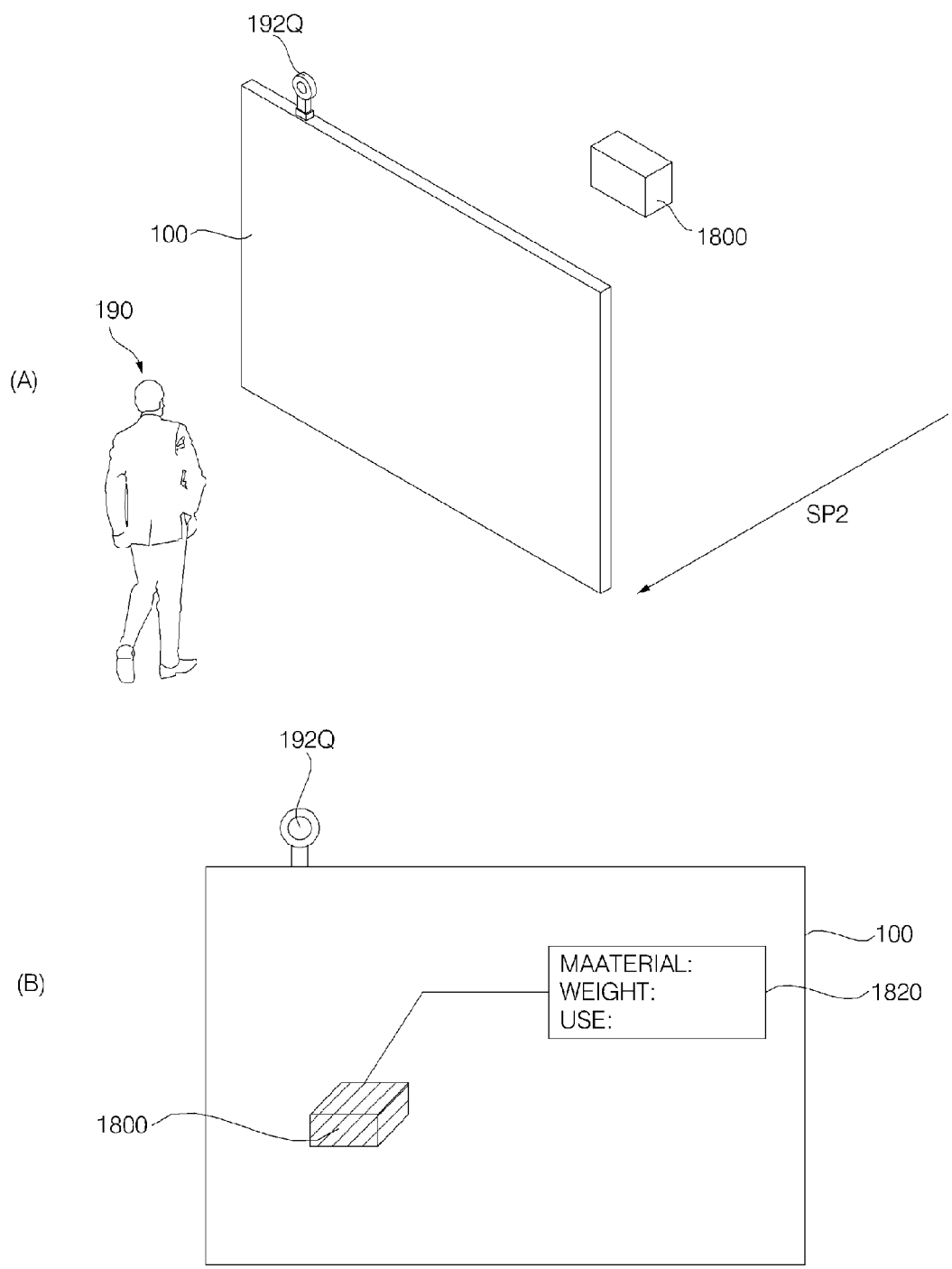
Figure 33:
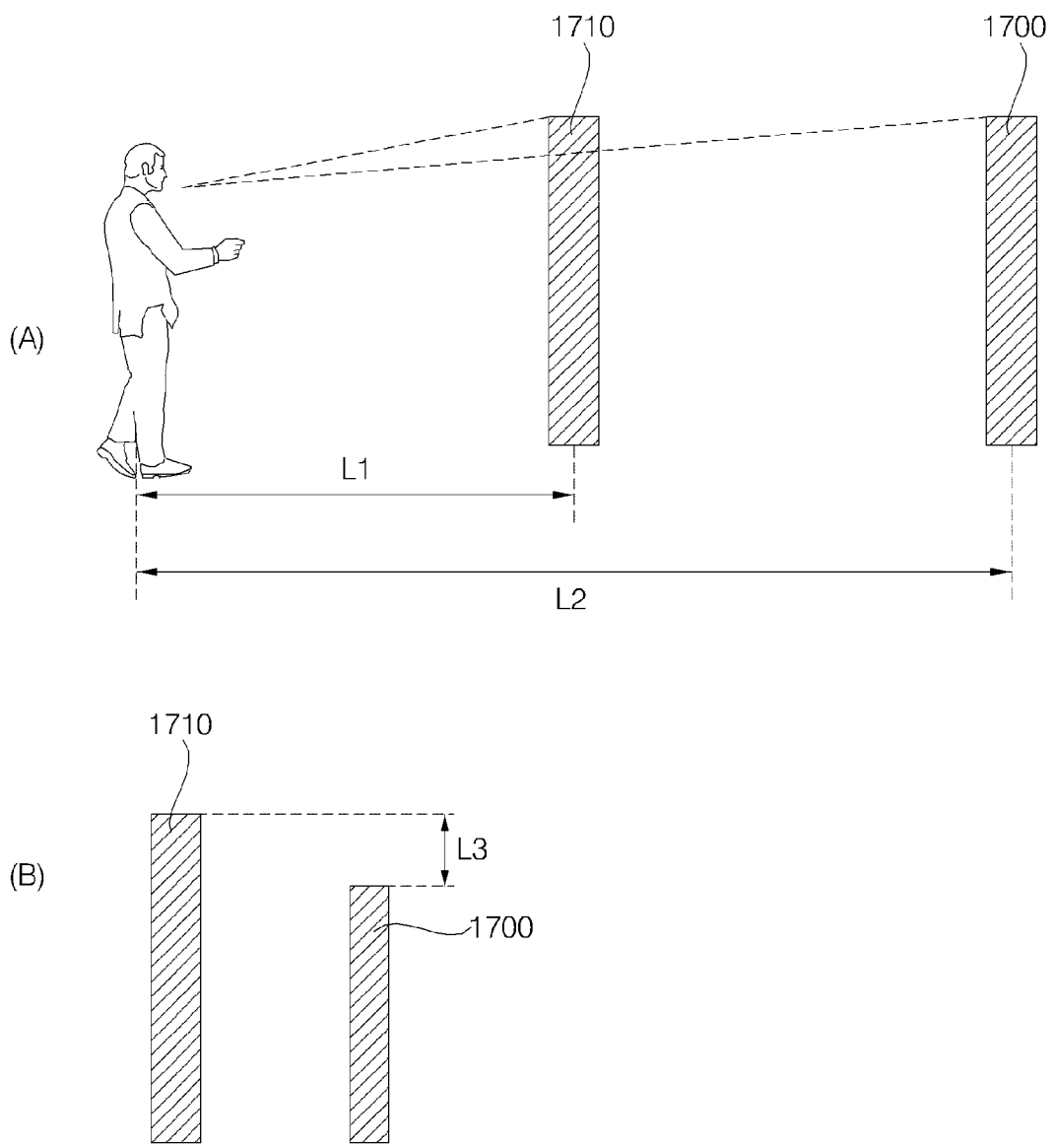
Figure 34:
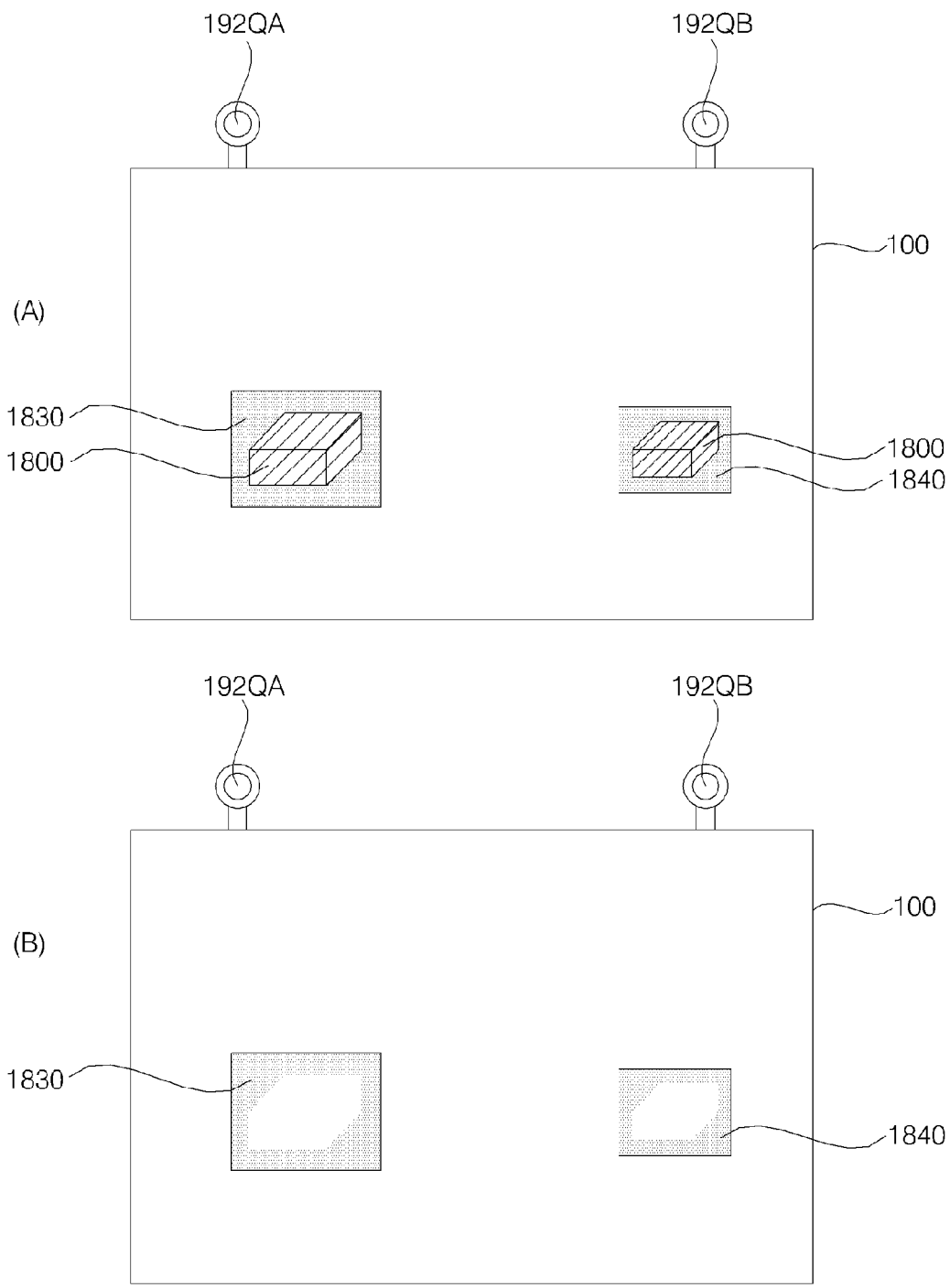
Figure 35:
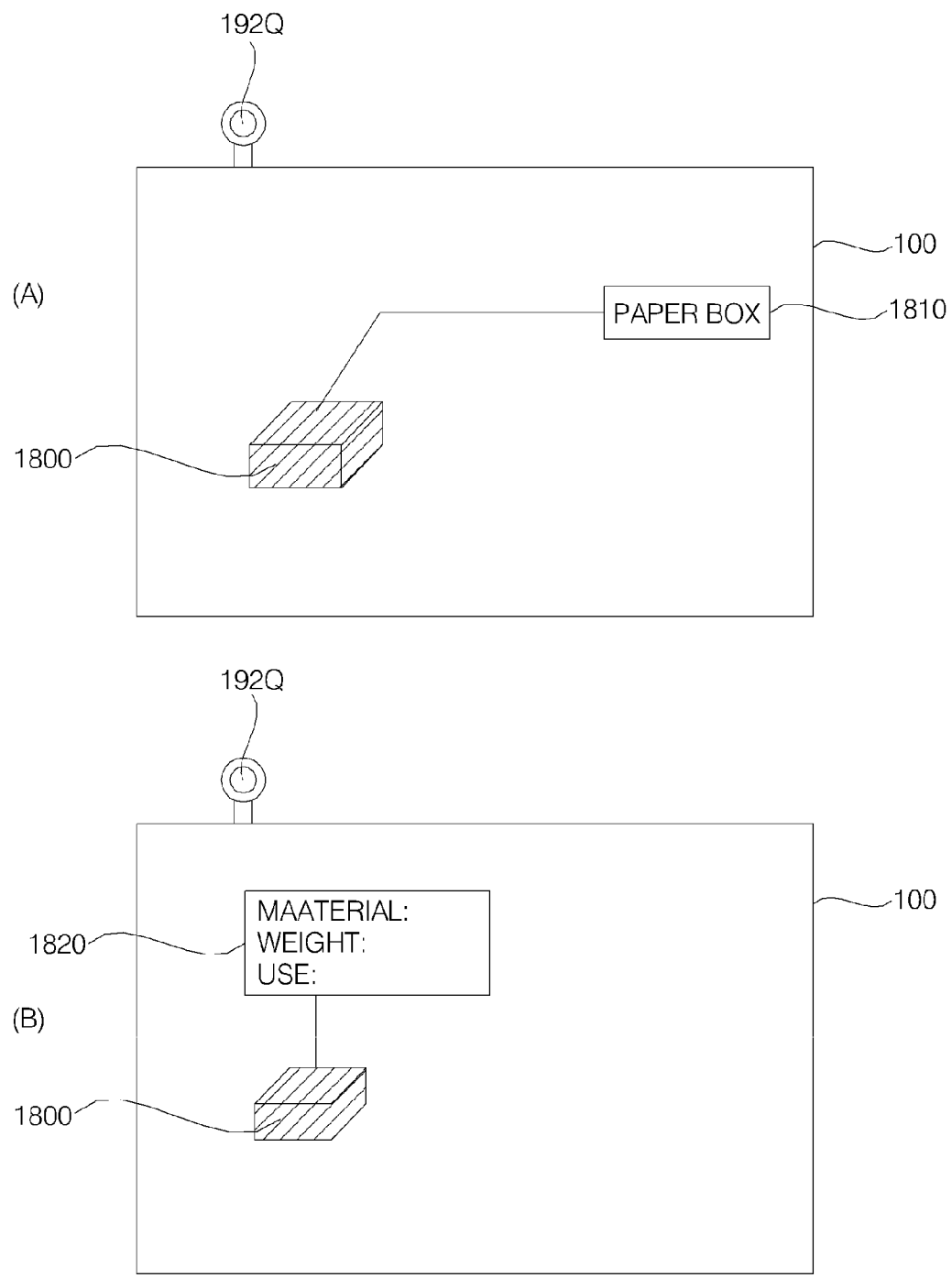

In this case, as shown in FIG. 30, information 1701 about the second object 1700 may be displayed on the transparent display panel 100 and information 1711 about the second object 1700 may be displayed on the transparent display panel 100.

From the viewpoint of the user, the first object 1710 may hide the transparent display panel 100 and the second object 1700 may be disposed at the opposite side of the transparent display panel 100.

At this time, if a first real object 1710 is located to face a user, information or menu associated with the first real object 1710 is displayed as a first augmented object 1711. If a second real object 1700 is located on the opposite side of a user, information or menu associated with the second real object 1700 is displayed as a second augmented object 1701. The information or menu associated with the first augmented object 1711 may be different from the information or menu associated with the second augmented object 1701.

For example, the information or menu associated with the first augmented object 1711 may be different from the information or menu associated with the second augmented object 1701 in terms of display position, size, color, luminance and transparency.

More specifically, the size of the information or menu associated with the first augmented object 1711 is greater than that of the information or menu associated with the second augmented object 1701, the luminance of the information or menu associated with the first augmented object 1711 is higher than that of the information or menu associated with the second augmented object 1701 or the transparency of the information or menu associated with the first augmented object 1711 is lower than that of the information or menu associated with the second augmented object 1701 such that the first augmented object 1711 is more conspicuous than the second augmented object 1701, and vice versa. Accordingly, the user may distinguish object information about the real objects.

The first augmented object 1711 which is the information about the first real object 1710 located to face the user may include at least one of product information or state information of the first real object and the information about the second real object 1700 located on the opposite side of the user may include an associated menu for remotely controlling the second real object. That is, it is possible to provide a differentiated user interface to the user by displaying a remote control menu for the second real object 1700 located far from the user.

If the first real object 1710 and the second real object 1700 are simultaneously located at respective positions, the step of displaying the first augmented object 1711 and the step of displaying the second augmented object 1701 may be simultaneously performed.

For example, as shown in FIG. 29, if the user moves a transparent image display apparatus between the first real object 1710 and the second real object 1700, the step of displaying the first augmented object 1711 and the step of displaying the second augmented object 1701 may be simultaneously performed. Accordingly, the user can intuitively and rapidly identify the information.

As shown in FIG. 30, the information or menu associated with the first augmented object 1711 may preferably be displayed so as not to overlap the first real object penetrating through the transparent image display apparatus, and the information or menu associated with the second augmented object 1701 may preferably be displayed so as not to overlap the second real object penetrating through the transparent image display apparatus.

For example, if the transparent image display apparatus is partially moved upward, downward, leftward or rightward in a state in which the first augmented object 1711 and the second augmented object 1701 are displayed as shown in FIG. 30 as the user locates the transparent image display apparatus between the first real object 1710 and the second real object 1700 as shown in FIG. 29, the user may perceive at least one of the first augmented object 1711 and the second augmented object 1701 as overlapping the first real object 1710 and the second real object 1700.

In order to prevent this problem, at least one of the first augmented object 1711 and the second augmented object 1701 may be moved and displayed such that at least one of the first augmented object 1711 and the second augmented object 1701 does not partially overlap the first real object 1710 and the second real object 1700. At this time, the position of the moved object may be determined in consideration of a user's eye position, the movement direction of the transparent image display apparatus and the positions of the first augmented object 1711 and the second augmented object 1701.

The information displayed on the transparent display panel 100 in the case in which the same object is disposed in the first space area SP1 and the information displayed on the transparent display panel 100 in the case in which the same object is disposed in the second space area SP2 may be different from each other.

For example, as shown in FIG. 31(A), if a predetermined first object 1800 is disposed between the user 190 and the transparent display panel 100, that is, if the first object 1800 is disposed in the first space area SP1, first information 1810 of the first object 1800 may be displayed on the transparent display panel 100 as shown in FIG. 31(B). The first information 1810 of the first object 1800 may be kind/name (paper box) information of the first object 1800.

In contrast, as shown in FIG. 32(A), if a predetermined first object 1800 is disposed in the second space area SP2, second information 1820 of the first object 1800 may be displayed on the transparent display panel 100 as shown in FIG. 32(B). The second information 1820 of the first object 1800 may be low-level information (detailed information) of the first information 1810 of the first object 1800, such as material, weight or use of the first object 1800.

As another example, as shown in FIG. 31(A), if a first predetermined object 1800 is disposed in an area between a user 1900 and a transparent display panel 100, a displayed first augmented object 1810 includes at least one of product information or state information of a first real object. As shown in FIG. 32(A), if it is assumed that a first predetermined object 1800 is disposed in a second space area SP2, an associated menu for remotely controlling a second augmented object 1810 may be displayed. That is, if the same real object is located farther from a user, a remote control menu for the object may be displayed so as to provide a differentiated user interface to the user.

From the viewpoint of the user 190, display information in the case in which a predetermined object is located behind the transparent display panel 100 and display information in the case in which display information located in front of the transparent display panel 100 may be different from each other.

In order to determine whether the information displayed on the transparent display panel 100 is information about an object located in front of the transparent display panel 100 or information about an object located behind the transparent display panel 100 from the viewpoint of the user 190, the second information 1820 and the first information 1810 of the first object 1800 may differ in terms of font, color or brightness.

As shown in FIG. 33(A), since the first object 1710 is located in front of the transparent display panel 100 and the second object 1700 is located behind the transparent display panel 100 from the viewpoint of the user, a distance L1 between the user and the first object 1710 may be less than a distance L2 between the user and the second object 1700.

Even when the heights, lengths and widths of the first object 1710 and the second object 1700 are identical by 100%, as shown in FIG. 33(B), the user may perceive the size of the first object 1710 as being greater than the size of the second object 1700.

Therefore, the size of the selection mark displayed around the object may be changed depending on whether the same object is located in front of or behind the transparent display panel 100.

For example, as shown in FIG. 34(A), if a predetermined first object 1800 is located in front of the transparent display panel 100 and is selected by the user, a first selection mark 1830 may be displayed around the first object 1800.

If the first object 1800 is located behind the transparent display panel 100 and is selected by the user, a second selection mark 1840 may be displayed around the first object 1800.

The size of the first object 1800 perceived by the user in the case in which the predetermined first object 1800 is located in front of the transparent display panel 100 may be greater than the size of the first object 1800 perceived by the user in the case in which the first object 1800 is located behind the transparent display panel 100.

As shown in FIG. 34(B), the size of the first selection mark 1830 displayed around the first object 1800 may be greater than the size of the second selection mark 1840.

Alternatively, in order to determine whether the information displayed on the transparent display panel 100 is information about an object located in front of the transparent display panel 100 or information about an object located behind the transparent display panel 100, the display position of the object may be changed.

For example, as shown in FIG. 35(A), if a predetermined first object 1800 is located in front of the transparent display panel 100, first information 1810 of the first object 1800 may be displayed at the right side of the transparent display panel 100.

As shown in FIG. 35(B), if a predetermined first object 1800 is located behind the transparent display panel 100, second information of the first object 1800 may be displayed at the left side of the transparent display panel 100.

The size of the first object 1800 perceived by the user in the case in which the first object 1800 is located in front of the transparent display panel 100 is greater than the size of the first object 1800 perceived by the user in the case in which the first object 1800 is located behind the transparent display panel 100. Since spaces for displaying the information about the first object 1800 on the screen of the transparent display panel 100 are different, the display position of the first information 1810 and the display position of the second information 1820 are preferably different.

In a state in which a first object is located in front of or behind a transparent display panel, if the position of the first object is changed in a state in which a distance between the transparent display panel and the first object is maintained, different information or different menus may be displayed or different operations may be performed.

Figure 36:
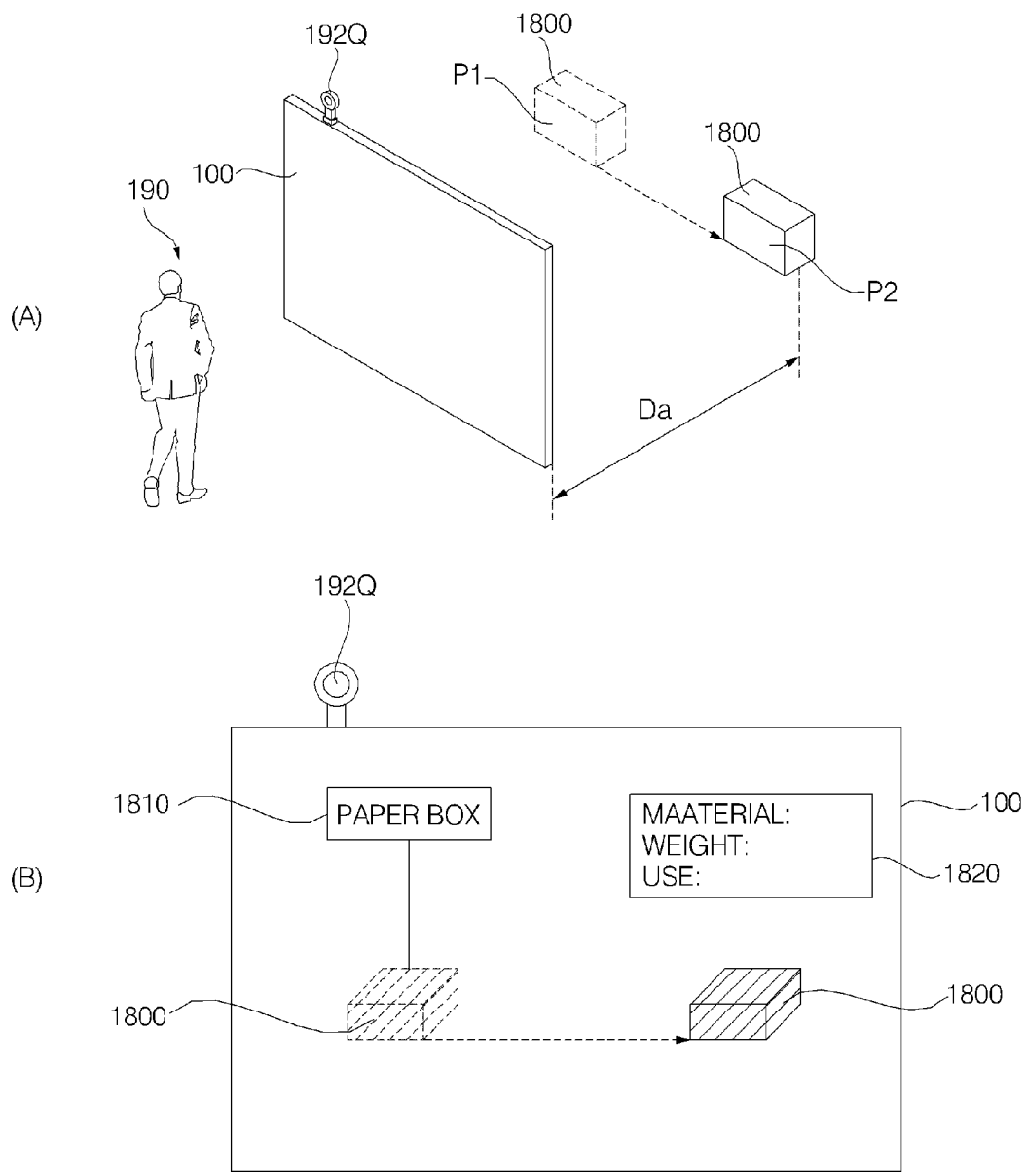

For example, as shown in (A) of FIG. 36, in the case in which the position of a first object 1800 is changed from a first position P1 to a second position P2 in a state in which a distance Da between a transparent display panel 100 and the first object 1800 is maintained, first object information 1810 may be displayed on the transparent display panel 100 if the first object is located at the first position P1 and second object information 1820 may be displayed on the transparent display panel 100 if the first object is located at the second position P2 as shown in (B) of FIG. 36. Accordingly, different information may be displayed or different operations may be performed according object positions. Thus, it is possible to increase user convenience.

In a state in which a first object is located in front of or behind a transparent display panel, different information or different menus may be displayed or different operations may be performed depending on whether a first surface of the first object faces the transparent display panel or a second surface of the first object faces the transparent display panel.

Figure 37:
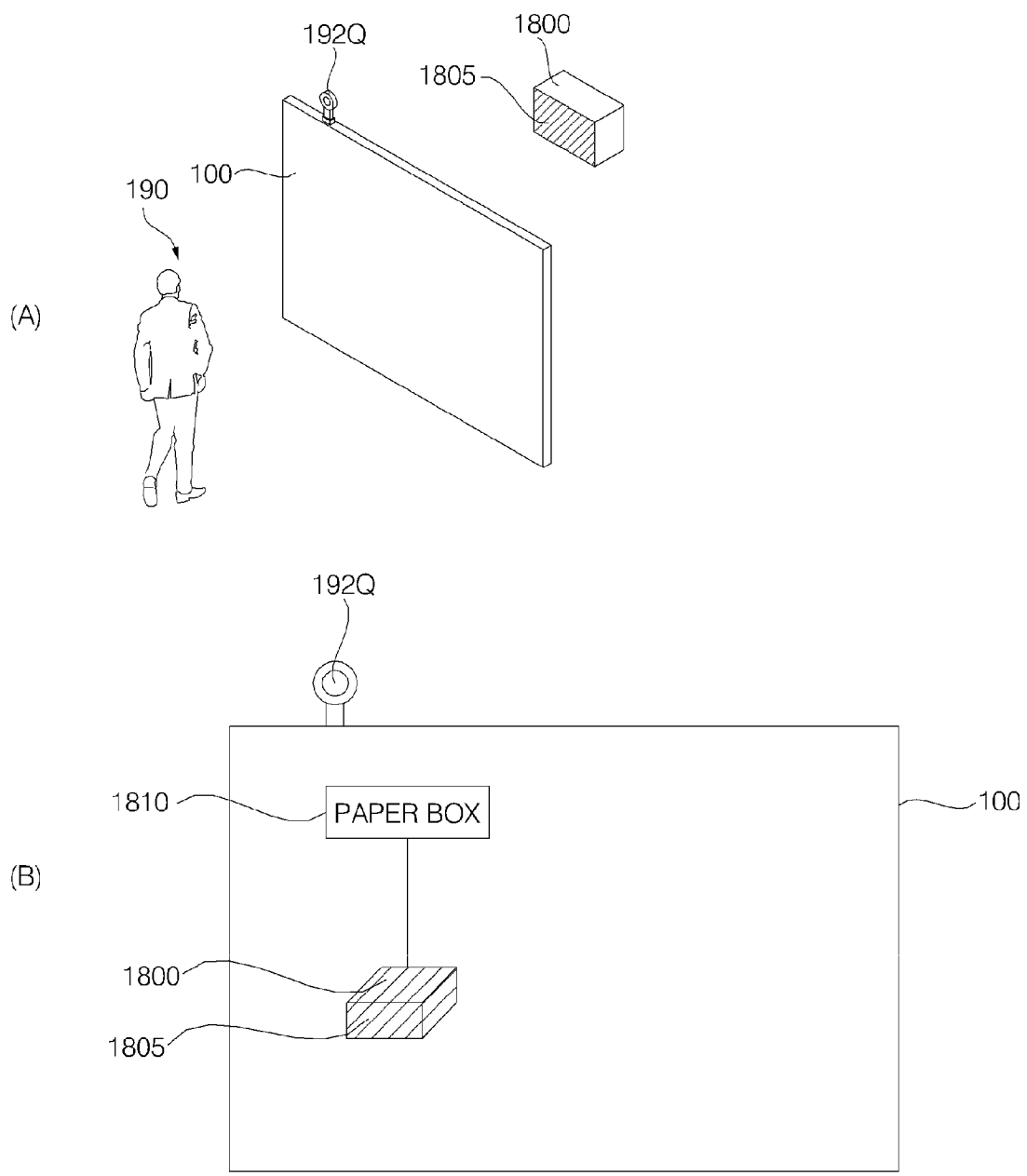
Figure 38:
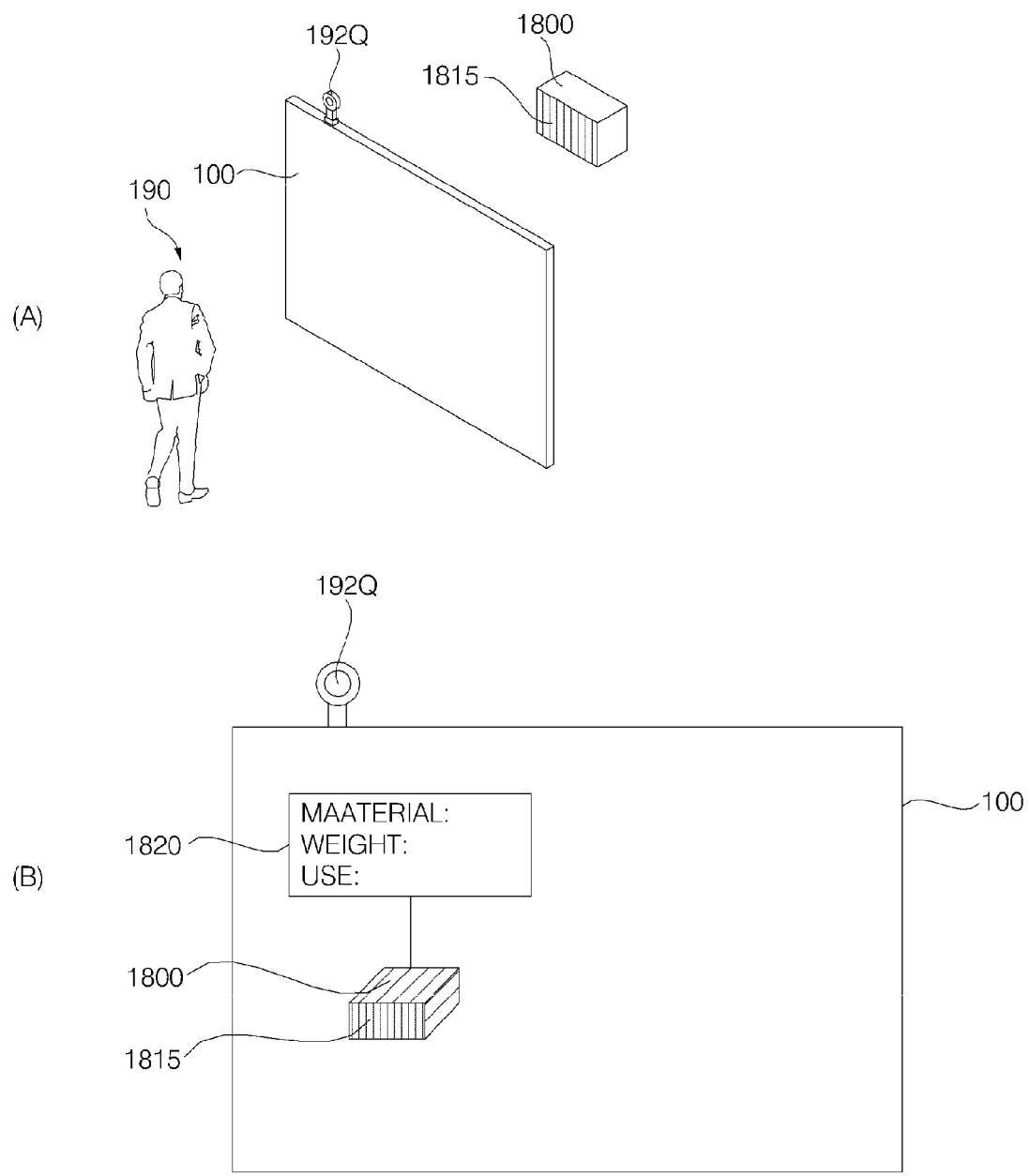

For example, if a first surface 1805 of a first object 1800 faces a transparent display panel 100 as shown in (A) of FIG. 37, first object information 1810 may be displayed on the transparent display panel 100 as shown in (B) of FIG. 37. If a second surface 1815 opposed to the first surface 1805 of the first object 1800 faces the transparent display panel 100 as shown in (A) of FIG. 38, second object information 1820 may be displayed on the transparent display panel 100. Accordingly, different information may be displayed or different operations may be performed depending on which surface of the object faces the transparent display panel 100. Thus, it is possible to increase user convenience.

Information about an object displayed on the transparent display panel 100 may be changed according to a distance between the object and the transparent display panel 100.

In other words, if a distance between a predetermined object and the transparent display panel 100 is a first distance, first information of the object may be displayed on the transparent display panel 100 and, if a distance between the first object and the transparent display panel is a second distance greater than the first distance, second information different from the first information of the object may be displayed on the transparent display panel 100.

Figure 39:
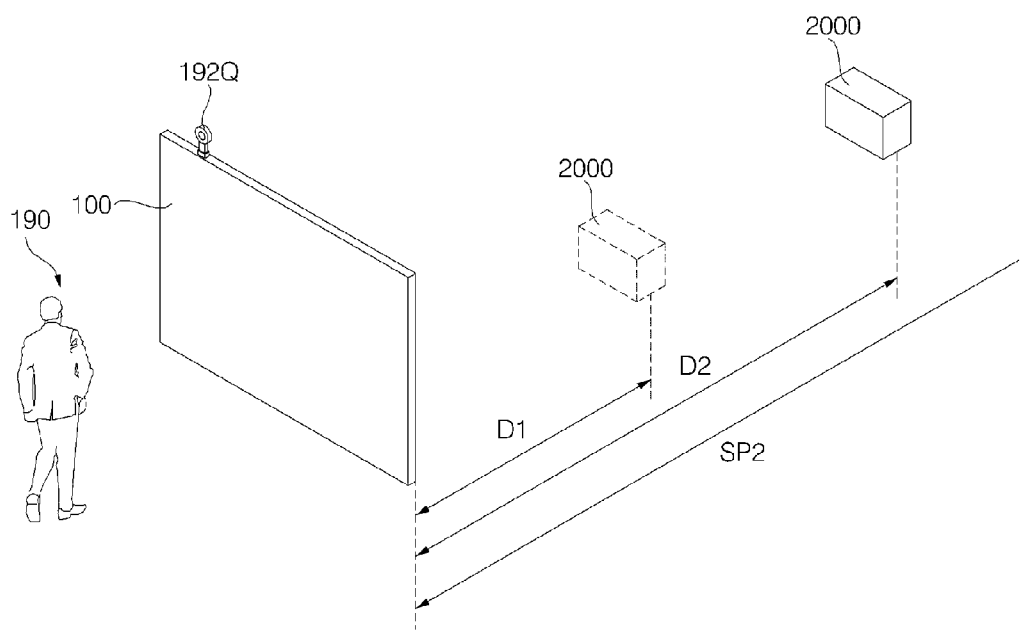
Figure 40:
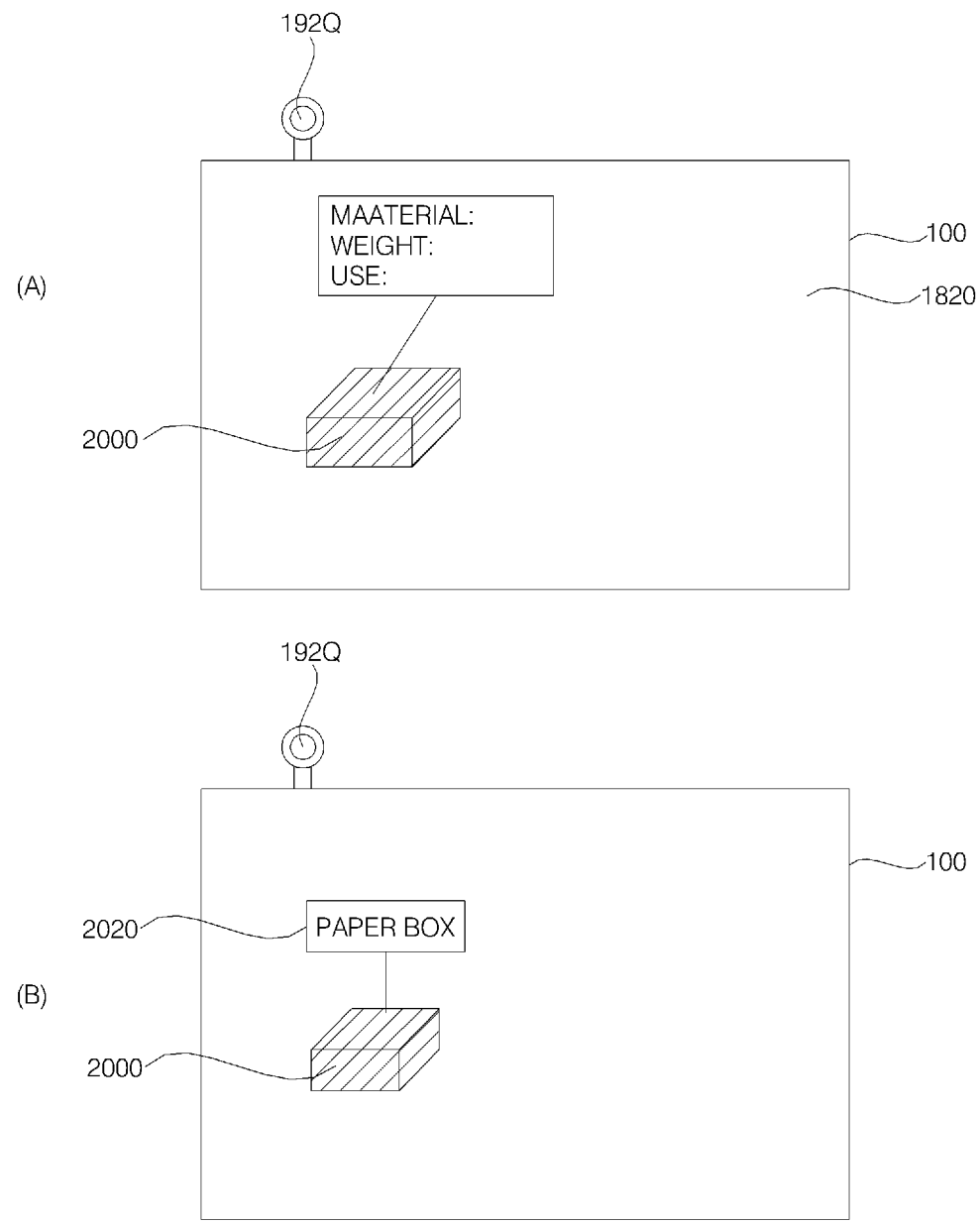
Figure 41:
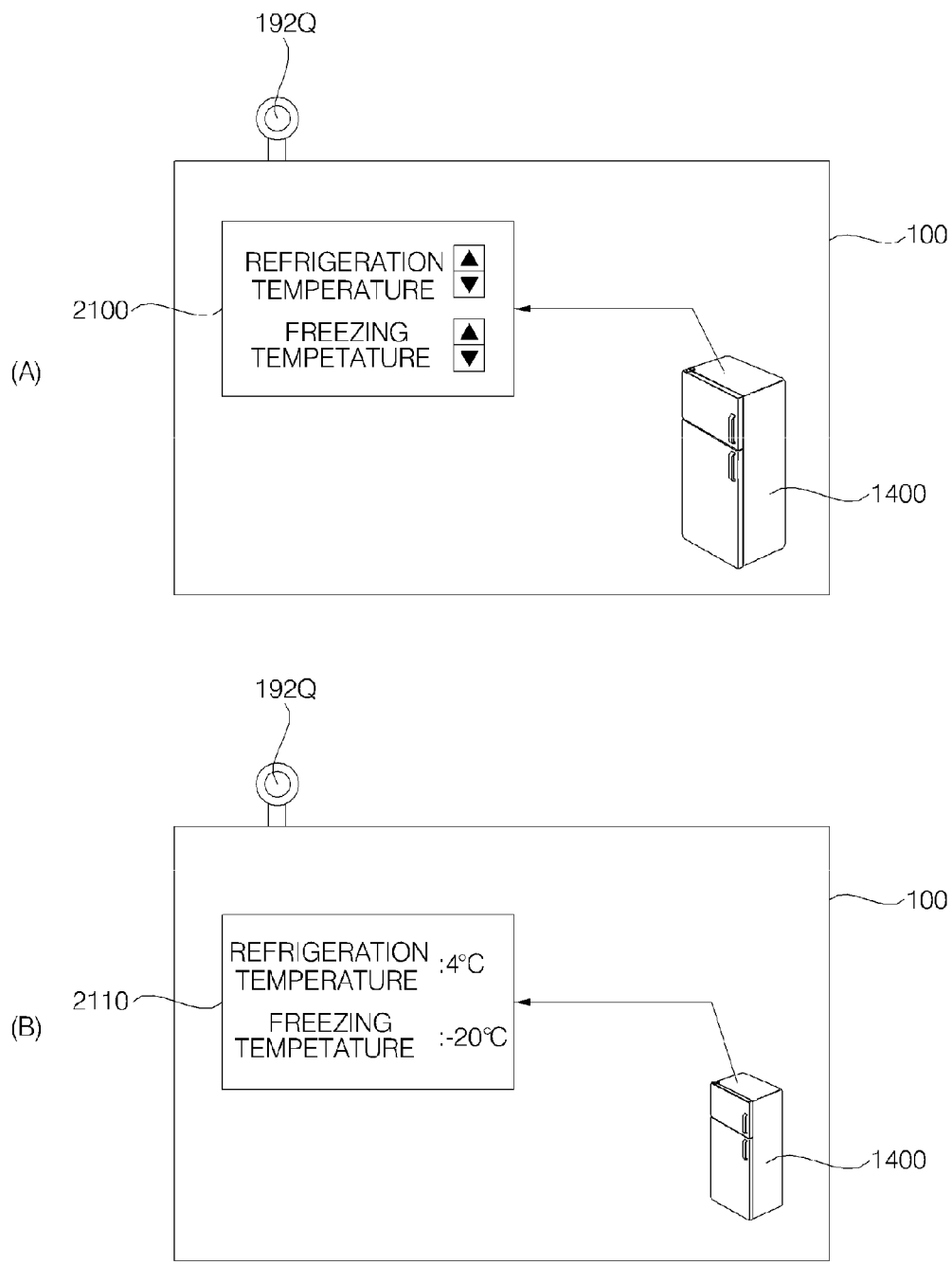

For example, as shown in FIG. 39, in the case in which a predetermined object 2000 is located in the second space area SP2, information about the object 2000 displayed on the transparent display panel 100 in the case in which a distance between the object 2000 and the transparent display panel 100 is a first distance D1 may be different from information about the object 2000 displayed on the transparent display panel 100 in the case in which the distance between the object 2000 and the transparent display panel 100 is a second distance D2 greater than the first distance D1.

For example, as shown in FIG. 40(A), if the distance between the object 2000 and the transparent display panel 100 is the first distance D1, since the distance between the user and the object 2000 is relatively small, the user may accurately observe the object 2000 and thus easily identify the kind of the object 2000.

In contrast, as shown in FIG. 40(B), if the distance between the object 2000 and the transparent display panel 100 is the second distance D2, which is greater than the first distance D1, the distance between the user and the object 2000 is relatively large. Thus, a probability that the user can identify the object 2000 is relatively low.

Accordingly, as shown in FIG. 40(A), if the distance between the object 2000 and the transparent display panel 100 is the first distance D1, low-level information (detailed information) 2010 of the object 2000, such as price, material, weight or use, may be displayed on the transparent display panel 100.

In contrast, as shown in FIG. 40(B), if the distance between the object 2000 and the transparent display panel 100 is the second distance D2, which is greater than the first distance D1, high-level information of the object 2000, such as the name of the object 2000, may be displayed on the transparent display panel 100.

As another example, as a distance between an object 2000 and a transparent display panel 100 is decreased, the display size of information or menu associated with the object 200 may be changed or a display information amount or the number of display menu kinds may be changed. More specifically, if the distance between the object 2000 and the transparent display panel 100 is decreased, the display size of the associated information or menu may be increased, the display information amount may be increased, or the number of display menu kinds may be increased.

A control menu or an object state menu may be displayed on the transparent display panel 100 according to the distance between the object and the transparent display panel 100.

For example, as shown in FIG. 41(A), if a predetermined refrigerator 1400 is located in the second space area SP2 and the distance between the refrigerator 1400 and the transparent display panel 100 is a first distance D1, a control menu 2100 for controlling the refrigerator 1400 may be displayed on the transparent display panel 100.

Thus, the user can control the refrigerator 1400 using the control menu 2100 displayed on the transparent display panel 100.

In contrast, as shown in FIG. 41(B), if the predetermined refrigerator 1400 is located in the second space area SP2 and the distance between the refrigerator 1400 and the transparent display panel 100 is a second distance D2, which is greater than the first distance D1, state information 2110 of the refrigerator 1400 may be displayed on the transparent display panel 100.

The state information 2110 may include a current refrigeration temperature and a current freezing temperature of the refrigerator 1400.

By displaying a variety of information about an object on the transparent display panel 100 according to a distance between the object and the transparent display panel 100, it is possible to confirm the variety of information about the object without key manipulation.

Figure 42:
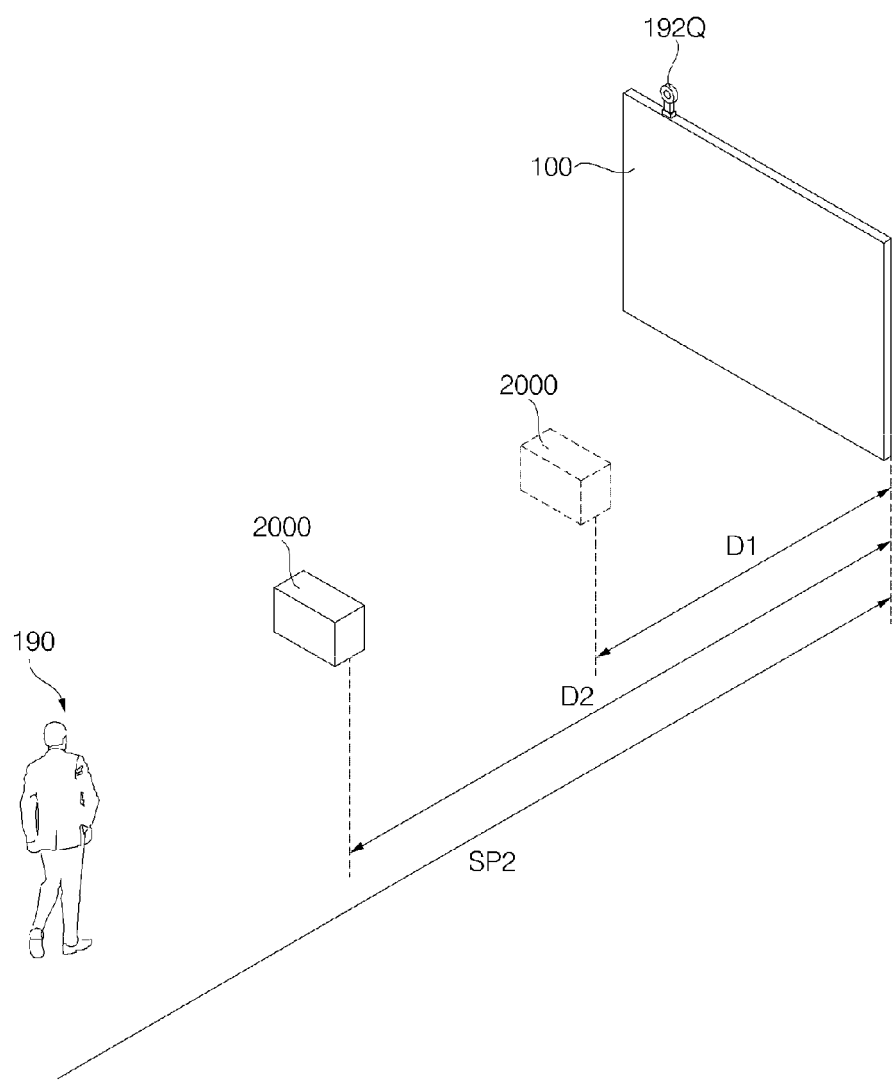

As shown in FIG. 42, if a predetermined object 2000 is located between the user and the transparent display panel 100, that is, if the object 2000 is located in the first space area SP1, the distance between the object 2000 and the user may be decreased as the distance between the object 2000 and the transparent display panel 100 is increased.

Thus, settings in the case in which the object 2000 is located in the first space area SP1 may be opposed to settings in the case in which the object 2000 is located in the second space area SP2.

For example, if the distance between the object 2000 and the transparent display panel 100 is an eleventh distance D11, a distance between the user and the object 2000 may be relatively large.

In contrast, if the distance between the object 2000 and the transparent display panel 100 is a twelfth distance D12 greater than the eleventh distance D11, a distance between the user and the object 2000 may be relatively small.

Accordingly, if the distance between the object 2000 and the transparent display panel 100 is an eleventh distance D11, high-level information of the object 2000, such as the name of the object, may be displayed on the transparent display panel 100.

In contrast, if the distance between the object 2000 and the transparent display panel 100 is a twelfth distance D12 greater than the eleventh distance D11, low-level information (detailed information) of the object 2000, such as price, material, weight, use or color, may be displayed on the transparent display panel 100.

In addition, if an object 2000 disposed in the first space area SP1 is an electronic apparatus and the distance between the object 2000 and the transparent display panel 100 is an eleventh distance D11, state information of the object 2000 may be displayed on the transparent display panel 100.

In contrast, if the distance between the object 2000 and the transparent display panel 100 is a twelfth distance D12 greater than the eleventh distance D11, a control menu of the object 2000 may be displayed on the transparent display panel 100.

FIGS. 43 to 53 are diagrams illustrating an image reversal method. Hereinafter, a description of the above-described portions will be omitted.

Figure 43:
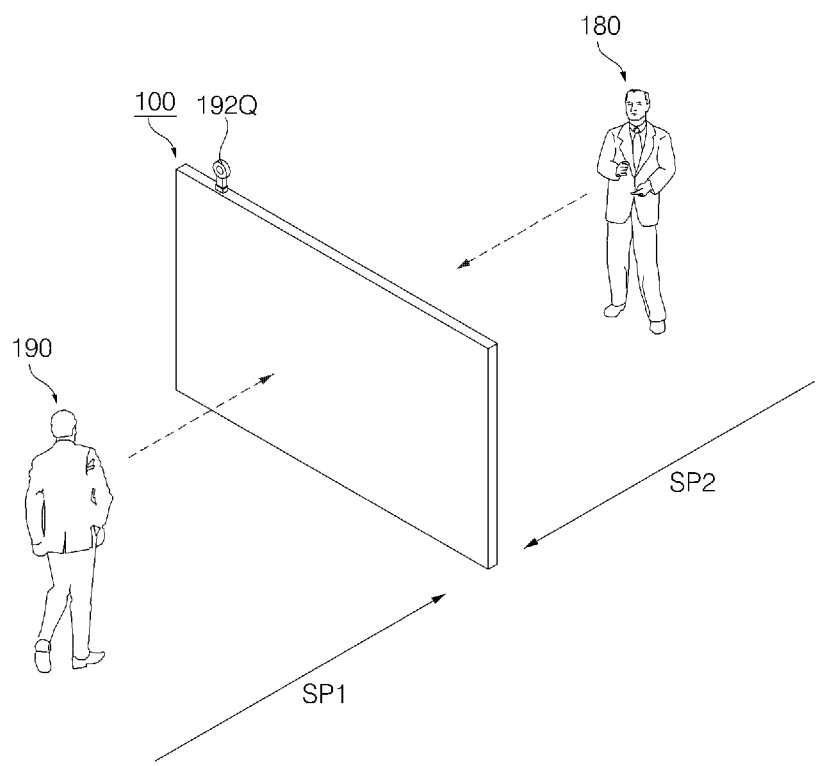
FIGS. 43 to 53 are diagrams illustrating an image reversal method.
Figure 43:
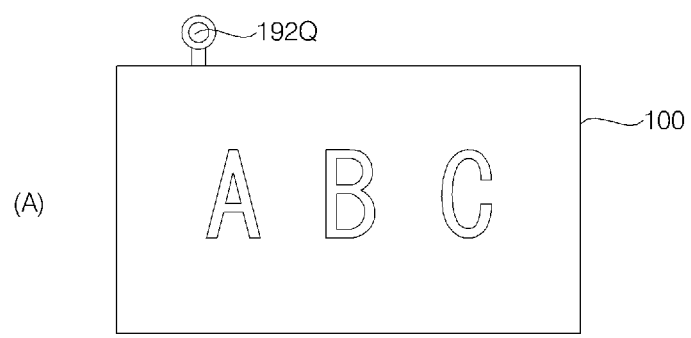
Figure 43:
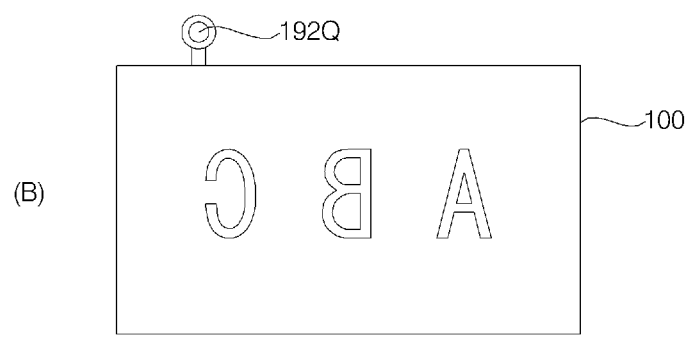

Referring to FIG. 43, it is assumed that a first user 190 observes a transparent display panel 100 in a first space area SP1 and a second user 180 observes the transparent display panel 100 in a second space area SP2.

It is assumed that the first user 190 observes an image displayed on the transparent display panel 100 shown in FIG. 43(A).

In this case, the second user 180 may observe the image displayed on the transparent display panel 100 shown in FIG. 43(B).

In this case, if the transparent display panel 100 is reversed, the first user 190 may observe the image displayed on the transparent display panel 100 shown in FIG. 43(B).

If the first user 190 is a main user for manipulating the transparent display panel 100, the first user 190 preferably views the normal image shown in FIG. 43(A).

It is assumed that the transparent display panel 100 is reversed as shown in FIG. 44(A) while the first user 190 observes the normal image displayed on the transparent display panel 100 shown in FIG. 44(B).

In this case, the reversed image may be displayed on the transparent display panel 100. Then, the first user 190 may observe the normal image displayed on the transparent display panel 100 shown in FIG. 44(C) even when the transparent display panel 100 is reversed.

For example, it is assumed that the transparent display panel 100 includes a first screen 110 and a second screen 120 opposed to each other.

Figure 44:
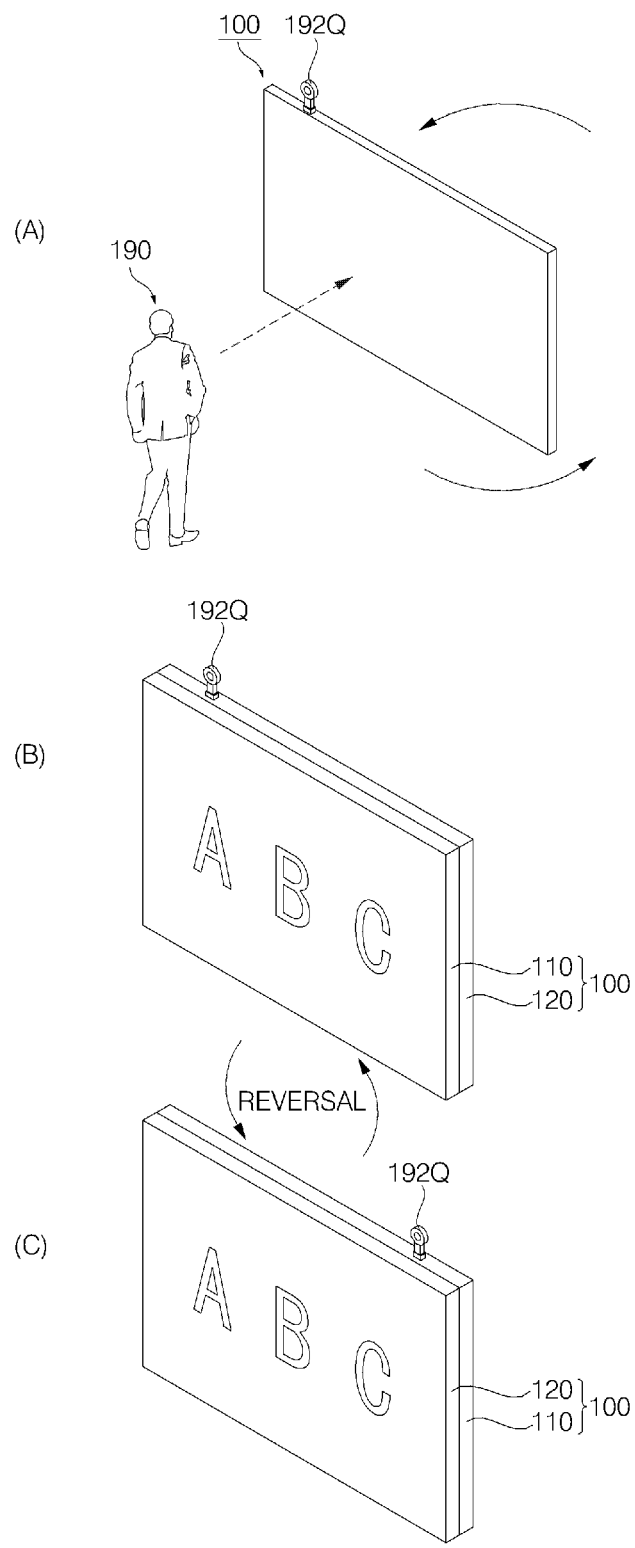
Figure 45:
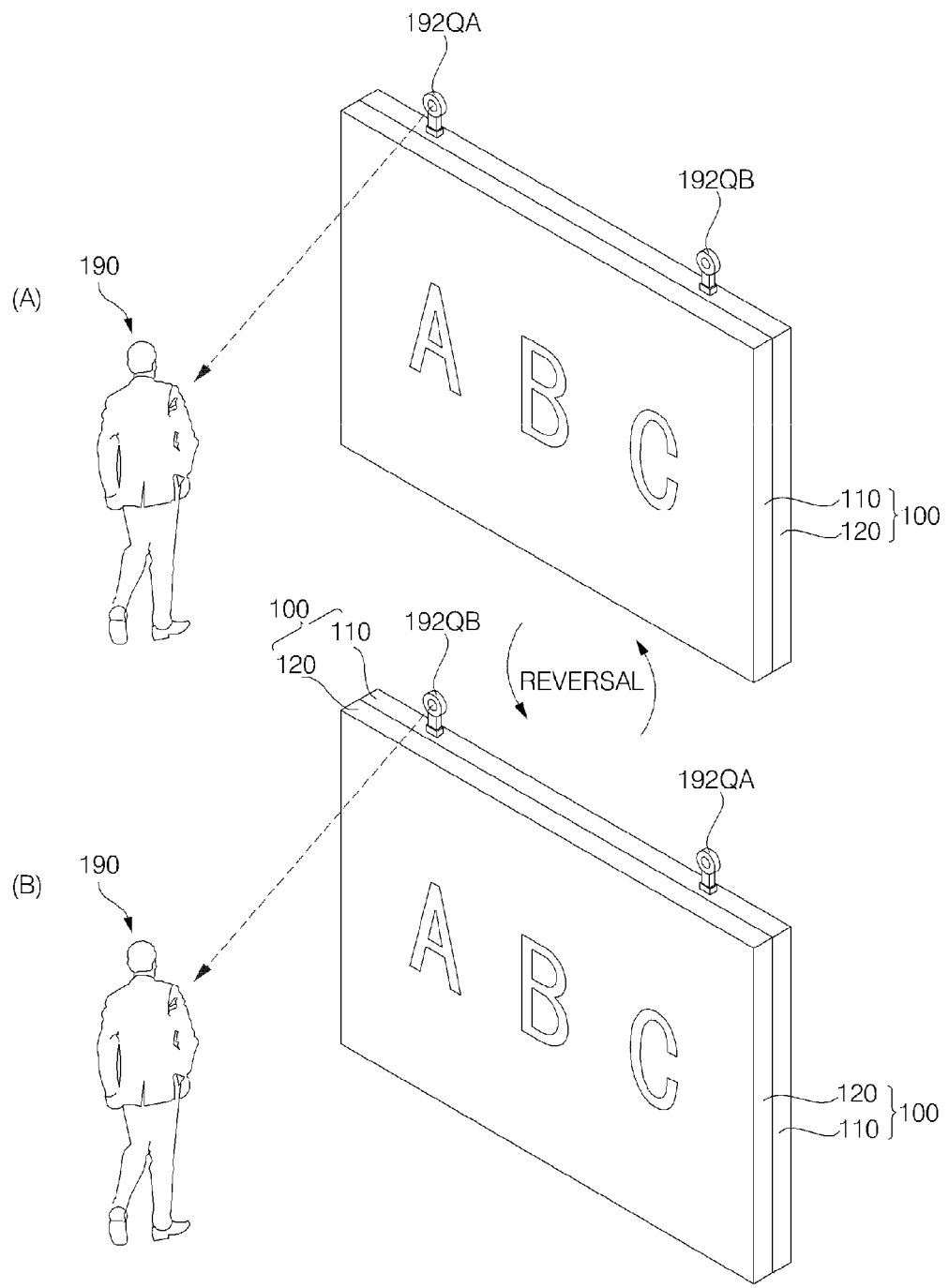
Figure 46:
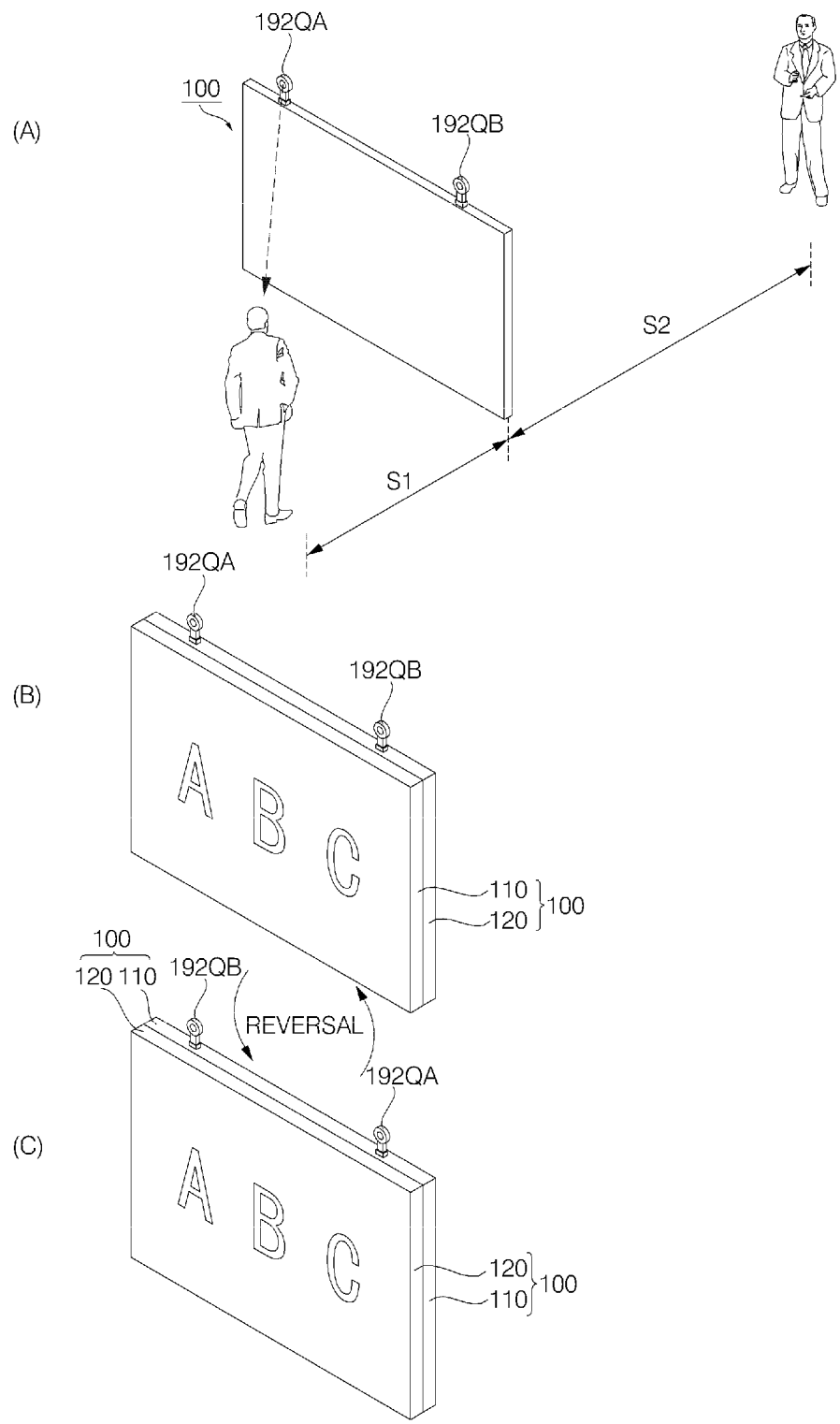
Figure 47:
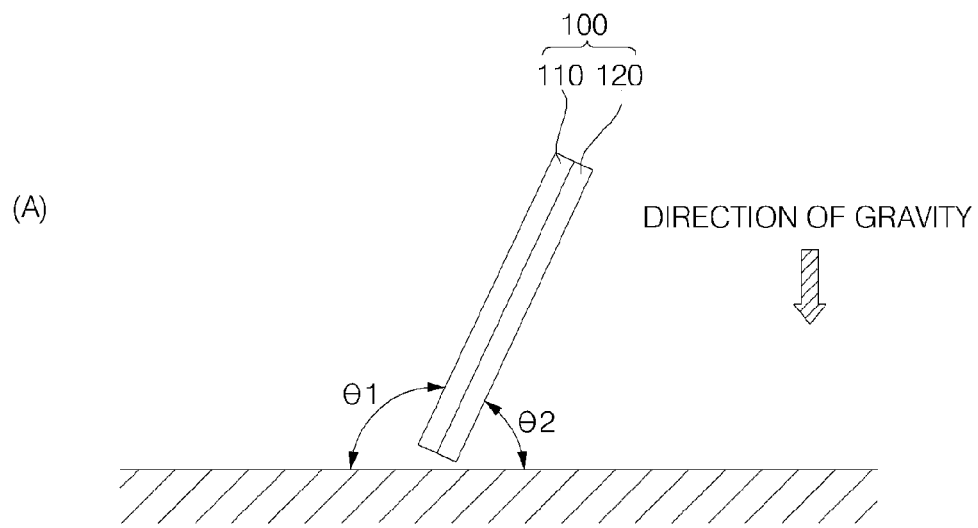
Figure 47:
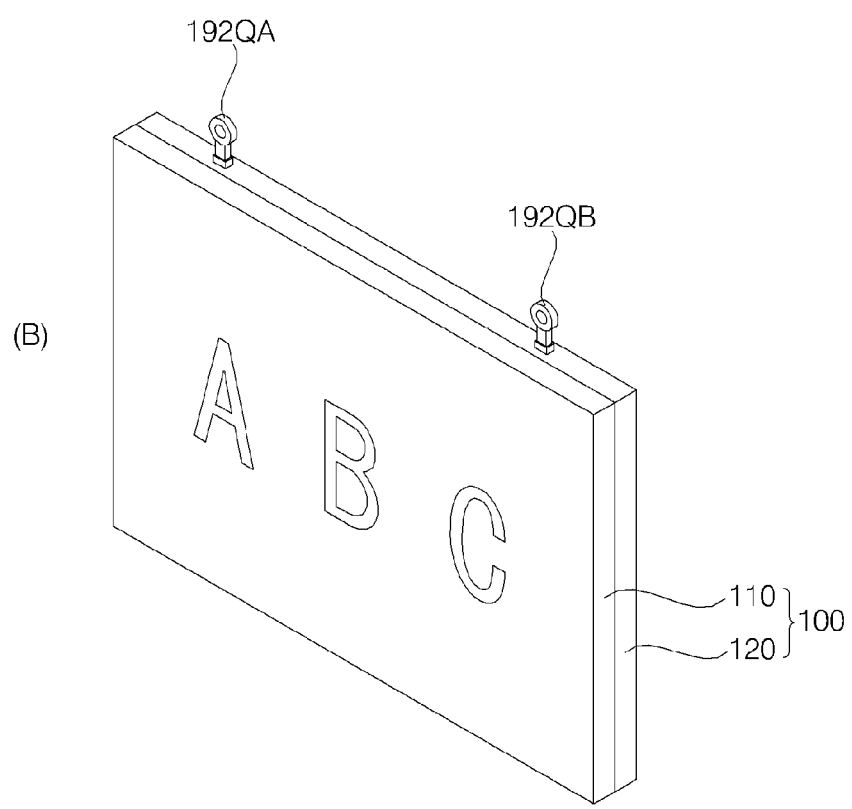
Figure 48:
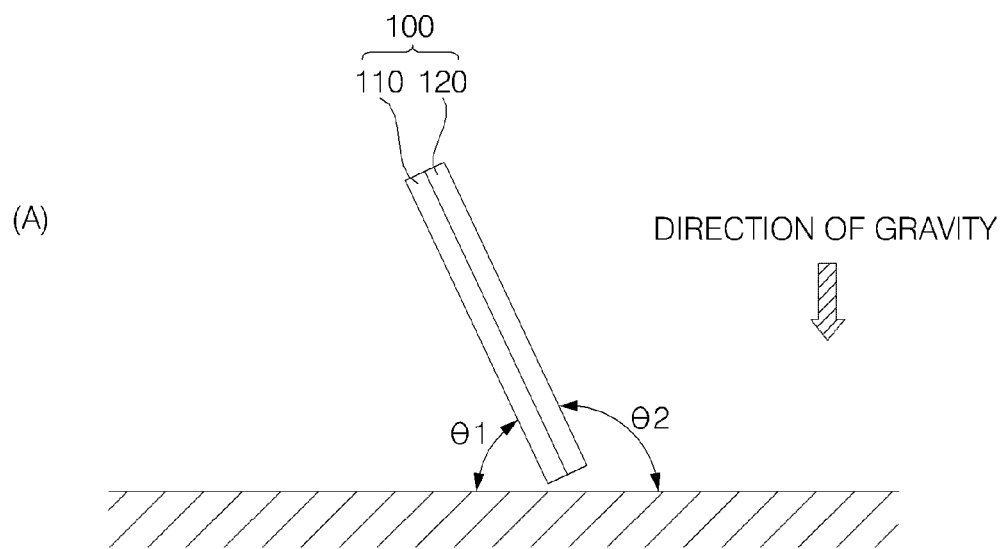
Figure 48:
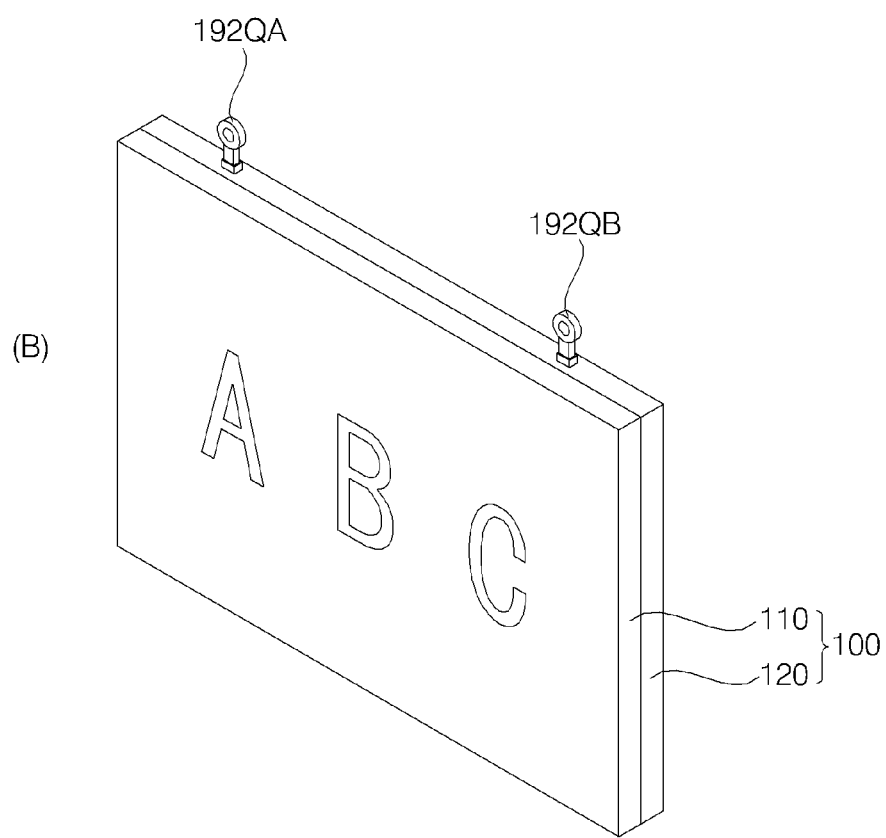
Figure 49:
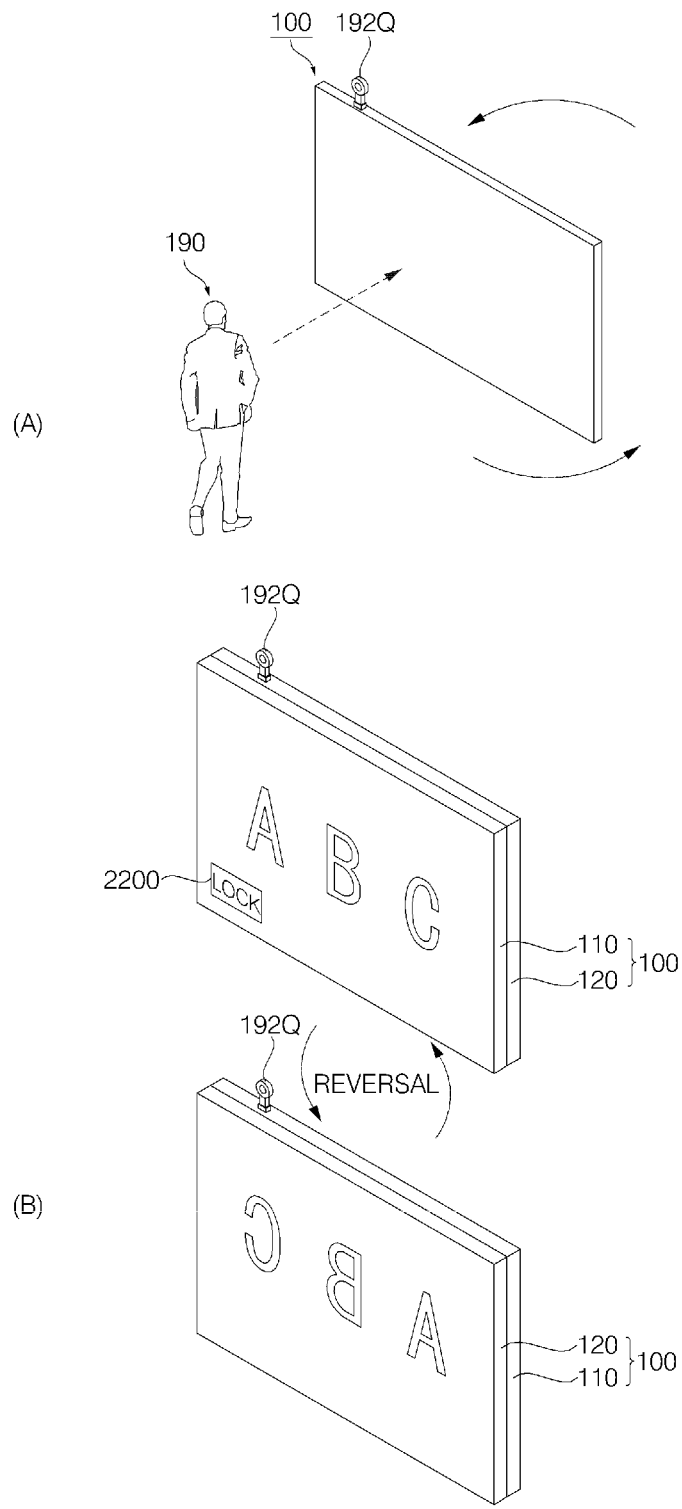
Figure 50:
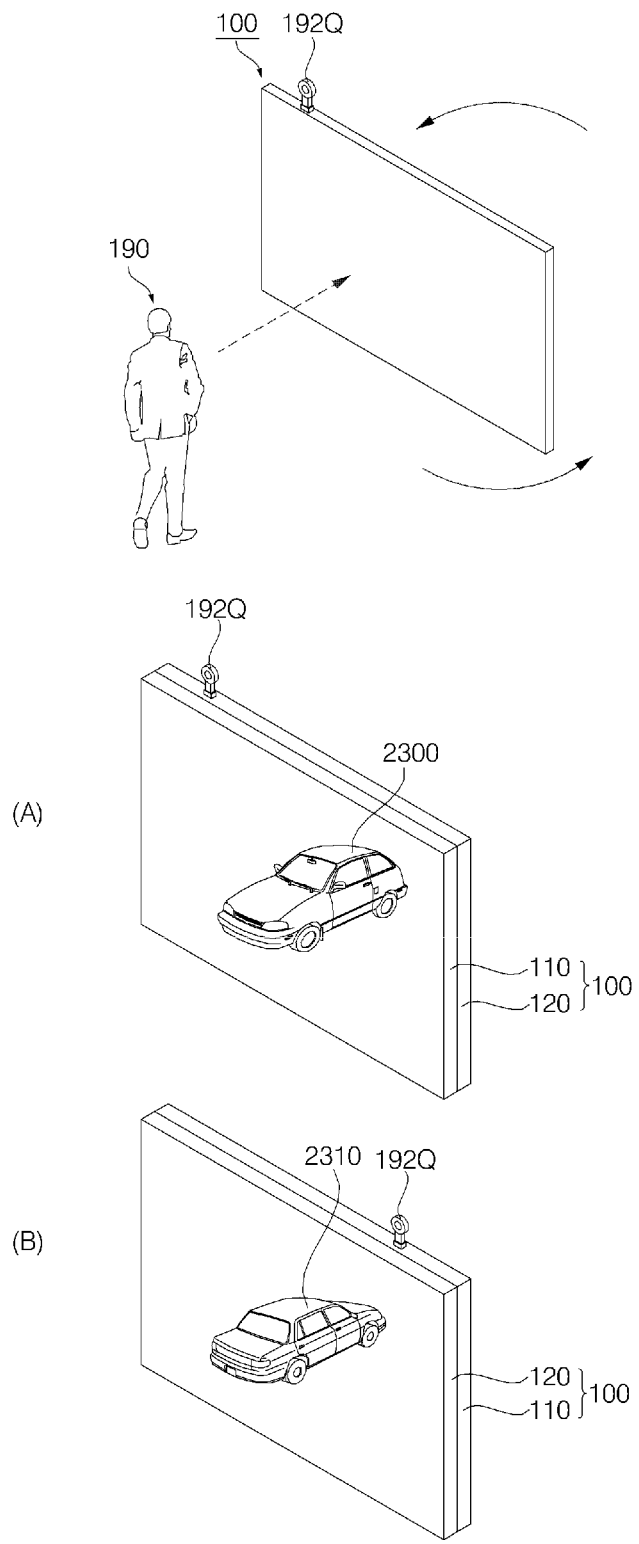

As shown in FIG. 44, the first screen 110 may be a surface for displaying an image toward the first user 190. Such a first screen 110 may be a first transparent substrate.

In addition, the second screen 120 may be a surface for displaying an image toward an opposite direction of the user 190. Such a second screen 120 may be a second transparent substrate.

In this case, if the transparent display panel 100 is reversed, the image displayed on the first screen 110, that is, the first transparent substrate, is reversed as shown in FIG. 44(B) and thus the image displayed on the second screen 120, that is, the second transparent substrate, may be obtained as shown in FIG. 44(C).

In this case, even when the first user 190 reverses the transparent display panel 100 while viewing a normal image, the user can continue to view the same normal image.

In order to view the same image as the previous image even when the transparent display panel 100 is reversed, user position information is preferably acquired using the object sensor unit 192Q.

For example, as shown in FIG. 45(A), it is assumed that a first screen 110 of the transparent display panel 100 is disposed to face the first user 190.

In this case, the first object sensor unit 192QA may acquire position information indicating that the first user 190 is located in front of the first screen 110.

In addition, an image may be displayed on the transparent display panel 100 such that the first user 190 located in front of the first screen 110 views a normal image "ABC" according to the position information acquired by the first object sensor unit 192QA.

In contrast, it is assumed that the transparent display panel 100 is reversed and a second screen 120 of the transparent display panel 100 is disposed to face the first user 190 as shown in FIG. 45(B).

In this case, the second object sensor unit 192QB may acquire position information indicating that the first user 190 is located in front of the second screen 120.

In addition, an image displayed on the transparent display panel 100 may be reversed such that the first user 190 located in front of the second screen 120 views a normal image "ABC" according to the position information acquired by the second object sensor unit 192QB.

Alternatively, if there are a plurality of users, an image may be reversed according to a user closest to the transparent display panel 100.

For example, as shown in FIG. 46(A), it is assumed that the first screen 110 of the transparent display panel 100 is disposed to face a first user 190 and the second screen 120 of the transparent display panel 100 is disposed to face a second user 180.

If a distance S1 between the transparent display panel 100 and the second user 190 is less than a distance S2 between the transparent display panel 100 and the second user 180, the first user 190 may be set as a main user. In this case, the first user 190 may have a control right of the transparent display apparatus.

As shown in FIG. 46(B), if the first screen of the transparent display panel 100 is disposed to face the first user 190, an image may be displayed on the transparent display panel 100 such that the first user 190 located in front of the first screen 100 views a normal image "ABC".

In contrast, if the transparent display panel 100 is reversed and the second screen 120 of the transparent display panel 100 is disposed to face the first user 190 as shown in FIG. 46(C), an image displayed on the transparent display panel

100 may be reversed such that the first user 190 located in front of the second screen 120 views a normal image "ABC".

An image displayed on the transparent display panel 100 may be revered according to an angle between the transparent display panel 100 and the direction of gravity.

For example, as shown in FIG. 47(A), it is assumed that the second screen 120 of the transparent display panel 100 is inclined toward the ground in the direction of gravity.

In this case, a probability that a predetermined user observes an image displayed on the first screen 110 of the transparent display panel 100 is high.

Thus, an image may be displayed on the transparent display panel 100 such that a user located in front of the first screen 110 views a normal image "ABC".

In contrast, as shown in FIG. 48(A), it is assumed that the first screen 110 of the transparent display panel 100 is inclined toward the ground in the direction of gravity.

In this case, a probability that a predetermined user observes an image displayed on the second screen 120 of the transparent display panel 100 is high.

Thus, an image displayed on the transparent display panel 100 may be reversed such that a user located in front of the second screen 120 views a normal image "ABC".

As described above, an image may be reversed such that a normal image is displayed on a screen in which a probability that a viewer views the image is high.

Meanwhile, a reverse inhibition mode for inhibiting image reversal may be set.

In other words, in a reverse mode, as described with reference to FIGS. 44 to 48, the image displayed on the first screen in the case in which the first screen faces the user may be substantially identical to the image displayed on the second screen in the case in which the second screen faces the user.

In contrast, in a reverse inhibition mode, the image displayed on the first screen in the case in which the first screen faces the user may be a reversed image of the image displayed on the second screen in the case in which the second screen faces the user.

For example, if the first screen 110 of the transparent display panel 100 is disposed to face the user, as shown in FIG. 49(B), an image may be displayed on the transparent display panel 100 such that the user located in front of the first screen 110 views a normal image "ABC".

In contrast, as shown in FIG. 49(A), if the transparent display panel 100 is reversed and the second screen 120 of the transparent display panel 100 is disposed to face the user 190, in the reverse inhibition mode for inhibiting image reversal, as shown in FIG. 49(C), the user 190 located in front of the second screen 120 can view a reversed image of the normal image "ABC".

Different images may be displayed on the transparent display panel 100 depending on whether the front surface or the rear surface of the transparent display panel 100 is disposed to face the user.

In other words, as shown in FIG. 50(A), a first image 2300 may be displayed on the first screen 110 if the first screen 110 of the transparent display panel 100 faces the user 190 and a second image 2310 different from the first image 2300 may be displayed on the second screen 120 if the second screen 120 faces the user 190.

The first image 2300 may be obtained by capturing a predetermined object in a first direction and the second image 2310 may be obtained by capturing the object in a second direction.

Figure 51:
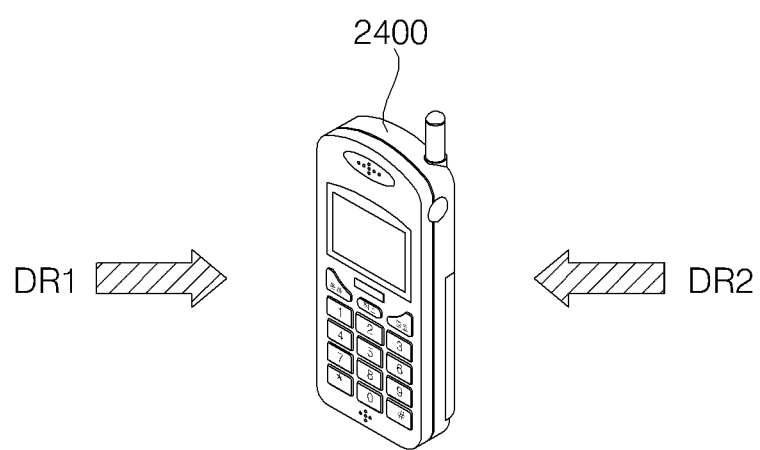
Figure 52:
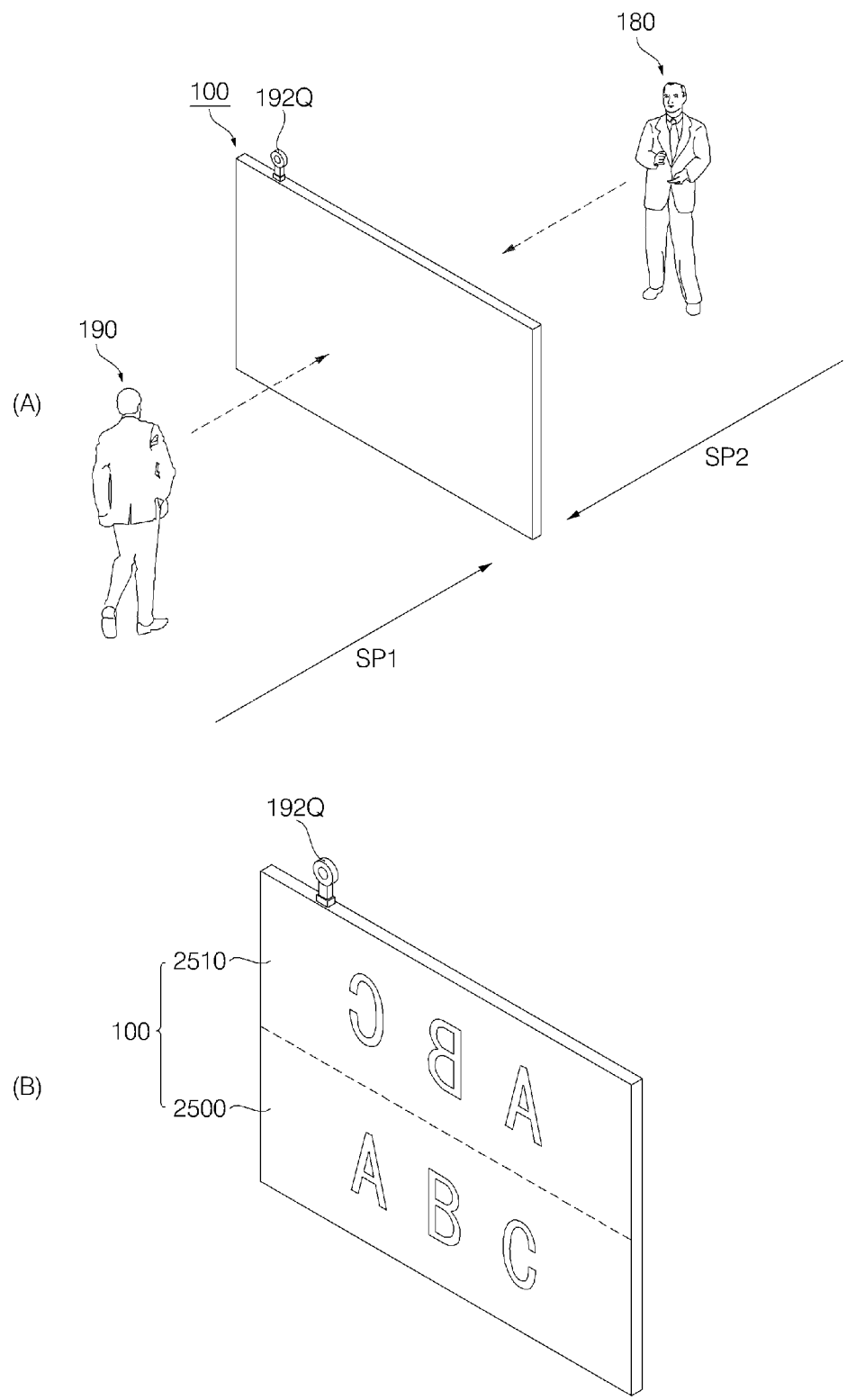

In other words, the first image 2300 may be a front image of the predetermined object and the second image 2310 may be a rear image of the predetermined object. For example, as shown in FIG. 51, if the object is a mobile phone 2400, the first image 2300 is an image obtained by capturing the mobile phone 2400 in a first direction DR1 and the second image 2310 may be an image obtained by capturing the mobile phone 2400 in a second direction DR2 opposed to the first direction DR1.

In this case, an image content provider such as a broadcast station may provide both the image obtained by capturing a predetermined object in the first direction and the image obtained by capturing the object in the second direction opposed to the first direction.

In the transparent display apparatus according to the present invention, a screen area of the transparent display panel 100 is divided into a plurality of sub screen areas and an image displayed in at least one of the plurality of sub screen areas may be a reversed image of an image displayed in another sub screen area.

For example, as shown in FIG. 52(B), the screen area of the transparent display panel 100 may be divided into a lower screen area 2500 and an upper screen area 2510.

In this case, as shown in FIG. 52(A), the first user 190 located in the first space area SP1 can normally perceive the image displayed in the lower screen area 2500 and the second user 180 located in the second space area SP2 can normally perceive the image displayed in the upper screen area 2510.

Accordingly, the first user 190 and the second user 180 may normally view the images.

The image displayed in the upper screen area 2510 and the image displayed in the lower screen area 2500 may correspond to the same channel or different channels.

Figure 53:
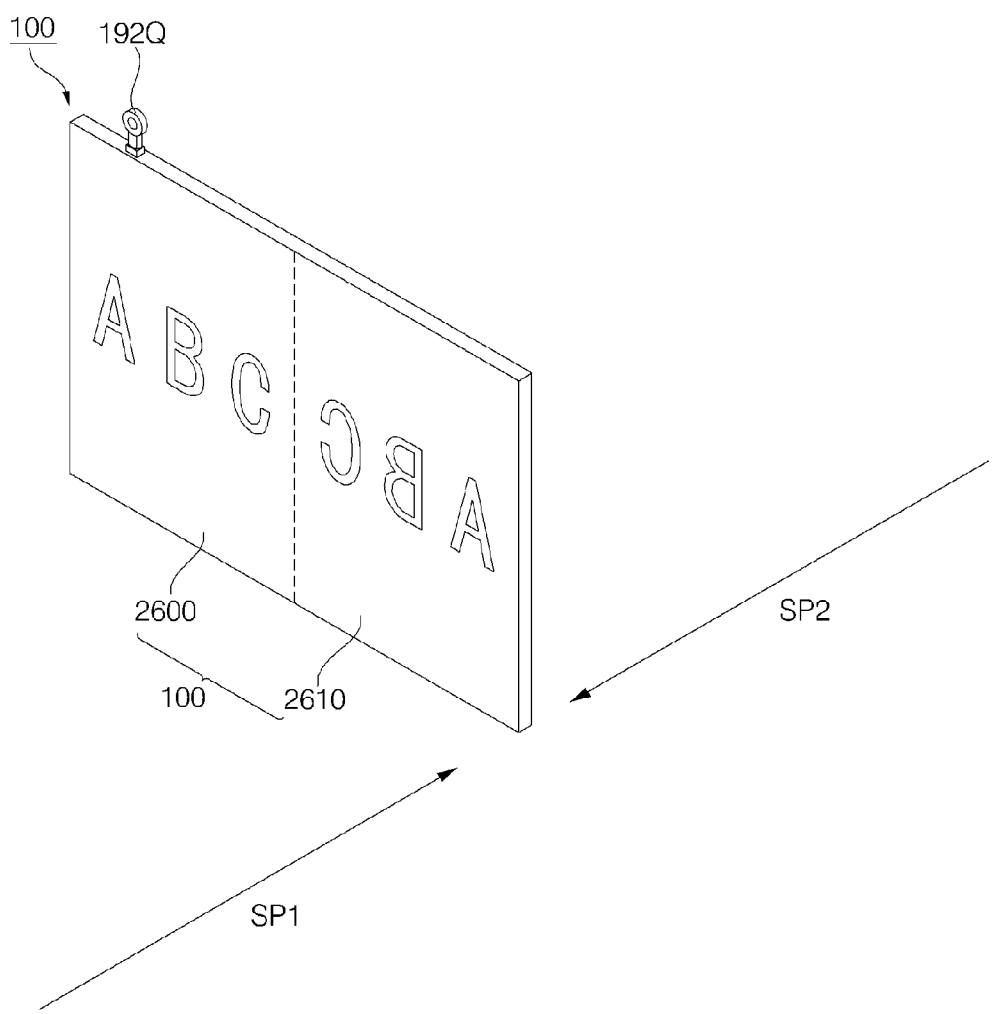
Figure 54:
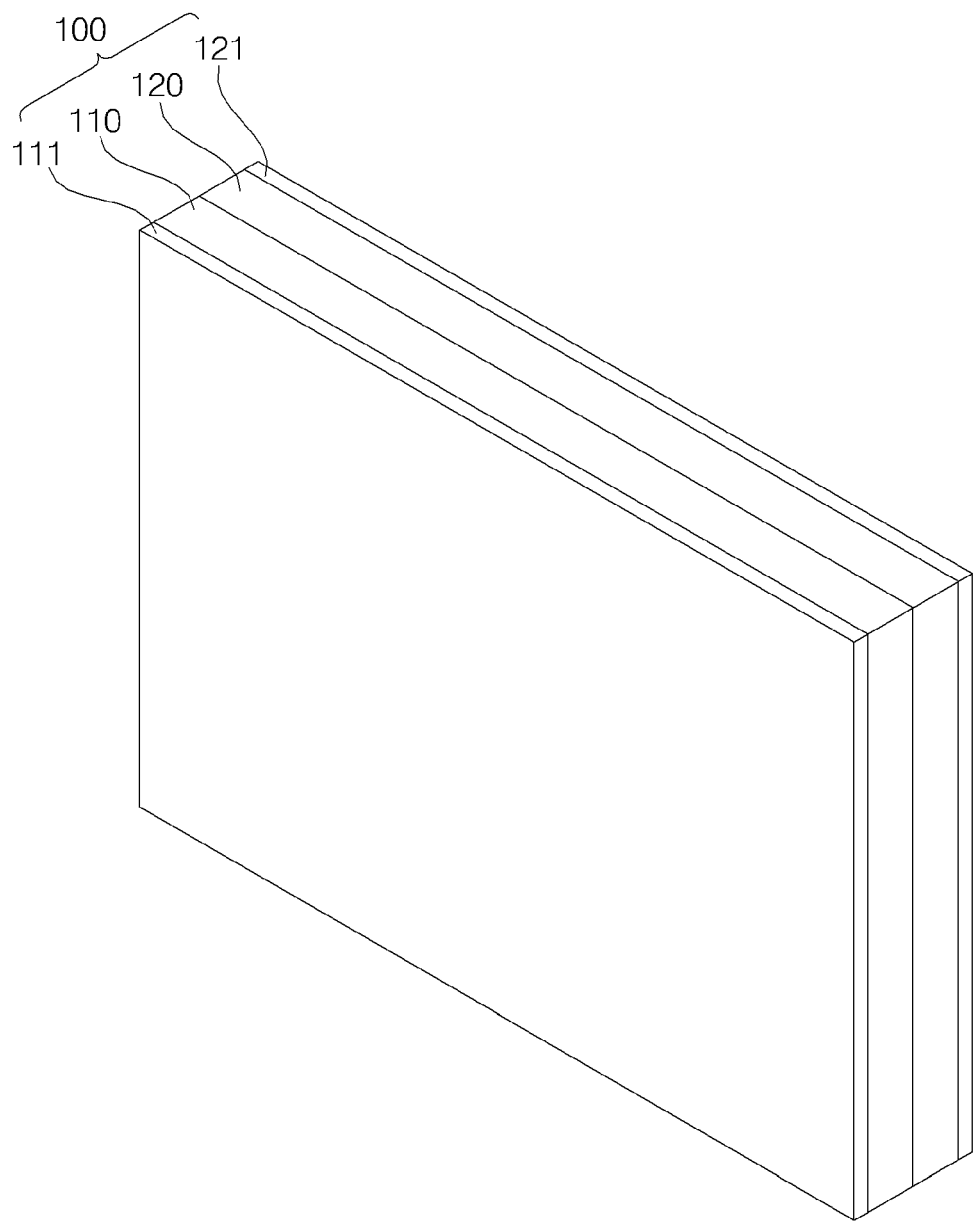
Figure 55:
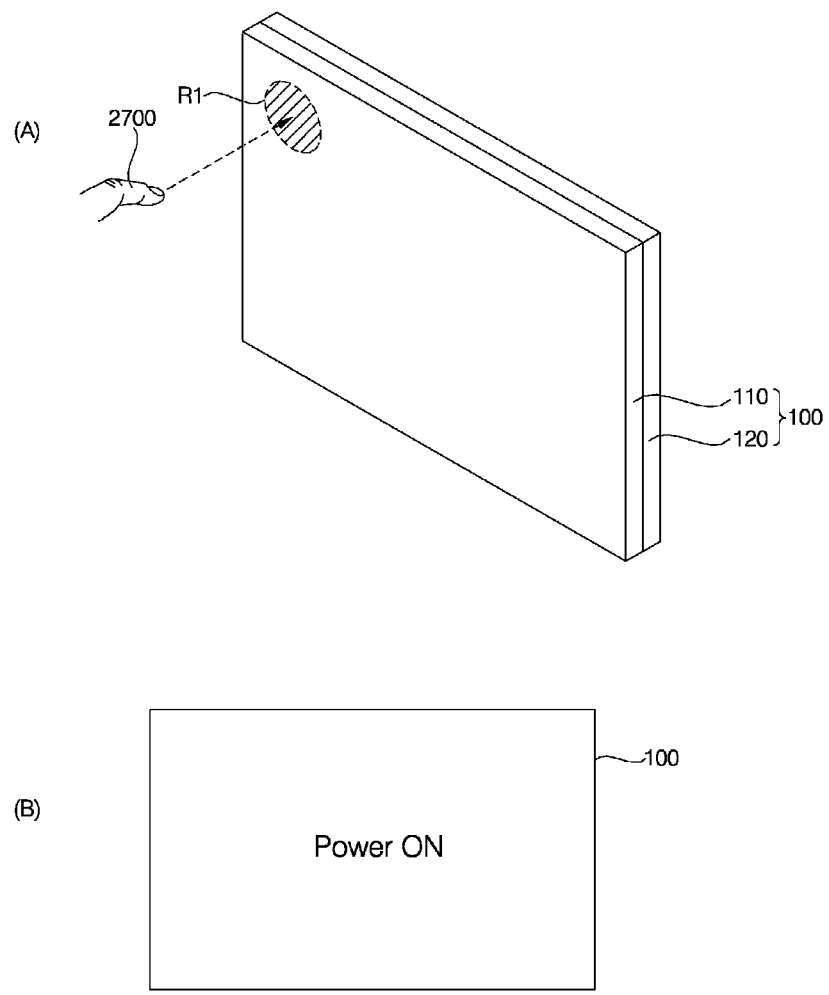
Figure 56:
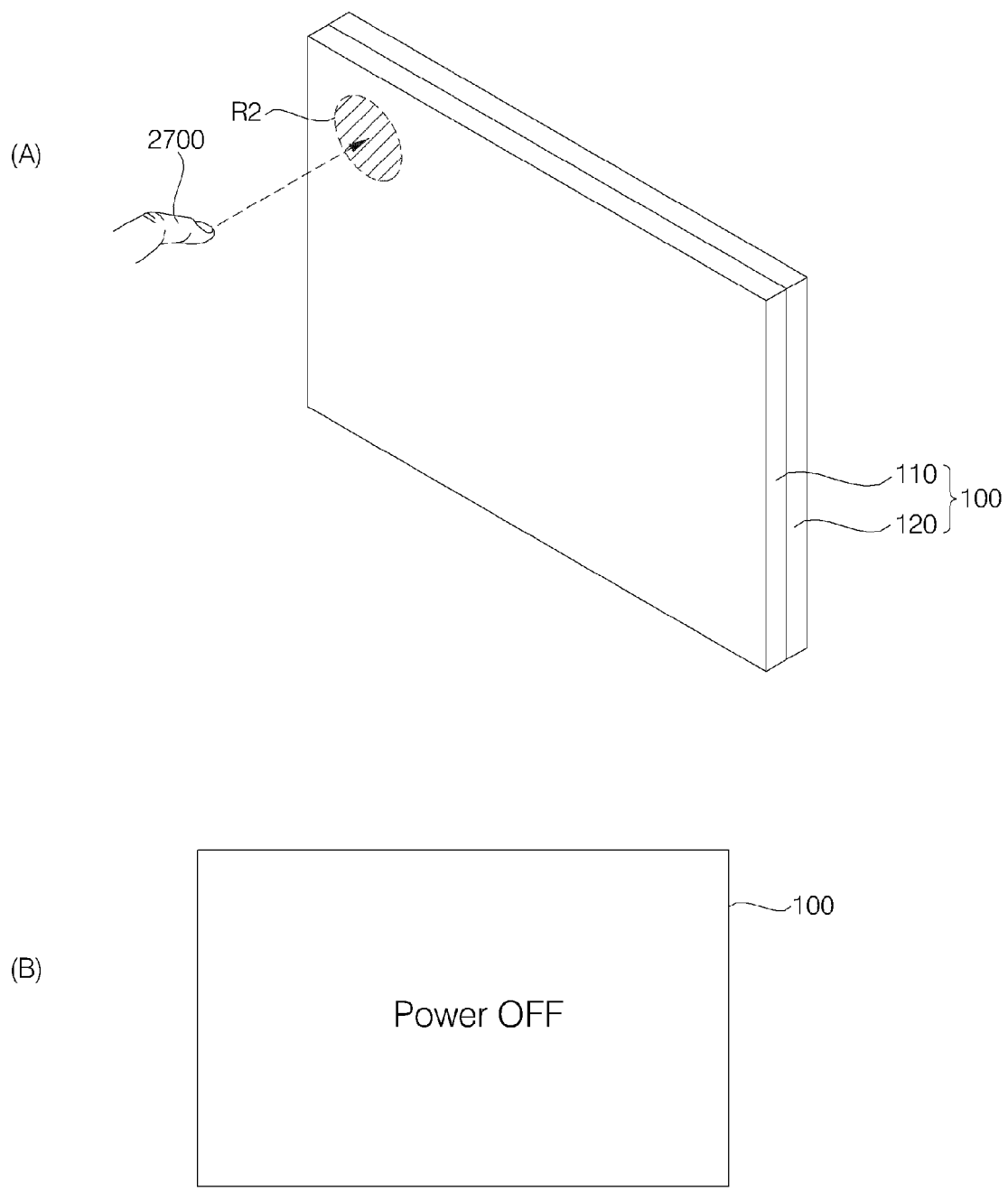
Figure 58:
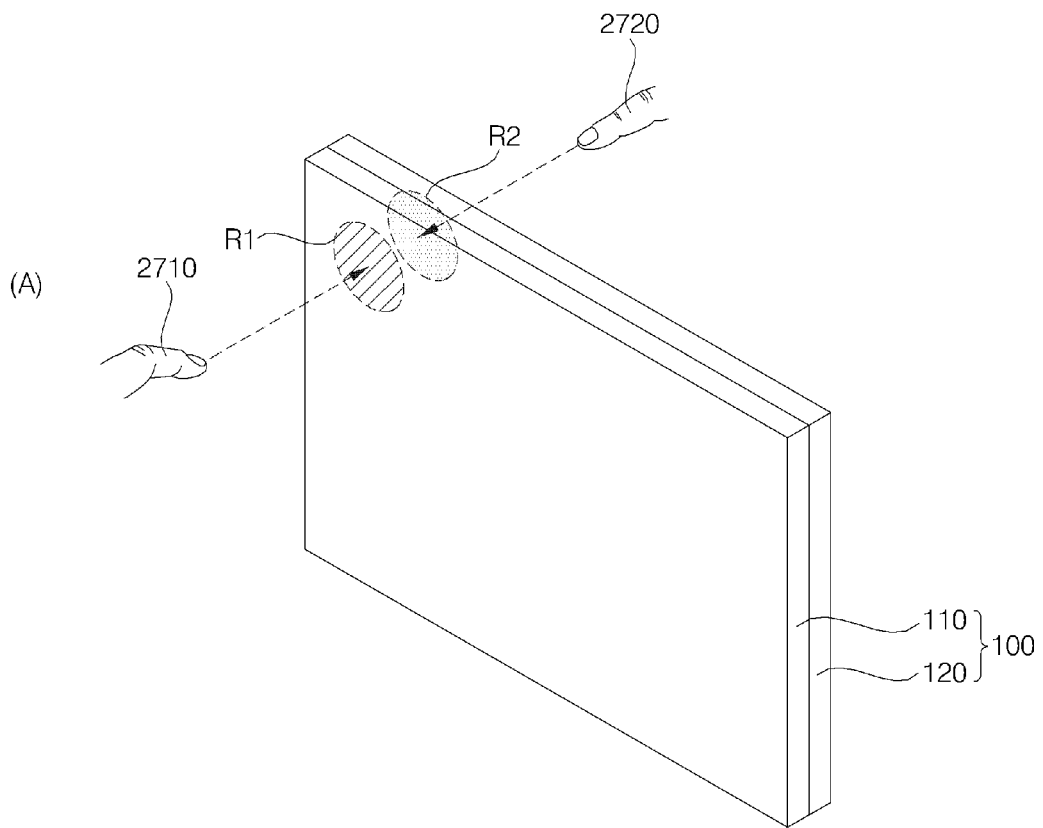
Figure 58:
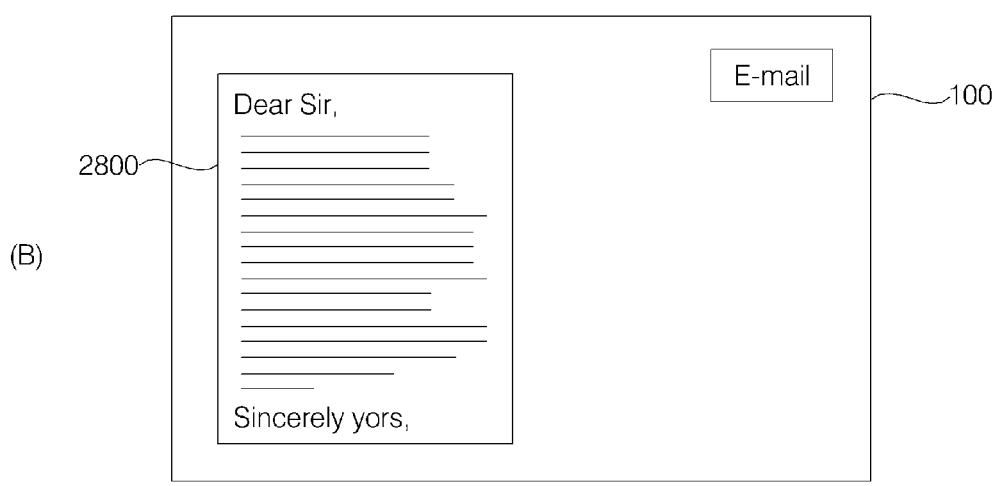
Figure 59:
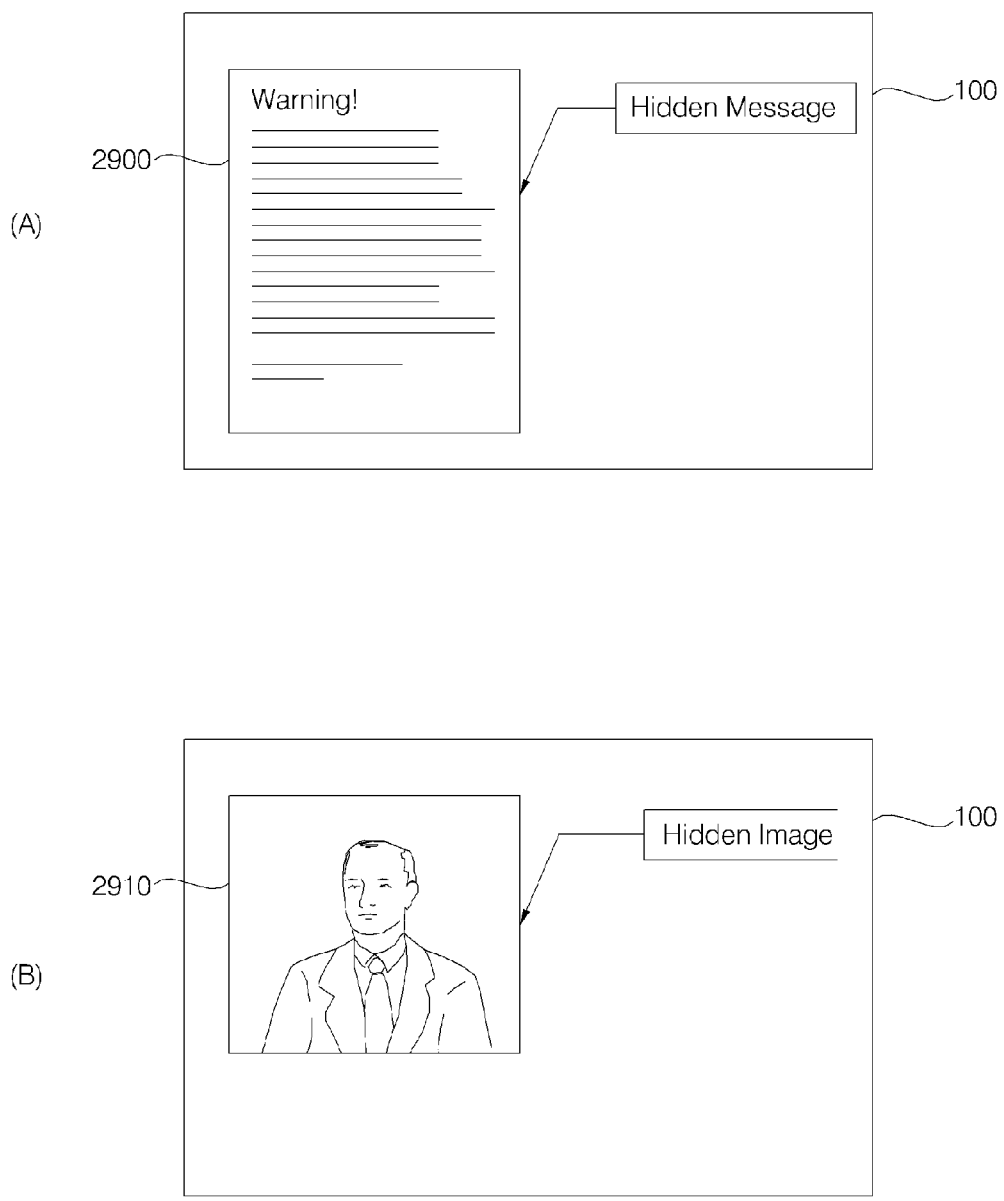
Figure 60:
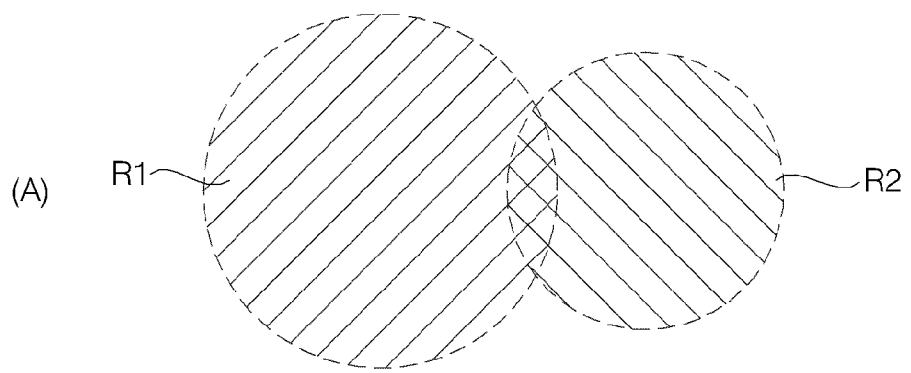
Figure 60:
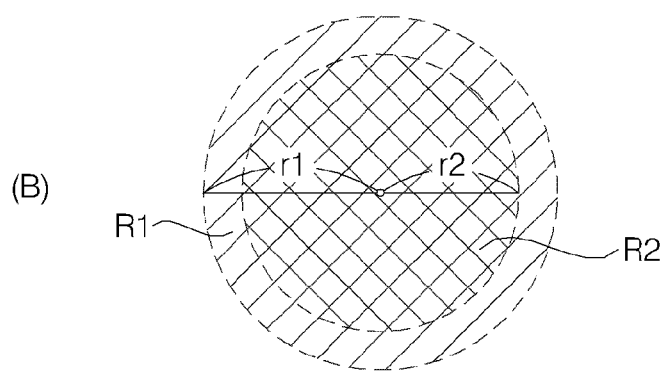
Figure 60:
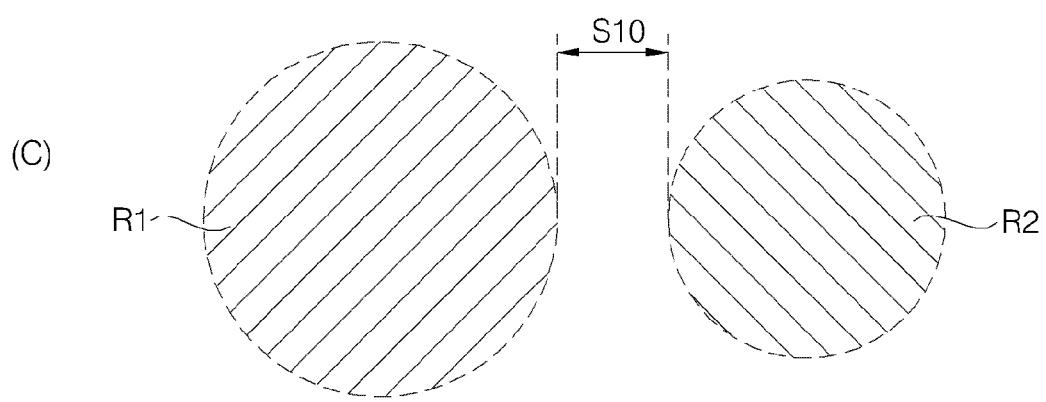
Figure 61:
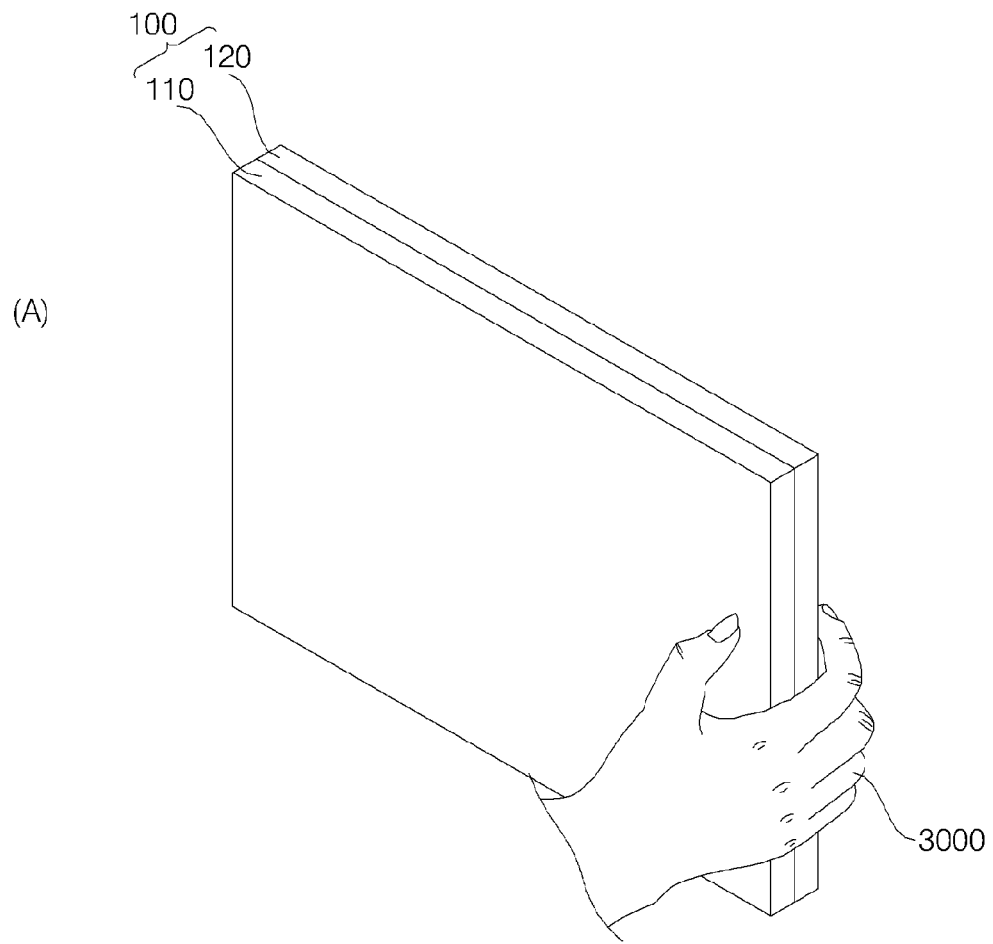
Figure 61:
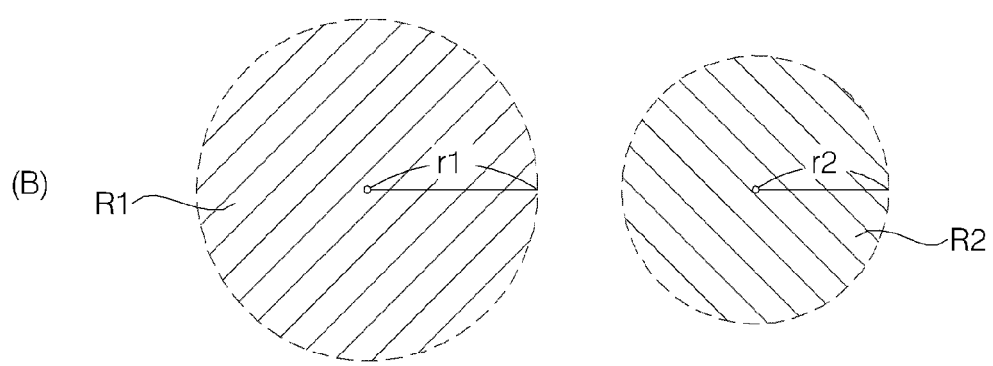

For example, as shown in FIG. 53, the screen area of the transparent display panel 100 may be divided into a left screen area 2600 and a right screen area 2610.

In this case, the user located in the first space area SP1 can normally perceive the image displayed in the left screen area 2600 and the user locate in the second space area SP2 can normally perceive the image displayed in the right screen area 2610.

Accordingly, the user located in the first space area SP1 and the user located in the second space area SP2 may normally view the images.

The image displayed in the left screen area 2600 and the image displayed in the right screen area 2610 may correspond to the same channel or different channels.

FIGS. 54 to 77 are diagrams illustrating double-sided touch. Hereinafter, a description of the above-described portions will be omitted.

Double-sided touch mode may mean mode capable of touching both surfaces of the transparent display panel 100.

In the transparent display apparatus according to the present invention, touch panels 111 and 121 may be disposed on a first screen 110 and a second screen 120 of the transparent display panel 100. The touch panels 111 and 121 may have various structures, such as a capacitive touch panel, a pressure touch panel, an optical touch panel, etc.

Hereinafter, for convenience of description, although the touch panels 111 and 121 are not shown, the touch panels 111 and 121 are disposed in an area in which a touch operation is performed.

In the transparent display apparatus according to the present invention, touching one surface of the transparent display panel 100 and touching another surface of the transparent display panel 100 have different functions.

In other words, if a first position of the first screen 110 of the transparent display panel 100 is touched, a first function is performed and, if a second position of the second screen 120 corresponding to the first position is touched, a second function different from the first function is performed.

If the first position of the first screen 110 and the second position of the second screen 120 are simultaneously touched, a third function different from the first and second functions may be performed.

For example, if a user touches a first position R1 of the first screen 110 of the transparent display panel 100 with a finger 2700 as shown in FIG. 55(A), power may be turned on as shown in FIG. 55(B).

In contrast, if a user touches a second position R2 of the second screen 120 of the transparent display panel 100 with a finger 2700 as shown in FIG. 56(A), power may be turned off as shown in FIG. 56(B).

Alternatively, as shown in FIG. 57, if the first position R1 of the first screen 110 of the transparent display panel 100 is touched according to a first type Type1, the volume is turned up (volume up), and, if the second position R2 of the second screen 120 of the transparent display panel 100 is touched, the volume is turned down (volume down).

Alternatively, if the first position R1 of the first screen 110 of the transparent display panel 100 is touched according to a second type Type2, the channel is turned up (channel up), and, if the second position R2 of the second screen 120 of the transparent display panel 100 is touched, the channel is turned down (channel down).

Functions of the case in which the first position R1 is touched and the case in which the second position R2 is touched may be variously set.

If the first position R1 and the second position R2 are simultaneously touched, a function different from the function performed in the case in which the first position R1 or the second position R2 is touched alone may be performed.

For example, as shown in FIG. 58(A), if both the first position R1 of the first screen 110 of the transparent display panel 100 and the second position R2 of the second screen 120 of the transparent display panel 100 are touched, an email menu may be displayed on the transparent display panel 100 as shown in FIG. 58(B).

Preferably, as shown in FIG. 58(B), if both the first position R1 and the second position R2 are touched, email message content 2800 may be displayed on the transparent display panel 100.

Alternatively, as shown in FIG. 59(A), if both the first position R1 and the second position R2 are touched, a hidden message 2900 may be displayed on the touch display panel 100.

Alternatively, as shown in FIG. 59(B), if both the first position R1 and the second position R2 are touched, a hidden image 2910 may be displayed on the touch display panel 100.

Although not shown, if both the first position R1 and the second position R2 are touched, a hidden video may be displayed on the touch display panel 100.

In this way, by performing another function if both the first position R1 and the second position R2 are touched, it is possible to set a wider variety of functions.

As shown in FIG. 60(A), the first position R1 and the second position R2 may partially overlap.

Alternatively, as shown in FIG. 60(B), the position R2 may fully overlap the first position R1.

In contrast, as shown in FIG. 60(C), the first position R1 and the second position R2 may be separated from each other by a predetermined distance S10 in a horizontal direction of the transparent display panel 100.

In this case, for touch reliability, the distance S10 between the first position R1 and the second position R2 may be less than at least one of the radius r1 of the first position R1 and the radius r2 of the second position R2.

The size of the first position R1 may be different from the size of the second position R2.

For example, as shown in FIG. 61(A), if a user grips a part of the transparent display panel 100 with one hand, a thumb may contact the first screen 110 of the transparent display panel 100 and the remaining fingers may contact the second screen 120.

For example, when the first position R1 is touched with the thumb and the second position R2 is touched with an index finger, a predetermined function may be performed.

The size of the first position R1 touched by the thumb may be greater than the size of the second position R2 touched by the index finger.

As shown in FIG. 61(B), the size of the first position R1 may be greater than the size of the second position R2. For example, if the first position R1 and the second position R2 have a circular shape, the radius r1 of the first position R1 may be larger than the radius r2 of the second position R2.

Alternatively, as shown in FIG. 62(A), if a first touch operation moving from the first position R1 of the first screen 110 in a first direction DR1 is performed, an object 3100 located on the first screen 110 of the transparent display panel 100 may move in the first direction DR1 as shown in FIG. 62(B).

For example, the predetermined object 3100 may be dragged in the first direction DR1 to move the object 3100.

In contrast, as shown in FIG. 63(A), if a second touch operation moving the second position R2 of the second screen 120 in a second direction DR2 opposed to the first direction DR1 is performed, the object 3100 located on the second screen 120 of the transparent display panel 100 may move in the second direction DR2 as shown in FIG. 63(B).

For example, the predetermined object 3100 may be dragged in the second direction DR2 to move the object 3100.

Figure 62:
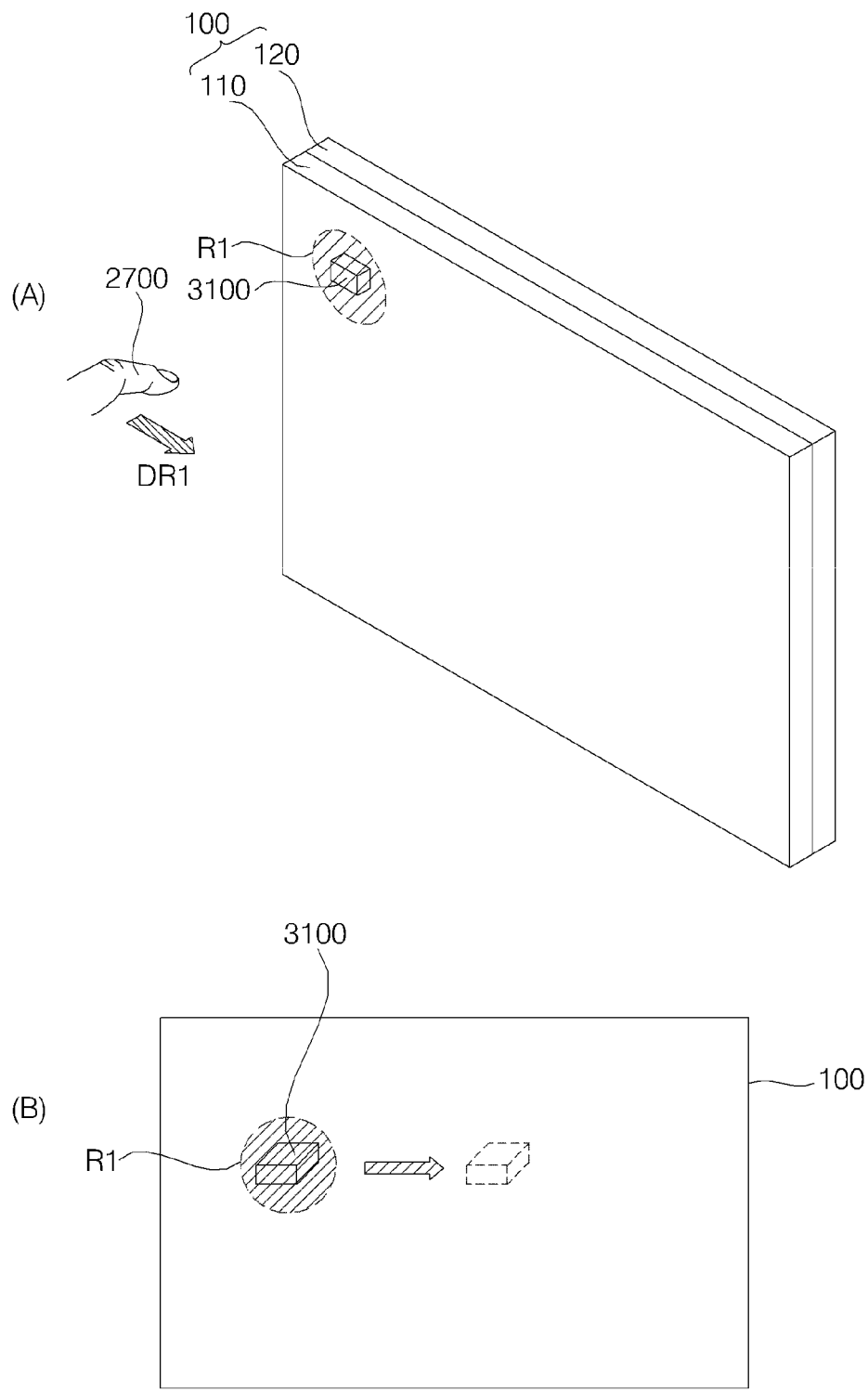
Figure 63:
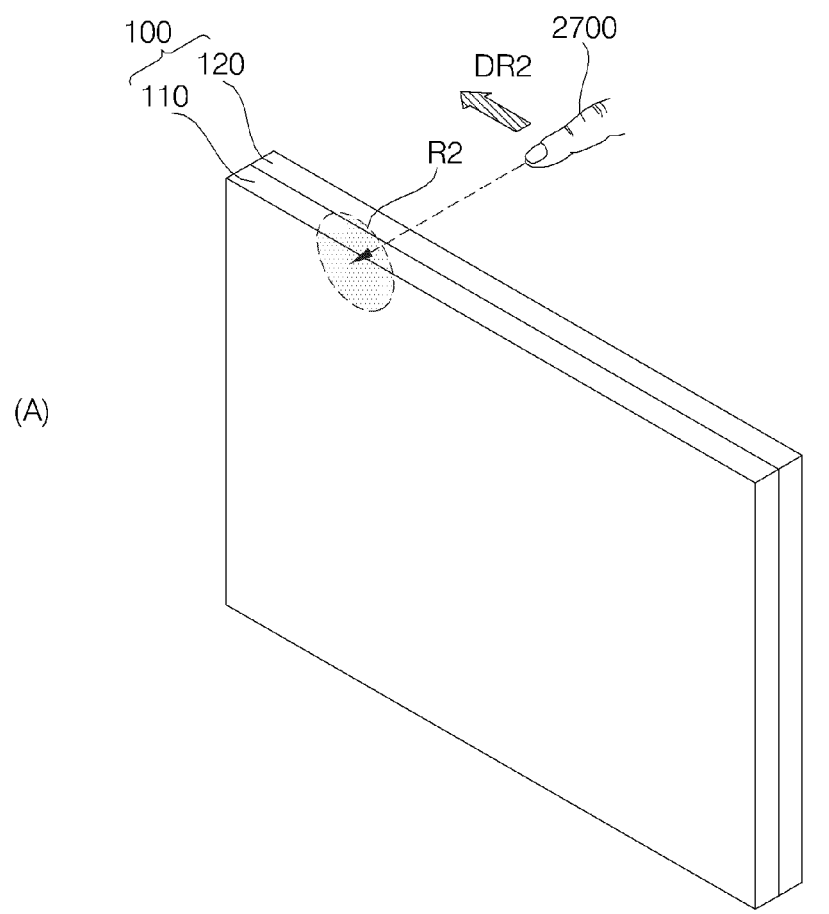
Figure 63:
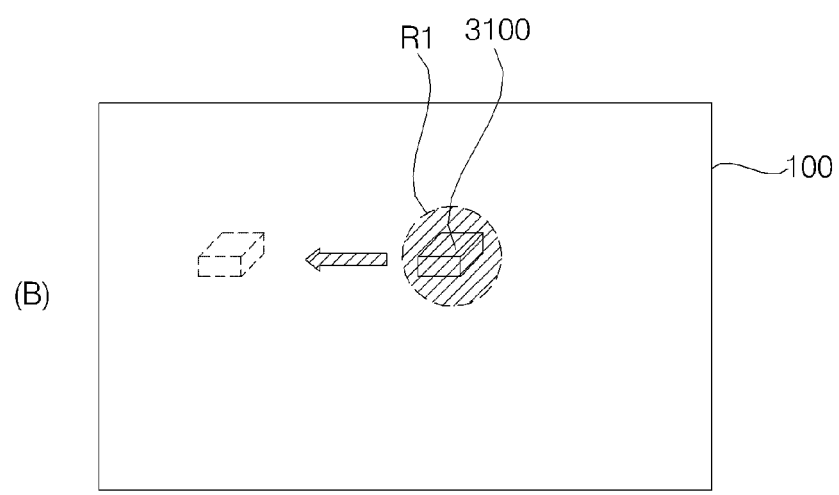
Figure 64:
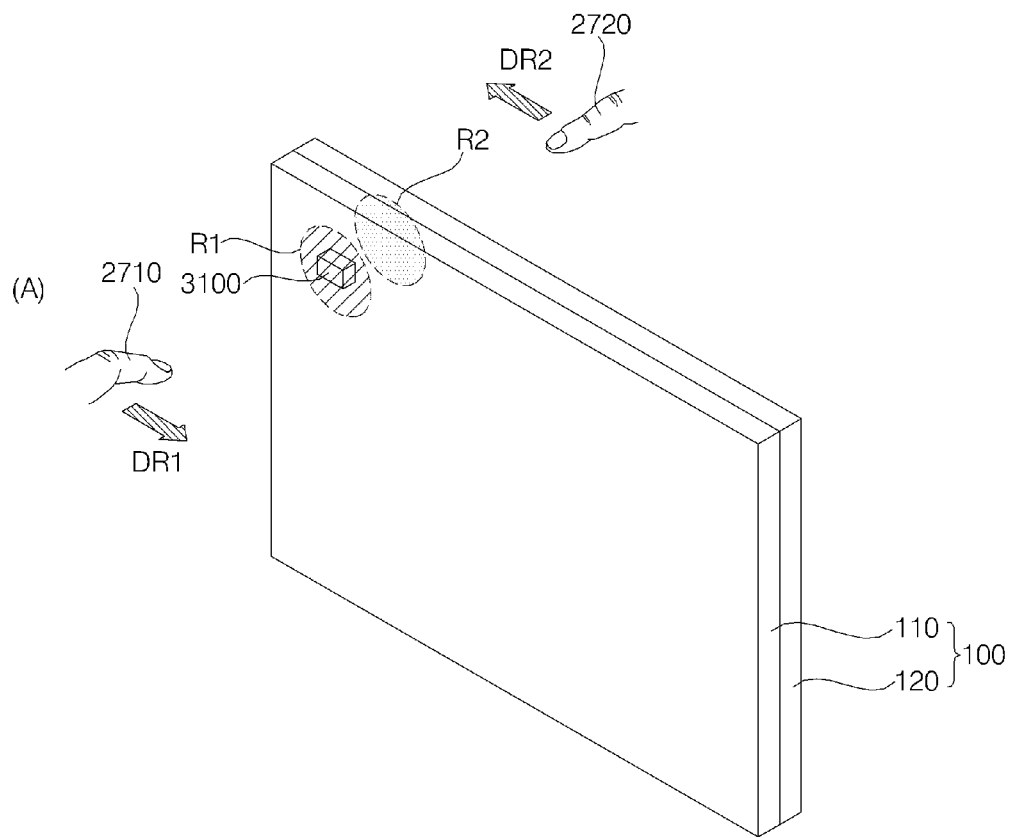
Figure 64:
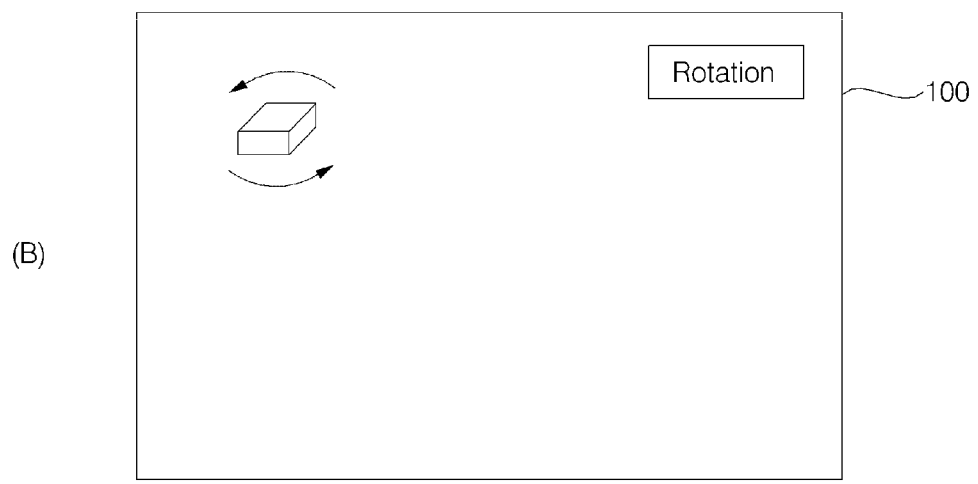

In contrast, as shown in FIG. 64(A), if a first touch operation moving from the first position R1 of the first screen 110 in the first direction DR1 and a second touch operation moving the second position R2 of the second screen 120 in the second direction DR2 opposed to the first direction DR1 are performed, the object 3100 may rotate differently from FIGS. 62 and 63.

In this way, it is possible to set a wider variety of functions using a double-sided touch mode for touching the first screen 110 and the second screen 120 of the transparent display panel 100.

Figure 65:
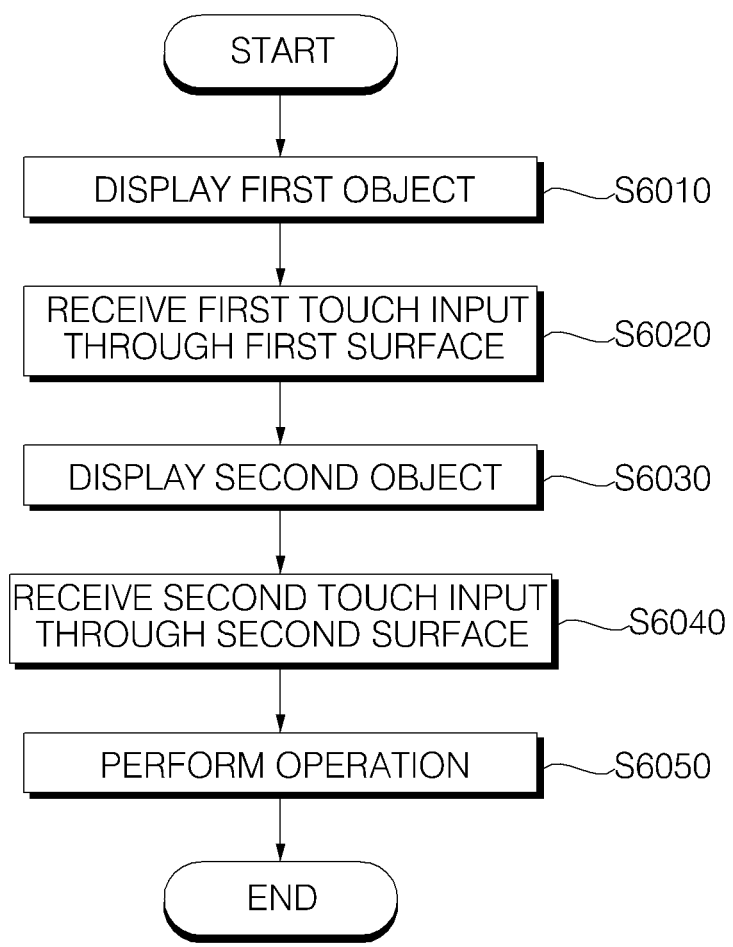
Figure 66:
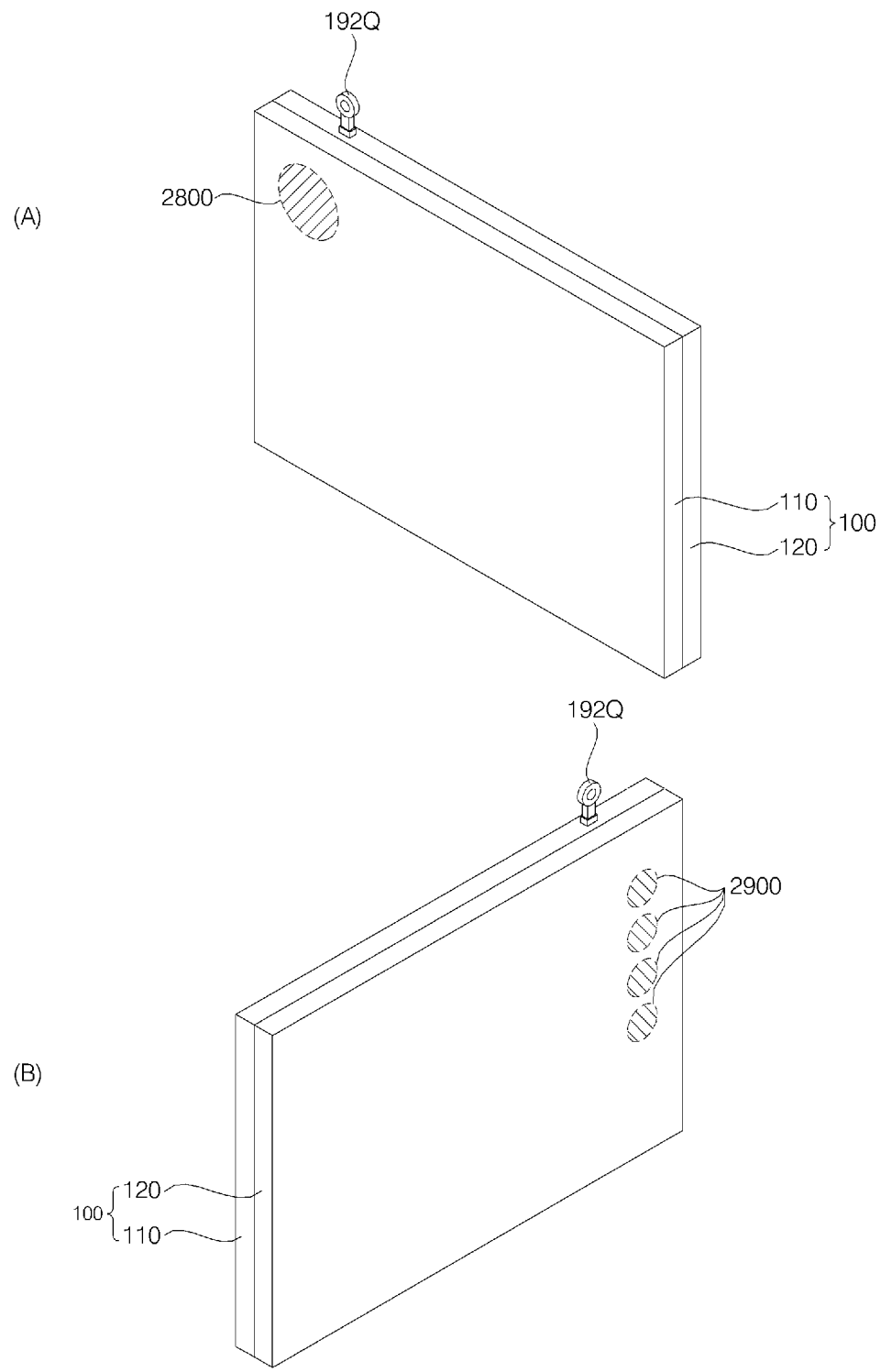

FIG. 65 is a flowchart illustrating a method for operating a transparent display apparatus according to an embodiment of the present invention.

The transparent display apparatus according to the embodiment of the present invention may include a transparent display panel including a first surface 110 and a second surface 120 opposed to each other.

The first surface 110 may be a first transparent substrate and the second surface 120 may be a second transparent substrate. The first surface may be disposed to face a user. That is, a transparent substrate closer to a user between the first transparent substrate and the second transparent substrate may be defined as the first surface.

First, the transparent display apparatus displays a first object for touch input (S6010).

The first object may correspond to an input window for inputting a menu or a command, a text or graphic object including information associated with an inputtable command or a text or graphic object for aiding command input. In addition, the first object may be a guide object for an inputtable command or area, which guides user touch input.

A display position of the first object is not limited. For example, the first object may be displayed on the first surface 110 or the second surface 120. An image may be displayed on an image layer 130 interposed between the first transparent substrate 110 and the second transparent substrate 120 such that a user views the image through the first transparent substrate 110 and the second transparent substrate 120 or the user perceives the image displayed on the image layer 130 as being displayed on the first transparent substrate 110 or the second transparent substrate 120.

Hereinafter, for convenience of description, it is assumed that various objects are displayed on the first surface 110 or the second surface 120.

Thereafter, if first touch input for the first object is received through the first surface (S6020), a second object for touch input through the second surface may be displayed (S6030).

The second object may be associated with the first object. For example, if the first object is a high-level menu, the second object may be a low-level menu. Alternatively, the second object may be an item related to an operation associated with the first object.

Thereafter, if second touch input is received through the second surface (S6040), an operation corresponding to a combination of the first touch input and the second touch input may be performed (S6050).

The step S6050 of performing the operation may be set such that the operation is performed if the first touch input and the second touch input are maintained for a predetermined reference time.

Touch menus may be displayed on the first screen 110 and the second screen 120 of the transparent display panel 100.

For example, as shown in FIG. 66(A), a first touch menu 2800 may be displayed on the first screen 110 of the transparent display panel 100 and a second touch menu 2900 may be displayed on the second screen 120.

If the respective touch menus are displayed on the first screen 110 and the second screen 120 of the transparent display panel 100, a command for initiating a double-sided touch mode may be input. That is, if a user initiates a double-sided touch mode using a predetermined command input unit, such as voice, a gesture, etc., the first touch menu 2800 may be displayed on the first screen 110 of the transparent display panel 100 and the second touch menu 2900 may be displayed on the second screen 120.

Alternatively, in the case in which the first screen 110 of the transparent display panel 100 is disposed to face the user and the first touch menu 2800 displayed on the first screen 110 of the transparent display panel 100 is touched, the second touch menu 2900 may be displayed on the second screen 120. That is, in the case in which the first touch menu 2800 displayed on the first screen 110 is touched, the second touch menu 200 may be activated.

If the first screen 110 of the transparent display panel 100 is disposed to face the user and the user grips the transparent display panel 100 with one hand, a thumb among the five fingers may correspond to the first screen 110 of the transparent display panel 100 and the remaining fingers may correspond to the second screen 120.

Thus, a touch margin of the second screen 120 of the transparent display panel 100 may be increased. Accordingly, the number of first touch menus 2800 disposed on the first screen 110 of the transparent display panel 100 may be less than the number of second touch menus 2900 disposed on the second screen 120.

Since the number of second touch menus 2900 is greater than the number of first touch menus 2800, a wider variety of various functions may be assigned to the second touch menus 2900 as compared to the first touch menus 2800.

Therefore, the second touch menu 2900 may perform a function having a level lower than that of the first touch menu 2800. In other words, the second touch menu 2900 may be a low-level menu of the first touch menu 2800.

In other words, if the first menu 2800 displayed on the first screen 110 is touched, the second menu 2900 which is the low-level menu of the first menu 2800 may be displayed on the second screen 120.

The first menu 2800 and the second menu 2900 may be arranged according to the shape of the user's hand.

Figure 67:
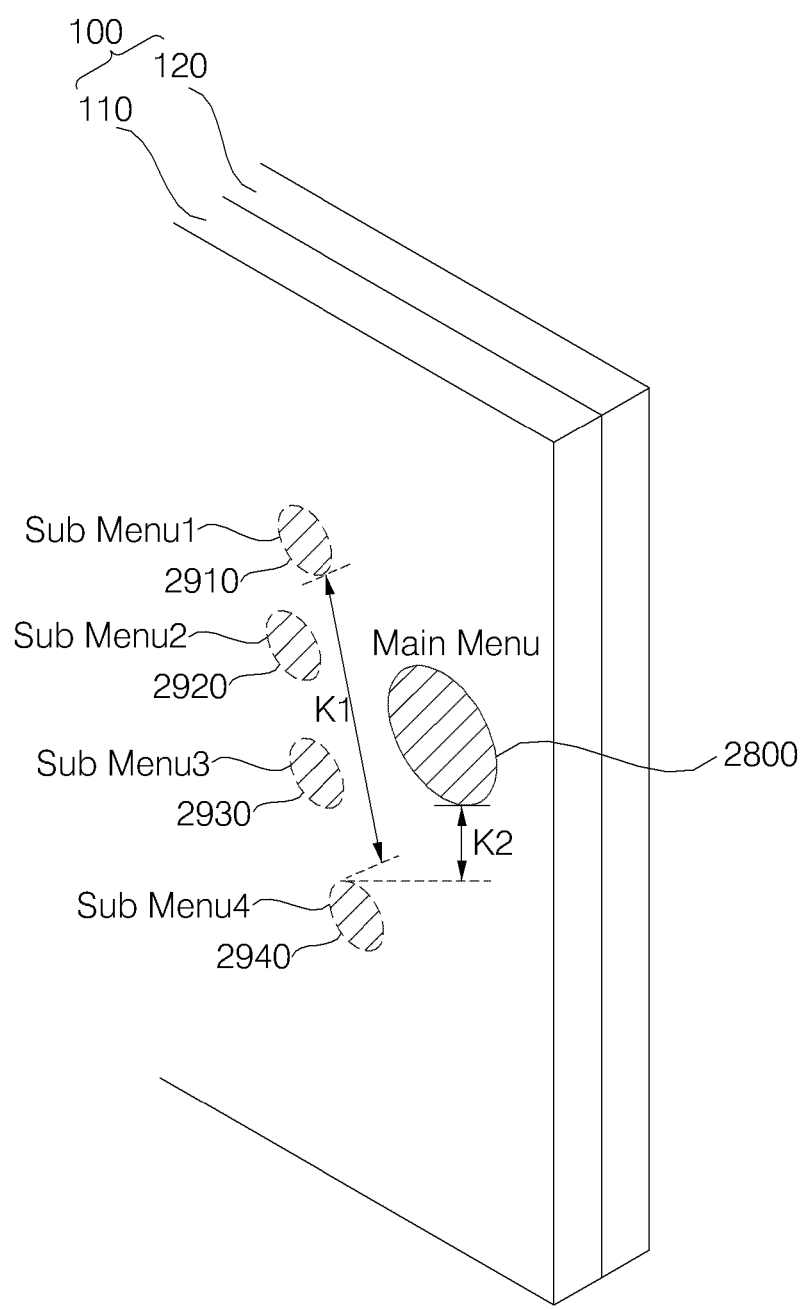

For example, as shown in FIG. 67, the first touch menu 2800 may be displayed at a predetermined position of the first screen 110 and four second touch menus 2910 to 2940 may be arranged in the vicinity of the first touch menu 2800.

Figure 68:
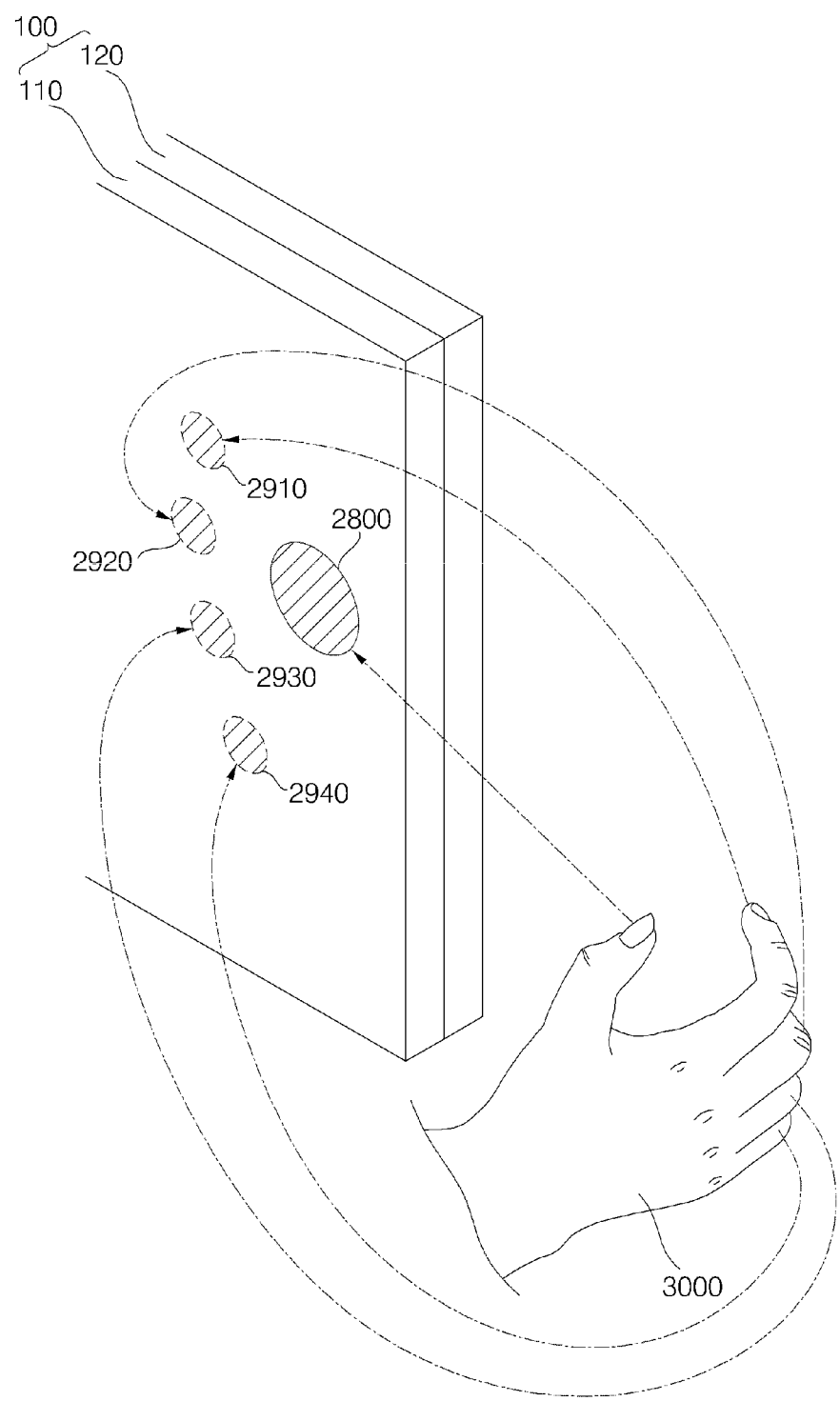
Figure 70:
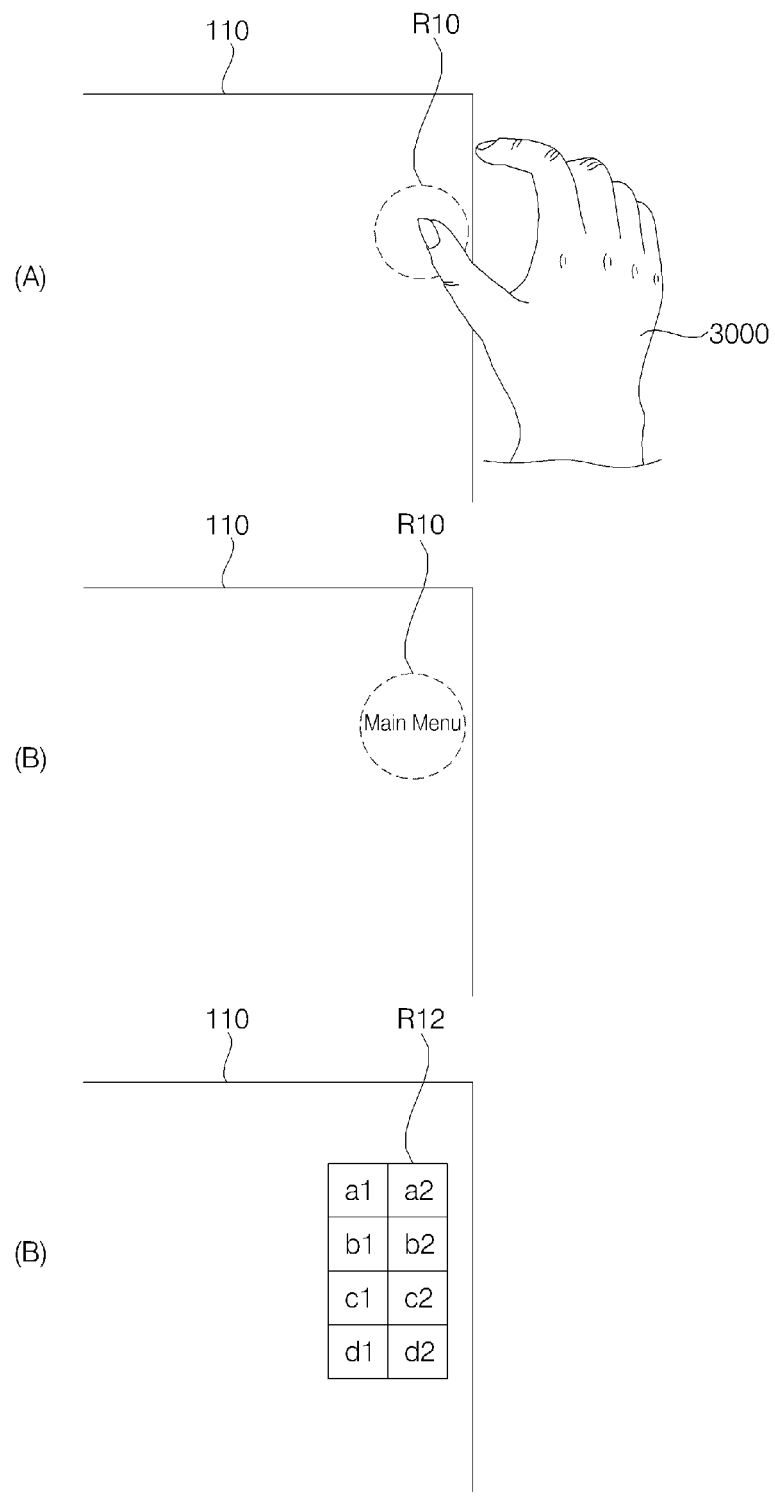

The first touch menu 2800 may correspond to the thumb among fingers as shown in FIG. 68 and activate the four second touch menus 2910 to 2940. Alternatively, the first touch menu 2800 may be a high-level menu of the second touch menus 2910 to 2940.

Therefore, the first touch menu 2800 may be a main menu. The second touch menu 2900 may be a sub menu.

For example, as shown in FIG. 69, the main menu 2800 may be assigned to a volume setting function. That is, if the user touches the main menu 2800, the transparent display apparatus according to the present invention may enter a volume control mode. That is, if the main menu 2800 is touched, the volume setting menu may be activated.

A first sub menu Sub Menu1 may be assigned to a volume up function.

A second sub menu Sub Menu2 may be assigned to a volume down function.

A third sub menu Sub Menu3 may be assigned to a preferred volume function.

A fourth sub menu Sub Menu4 may be assigned to a recommended volume function.

For example, if the main menu 2800 is selected, the transparent display apparatus may enter a volume setting mode and then control the volume using the first to fourth sub menus Sub Menu1 to Sub Menu4.

In consideration of the arrangement of the user's fingers, a maximum distance between two menus selected from the plurality of second touch menus 2910 to 2940 may be greater than a maximum distance between the first touch menu 2800 and the second menus 2910 to 2940.

For example, as shown in FIG. 67, a distance K2 between the first touch menu 2800 and the second touch menu 2940 may be less than a distance K1 between the second touch menu 2910 and the second touch menu 2940.

In this case, the user may readily input a touch signal in a state of gripping the transparent display panel 100 with one hand.

The first object may be displayed when input of touching a predetermined area of the first surface is received. In this case, according to the embodiment, the first object may be displayed when input of touching the predetermined area of the first surface is received for a threshold time or more.

Alternatively, the first object may be displayed if input of touching the first surface in a predetermined pattern is received or if side surface touch input of the transparent display panel is received.

The first touch menu (main menu) 2800 may be displayed on the first screen 110 when the user touches a predetermined area of the first screen 110.

For example, as shown in FIG. 70(A), if the user touches a predetermined position R10 of the first screen 110 of the transparent display panel 100, the first touch menu 2800 may be displayed on the first screen 110 as shown in FIG. 70(B). The first touch menu 2800 may be displayed at a position corresponding to the predetermined position R10.

In addition, as shown in FIG. 70(c), a guide object may be displayed on the first surface 110 in the form of a matrix having a plurality of rows and columns. The guide object has partitioned areas a1 to d2 mapped to predetermined functions or operations and may perform a function or operation corresponding to touch input. In addition, the guide object may include text or graphic information indicating a mapped function or operation.

Alternatively, the first touch menu 2800 may be displayed on the first screen 110 if the user touches a predetermined area of the first screen 110 for a threshold time or more.

For example, as shown in FIG. 70(A), if the user touches the predetermined position R10 of the first screen 110 of the transparent display panel 100 for the threshold time or more, the first touch menu 2800 may be displayed on the first screen 110 as shown in FIG. 70(B).

As shown in FIG. 70(C), a guide object R12 may be displayed on the first surface 110 in the form of a matrix having a plurality of rows and columns. Alternatively, the guide object including a plurality of separated objects may be displayed in a form similar to a second touch menu 2900 of FIG. 66 or second menus 2910 to 2940 of FIG. 67. That is, the guide object may include a plurality of separated areas, each of which can perform a predetermined function according to touch input.

In the embodiments, the second object may be a guide object for an inputtable command or area.

Alternatively, the first touch menu 2800 may be displayed on the first screen 110 if the user performs a touch input on the screen of the transparent display panel 100 according to a predetermined pattern.

Figure 71:
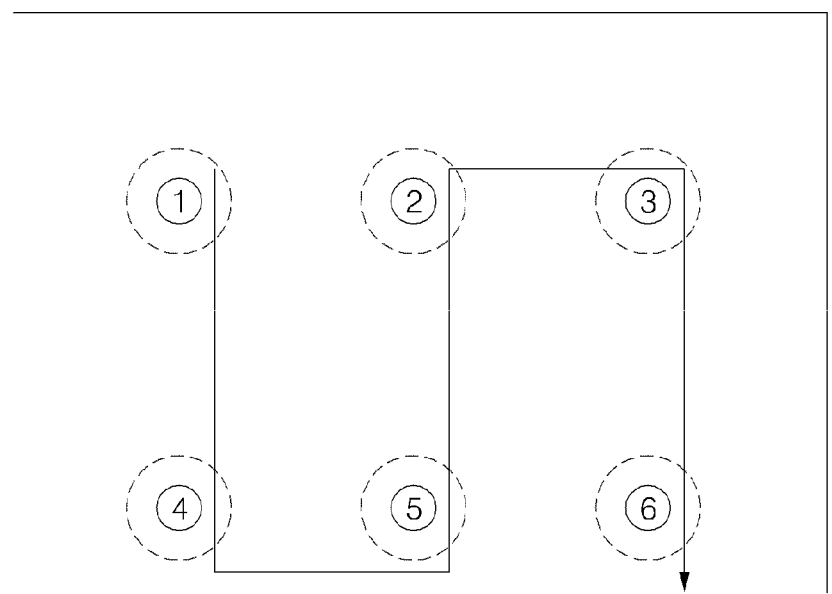

For example, as shown in FIG. 71, if the user touches the screen in the order of ①-②-③-④-⑤-⑥, the first touch menu 2800 may be displayed on the first screen 110. The touch pattern for activating the first touch menu 2800 is not limited to that illustrated in FIG. 71.

Input of touching a predetermined area of the first surface may be equal to the first touch input.

For example, if the first object is displayed by touch input through the first surface, a predetermined area of the first surface is touched without separate first touch input and a state of touching the first surface is maintained, input of touching the predetermined area of the first surface may be processed as the first touch input and an operation associated with the first touch input may be performed.

The second touch menu 2900 may disappear if the user releases the touch of the first touch menu 2800 displayed on the first screen 110.

Figure 72:
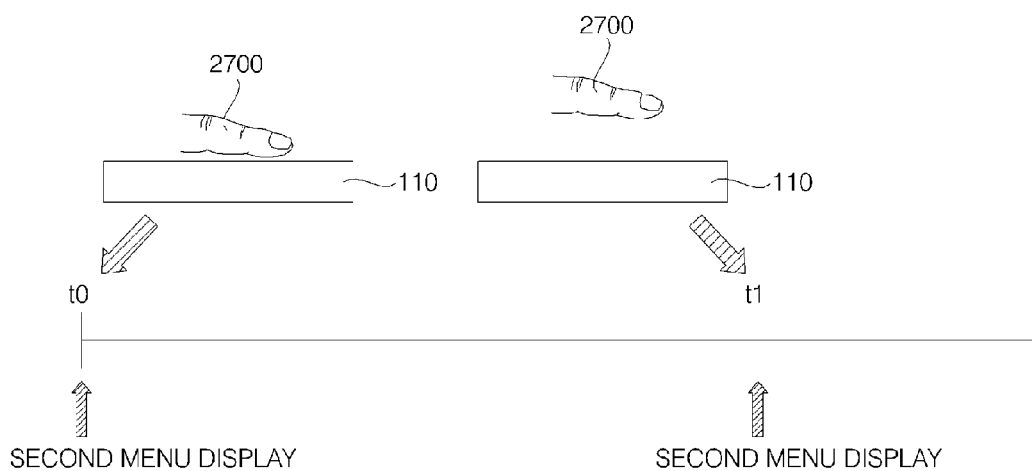
Figure 73:
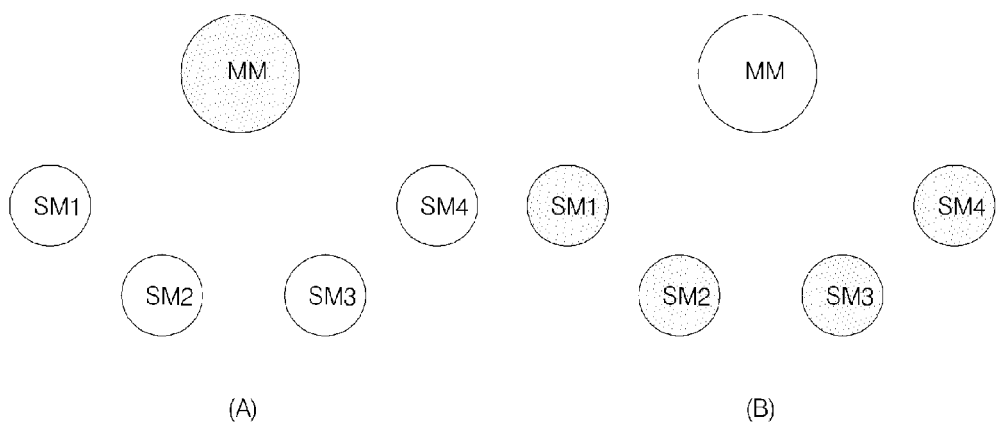

For example, as shown in FIG. 72, if the user touches the first touch menu 2800 at a time t0, the second touch menu 2900 may be displayed on the second screen 120.

Thereafter, if the touch of the first touch menu 2800 is released at a time t1, the second touch menu 2900 may disappear from the second screen 120.

Alternatively, at the time t1, the second touch menu 2900 may not disappear from the second screen 120, but the luminance (brightness) of the second touch menu 2900 may be decreased. In other words, the luminance of the second touch menu may be decreased if the user releases the touch of the first touch menu 2800.

The luminance (brightness) may be changed depending on whether or not the first touch menu 2800 and the second touch menu 2900 are activated.

For example, as shown in FIG. 73(A), if the second touch menu 2900 is activated in a state of displaying both the first touch menu 2800 and the second touch menu 2900, the luminance of the second touch menu 2900 may be higher than that of the first touch menu 2800. For example, this may correspond to the case in which the second touch menu 2900 may be activated by selecting the first touch menu 2800. For example, this may correspond to the case in which the transparent display apparatus enters the volume setting mode in FIG. 69.

Alternatively, as shown in FIG. 73(B), if the second touch menu 2900 is not activated in a state of displaying both the first touch menu 2800 and the second touch menu 2900, the luminance of the first touch menu 2800 may be higher than that of the second touch menu 2900. For example, this may correspond to the case in which the transparent display apparatus does not enter the volume setting mode in FIG. 69.

If the display position of the first touch menu 2800 is changed, the display position of the second touch menu 2900 may be changed.

Figure 74:
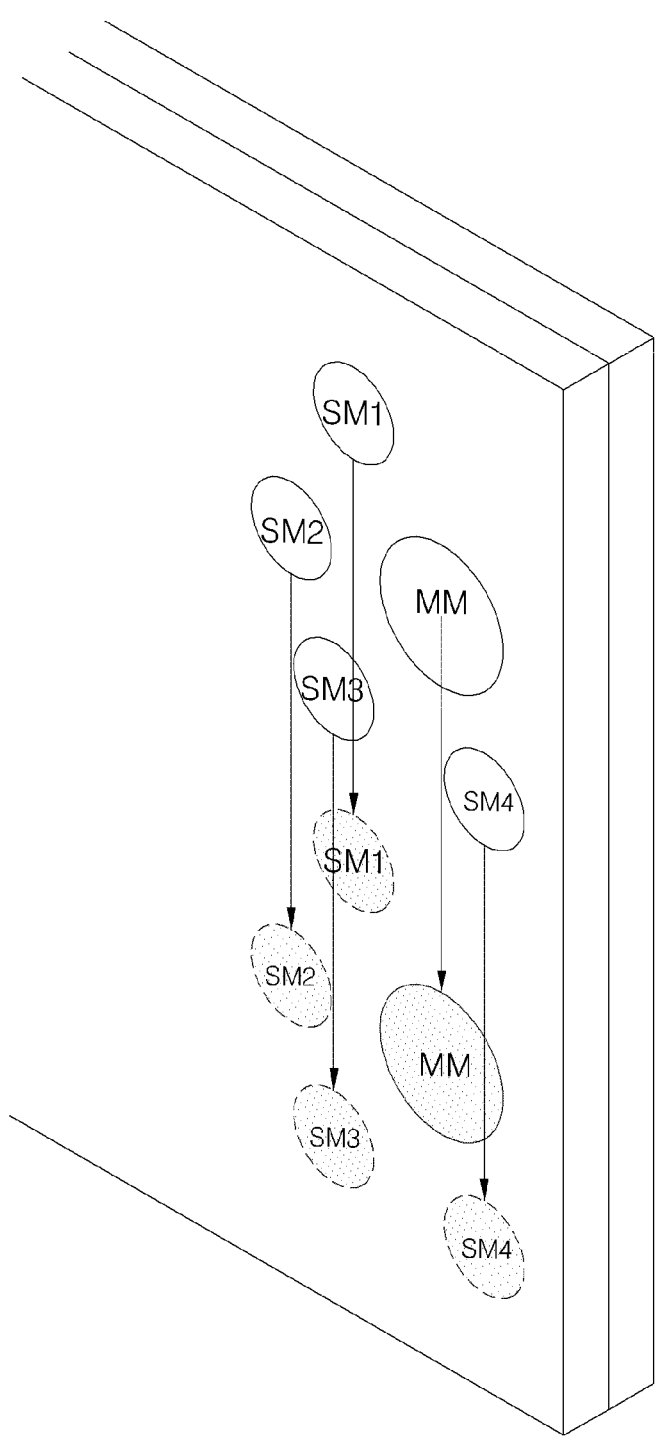

For example, as shown in FIG. 74, if the first touch menu (main menu) MM is moved downward on the first screen 110, the second touch menu (Sub Menu1 to Sub Menu4) SM1 to SM4 may be moved downward on the first screen 110. This enables the user to readily touch the first touch menu (main menu) MM and the second touch menu (Sub Menu1 to Sub Menu4) SM1 to SM4 with one hand.

Figure 75:
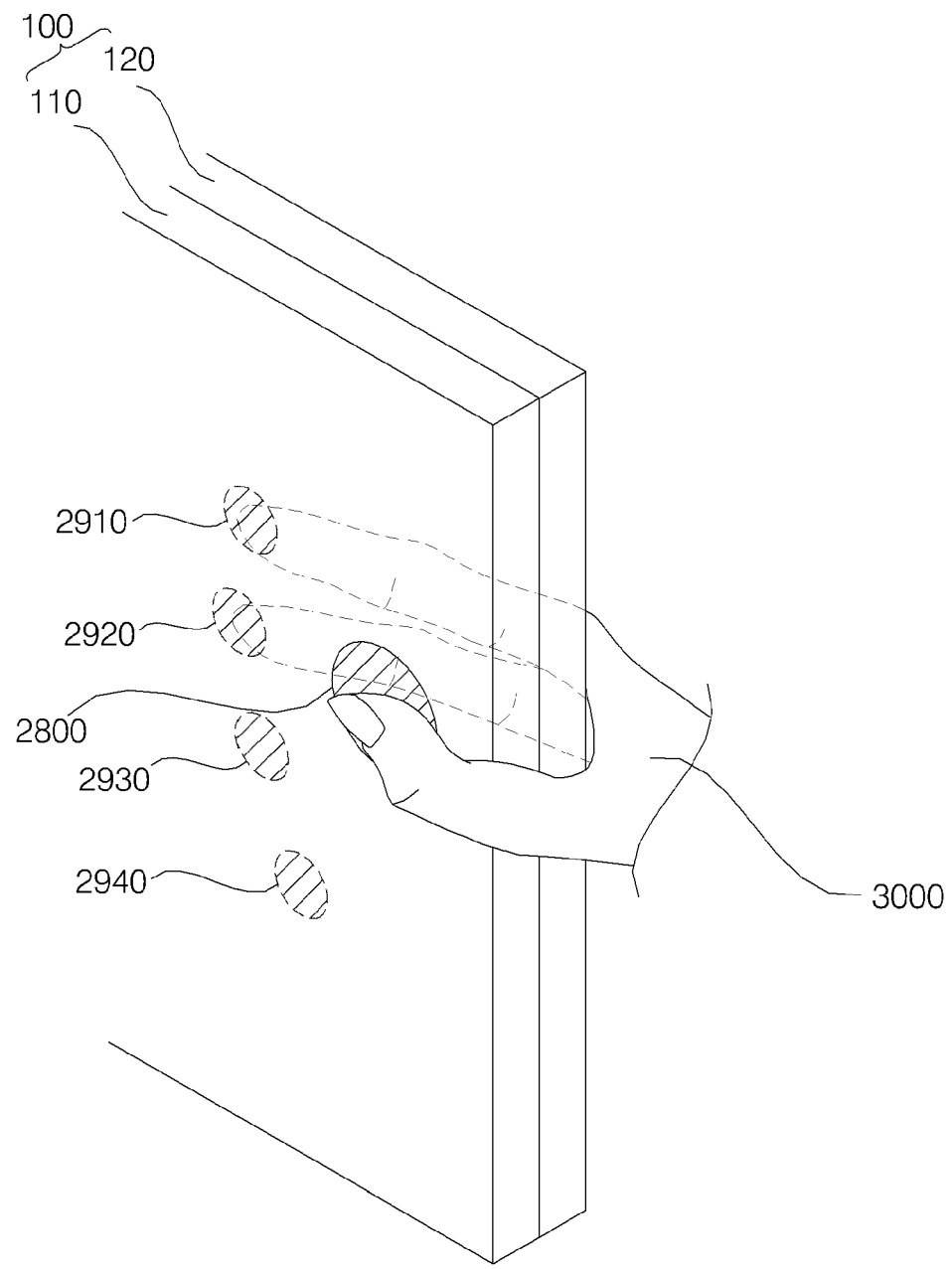
Figure 76:
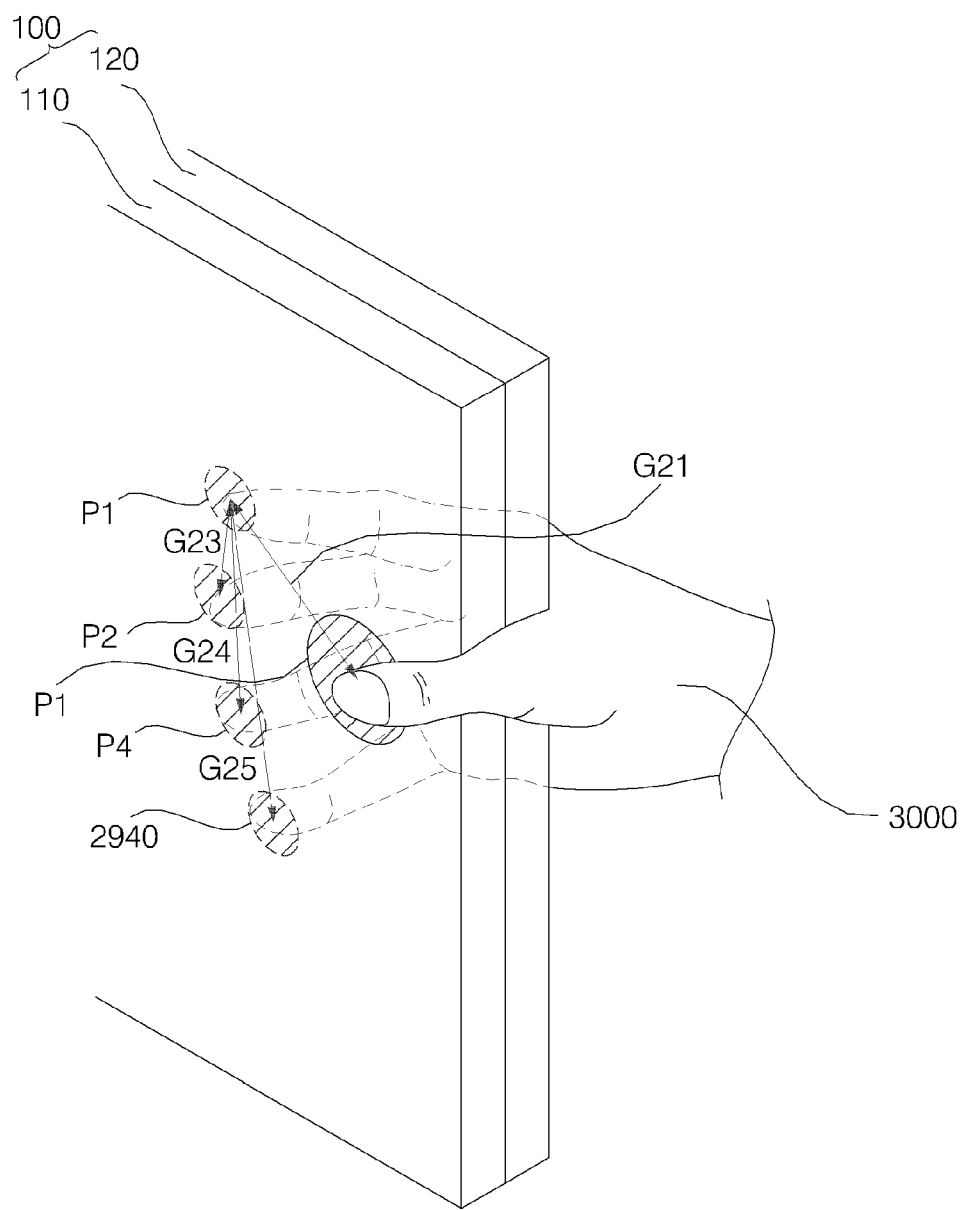

The second touch input may be multi-touch input of touching a plurality of points of the second surface and the step S6050 of performing the operation may perform the operation based on the positions of the touched points. FIGS. 75 and 76 are diagrams referred to for describing the case in which the second touch input is multi-touch input of touching a plurality of points of the second surface.

FIG. 75 shows an example in which a user touches a first menu 2800 through the first surface and touches two second menus 2910 and 2920 through the first surface in a state in which the first menu 2800 and the second menus 2910, 2920, 2930 and 2940 are displayed. The transparent display apparatus may perform an operation corresponding to a combination of a plurality of touched menus 2800, 2910 and 2920 or positions (areas).

Even when a user operates the transparent display apparatus using one hand, the first menu 2800 may be touched using a first finger and a maximum of four menus 2910, 2920, 2930 and 2940 may be simultaneously touched using the remaining fingers.

Thus, the user can perform multi-touch input including a large number of cases or can enter various commands.

In addition, according to the present invention, since touch input through the first surface and touch input through the second surface can be separately processed, various touch input combinations are possible.

According to the present invention, the step S6050 of performing the operation may perform the operation based on the positions of the touched points and the gap between the touched points. That is, the operation may be performed not only according to the positions of the touched points but also according to the gap between the touched points.

For example, in volume control, the volume may be increased if the gap between the touched points is large and may be decreased if the gap between the touched points is small.

Alternatively, as shown in FIG. 76, if a gap between fingers in a grip state of a specific user is set in advance, the gap between the touched points and/or the touch input order may be applied to touch input functions.

FIG. 76 shows gaps G21 to G25 between touch input positions P1 to P5 of five fingers in a grip state and a touch input position of an index finger. The gap between the touch input positions may be measured based on the touch input positions P1 to P5 of five fingers.

A side surface of the transparent display panel may be divided into a plurality of areas and the plurality of areas may correspond to different menus or functions.

In this case, the method for operating the transparent display apparatus according to the embodiment of the present invention may further include displaying objects corresponding to the menus or functions corresponding to the plurality of areas.

In addition, the method for operating the transparent display apparatus according to the embodiment of the present invention may further include receiving third touch input of touching a side surface of the transparent display panel. The step S6050 of performing the operation may perform an operation corresponding to a combination of the first to third touch input.

The method for operating the transparent display apparatus using side surface touch will be described in detail below with reference to FIGS. 111 to 123.

In a grip mode in which the user uses the transparent display apparatus according to the present invention in a state of gripping the transparent display apparatus with the user's hand, the first touch menu 2800 may be displayed on the first screen 110 and the second touch menu 2900 may be displayed on the second screen 120.

Figure 77:
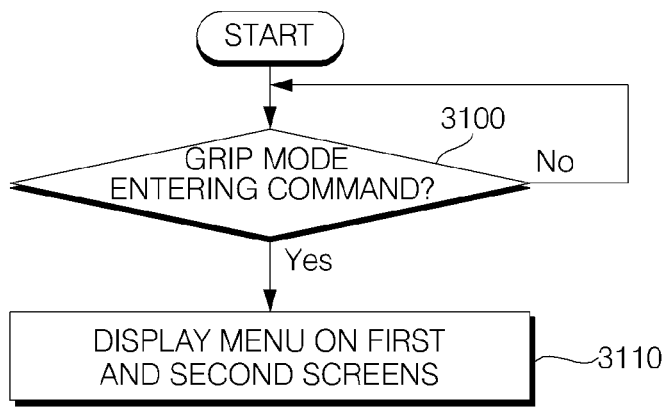

For example, as shown in FIG. 77, a determination as to whether a grip mode entering command is input may be made (3100) and, if it is determined that the grip mode entering command is input, the first touch menu 2800 may be displayed on the first screen 110 and the second touch menu 2900 may be displayed on the second screen 120.

The grip mode entering command may be input when the user presses a predetermined input key or when the user grips a predetermined grip area with the user's hand.

In a supporting mode, for example, in a mode in which the transparent display panel 100 is supported by a supporter, since the user does not grip the transparent display apparatus according to the present invention, the first touch menu 2800 and the second touch menu 2900 may not be displayed.

FIGS. 78 to 92C are diagrams illustrating a supporting mode. Hereinafter, a description of the above-described portions will be omitted.

Figure 78:
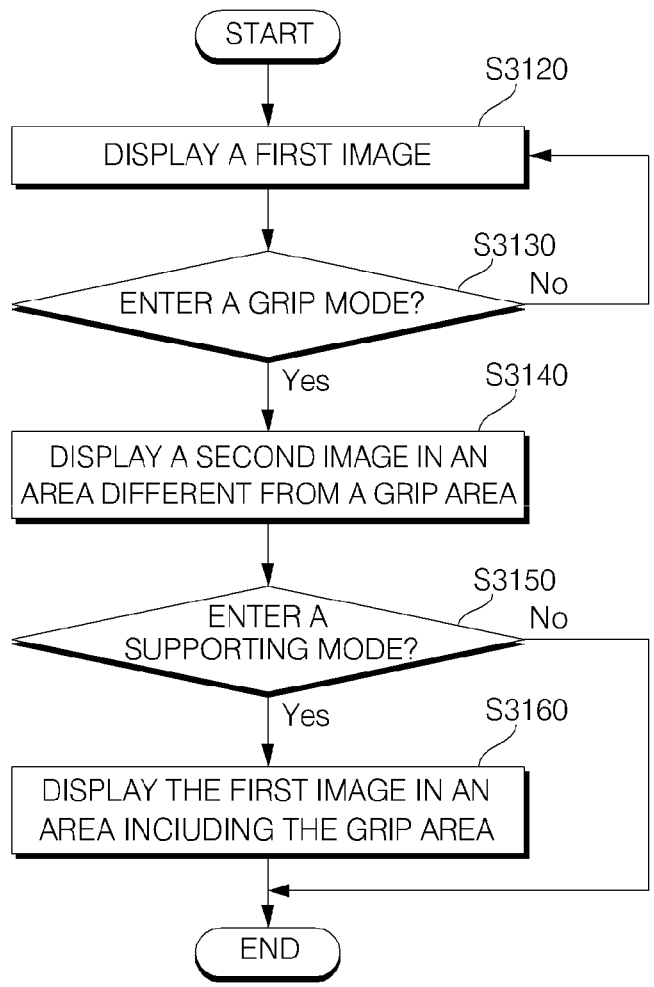
FIGS. 78 to 92 are diagrams illustrating a supporting mode.

FIG. 78 is a flowchart illustrating a method for operating a transparent image display apparatus in an grip mode and a supporting mode according to an embodiment of the present invention, and FIGS. 79 to 92 are diagrams referred to for describing various examples of the method for operating the transparent image display apparatus in the grip mode and the supporting mode along with a screen displayed on a transparent image display panel.

Referring to FIG. 78, the drive unit 101Q displays a first image 3410 on the transparent display panel 100 (S3120) and determines whether a grip mode entering command has been received (S3130). The determination as to whether the grip mode entering command has been received may be made by determining whether a grip input for the transparent display panel 100 has been received. The determination as to whether the grip input has been received may be made by determining whether a plurality of touch inputs (multiple touch inputs) for the transparent display panel 100 has been simultaneously received, determining whether the transparent display panel 100 has been moved, or determining whether a double-sided touch input for a first screen area and a second screen area of the transparent display panel 100 has been received.

For example, if a user grips the transparent display panel 100, the user can grip the transparent display panel 100 by touching the first screen area and the second screen area with a plurality of fingers. Thus, if a plurality of touch inputs and a double-sided touch input is detected, it may be determined that the grip mode entering command has been received. In addition, if the transparent display panel 100 is gripped, a user's hand contacts or approaches side surfaces of the transparent display panel 100. Thus, if it is detected that the user's hand contacts or approaches the side surfaces of the transparent display panel 100, it may be determined that the grip mode entering command has been received.

Since the transparent display panel 100 is mostly moved in a state of being gripped, it may be determined that the grip mode entering command has been received if movement of the transparent display panel 100 has been detected using an acceleration sensor or a gyroscopic sensor.

If it is determined that the grip mode entering command has been received, the drive unit 101Q may display a second image 3420 in an area different from a grip area on the transparent display panel 100 (S3140). Since the second image 3420 is displayed in the area different from the grip area, the size of the second image 3420 may be less than that of the first image 3410 and at least one of the position and the size of the second image 3420 may be changed according to the position and the size of the grip area. The drive unit 101Q may display the second image 3420 which is different from the grip area in terms of at least one of transparency, color, luminance and resolution. In addition, touch input may be deactivated in the grip area or a predetermined touch menu may be displayed in the grip area.

Referring to FIG. 78 again, the drive unit 101Q determines whether a supporting mode entering command has been received (S3150). The determination as to whether the supporting mode entering command has been received may be made by determining whether the transparent display panel 100 has been connected to a supporter 3200, determining whether the transparent display panel 100 has been moved for a predetermined time or determining whether touch input has been received.

For example, if the transparent display panel 100 has been connected to the supporter 3200, if the transparent display panel 100 has not been moved for a predetermined time, or if touch input for the transparent display panel 100 has not been received, it may be determined that the supporting mode entering command has been received.

If it is determined that the supporting mode entering command has been received, the drive unit 101Q may display the first image 3410 in the entire area including the grip area on the transparent display panel 100 (S3160). At this time, the drive unit 101Q may display the first image 3410 on the entire screen of the transparent display panel 100 or display the first image 3410 in the area except for a part concealed by the supporter 3200.

Figure 79:
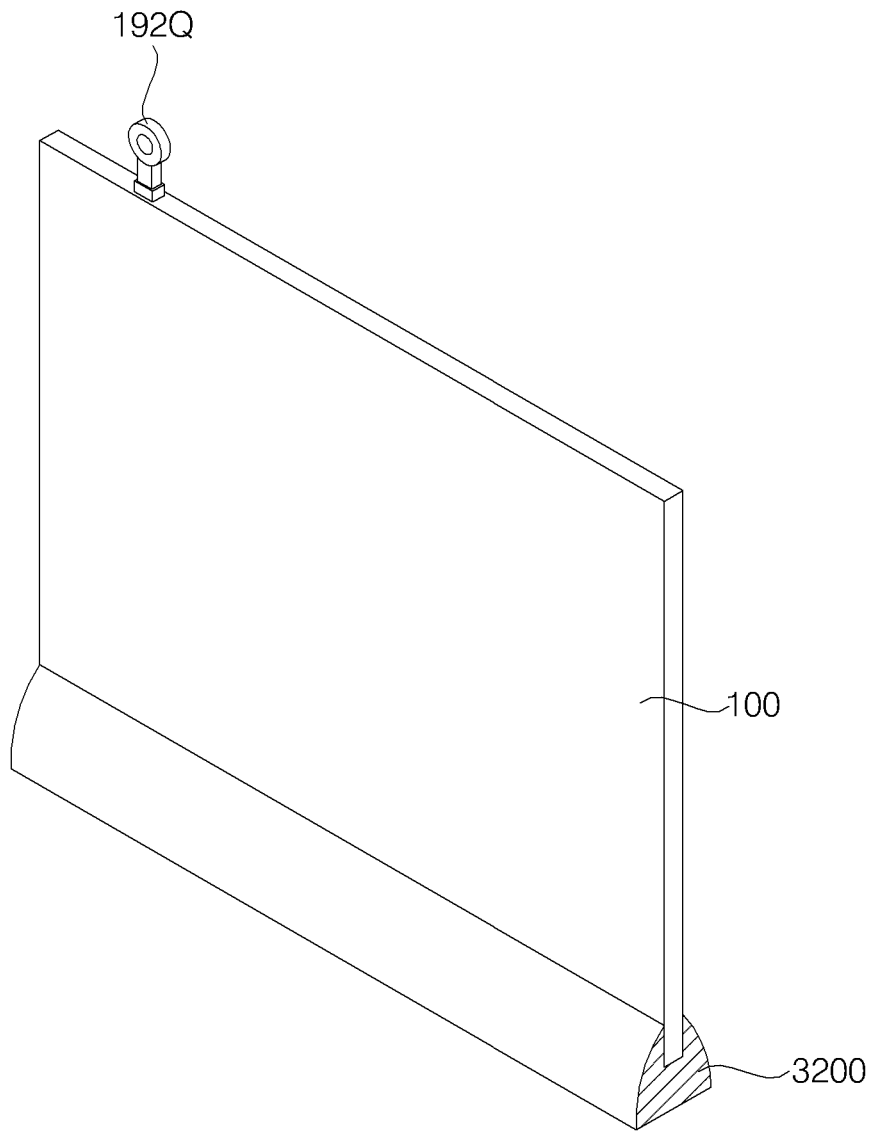
Figure 80:
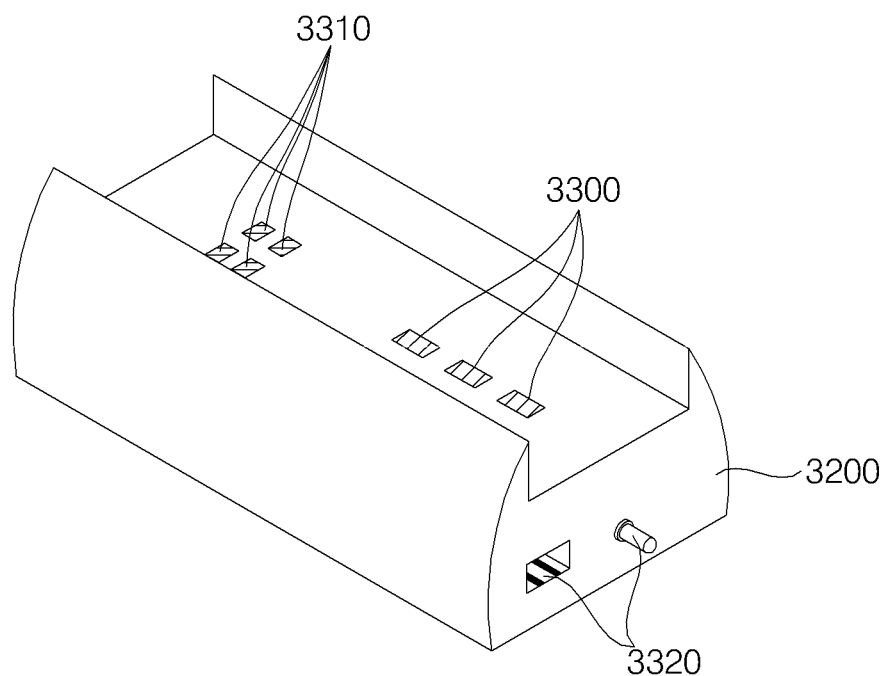
Figure 81:
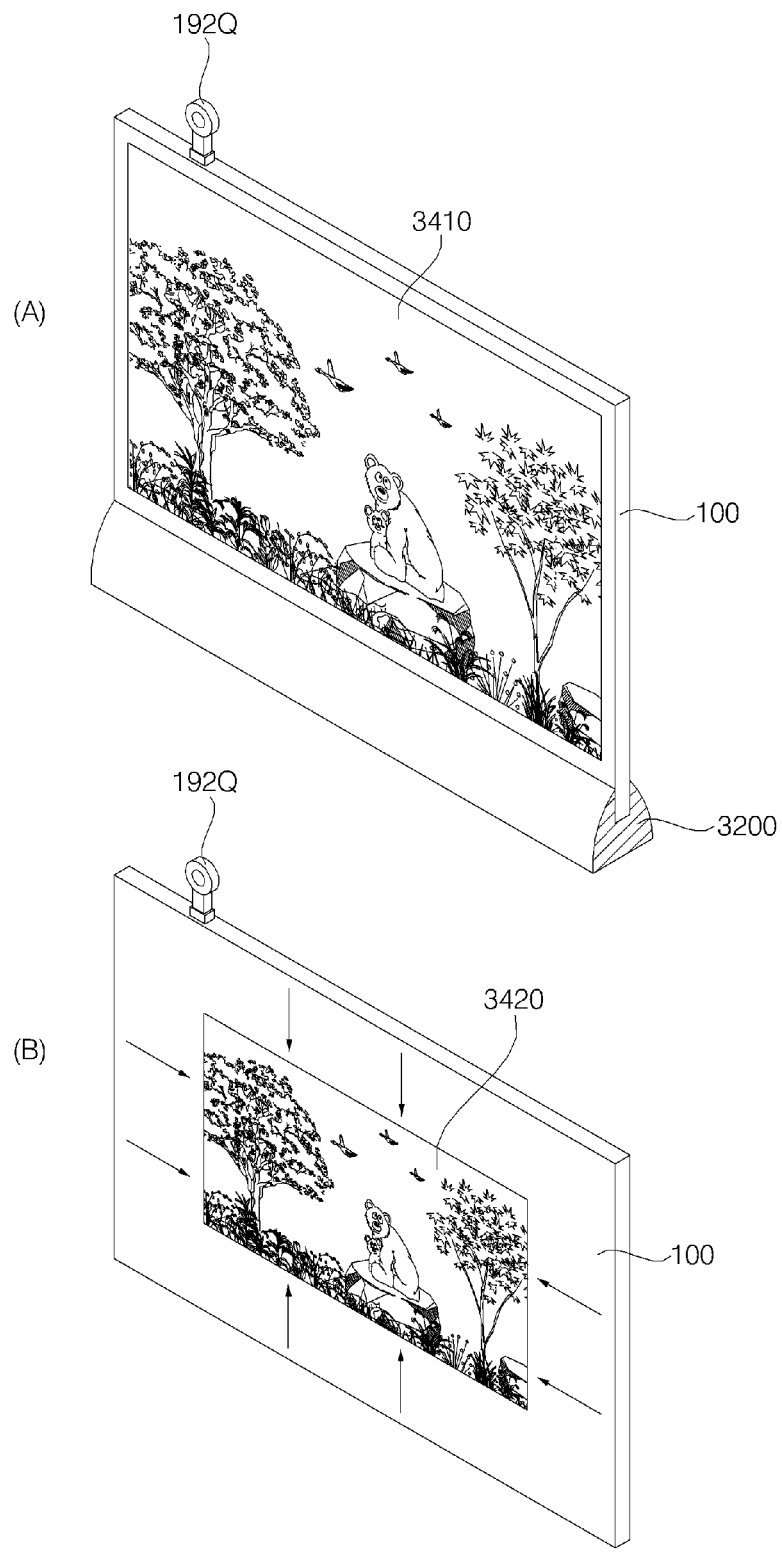
Figure 82:
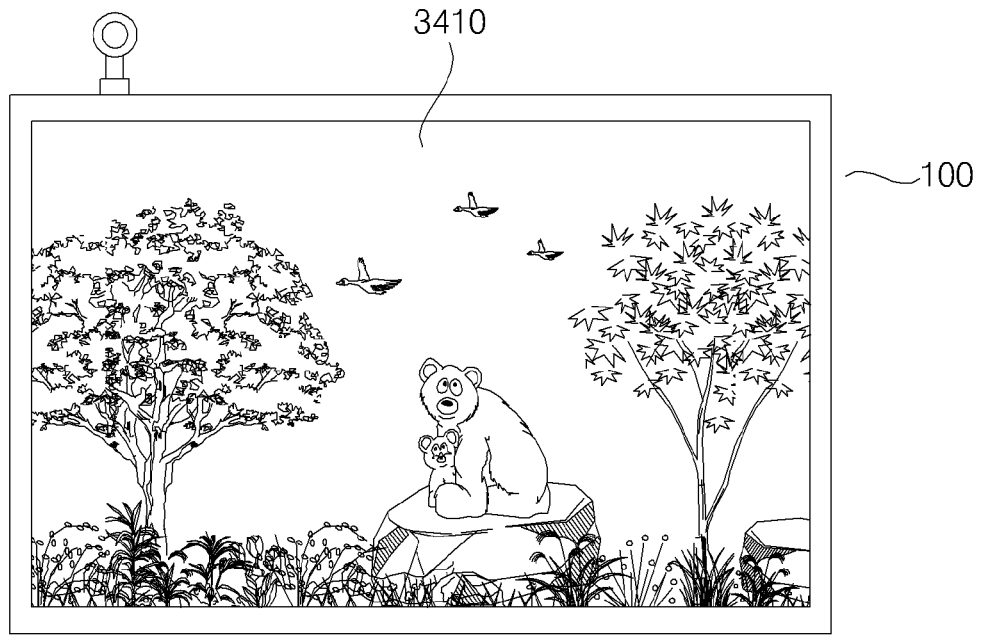

The transparent display panel 100 may be supported by the supporter 3200 in a supporting mode as shown in FIG. 79. Referring to FIG. 80, the supporter 3200 may support the transparent display panel 100. The supporter 3200 may include a power supply terminal 3300 for supplying power to the transparent display panel 100. The transparent display panel 100 can be charged through the power supply terminal 3300. Alternatively, the supporter 3200 may include an interface 3310 for connecting the transparent display panel 100 to a network.

Alternatively, the supporter 3200 may include an interface 3320 for connecting the transparent display panel 100 to a peripheral device.

If the transparent display panel 100 is supported by the supporter 3200, the drive unit 101Q can detect that the transparent display panel 100 is supported by the supporter 3200 through a sensor or a connection terminal.

Settings may be changed according to a first case in which the transparent display panel 100 is supported by the panel supporter 3200 and a second case in which the transparent display panel 100 is separated from the supporter 3200.

For example, the volume may be controlled according to the first case in which the transparent display panel 100 is supported by the panel supporter 3200 and the second case in which the transparent display panel 100 is separated from the supporter 3200. That is, the volume may be changed depending on whether the transparent display panel 100 is separated from the panel supporter 3200 or whether the transparent display panel 100 is supported by the supporter 3200.

Luminance, image mode, screen size, resolution, aspect ratio, etc., may be changed according to the first case and the second case.

For example, the size of the first image 3410 displayed on the transparent display panel 100 in the first case in which the transparent display panel 100 is supported by the panel supporter 3200, that is, the supporting mode, as shown in FIG. 81(A) may be greater than the size of the second image 3420 displayed on the transparent display panel 100 in the second case in which the transparent display panel 100 is separated from the panel supporter 3200 as shown in FIG. 81(B). In addition, in the supporting mode, the first image 3410 may be displayed on the entire screen of the transparent display panel 100 or may be displayed on the area except for the part concealed by the supporter 3200.

In other words, if the transparent display panel 100 is changed from the state of being separated from the supporter 3200 to the state of being supported by the supporter 3200, the size of the image displayed on the transparent display panel 100 may be increased.

On the contrary, if the transparent display panel 100 is changed from the state of being supported by the supporter 3200 to the state of being separated from the supporter 3200, the size of the image displayed on the transparent display panel 100 may be decreased.

Figure 84:
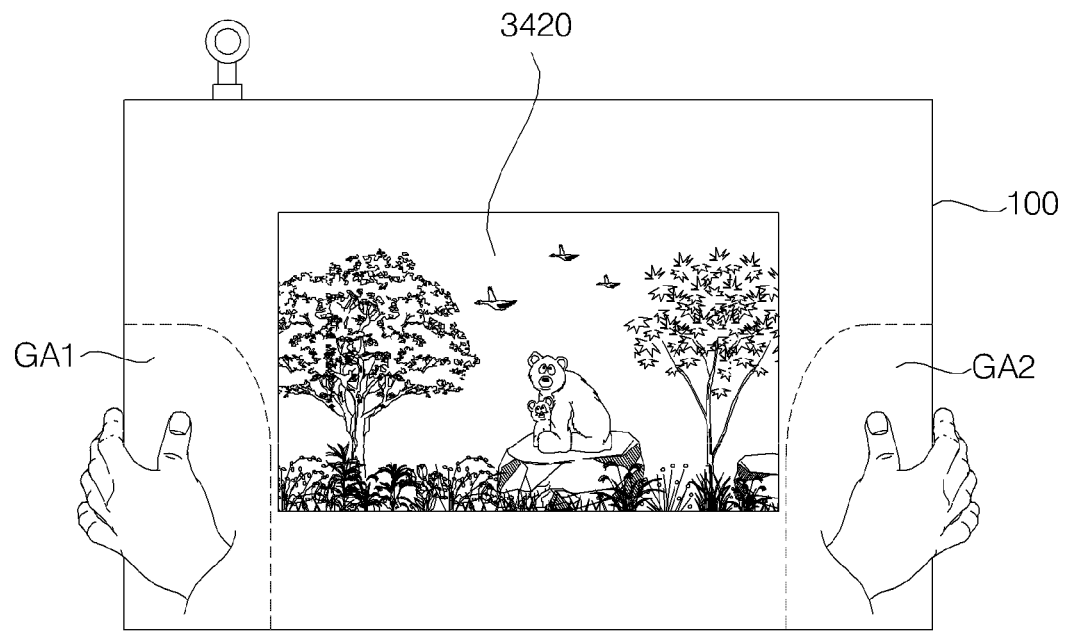

In a state in which the transparent display panel 100 is supported by the supporter 3200, the user may view the image displayed on the screen of the transparent display panel 100 at a position separated from the transparent display panel 100 by a predetermined distance. In contrast, as shown in FIG. 84 or 75D, if the user grips the transparent display panel 100, a probability that the transparent display panel 100 is separated from the supporter 3200 is high.

In addition, if the user grips the transparent display panel 100, the screen of the transparent display panel 100 may be concealed by the user's hands.

Accordingly, the size of the area displaying the image may be reduced in consideration of parts concealed by the user's hands in a state in which the transparent display panel 100 is separated from the supporter 3200. Accordingly, the size of the second image 3400 displayed on the transparent display panel 100 may be less than that of the first image 3410, which will be described in detail below.

Referring to FIGS. 81(A) and 81(B), the resolution of the first image 3410 displayed on the transparent display panel 100 in the first case in which the transparent display panel 100 is supported by the supporter 3200 as shown in FIG. 81(A) may be higher than that of the second image 3420 displayed on the transparent display panel 100 in the second case in which the transparent display panel 100 is separated from the supporter 3200 as shown in FIG. 81(B).

In addition, the luminance (brightness) of the first image 3410 displayed on the transparent display panel 100 in the first case in which the transparent display panel 100 is supported by the supporter 3200 as shown in FIG. 81(A) may be different from that of the second image 3420 displayed on the transparent display panel 100 in the second case in which the transparent display panel 100 is separated from the supporter 3200 as shown in FIG. 81(B).

For example, it is assumed that a user views the image displayed on the transparent display panel 100 while moving.

In this case, since the user views the image displayed on the transparent display panel 100 while moving, the user's ability to concentrate on the image may be decreased.

In consideration of this, the luminance (brightness) of the first image 3410 displayed on the transparent display panel 100 in the first case in which the transparent display panel 100 is supported by the panel supporter 3200 as shown in FIG. 81(A) may be higher than that of the second image 3420 displayed on the transparent display panel 100 in the second case in which the transparent display panel 100 is separated from the panel supporter 3200 as shown in FIG. 81(B).

Figure 83:
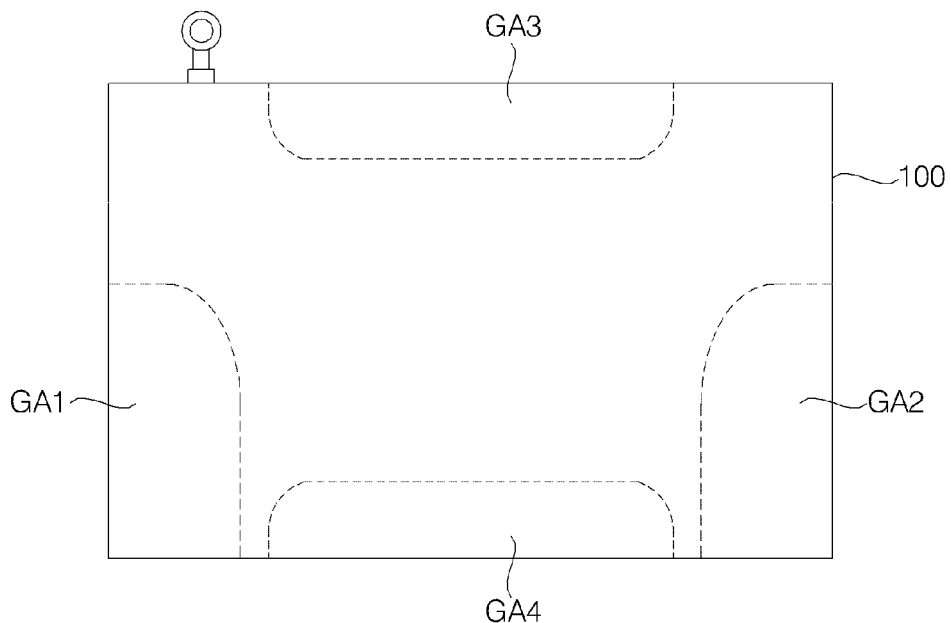

Referring to FIGS. 82 to 75D again, in a state in which the first image 3410 is displayed on the transparent display panel 100 as shown in FIG. 82, it may be detected whether grip input for the transparent display panel 100 has been received. As shown in FIG. 83, the transparent display panel 100 may include grip areas GA1, GA2, GA3 and GA4 for detecting the grip input. The grip areas GA1, GA2, GA3 and GA4 may be set as areas gripped by the user. The grip areas GA1, GA2, GA3 and GA4 may be fixed or set by the user. A plurality of grip areas may be set in some areas of an edge or one grip area may be set throughout the entire edge.

If it is detected that the grip areas GA1 and GA2 are gripped by the user as shown in FIG. 84, the drive unit 101Q may display the second image 3420 on the transparent display panel 100. The second image 3420 may be displayed in the area except for the grip areas GA1, GA2, GA3 and GA4. At this time, if only the grip areas GA1 and GA2 are gripped, the second image 3420 may be displayed in the area except for all the grip areas GA1, GA2, GA3 and GA4. At this time, the area in which the second image 3420 is displayed and the grip areas GA1, GA2, GA3 and GA4 may be different from each other in terms of at least one of transparency, color, luminance and resolution.

Figure 85:
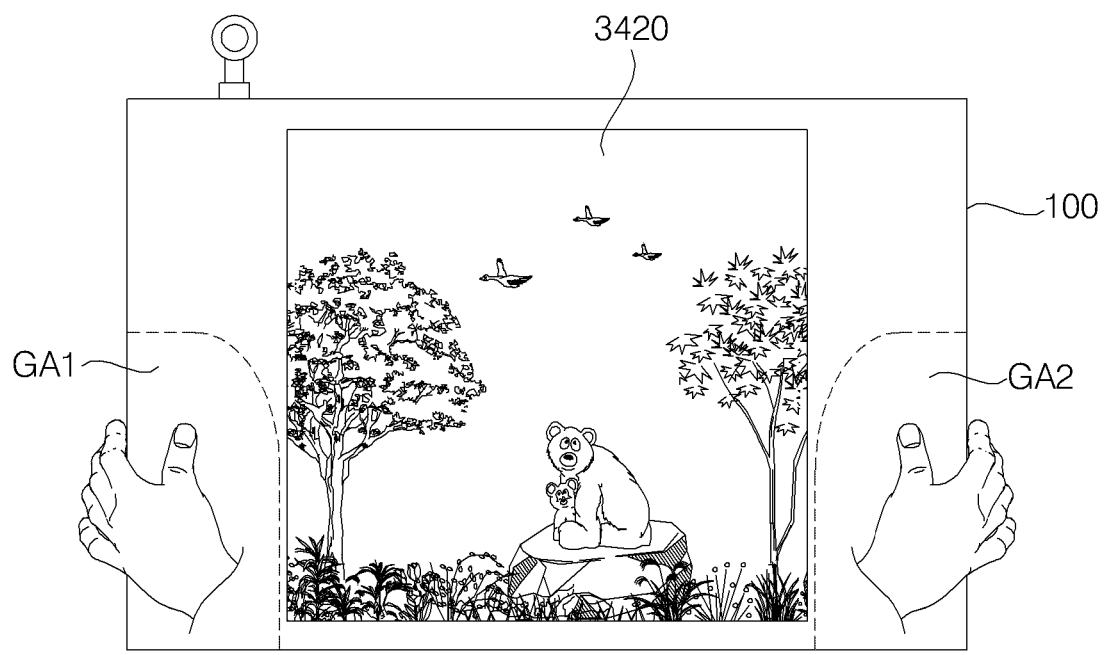

In contrast, referring to FIG. 85, if some areas GA1 and GA2 of a plurality of grip areas are gripped, the second image 3420 may be displayed in an area different from the grip areas GA1 and GA2. Accordingly, the second image 3420 may be displayed in the grip areas GA3 and GA4 which are not gripped by the user. Accordingly, the aspect ratio of the second image 3420 may be changed according to which grip areas are gripped by the user.

Figure 86:
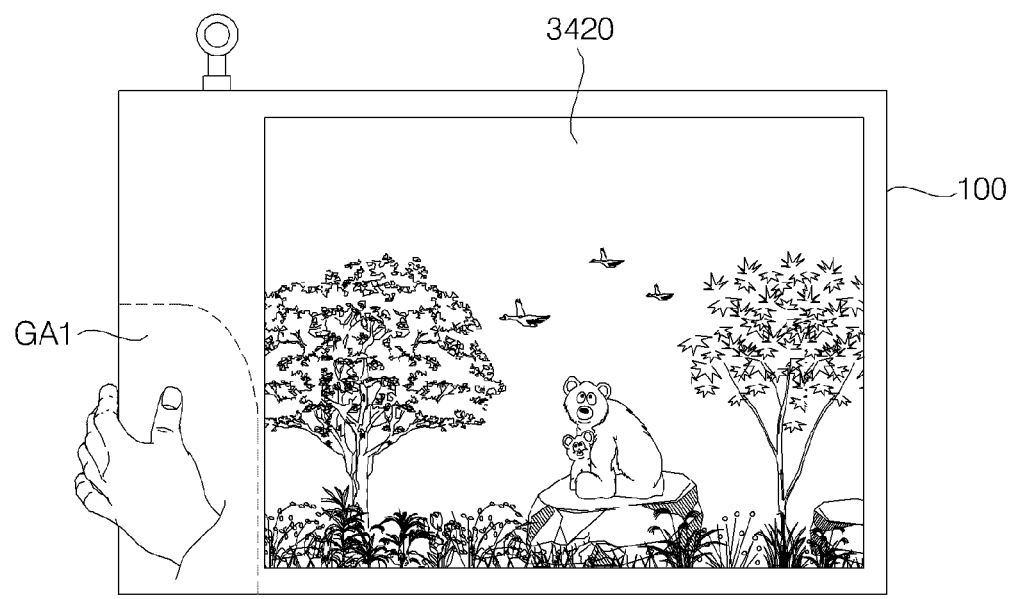

For example, as shown in FIG. 86, if only the first grip area GA1 is gripped, the second image 3420 having an aspect ratio of 16:9 may be displayed in the area except for the first grip area GAL. As shown in FIG. 85, if the first grip area GA1 and the second grip area are gripped, the second image 3420 having an aspect ratio of 4:3 may be displayed in the area except for the first grip area GA1 and the second grip area GA2.

Figure 87:
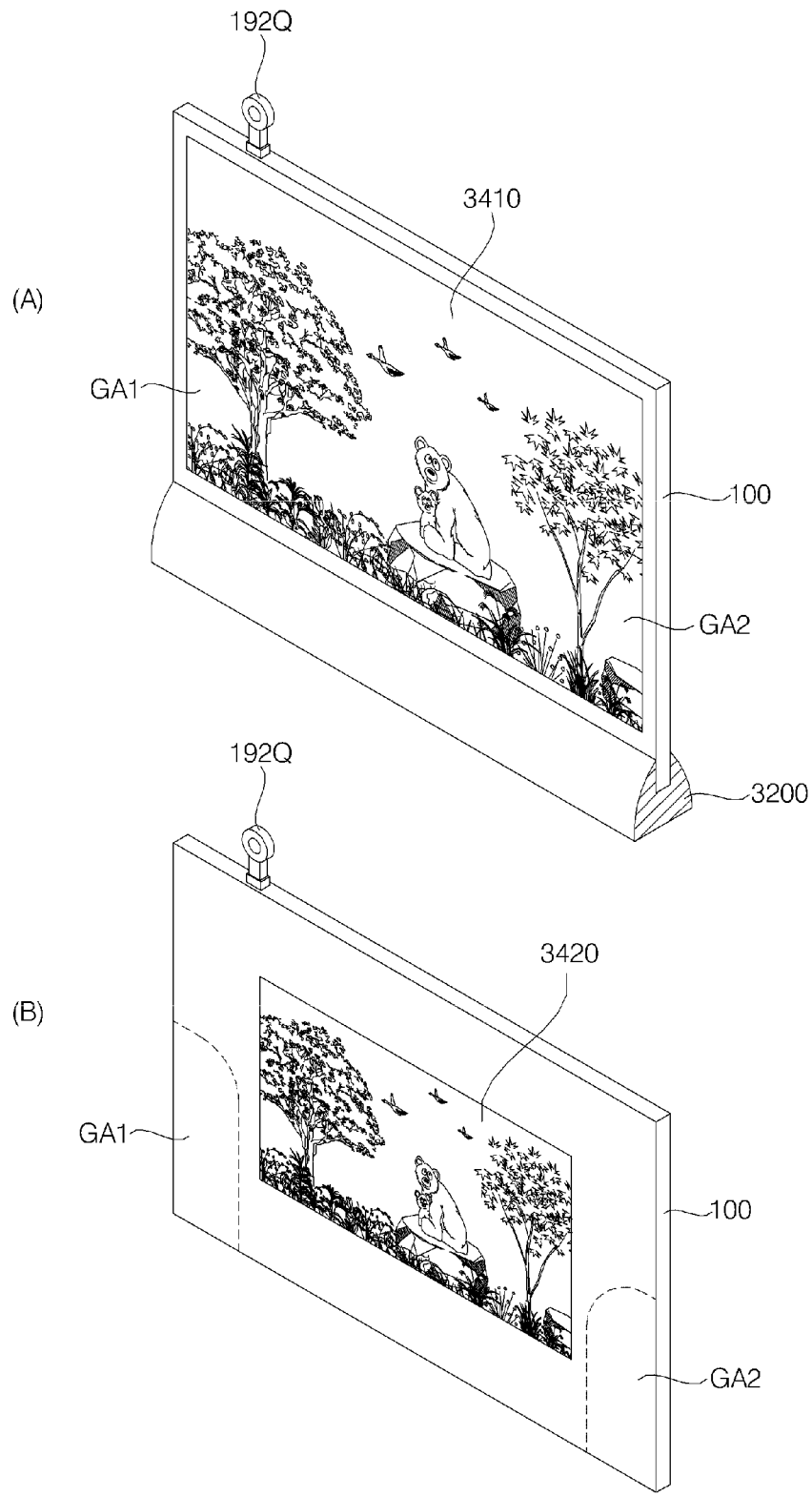
Figure 88:
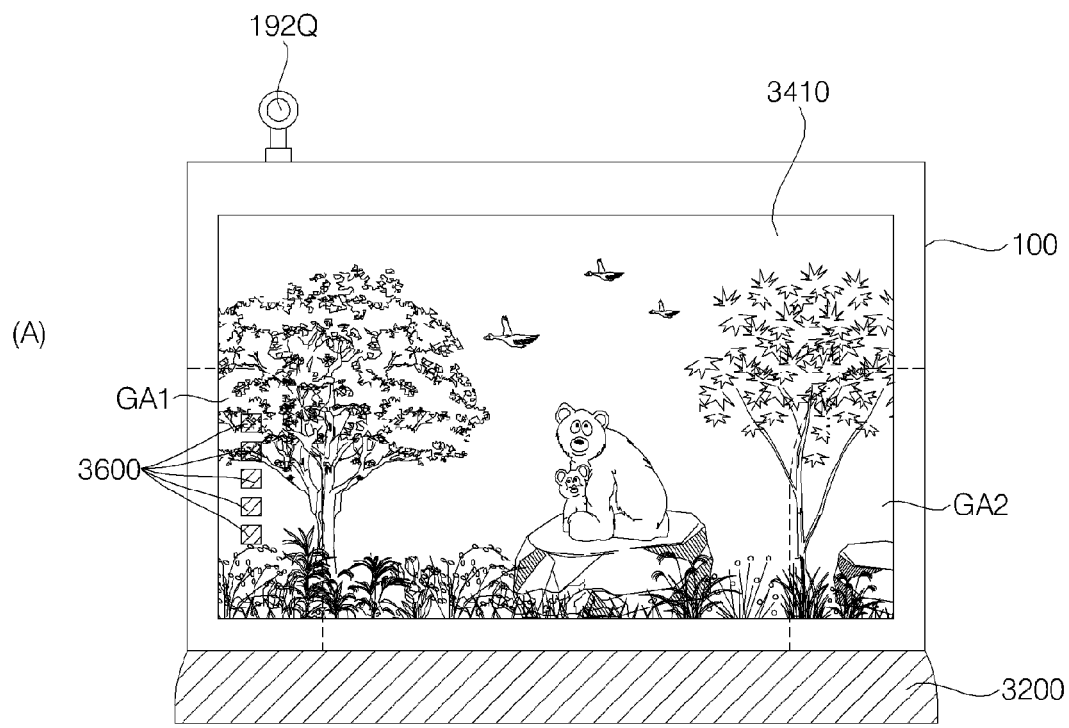
Figure 88:
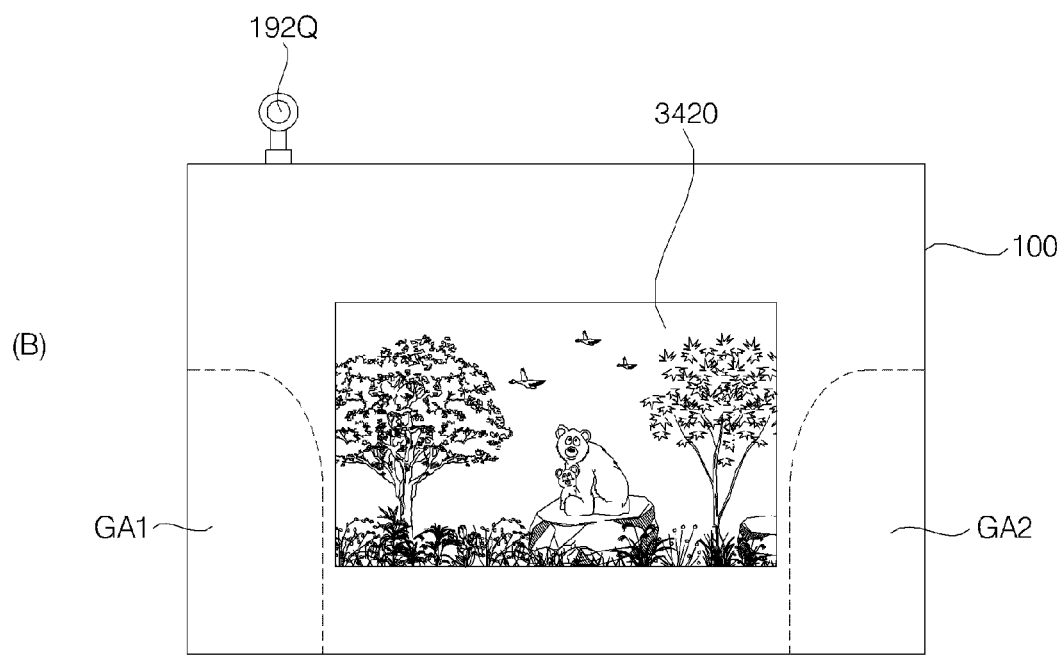

Referring to FIG. 87, in a state in which the transparent display panel 100 is supported by the supporter 3200 as shown in FIG. 87(A), the first image 3410 may be displayed on the transparent display panel 100, and the first image 3410 may be displayed throughout the entire screen of the transparent display panel 100 including the predetermined grip areas GA1 and GA2. At this time, the part concealed by the supporter 3200 may be detected and the first image may be displayed in the area except for the part concealed by the supporter 3200.

In contrast, in a state in which the transparent display panel 100 is separated from the supporter 3200 as shown in FIG. 87(B), the image may not be displayed in the grip areas GA1 and GA2 of the transparent display panel 100.

In a state in which the transparent display panel 100 is supported by the supporter 3200 as shown in FIG. 88(A), a touch function may be activated in the grip areas GA1 and GA2. For example, at least one touch menu 3600 may be displayed in the first grip area GA1, and various menus may be executed through touch input.

In contrast, in a state in which the transparent display panel 100 is separated from the supporter 3200 as shown in FIG. 88(B), a touch function may be deactivated in the grip areas GA1 and GA2. For example, the touch menu 3600 displayed in the first grip area GA1 may disappear or the touch menu 3600 may be deactivated.

In addition, if the user grips the transparent display panel 100, a touch function may be deactivated in a grip area in which grip input is detected.

Figure 89:
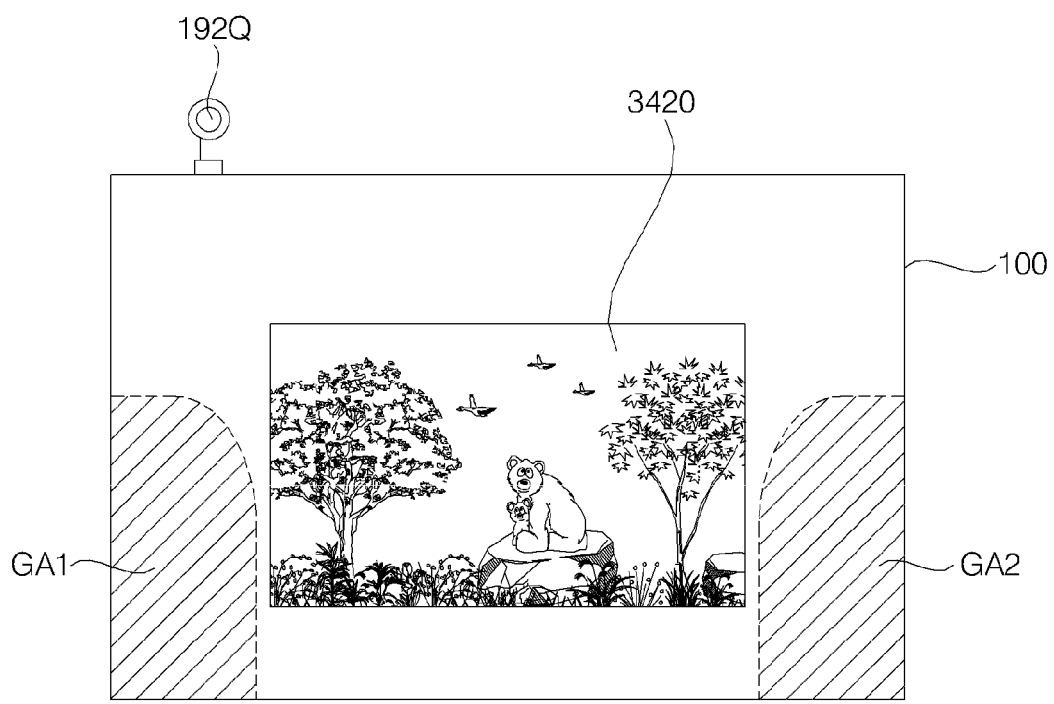

In the state in which the transparent display panel 100 is separated from the supporter 3200 as shown in FIG. 89, transparency of the grip areas GA1 and GA2 may be decreased. In the state in which the transparent display panel 100 is separated from the supporter 3200, since the grip areas GA1 and GA2 are concealed by the user's hands, transparency may be decreased.

Figure 90:
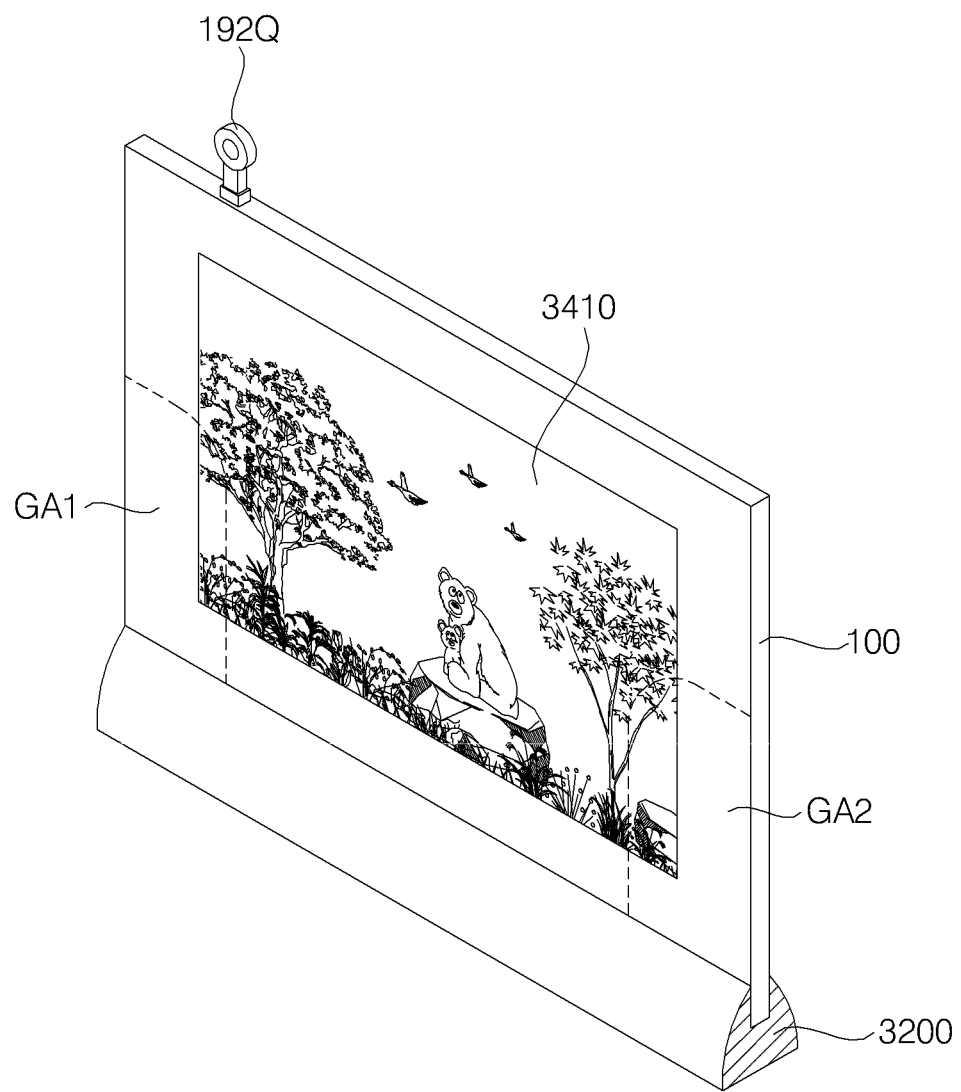
Figure 91:
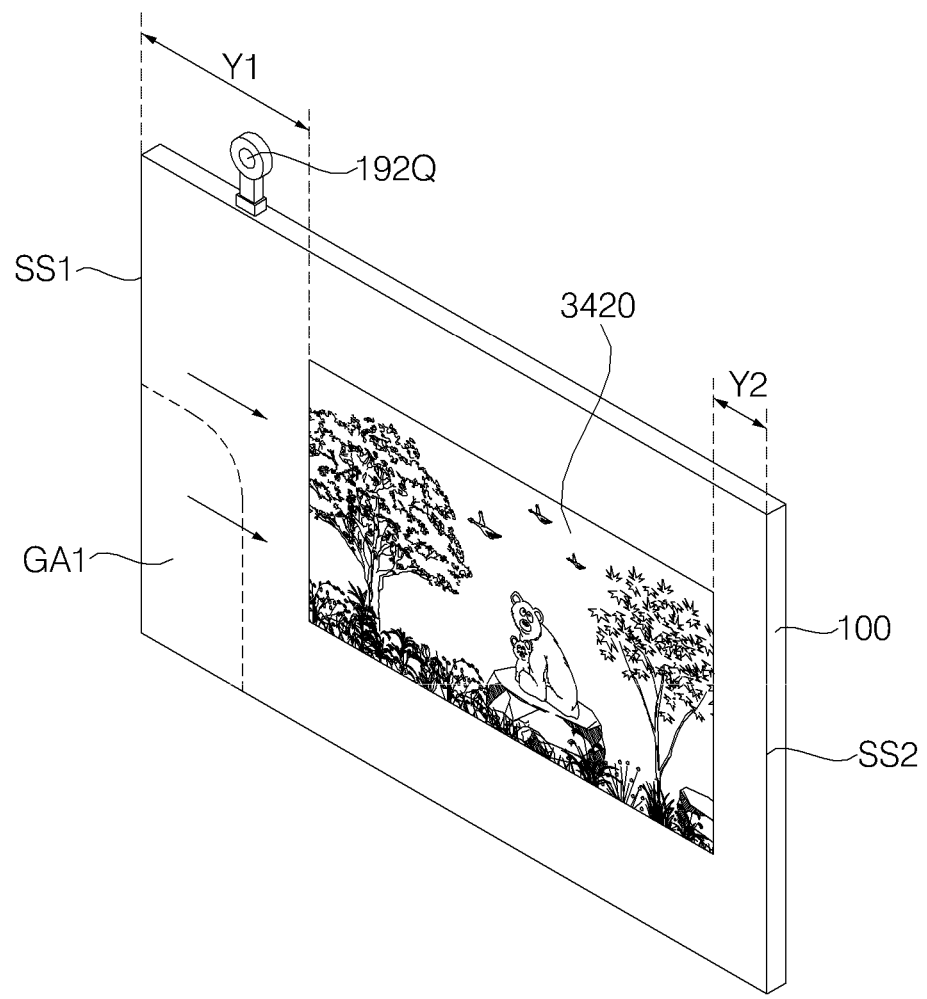

Referring to FIGS. 90 and 91, the position of the image displayed on the transparent display panel 100 may be changed according to the first case in which the transparent display panel 100 is supported by the supporter 3200 and the second case in which the transparent display panel 100 is separated from the supporter 3200 or the grip mode.

For example, if a grip area GA1 may be set at a first short side SS1 of the transparent display panel 100 and a grip area GA2 may not be set at a second short side SS2 corresponding to the first short side SS1 of the transparent display panel 100, in a state in which the transparent display panel 100 is separated from the supporter 3200 as shown in FIG. 91, the image 3400 may move from the first short side SS1 to the second short side SS2 of the transparent display panel 100 in order to prevent the size of the image from being excessively decreased without displaying the second image 3420 in the grip area GA1.

In contrast, if a plurality of grip areas GA1 and GA2 is set in the transparent display panel 100, an image may be moved and displayed according to a grip area in which grip input is detected. For example, if grip input for the grip area GA1 set at the first short side SS1 is detected, the image may be moved from the first short side SS1 to the second short side SS2 to be displayed. In contrast, if grip input for the grip area GA1 set at the second short side SS2 is detected, the image may be moved from the second short side to the first short side SS1 to be displayed.

Accordingly, in the state in which the transparent display panel 100 is separated from the supporter 3200 or in the grip mode for a grip area, the image 3400 displayed on the transparent display panel 100 may be shifted to an area which does not overlap the grip area GA.

Figure 92:
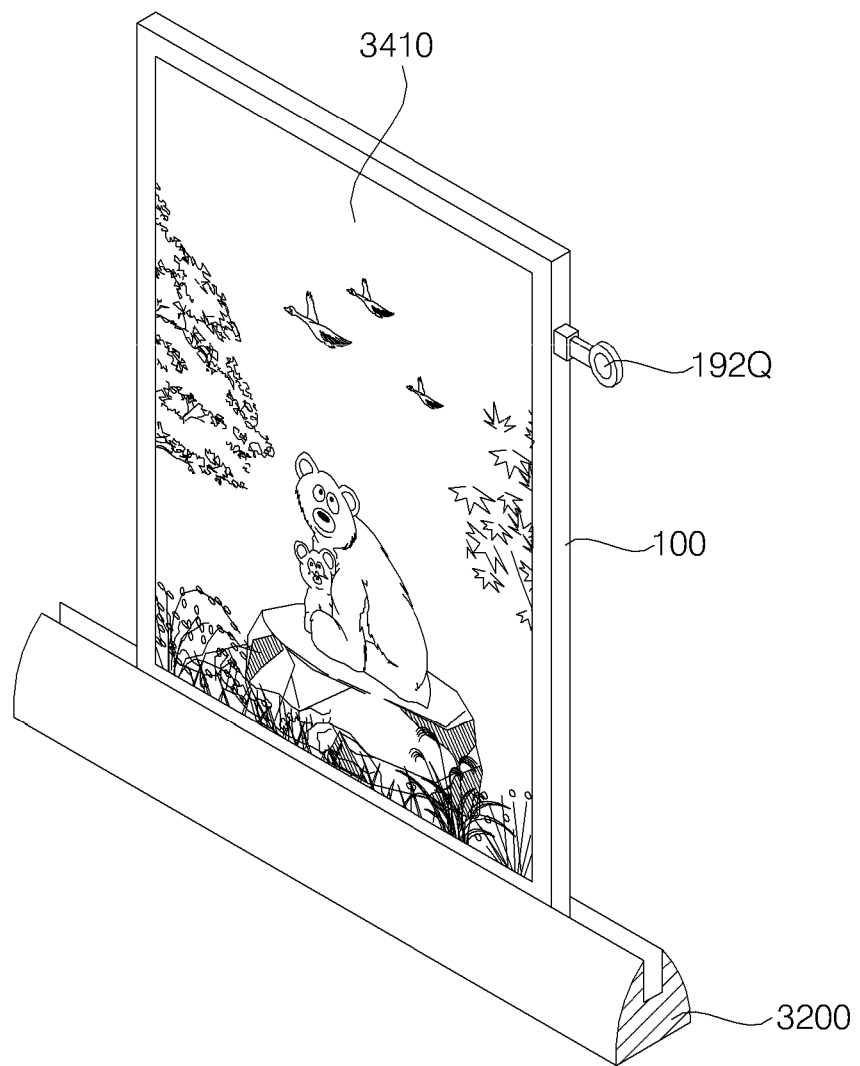

In the state in which the transparent display panel 100 is separated from the supporter 3200 or in the grip mode for a grip area, a distance Y1 between the image 3400 displayed on the transparent display panel 100 and the first short side SS1 of the transparent display panel 100 may be greater than a distance Y2 between the image 3400 displayed on the transparent display panel 100 and the second short side SS2 of the transparent display panel 100. Referring to FIG. 92, if the transparent display panel 100 is rotated and supported by the supporter 3200, an image rotated in the same direction as the transparent display panel 100 may be displayed. For example, as shown in FIG. 92, if the transparent display panel 100 is supported by the supporter 3200 in a state of being rotated by 90 degrees, the first image 3410 displayed on the transparent display panel 100 may be displayed in a state of being rotated by 90 degrees. At this time, the width and the length of the transparent display panel 100 may be different and the aspect ratio of the rotated first image 3410 may be changed.

In addition, although not shown, even when the transparent display panel 100 is separated from the supporter 3200, the second image displayed on the transparent display panel 100 may be displayed in a state of being rotated according to the rotation direction of the transparent display panel 100.

FIGS. 93 to 101 are diagrams illustrating all change methods according to inclination of a transparent display panel. Hereinafter, a description of the above-described portions will be omitted.

Figure 93:
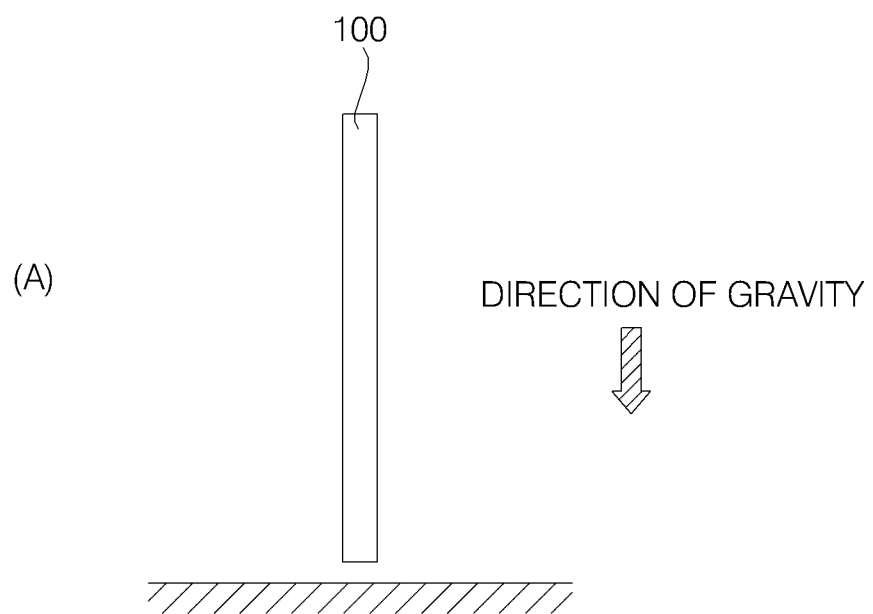
FIGS. 93 to 101 are diagrams illustrating all change methods according to inclination of a transparent display panel.
Figure 93:
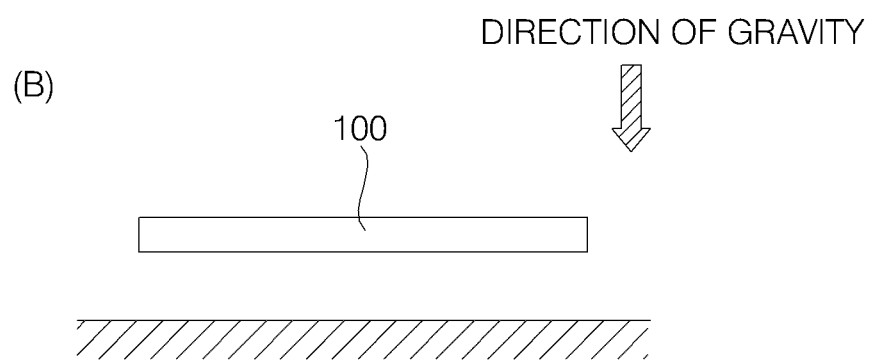
Figure 94:
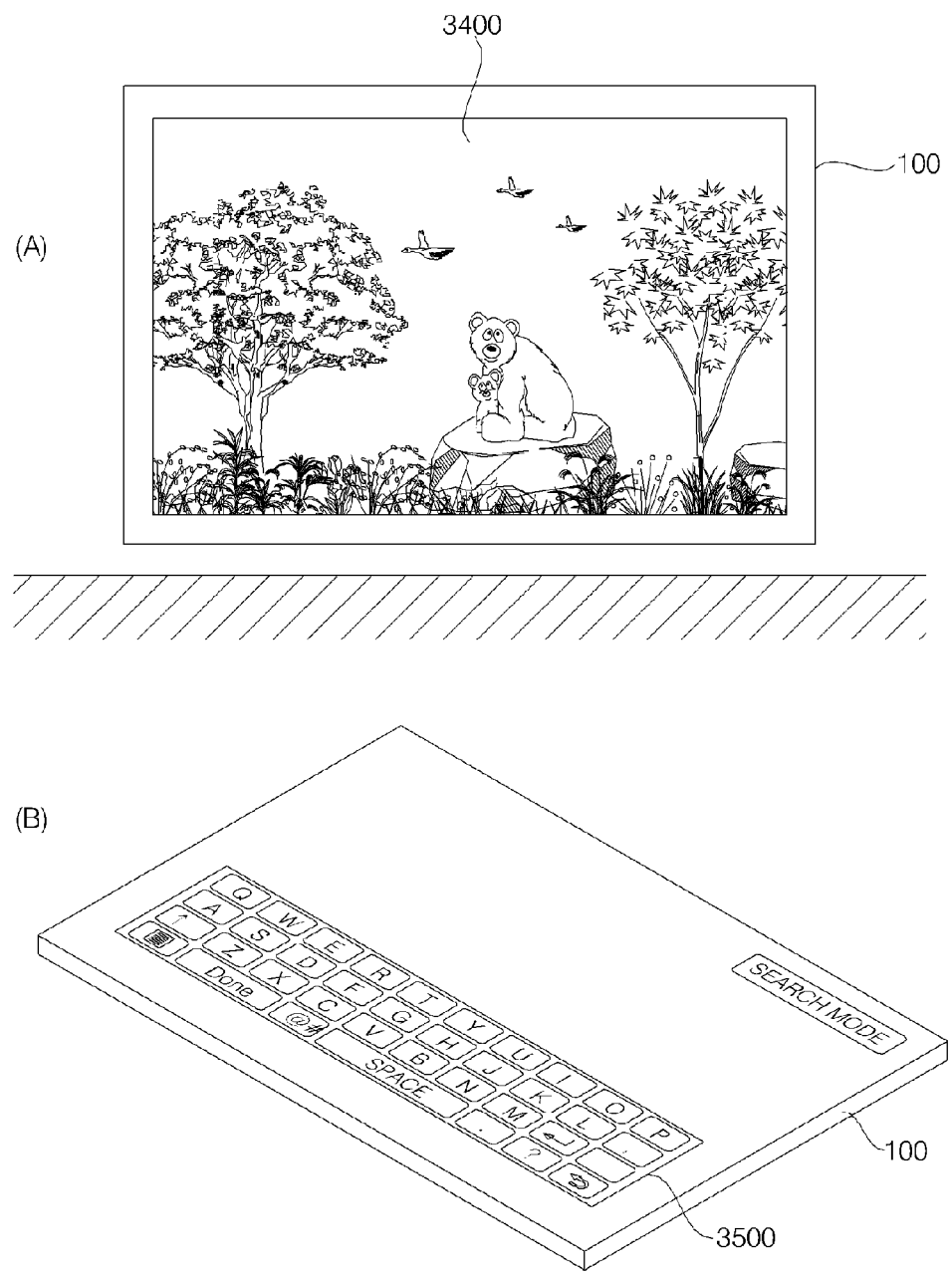
Figure 95:
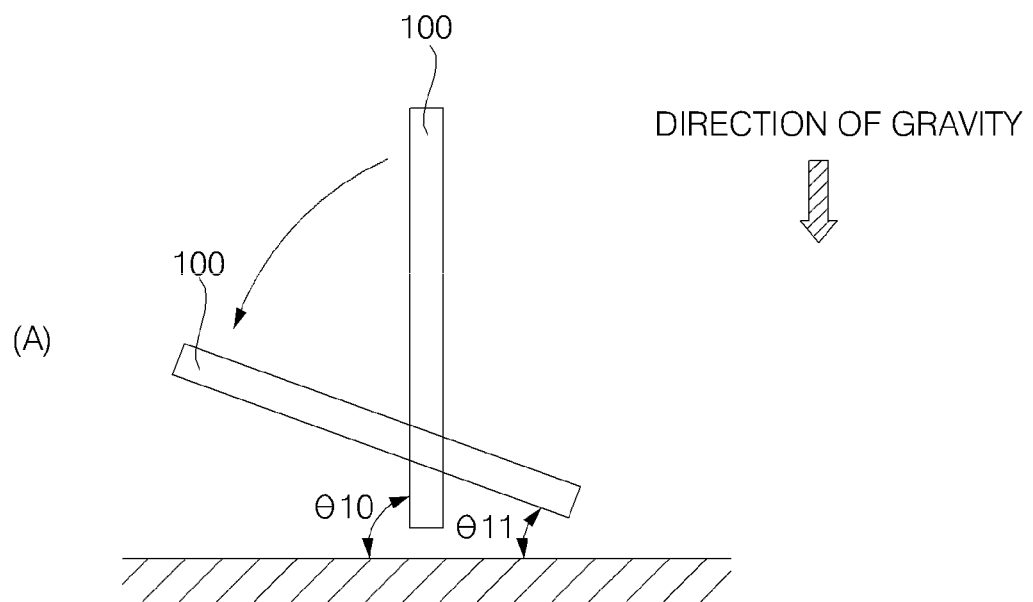
Figure 95:
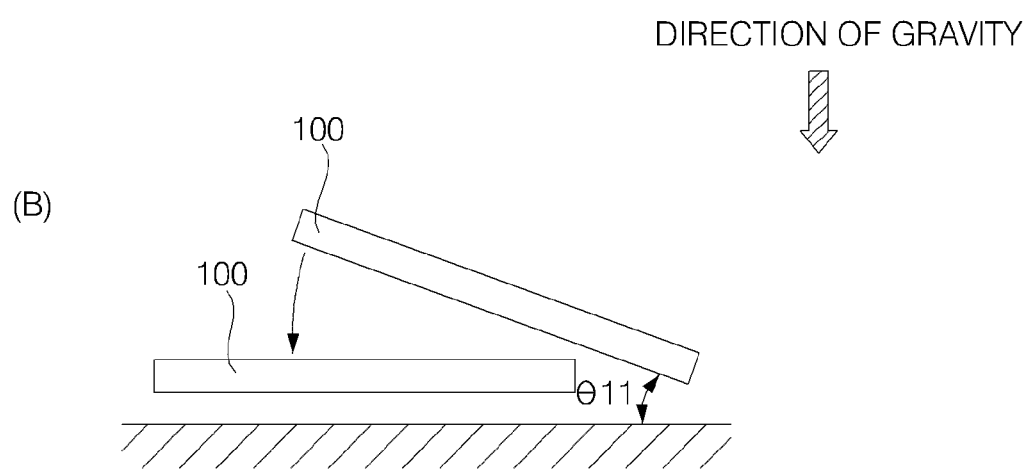

Referring to FIG. 93, an execution mode may be switched according to an inclination angle of the transparent display panel 100.

In other words, if a case in which the inclination angle of the transparent display panel 100 with respect to the direction of gravity is a first angle is a first case and a case in which the inclination angle of the transparent display panel 100 with respect to the direction of gravity is a second angle smaller than the first angle is a second case, the execution mode may be switched when the first case is switched to the second case.

For example, it is assumed that the transparent display panel 100 stands erect on the floor as shown in FIG. 93(A).

In this case, the user may readily view the image, for example, a broadcast image, displayed on the transparent display panel 100. Then, as shown in FIG. 94(A), a predetermined image may be implemented on the screen of the transparent display panel 100.

A mode for displaying an image according to a received video signal such as a broadcast signal or reproducing an image stored in a memory may be called an image viewing mode.

In contrast, it is assumed that the transparent display panel 100 is horizontally laid on the floor as shown in FIG. 93(B).

In this case, a predetermined user can readily observe a predetermined object located between the transparent display panel 100 and the floor or readily select a menu or object displayed on the transparent display panel 100.

In this way, if an angle between the transparent display panel 100 and the floor is small, an augmented reality mode, a scan mode or a search mode is more readily applicable.

For example, as shown in FIG. 94(B), in a search mode, predetermined search equations, characters, or numbers may be readily input to the transparent display panel 100.

In the search mode, at least one command input key 3500 for inputting a user command to the transparent display panel 100 may be displayed. A mode in which at least one command input key 3500 for inputting the user command is displayed on the transparent display panel 100 may be called a keyboard mode.

As described above, an image viewing mode or a search mode may be set according to an angle between the transparent display panel 100 and the floor, that is, an optimal execution mode may be set according to an inclination angle of the transparent display panel 100.

In addition, the floor may mean a surface on which the transparent display panel 100 is laid. For example, if the transparent display panel 100 is laid on a desk, the floor may be a top surface of the desk.

Alternatively, the floor may be the ground. If the floor is the ground, the execution mode may be changed using the inclination angle of the transparent display panel 100 in the direction of gravity.

Hereinafter, it is assumed that the floor is the ground.

Referring to FIG. 95(A), if the transparent display panel 100 is inclined in the direction of gravity such that the angle between the ground and the transparent display panel 100 is θ10 to θ11, the image viewing mode may be set as shown in FIG. 93(A) and FIG. 94(A). Here, θ10 may be a right angle.

As shown in FIG. 95(B), if the transparent display panel 100 is inclined in the direction of gravity such that the angle between the ground and the transparent display panel 100 is θ11 to 0 degrees, the augmented reality mode, the scan mode and/or the search mode may be set as shown in FIG. 93(B) and FIG. 94(B).

θ11 may be a threshold angle for distinguishing between the image viewing mode and other modes.

As shown in FIG. 96(A), it is assumed that a postcard 1000 is disposed on a table 3600 as an object.

In this case, if the transparent display panel 100 according to the present invention is laid on the table 3600 to correspond to the postcard 100, an angle between the top surface of the table and the transparent display panel 100 is sufficiently small. Alternatively, the angle between the ground and the transparent display panel 100 is sufficiently small. For example, this may correspond to FIG. 93(B), FIG. 94(B) and FIG. 95(B).

In this case, as shown in FIG. 96(B), in the transparent display apparatus, the postcard 1000 corresponding to the transparent display panel 100 may be selected. Thereafter, as shown in FIG. 96(C), information 1001 of the postcard 1000, that is, content of the postcard 1000 may be displayed on the transparent display panel 100.

This may correspond to a scan mode for scanning the content of the object, that is, the postcard 1000, or an augmented reality mode for selecting the postcard 1000.

Figure 96:
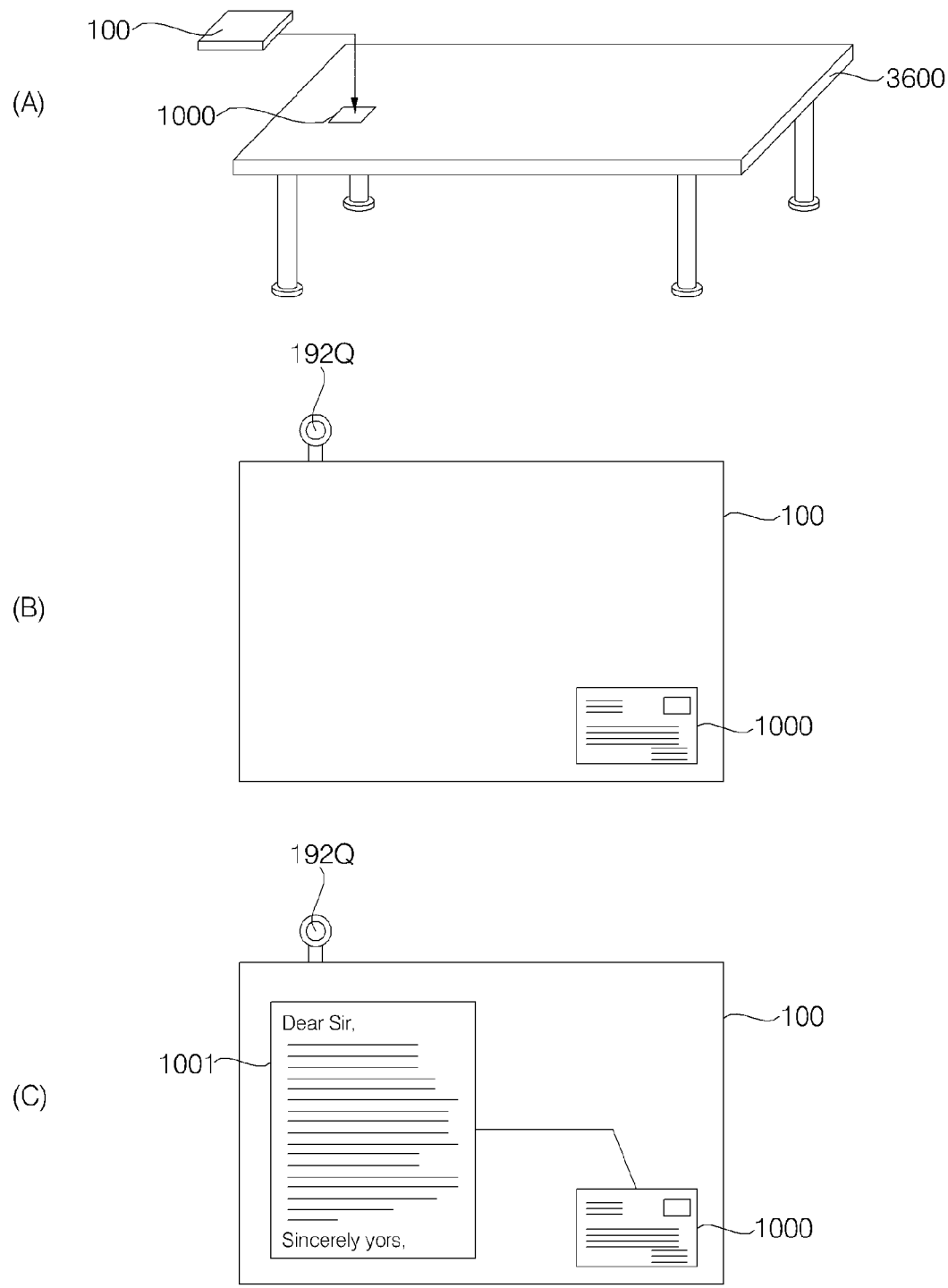
Figure 97:
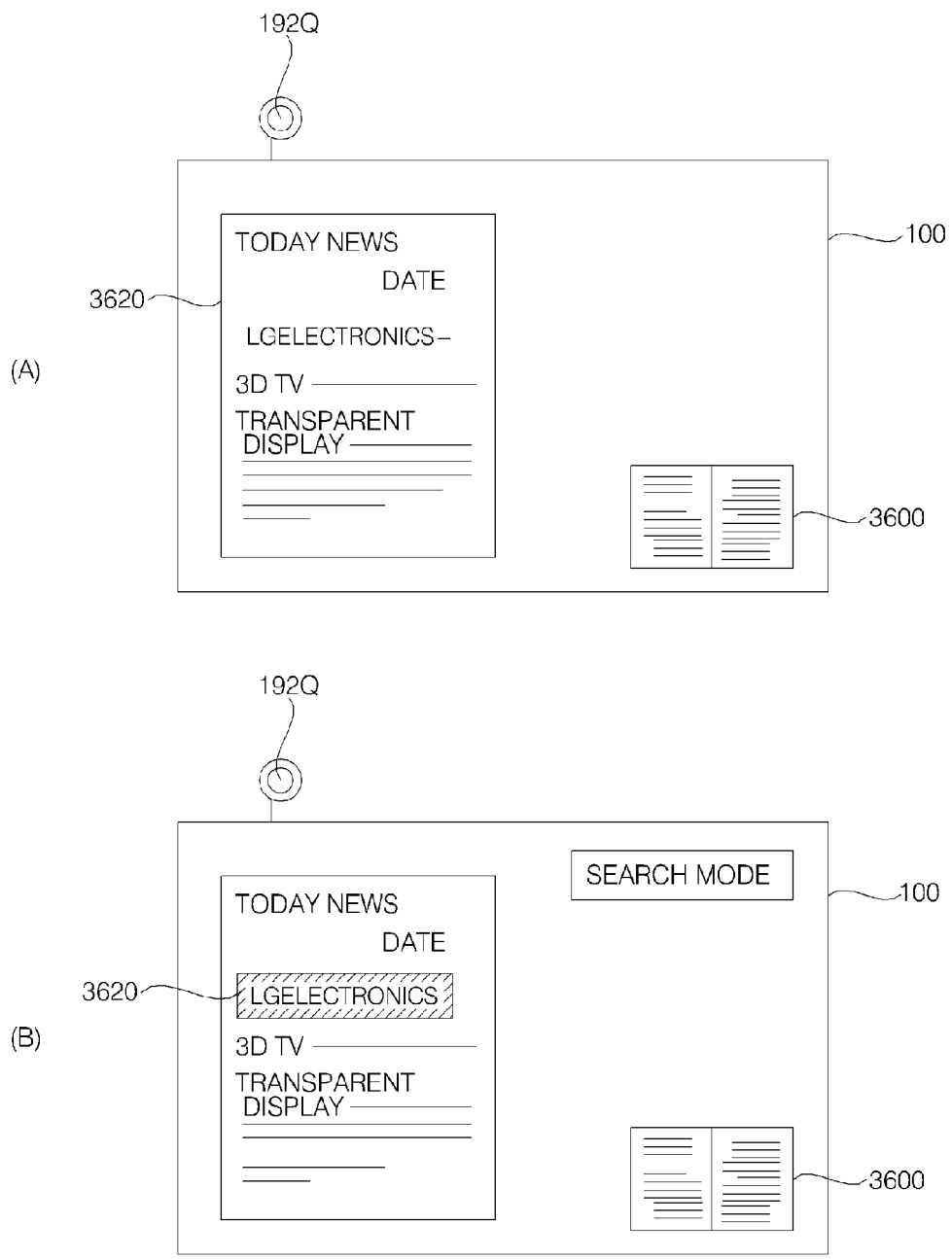
Figure 98:
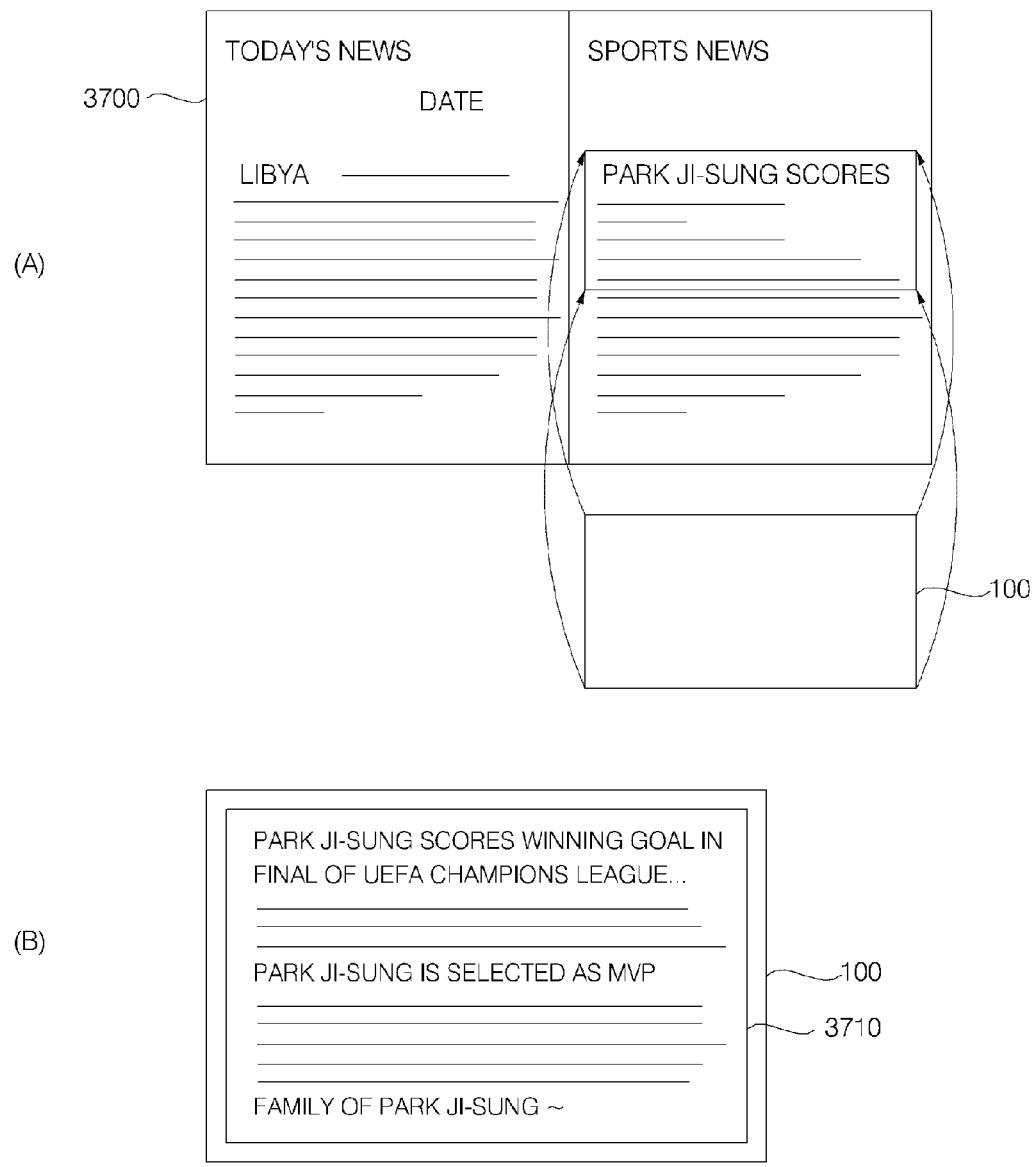
Figure 99:
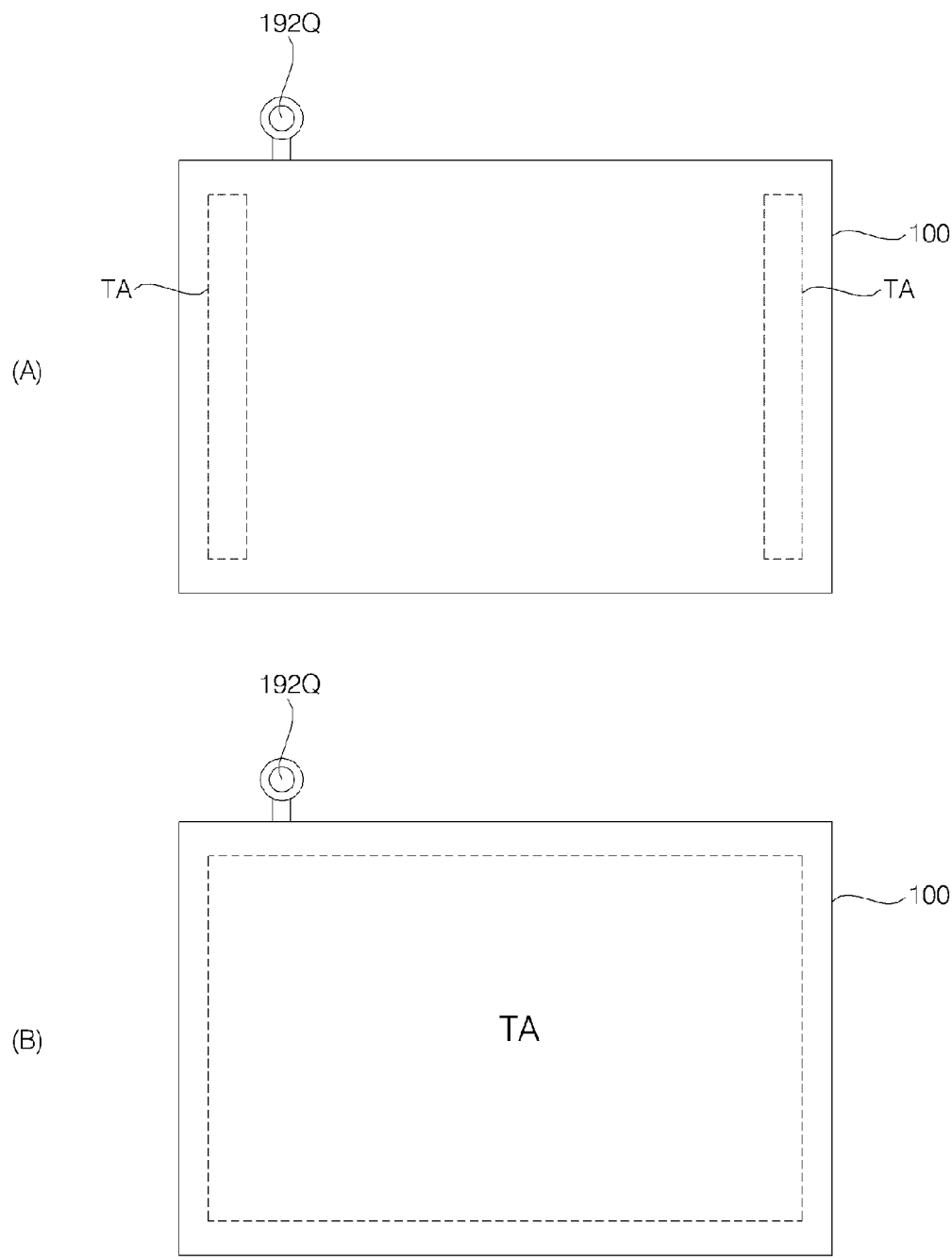
Figure 100:
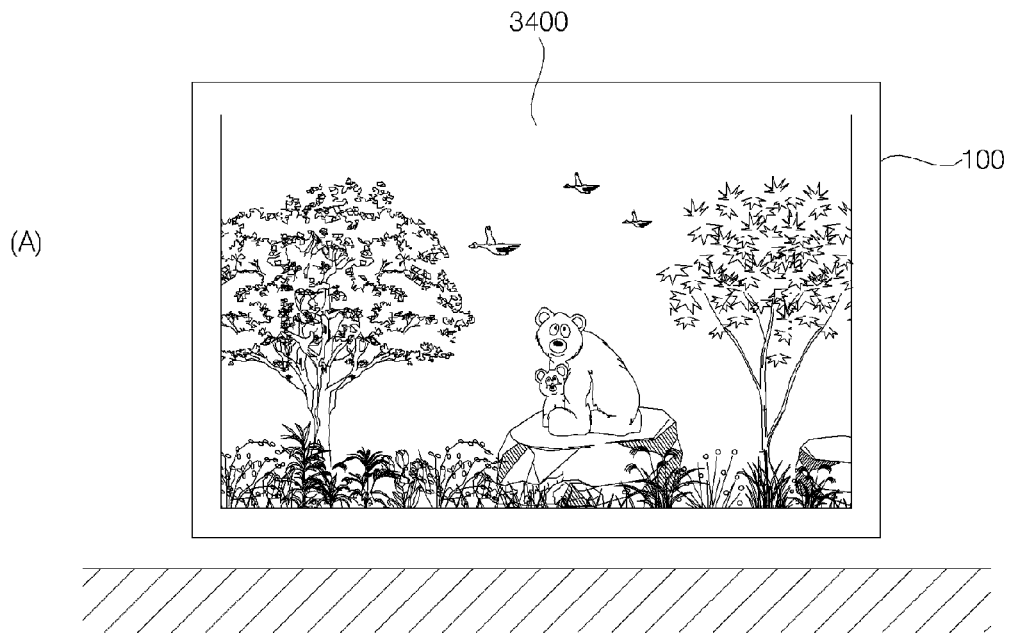
Figure 100:
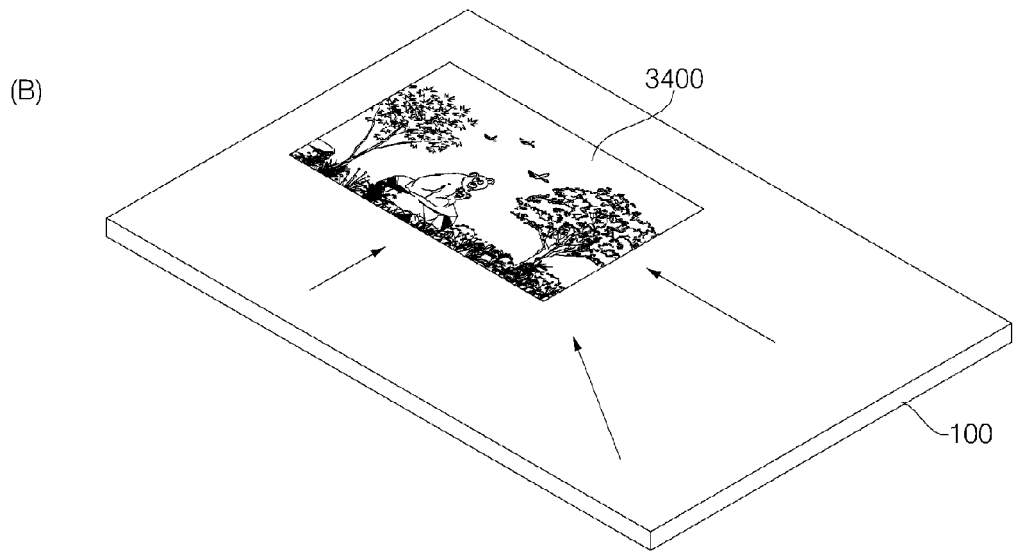
Figure 101:
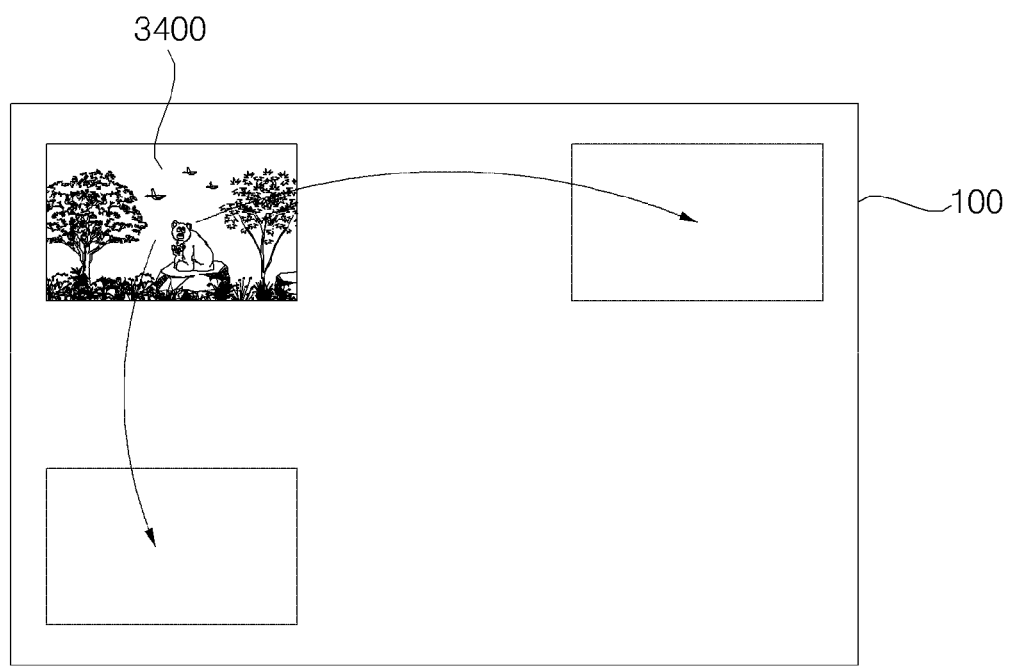
Figure 102:
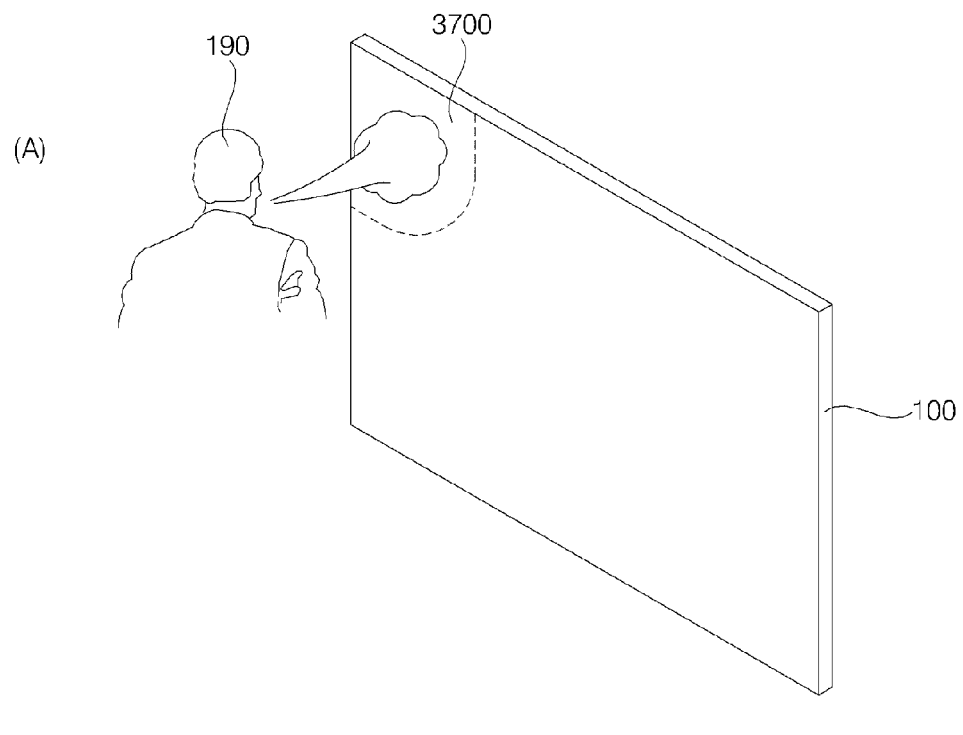
FIGS. 102 to 110 are diagrams illustrating a secret mode.
Figure 102:
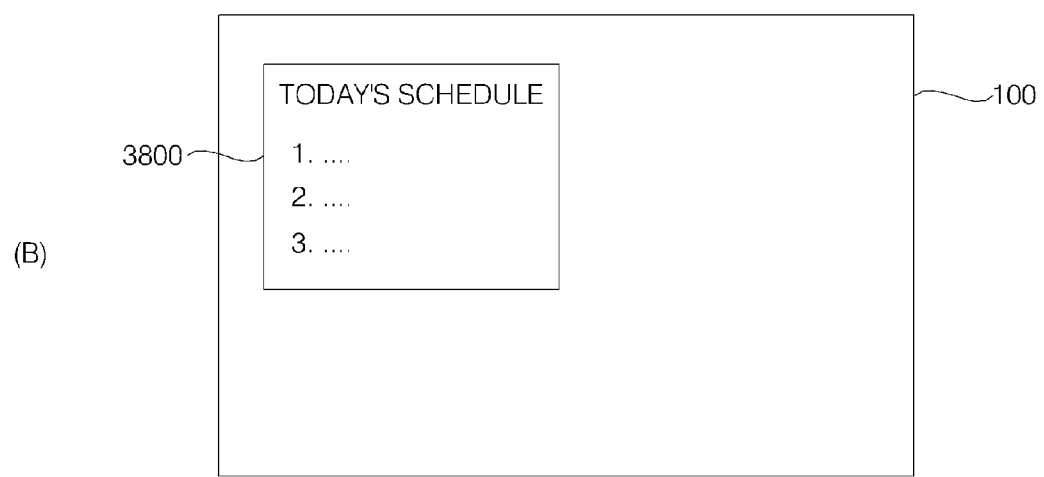

As shown in FIG. 97(A), if the postcard 1000 of FIG. 96 is replaced with a newspaper 3600, the transparent display apparatus may select the newspaper 3600 corresponding to the transparent display panel 100.

Thereafter, as shown in FIG. 97(B), information 3610 of the newspaper 3600, that is, content 3610 of the newspaper 3600, may be displayed on the transparent display panel 100. If the search mode is initiated, it is possible to search the content 3610 of the newspaper 3600 displayed on the transparent display panel 100 for desired information. For example, words "LG Electronics" may be searched from the content 3610 of the newspaper 3600.

This case may correspond to the scan mode for scanning the content of the object, that is, the newspaper 3600, the augmented reality mode for selecting the newspaper 3600 or the search mode for searching the information 3610 of the newspaper for a desired word.

Alternatively, as shown in FIG. 98(A), if the postcard 1000 of FIG. 96 is replaced with another newspaper 3700, the transparent display apparatus may be located on the newspaper 3700.

The transparent display apparatus according to the present invention may scan a part of the newspaper 3700 displayed on the transparent display panel 100 or display the scanned image/data 3701 on the transparent display panel 100 as shown in FIG. 98(B).

In addition, it is possible to search the scanned image/data 3710 for a desired word in the search mode.

The scanned image/data 3710 may be transmitted to an external device via fax or email.

Meanwhile, the size of a part set as a touch area in the augmented reality mode, the scan mode and/or search mode and the size of a part set as a touch area in the image viewing mode may be different.

For example, as shown in FIG. 99(A), the size of the touch area TA is decreased in the image viewing mode so as not to disturb image viewing of the user. In contrast, as shown in FIG. 99(B), the size of the touch area TA in the search mode, the augmented reality mode and/or the scan mode is greater than that the size of the touch area TA in the image viewing mode, in order to facilitate scan, search and selection.

Alternatively, if the image viewing mode is switched to the search mode, if the image viewing mode is switched to the scan mode, or if the image viewing mode is switched to the augmented reality mode, the size of the displayed image may be decreased.

For example, in the image viewing mode for displaying a predetermined image 3400, for example, an image according to a broadcast signal, on the transparent display panel 100 as shown in FIG. 100(A), if the transparent display panel 100 is substantially horizontally laid on the ground or the floor as shown in FIG. 100(B), the mode may be switched to the scan mode or the search mode.

If the mode is switched as shown in FIG. 100(B), the size of the image 3400 displayed on the transparent display panel 100 just before the mode is switched may be decreased.

In this case, the user may perform the search function or the scan function while viewing the image.

In addition, if the mode is switched from FIG. 100(A) to FIG. 100(B), the size of the image 3400 displayed on the transparent display panel 100 may be decreased and the display position of the image 3400 may be changed according to user choice.

FIGS. 102 to 110 are diagrams illustrating a secret mode. Hereinafter, a description of the above-described portions will be omitted.

In the transparent display apparatus according to the present invention, secret information such as a hidden message may be used by breathing on the transparent display panel 100.

For example, as shown in FIG. 102(A), it is assumed that the user 190 breathes on a predetermined first part 3700 of the transparent display panel 100.

In this case, as shown in FIG. 102(B), a hidden menu or message 3800 may be displayed in the first screen area 3800 corresponding to the first part 3700 on which the user 190 breathes.

In this case, the breath of the user may be used as authentication information for accessing the hidden menu or message 3800.

In this case, the transparent display apparatus may include a predetermined sensor for detecting the breath of the user 190. For example, as shown in FIG. 103(A), a sensor 3900 may be disposed on the first part 3700 of the transparent display panel 100. The sensor 3900 may include at least one of a vapor sensor, a breath sensor, a humidity sensor, a temperature sensor and a wind sensor.

Such a sensor 3900 may determine whether the amount of vapor of the first part 3700 of the transparent display panel 100 exceeds a threshold value THV as shown in FIG. 103(B).

At a time T0 when the amount of vapor of the first part 3700 of the transparent display panel 100 detected by the sensor 3900 exceeds the threshold value THV, the hidden menu or message may be displayed.

Meanwhile, in the transparent display apparatus according to the present invention, the hidden menu may disappear if the amount of vapor of the first part 3700 of the transparent display panel 100 is decreased and then increased within a threshold period.

For example, it is assumed that the threshold period is 1 minute.

In this case, when the user breathes on the first part 3700 of the transparent display panel 100 at a time T0 as shown in FIG. 103(B), the hidden menu or message 3800 may be displayed on the transparent display panel 100. Thereafter, when the user breathes on the first part 3700 of the transparent display panel 100 within 1 minute from the time T0, the hidden menu or message 3800 displayed on the transparent display panel 100 may disappear.

Alternatively, if the amount of vapor of the first part 3700 is decreased to the threshold value or less, the hidden menu or message 3800 displayed on the transparent display panel 100 may disappear.

For example, as shown in FIG. 104(A), the hidden menu or message 3800 may be displayed at the time T0 when the amount of vapor of the first part 3700 of the transparent display panel 100 detected by the sensor 3900 exceeds the threshold value THV and the hidden menu or message 3800 displayed on the transparent display panel 100 may then disappear at a time T1 when the amount of vapor of the first part 3700 falls below the threshold value THV. That is, the display of the hidden menu or message 3800 at the time T1 may be finished/released.

Alternatively, if a threshold time has elapsed from the time T0 when the hidden menu or message 3800 is displayed, the hidden menu or message 3800 may disappear.

For example, as shown in FIG. 104(B), the hidden menu or message 3800 may be displayed at the time T0 when the amount of vapor of the first part 3700 of the transparent display panel 100 detected by the sensor 3900 exceeds the threshold value THV and the hidden menu or message 3800 displayed on the transparent display panel 100 may then disappear at a time T2 when a predetermined threshold time THP has elapsed.

Meanwhile, the hidden menu or message 3800 may be displayed to overlap the image displayed on the transparent display panel 100 before the amount of vapor is increased to the threshold value THV or more.

Figure 103:
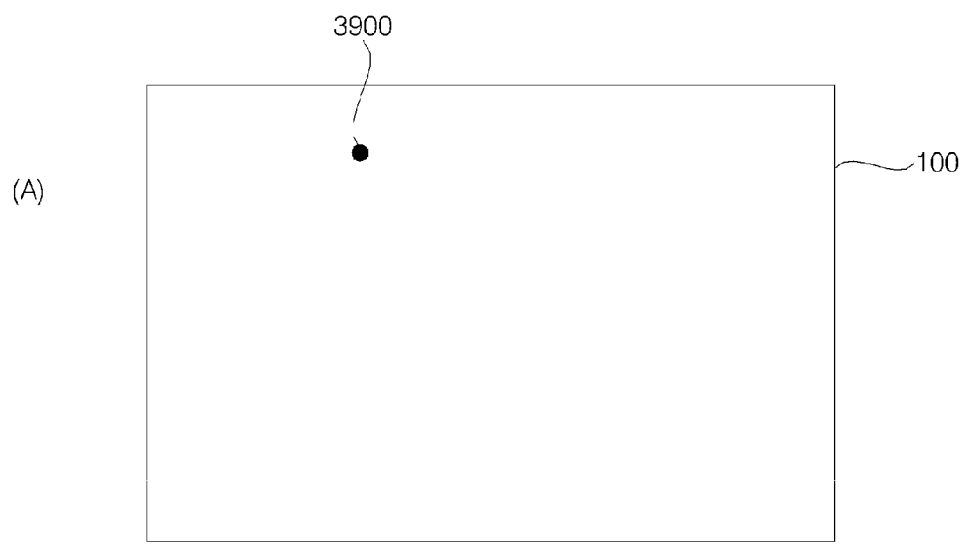
Figure 103:
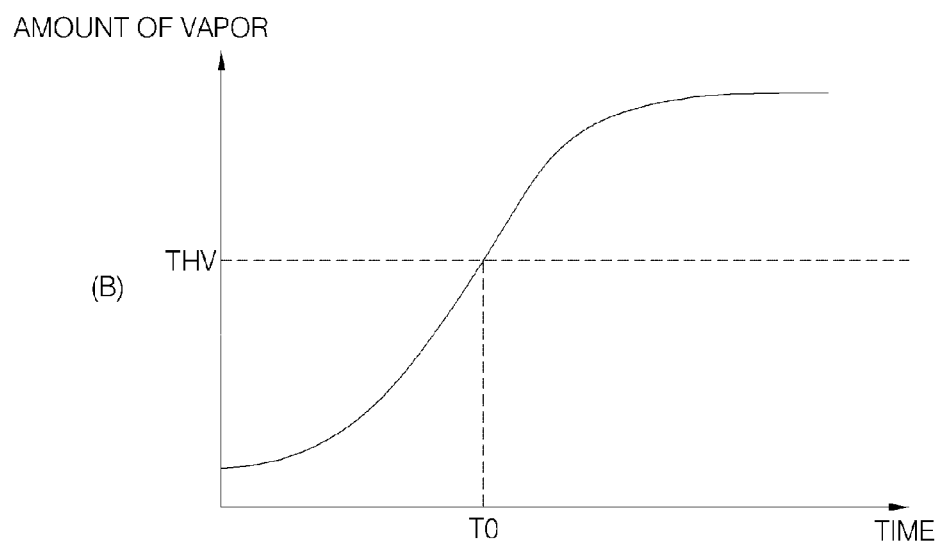
Figure 104:
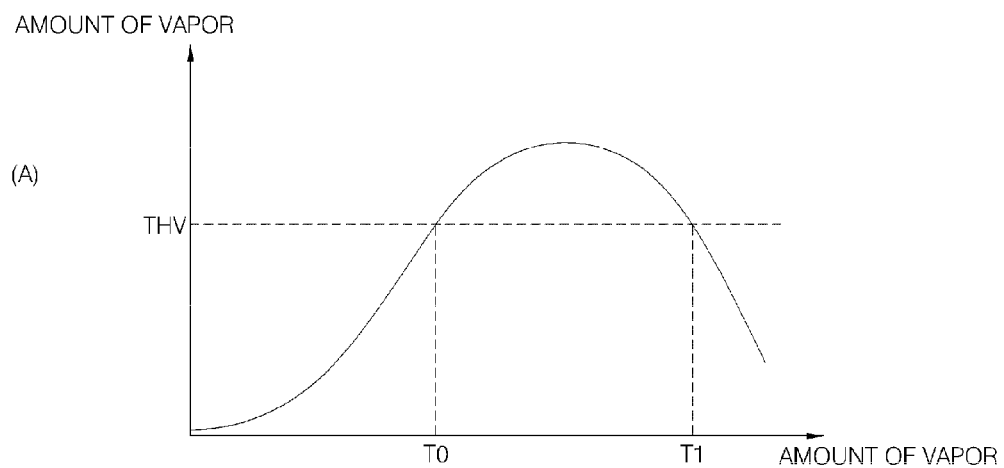
Figure 104:
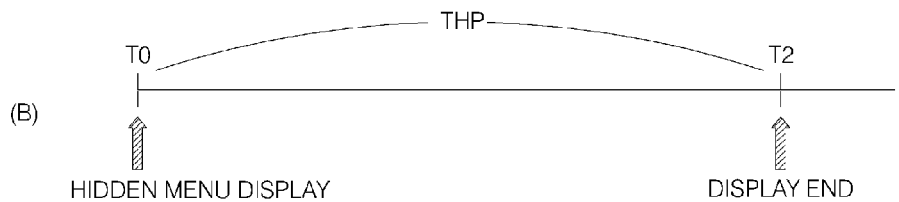
Figure 105:
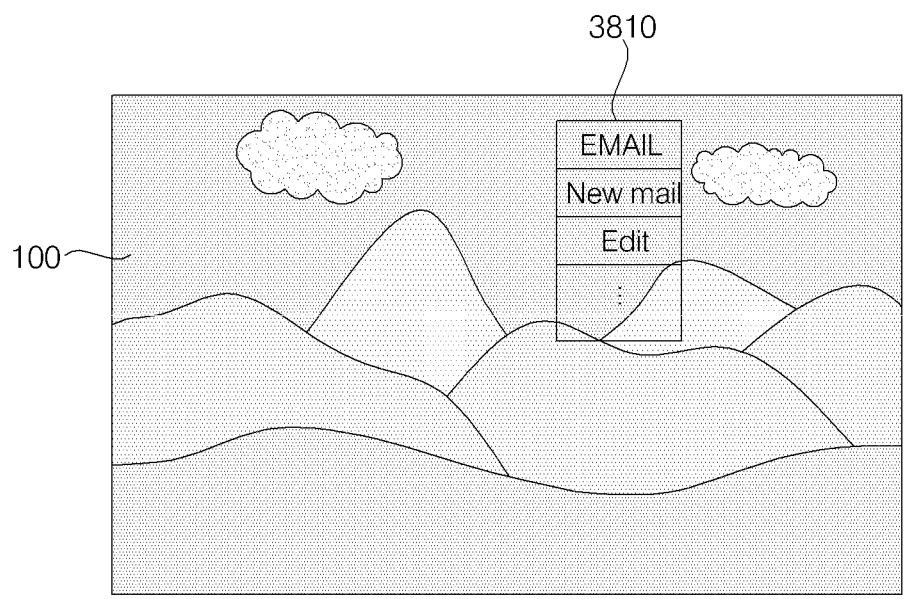

For example, it is assumed that an image corresponding to "mountain" is displayed before the time T0 of FIG. 103, as shown in FIG. 105.

In this case, as shown in FIG. 105, if the amount of vapor of a predetermined part exceeds the threshold value THV, another hidden menu 3810, for example, a hidden menu 3810 for a user email, may be displayed on the screen.

In addition, the hidden menu 3810 for the email may be displayed to overlap "mountain" displayed on the screen before the time T0. Accordingly, the user can observe the image of "mountain" in the area in which the hidden menu 3810 is displayed.

Alternatively, the hidden menu may be displayed in a state of concealing the image displayed on the transparent display panel 100 before the amount of vapor is increased to the threshold value or more.

Figure 106:
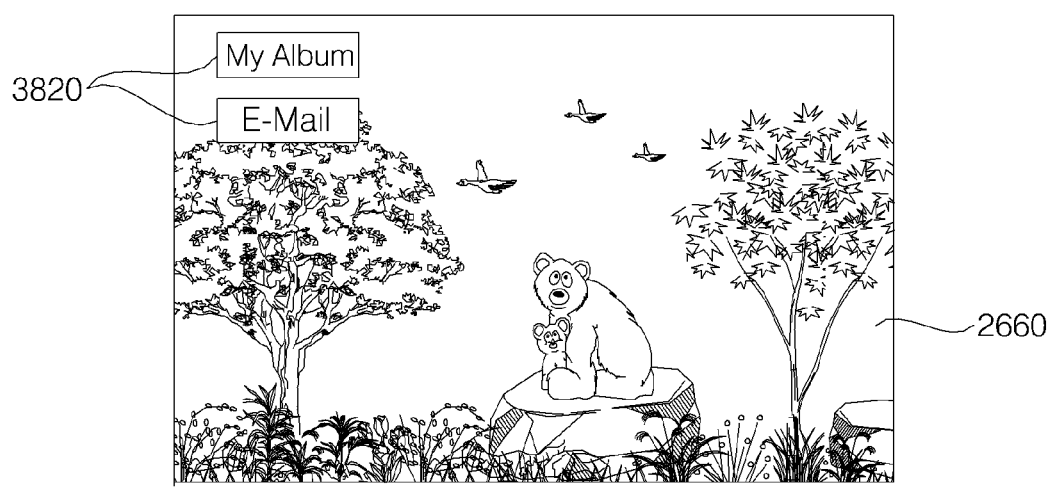

For example, it is assumed that an image corresponding to "bear" is displayed before the time T0 of FIG. 103 as shown in FIG. 106.

In this case, as shown in FIG. 106, if the amount of vapor of a predetermined part exceeds the threshold value THV, another hidden menu 3820, for example, a hidden menu 3820 for a user album and email may be displayed on the screen.

The hidden menu 3820 for the email may be displayed in a state of partially concealing the image corresponding to "bear" displayed on the screen before the time T0.

A plurality of sensors may be mounted on one transparent display panel 100.

Figure 107:
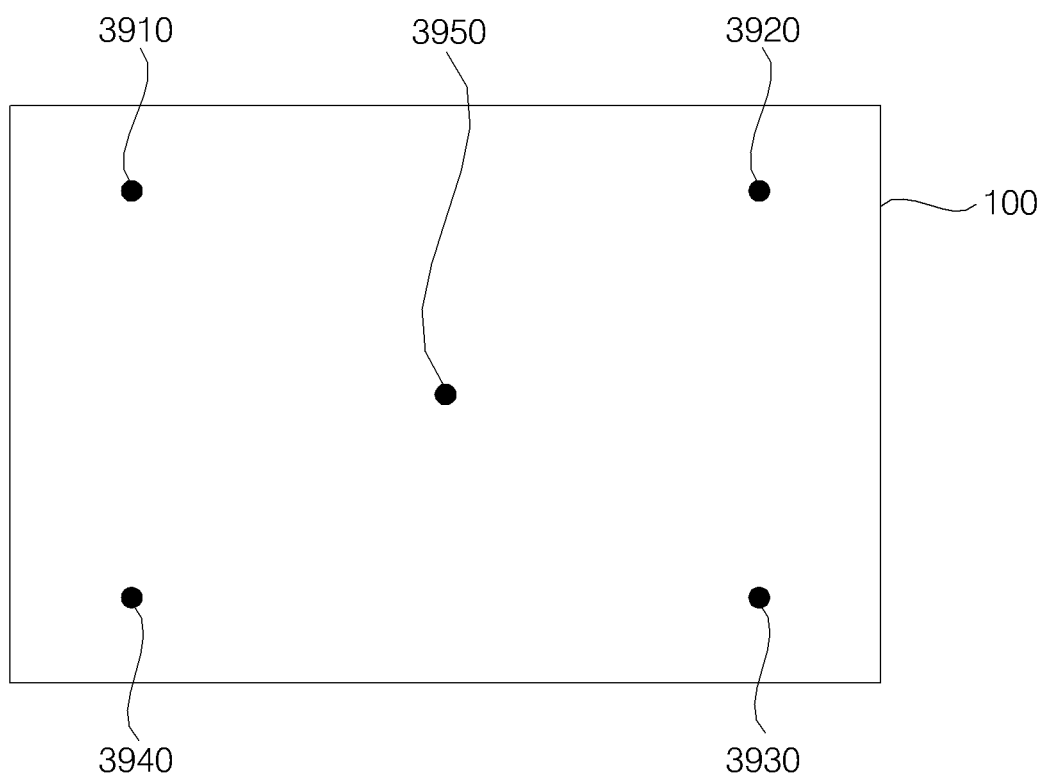

For example, as shown in FIG. 107, first to fifth sensors 3910 to 3950 may be disposed on the transparent display panel.

In this case, if the amount of vapor of a first part of the transparent display panel 100 is increased to a threshold value or more and the amount of vapor of a second part is increased to a threshold value or more, another hidden menu may be displayed in a second screen area corresponding to the second part.

For example, as shown in FIG. 108(A), it is assumed that the amount of vapor of the first part 4000 and the second part 4010 of the transparent display panel 100 exceeds a predetermined threshold value.

In this case, each of the first sensor 3910 mounted in the first part 4000 and the second sensor 3920 mounted in the second part 4010 of the transparent display panel 100 may detect that the amount of vapor exceeds the threshold value.

Then, as shown in FIG. 108(B), a first hidden menu or message 4100 may be displayed in the screen area corresponding to the first part 4000 on which the user breathes and a second hidden menu or message 4110 may be displayed in the screen area corresponding to the second part 4010 on which the user breathes.

The first hidden menu or message 4100 may be different from the second hidden menu or message 4110. For example, the first hidden menu or message 4100 may include schedule information of the user and the second hidden menu or message 4110 may include email information of the user.

In this way, different hidden menus can be displayed according to positions of the transparent display panel 100 on which the user breathes.

A predetermined hidden menu may be displayed according to a change in temperature of the transparent display panel 100.

For example, as shown in FIG. 109(A), if the user 190 breathes on a predetermined part 4300 of the transparent display panel 100, not only the amount of vapor of the predetermined part 4300 but also the temperature of the predetermined part 4300 may be increased.

The transparent display apparatus may include a temperature sensor in order to detect the breath of the user 190. For example, a temperature sensor 4200 may be mounted in the predetermined part 4300 of the transparent display panel 100.

This temperature sensor 4200 determines whether the temperature of the predetermined part 4300 of the transparent panel 100 exceeds a threshold temperature THV1, as shown in FIG. 109(B).

A hidden menu or message may be displayed at a time T10 when the temperature of the predetermined part 4300 of the transparent display panel 100 detected by the temperature sensor 4200 exceeds the threshold temperature THV1.

The hidden menu or message displayed on the transparent display panel 100 may disappear at a time T11 when the temperature of the predetermined part 4300 is decreased to the threshold temperature or less.

In this case, the temperature may be used as authentication information for accessing the hidden menu or message.

In this way, in the case in which the hidden menu or message is displayed when the temperature of a predetermined position of the transparent display panel 100 exceeds the threshold temperature, the hidden menu or message may be activated not only using the breath of the user but also using user touch.

For example, the user may touch a predetermined position of the transparent display panel 100 with the user's hand for a predetermined time. In this case, the temperature of the position touched by the user's hand may be increased by the temperature of the user.

If the threshold temperature is set to the temperature of the user or less, although the user does not breathe, the hidden menu or message may be activated by user touch alone.

Alternatively, transmittance may be decreased at a position of the transparent display panel 100 where a hidden menu or message is displayed. In other words, transparency of the position corresponding to the hidden menu or message of the transparent display panel 100 may be decreased.

For example, as shown in FIG. 110(A), it is assumed that a hidden menu or message 3800 is displayed by breathing on another predetermined part 4400 of the transparent display panel 100 or by hand touch.

In this case, transparency of the predetermined part 4400 of the transparent display panel 100 may be decreased. In this case, transparency of the part 4410 other than the first part 4400 of the transparent display panel 100 may not be decreased.

If the predetermined part 4400 corresponding to the hidden menu or message 3800 is a first part 4400 and the remaining part is a second part 4410, the transparency/transmittance of the first part 4400 may be lower than that of the second part 4410.

In this case, as shown in FIG. 110(A), the user can readily confirm the hidden menu or message 3800 on the front surface of the transparent display panel 100. However, as shown in FIG. 110(B), it may be difficult for the user to confirm the hidden menu or message 3800 on the rear surface of the transparent display panel 100 due to low transparency of the first part 4400. Accordingly, it is possible to suppress exposure of the hidden menu or message 3800 to other people.

Although the case in which breath is used for a secret mode is described with respect to FIGS. 102 to 110, various examples are possible.

For example, if transparency of a transparent display panel 100 is changed using a predetermined pen (that is, the transparent display panel becomes opaque by external input), a separate menu or information may be displayed only in an area in which transparency is changed. Alternatively, a menu or information may be displayed only in an area in which transparency is not changed.

In addition, if a predetermined area of the transparent display panel 100 is coated with moisture, information display may be changed such that information displayed in the predetermined area is displayed in the form of a fish eye. Thus, a user can perceive only the information of the predetermined area as being enlarged.

Alternatively, if a predetermined area of the transparent display panel 100 is coated with moisture, image quality (definition, luminance, brightness, etc.) may be changed such that information displayed in the predetermined area is clearly displayed.

In addition, various user interfaces using breath are possible.

The amount of information or menus displayed in a predetermined area may be increased or the information or menus may be sequentially changed and displayed according to the intensity of breath or the duration of breath.

If users breathe on the same area of a first surface and a second surface opposed to the first surface of the transparent display panel 100, a set menu or information may be displayed. For example, if two users simultaneously breathe on the same area, a menu or information set by the two users may be displayed.

FIGS. 111 to 123 are diagrams illustrating a side edge touch mode.

In the transparent display apparatus according to the present invention, it is possible to input a touch signal using a side edge of the transparent display panel 100.

For example, as shown in FIG. 111(A), the transparent display panel 100 substantially has a rectangular shape and may include a first long side LS1, a second long side LS2 corresponding to the first long side LS1, a first short side SS1 adjacent to the first long side LS1 and the second long side LS2, and a second short side SS2 corresponding to the first short side SS1.

A predetermined area of the second short side SS2 of the transparent display panel 100 may be set as a side edge touch area SE.

For example, if the user touches the side edge touch area SE, as shown in FIG. 111(B), functions such as volume up, volume down, channel up and channel down may be performed.

That is, when the user touches the side edge of the transparent display panel 100, a predetermined function can be performed.

If a predetermined function of the transparent display panel 100 is performed using the side edge touch area SE of the transparent display panel 100, it is possible to further increase the size of the active area in which the image of the transparent display panel 100 may be displayed.

Figure 112:
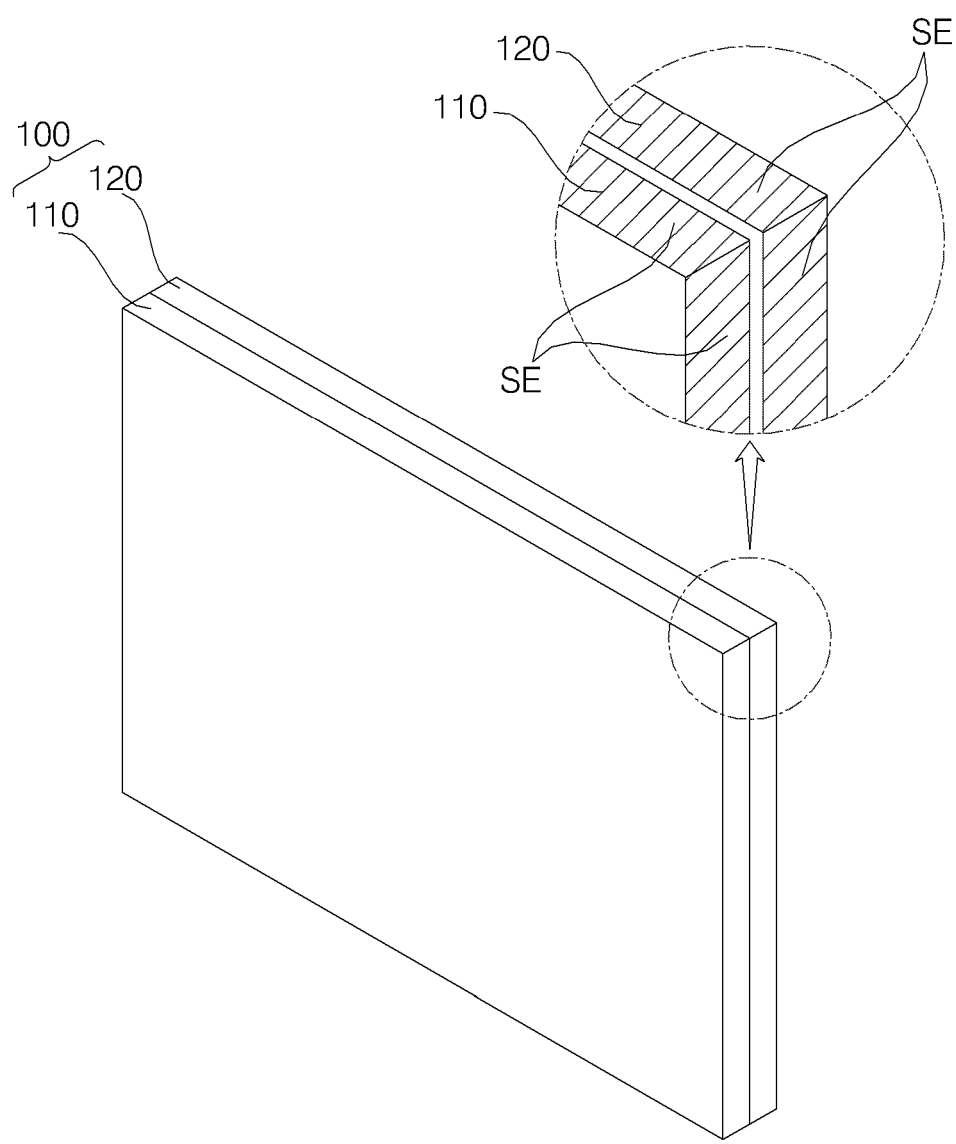

As shown in FIG. 112, if the transparent display panel 100 includes a first transparent substrate 110 and a second transparent substrate 120, at least one side of the first transparent substrate 110 and the second transparent substrate 120 may be set as a side edge touch area.

That is, when the user touches at least one side edge of the first transparent substrate 110 and the second transparent substrate 120, a predetermined function can be performed.

Alternatively, the side edge touch area SE may correspond not only to at least one side edge of the first transparent substrate 110 and the second transparent substrate 120 but also to an area adjacent to the side edge.

Figure 113:
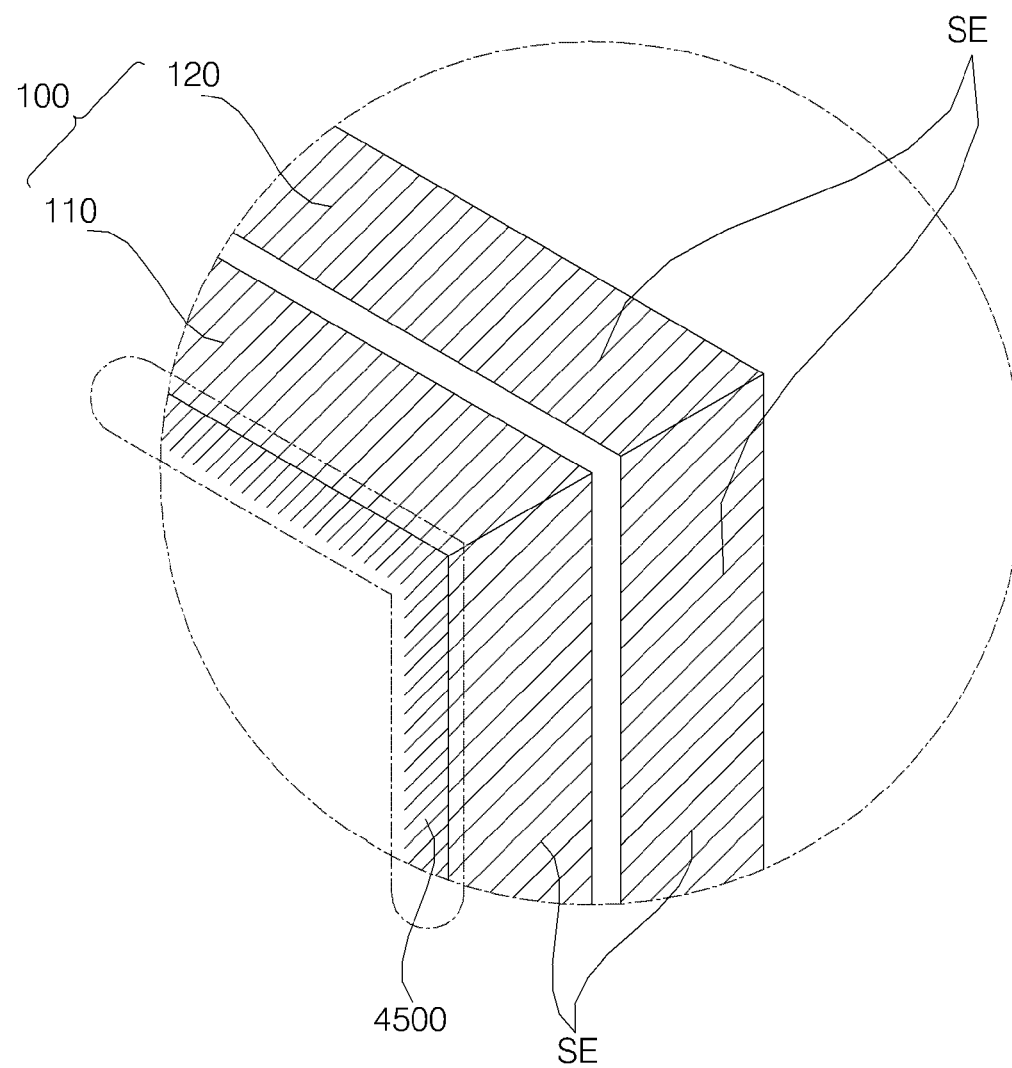

For example, as shown in FIG. 113, the side edge of the first transparent substrate 110 and an area 4500 adjacent to the side edge of the first transparent substrate 110 may be set as the side edge touch area SE of the first transparent substrate 100.

Figure 114:
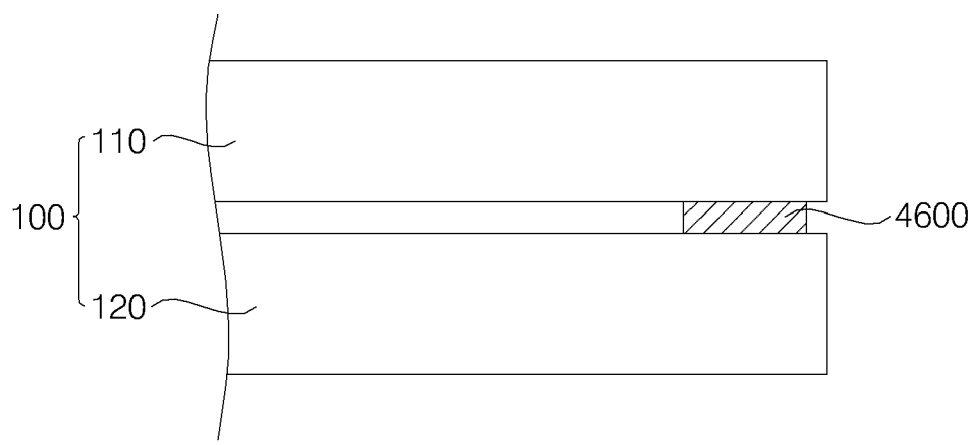
Figure 115:
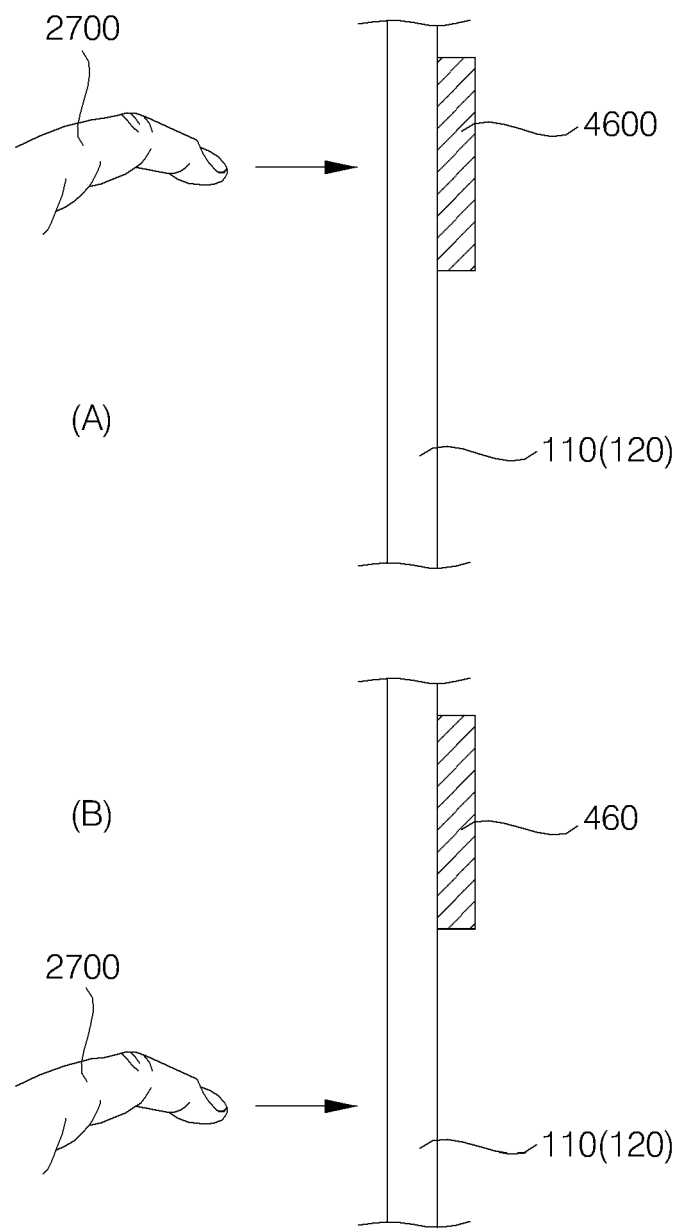

As shown in FIG. 114, in order to set at least one side edge of the first transparent substrate 110 and the second transparent substrate 120 as a side edge touch area, a touch sensor 4600 may be disposed between the first transparent substrate 110 and the second transparent substrate 120.

The touch sensor 4600 may detect minute capacitance of a human body or a specific object. In this case, the touch sensor 4600 may operate when a touch operation is performed using a human body or an object having capacitance. Accordingly, it is possible to detect touch of at least one side edge touch area SE of the first transparent substrate 110 and the second transparent substrate 120.

For example, as shown in FIG. 115(A), when the user touches an area, in which the touch sensor 4600 is provided, of the first transparent substrate 110 and/or the second transparent substrate 120, the touch sensor 4600 detect a minute change in capacitance generated upon user touch so as to detect user touch. Thus, a predetermined function can be performed.

In contrast, as shown in FIG. 115(B), when the user touches an area, in which the touch sensor 4600 is not provided, of the first transparent substrate 110 and/or the second transparent substrate 120, the touch sensor may not operate.

If the touch sensor 4600 is disposed between the first transparent substrate 110 and the second transparent substrate 120, a part of the first transparent substrate 110 and/or the second transparent substrate 120, that is, a side edge touch area, may be used as a switch.

The side edge touch area SE of the transparent display panel 100 is divided into a plurality of sub areas and the sub areas may perform different functions.

In other words, a first area of a side edge of the transparent display panel 100 may correspond to a first function and a second area thereof may correspond to a second function. In this case, the first function is performed when the first area is touched and the second function is performed when the second area is touched.

For example, as shown in FIG. 116(A), the second short side SS2 of the transparent display panel 100 may be divided into a first area 4700, a second area 4710 and a third area 4720.

As shown in FIG. 116(B), a volume up function may be assigned to the first area 4700, a volume down function may be assigned to the second area 4710 and a power on/off function may be assigned to the third area 4720.

In a side edge touch mode, different functions may be performed according to a method of touching the side edge touch area SE of the transparent display panel 100.

For example, if upward or downward movement is performed in the side edge touch area of the transparent display panel 100, a function different from the function performed when the side edge touch area is touched only once is performed. For example, the position of a predetermined object displayed on the screen of the transparent display panel 100 may be moved, the volume may be changed or the channel may be changed.

For example, as shown in FIG. 117(A), the case in which upward movement is performed in a state in which the side edge touch area set to the second short side SS2 of the transparent display panel 100 is touched or the case in which a touch operation is continuously performed while moving upward in the side edge touch area set to the second short side SS2 of the transparent display panel 100 is referred to as a first case ①.

The case in which downward movement is performed in a state in which the side edge touch area set to the second short side SS2 of the transparent display panel 100 is touched or the case in which a touch operation is continuously performed while moving downward in the side edge touch area set to the second short side SS2 of the transparent display panel 100 is referred to as a second case ②.

In this case, as shown in FIG. 117(B), in the first case ①, a volume up function, a channel up function and a "move to top" function for moving the position of the selected object upward may be performed.

In the second case ②, a volume down function, a channel down function and a "move to bottom" function for moving the position of the selected object downward may be performed.

Alternatively, different functions may be assigned to the first long side LS1, the second long side LS2, the first short side SS1 and the second short side SS2 of the transparent display panel 100.

For example, as shown in FIG. 118(A), the case in which upward movement is performed in a state in which the side edge touch area set to the second short side SS2 of the transparent display panel 100 is touched or the case in which a touch operation is continuously performed while moving upward in the side edge touch area set to the second short side SS2 of the transparent display panel 100 is referred to as a first case ①.

The case in which downward movement is performed in a state in which the side edge touch area set to the second short side SS2 of the transparent display panel 100 is touched or the case in which a touch operation is continuously performed while moving downward in the side edge touch area set to the second short side SS2 of the transparent display panel 100 is referred to as a second case ②.

The case in which rightward movement is performed in a state in which the side edge touch area set to the first long side LS1 of the transparent display panel 100 is touched or the case in which a touch operation is continuously performed while moving rightward in the side edge touch area set to the first long side LS1 of the transparent display panel 100 is referred to as a third case ③.

The case in which leftward movement is performed in a state in which the side edge touch area set to the first long side LS1 of the transparent display panel 100 is touched or the case in which a touch operation is continuously performed while moving leftward in the side edge touch area set to the first long side LS1 of the transparent display panel 100 is referred to as a fourth case ④.

In this case, as shown in FIG. 118(B), a volume up function may be assigned to the first case ①, a volume down function may be assigned to the second case ②, a channel up function may be assigned to the third case ③ and a channel down function may be assigned to the fourth case ④.

A mark corresponding to a function assigned to the side edge touch area of the transparent display panel 100 may be displayed on at least one of a front surface and a rear surface of the transparent display panel 100.

Figure 118:
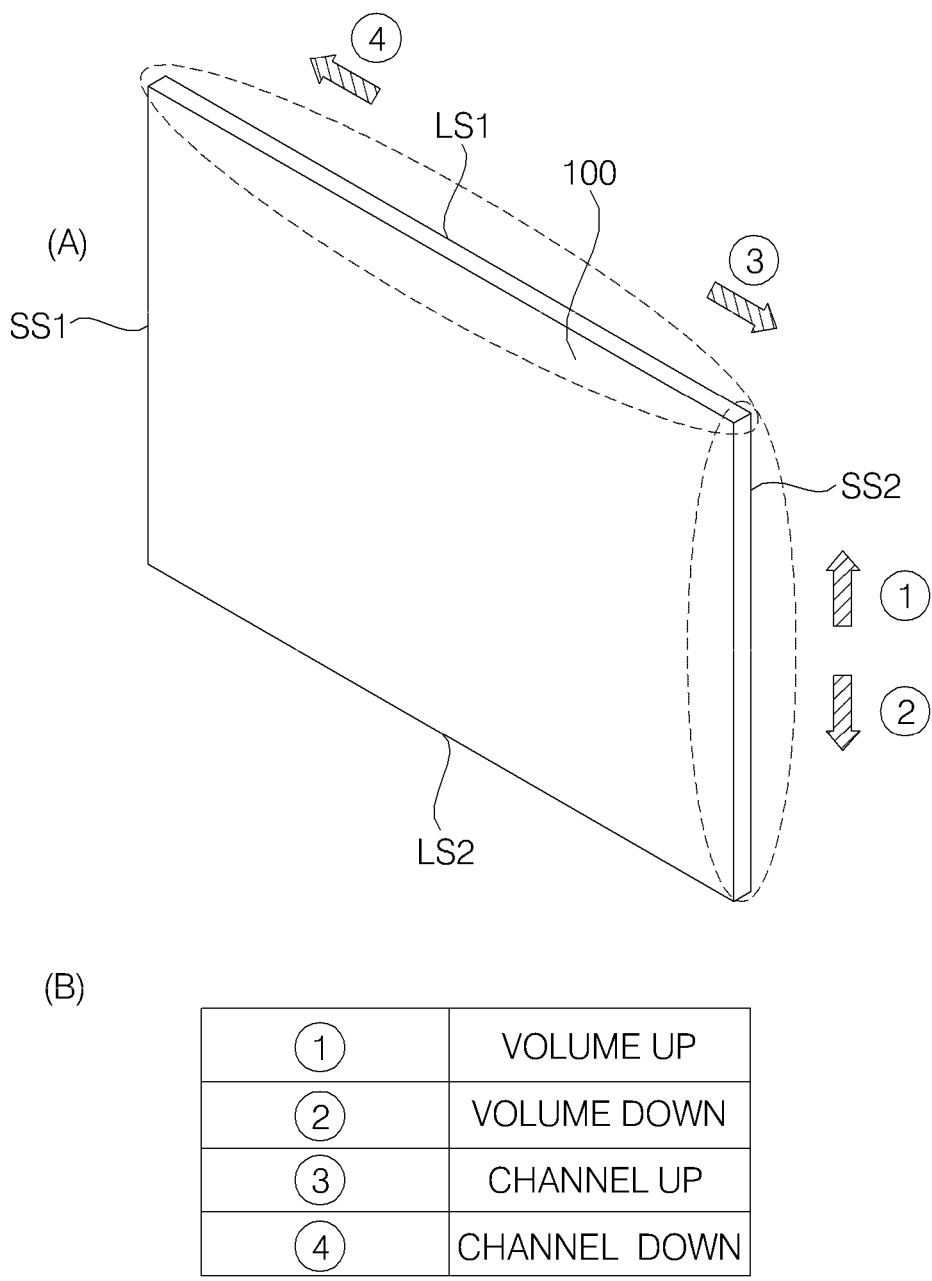

For example, in FIG. 118, a mark (not shown) representing that the volume up function is assigned to the first case ①, such as characters, symbols or numbers, may be displayed on an upper side of the second short side SS2 of the transparent display panel 100.

In this case, the user may confirm which function is assigned to a predetermined position using the mark.

If the side edge touch mode is executed, a mark for informing the user that the side edge touch function is being executed may be displayed.

Figure 119:
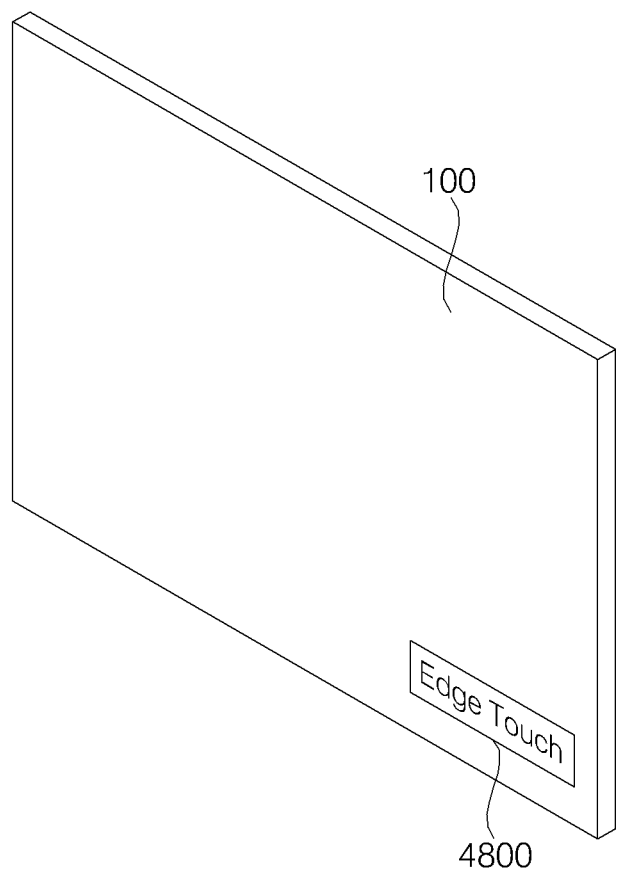

For example, as shown in FIG. 119, a mark 4800 for informing the user that the transparent display panel 100 operates in the side edge touch mode may be displayed on at least one of the front surface and the rear surface of the transparent display panel 100.

The user may select whether the side edge touch mode is executed.

For example, as shown in FIG. 77, if a command for enabling the transparent display panel according to the present invention to enter a grip mode is entered, that is, if a grip mode is set, the side edge touch mode may be released.

In the grip mode, since a probability that the user grips the transparent display panel according to the present invention with the user's hands is high, malfunction may occur if the side edge touch area of the transparent display panel 100 is activated in the grip mode.

In other words, in the grip mode, even when the side edge touch area of the transparent display panel 100 is touched, the function assigned thereto may not be performed.

As shown in FIG. 78, if the transparent display panel 100 is supported by the supporter 3200, a probability that the user grips the transparent display panel 100 with the user's hands is relatively low.

Accordingly, if the transparent display panel 100 is supported by the supporter 3200, the side edge touch area SE of the transparent display panel 100 may be activated.

Therefore, the above-described grip mode means that the transparent display panel 100 is not supported by the supporter 3200.

The screen area of the transparent display panel 100 according to the present invention may be divided into an image area and an application area in a specific mode.

Figure 120:
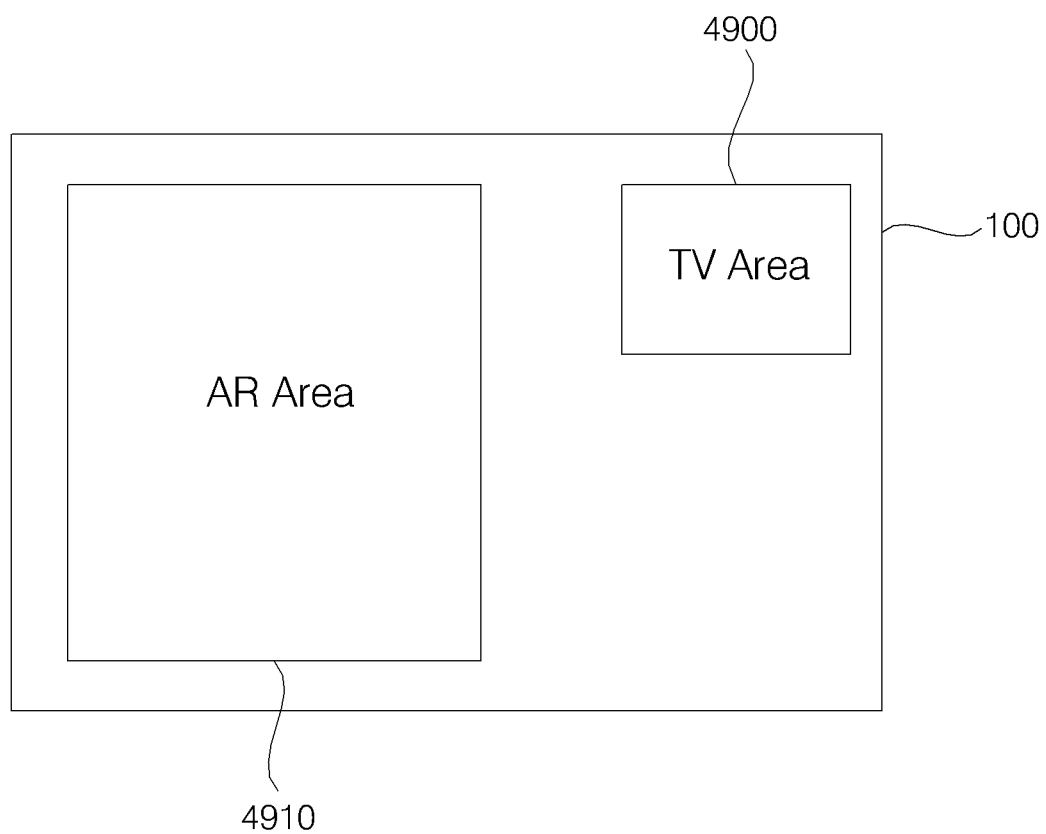
Figure 121:
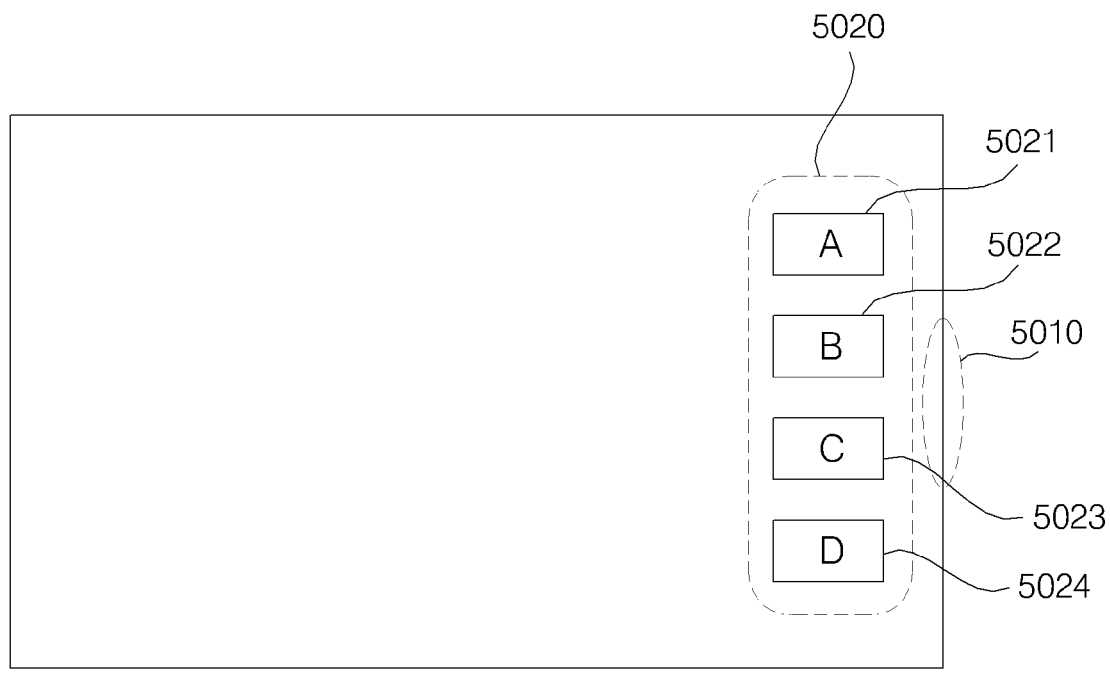
Figure 122:
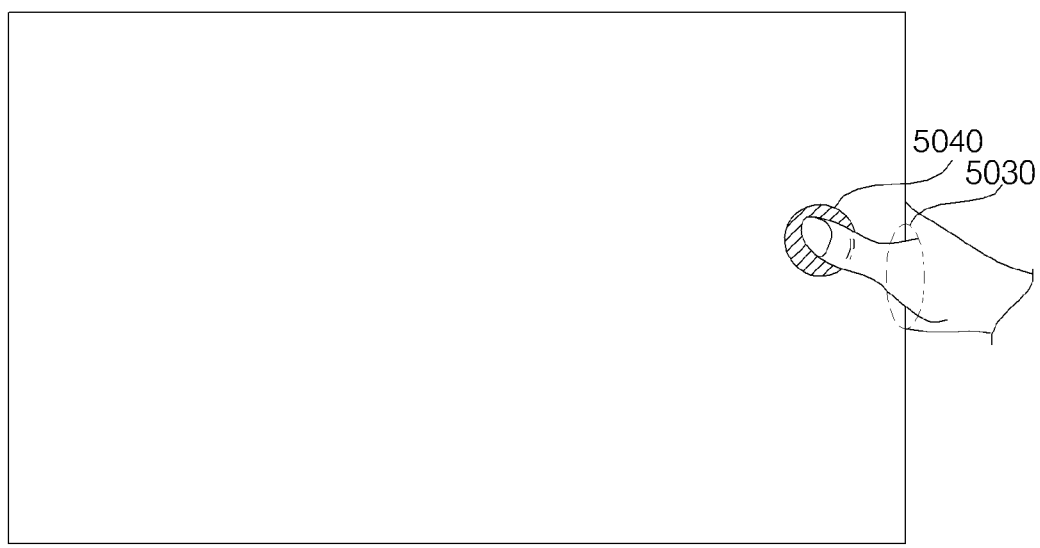
Figure 123:
Figure 123:
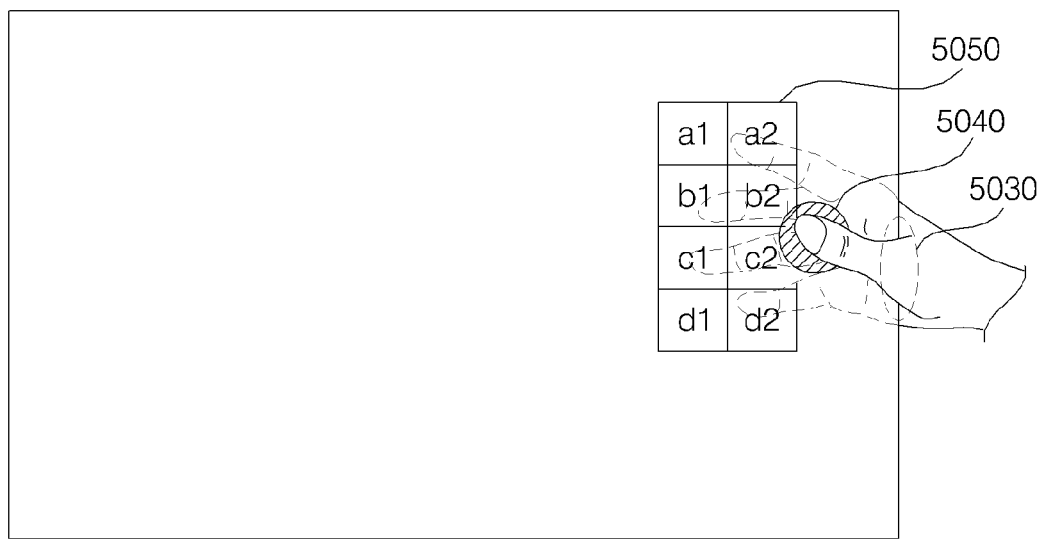

For example, as shown in FIG. 120, a first area 4900 of the screen of the transparent display panel 100 may be set to a TV area for displaying an image according to a broadcast signal, that is, an image area 4900.

A second area 4910 of the screen of the transparent display panel 100 may be set to an augmented reality (AR) area, that is, an application area 4910.

The application area 4910 may be used not only for the augmented reality function but also for various application functions such as scan and search.

In this case, the user can execute various application functions while viewing an image according to a broadcast signal.

Figure 116:
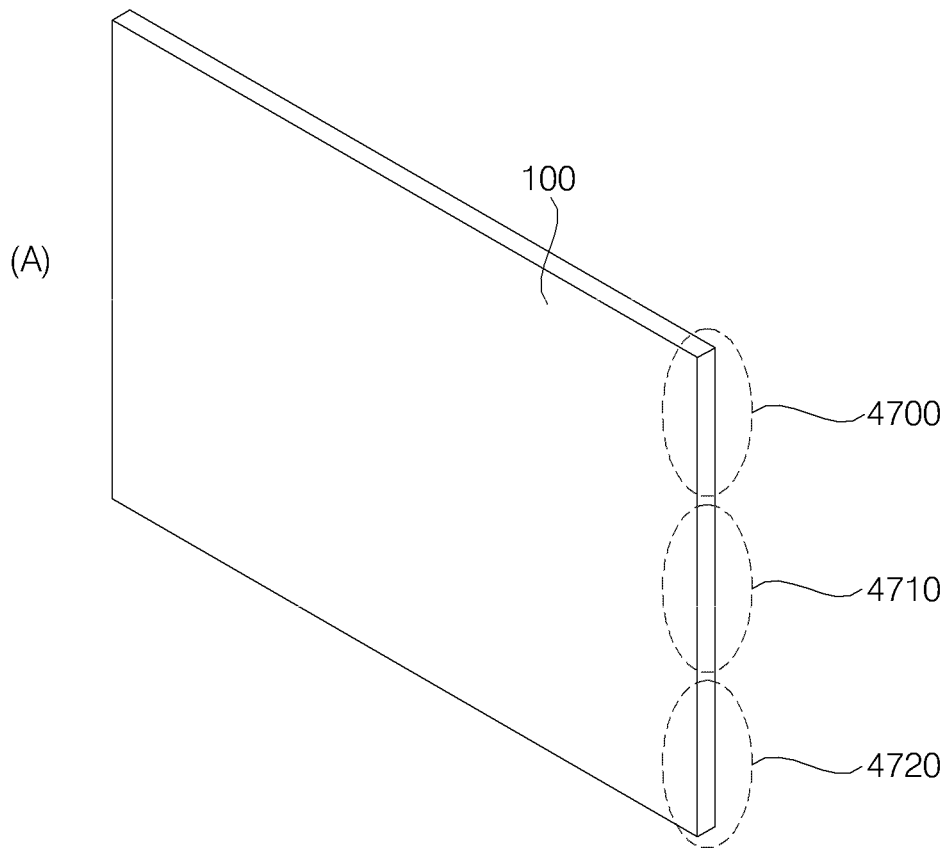
Figure 117:
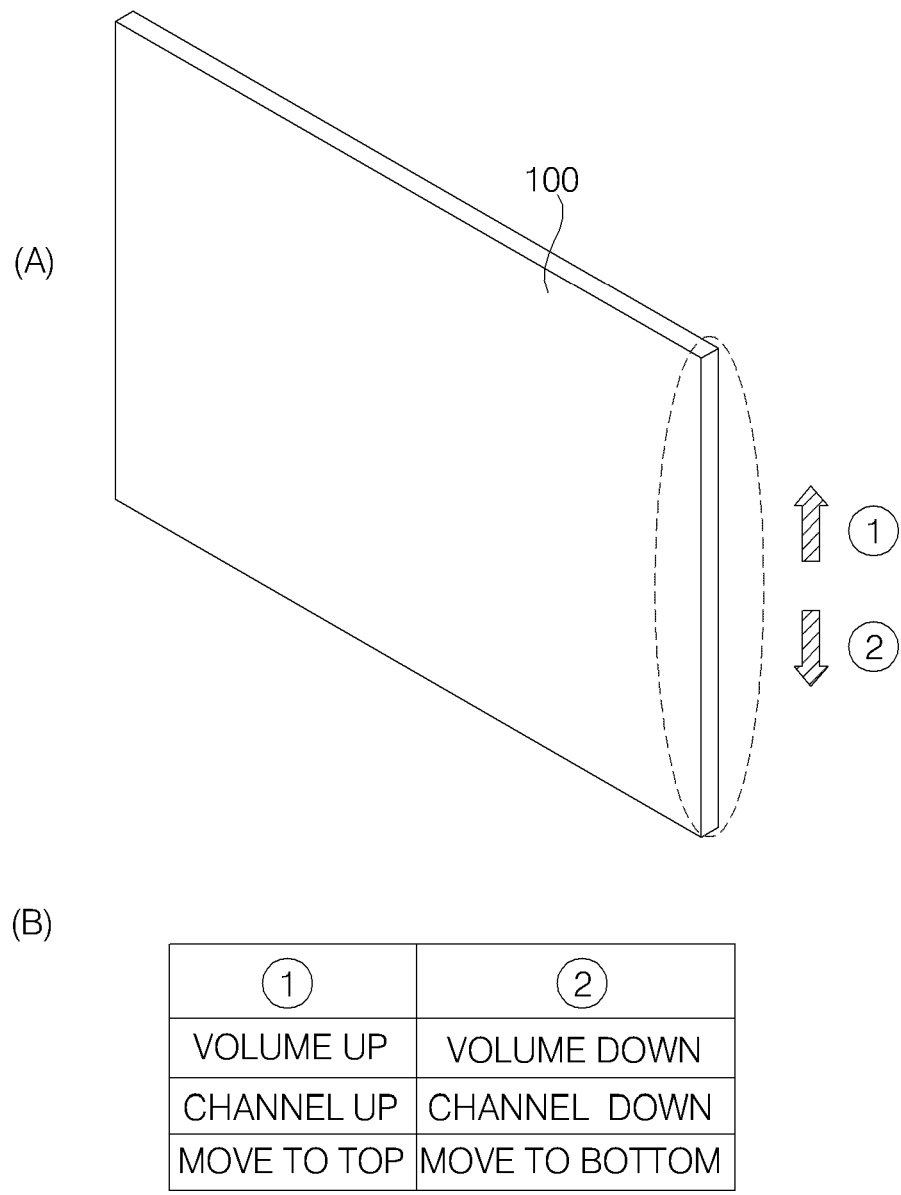

The side surface of the transparent display panel may be divided into a plurality of areas and the plurality of areas may correspond to different menus or functions as described with reference to FIG. 116.

In this case, the method for operating the transparent display apparatus according to the embodiment of the present invention may further include displaying objects corresponding to the menus or functions corresponding to the plurality of areas.

In addition, the method for operating the transparent display apparatus according to the embodiment of the present invention may further include third touch input of touching the side surface of the transparent display panel. The step S6050 of performing the operation may perform an operation corresponding to a combination of the first to third touch input.

Figure 108:
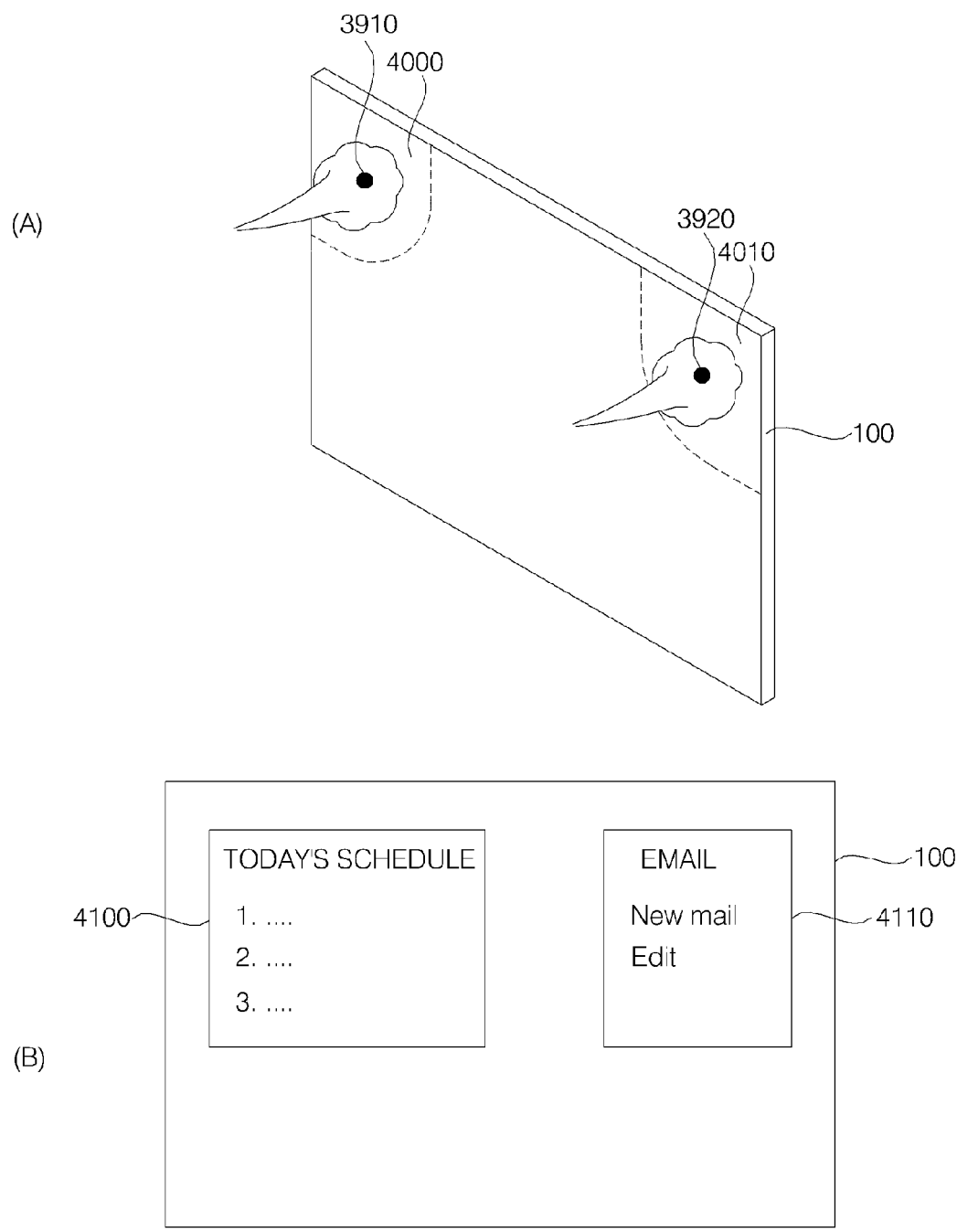

Referring to FIG. 108, if a user touches a predetermined area 5010 of the side surface of the transparent display panel, a first object 5020 may be displayed. The first object 5020 may include a plurality of items 5021, 5022, 5023 and 5024 corresponding to different functions or operations.

Figure 109:
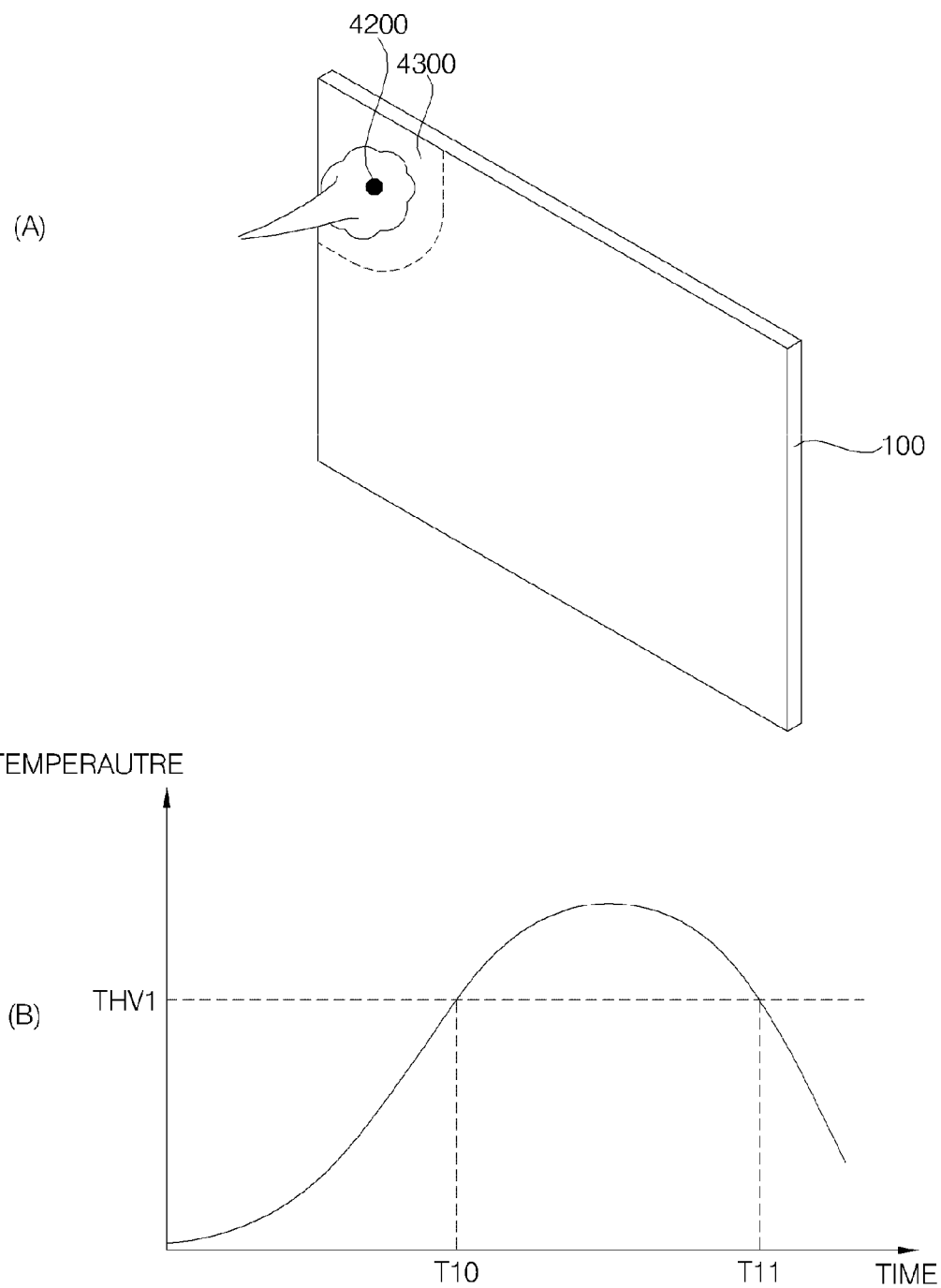
Figure 110:
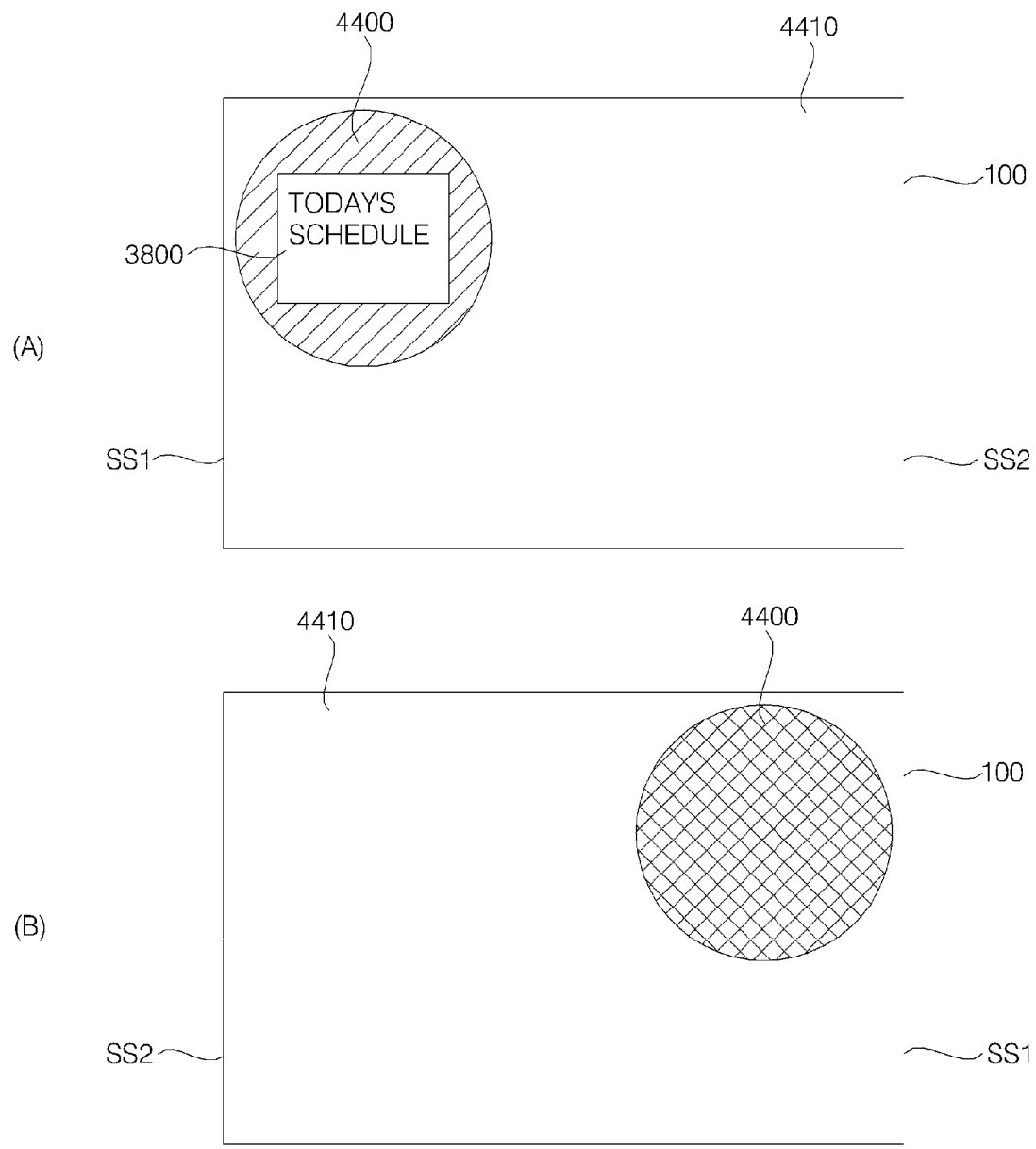
Figure 111:
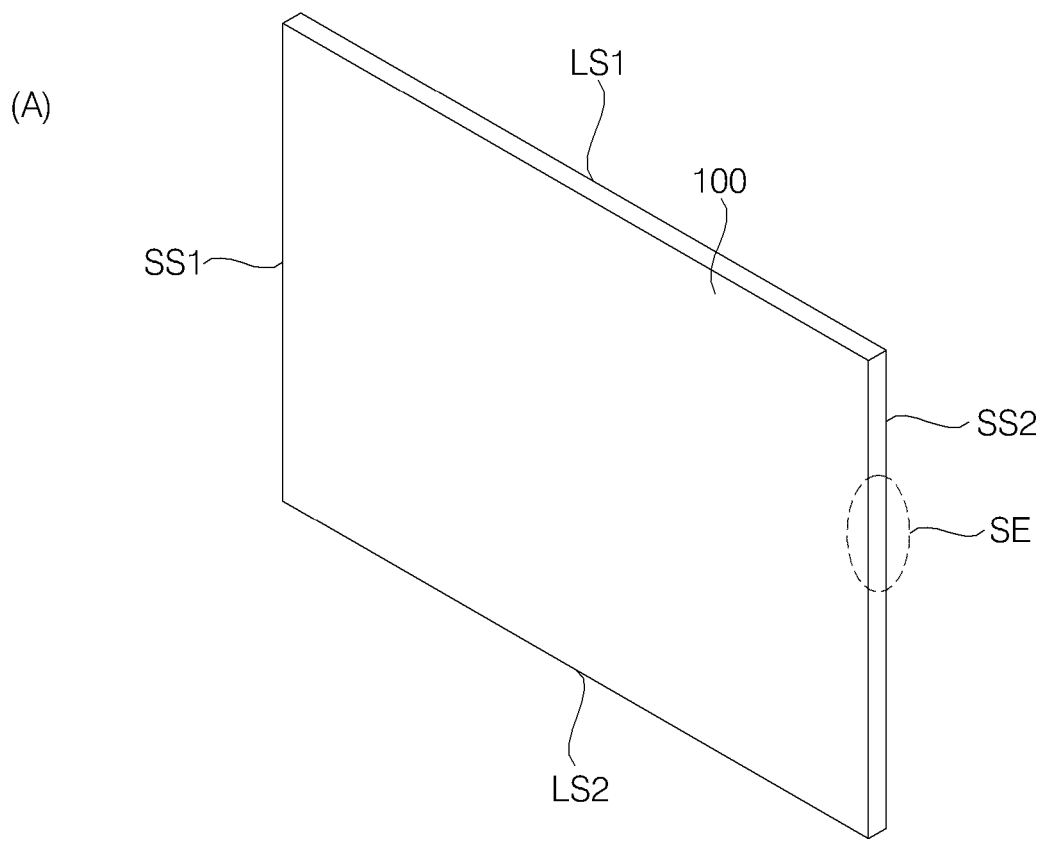
FIGS. 111 to 123 are diagrams illustrating a side edge touch mode.

Alternatively, as shown in FIG. 109, if a user touches a predetermined area 5010 of the side surface of the transparent display panel, a first object 5040 indicating one menu or area may be displayed.

Meanwhile, the operation of touching the predetermined area of the side surface of the transparent display panel by the user may be performed regardless of which part of the user is used to perform the operation. For example, an operation of holding the predetermined area 5010 may be performed.

If a user touches one of the first objects 5021, 5022, 5023 and 5024 or the first object 5040 through the first surface, for example, if the user touches the first object 5040 with a thumb, one or more second objects 5051, 5052, 5053 and 5054 for touch input through the second surface may be displayed.

If the second object includes the plurality of objects 5051, 5052, 5053 and 5054, the objects may be disposed to be separated from one another and are preferably displayed to correspond to the finger positions of the user.

Alternatively, if the user touches one of the first objects 5021, 5022, 5023 and 5024 or the first object 5040 through the first surface, the second object 5050 including a plurality of areas may be displayed. That is, the second object 5050 may be a guide object configured in the form of a matrix including a plurality of rows and columns. Cells of the matrix may correspond to different functions or operations.

Separate third touch input may be received and an operation corresponding to a combination of the third touch input, the first touch input through the first surface and the second touch input through the second surface may be performed. Accordingly, since more combinations are possible, more commands can be received.

Alternatively, side surface touch input for displaying the first object may be processed as the third touch input, without receiving separate side surface touch input.

In addition, if a predetermined area of a side surface is continuously held in a user's hand as in a grip mode, an operation corresponding to position information of the predetermined area and the areas in which the first touch input and the second touch input are detected may be performed.

According to the present invention, it is possible to perform various applications by various combinations of touch input through the first and second surfaces of the transparent display panel. In addition, since the user can freely enter various commands by adding side surface touch input, it is possible to improve user convenience.

The transparent display apparatus according to the present invention may be attached to another electronic apparatus. For example, the transparent display apparatus may be attached to a door of a refrigerator, a laundry washing machine or a cooker or a casing of an air conditioner so as to penetrate an internal object of the apparatus and display information or menu of the object. As another example, the transparent display apparatus may be attached to a window of a living room or a front window or a side window or a rear window of a vehicle so as to penetrate an external object of the window and display information or menu of the object.

For example, if the transparent display apparatus is attached to a door of a refrigerator, a laundry washing machine or a cooker or a casing of an air conditioner, the transparent display apparatus may detect a user who approaches the transparent display apparatus and display a menu. At this time, the penetration degree of the transparent display apparatus may be changed. That is, the internal object of the electronic apparatus may not be penetrated or may be dimly penetrated.

The transparent display apparatus may operate by sound in addition to user detection so as to display a menu. A first menu may be displayed if first sound is detected and a second menu may be displayed if second sound is detected. By such various settings, it is possible to increase user convenience.

As is apparent from the above description, the transparent display apparatus according to the present invention can conveniently implement various functions. one of a first viewing device and a second viewing device.

In particular, if the first real object is located in a first direction of the transparent image display apparatus and the second real object is located in a second direction of the transparent image display apparatus, the information or menu associated with the first real object is displayed as the first augmented object or the information or menu associated with the second real object is displayed as the second augmented object. The information or menu associated with the first augmented object is different from the information or menu associated with the second augmented object such that a user can readily distinguish the information about the real objects.

In particular, the first augmented object may be displayed so as not to overlap the first real object penetrating through the transparent image display apparatus. Thus, it is possible to increase user convenience.

In the displaying of the first augmented object, different information or different menus may be displayed or different operations may be performed if the position of the first augmented object penetrating through the transparent image display apparatus is changed in a state in which a distance between the transparent image display apparatus and the first augmented object is maintained. Thus, it is possible to increase user convenience.

In the displaying of the first augmented object, the display size of the information or menu associated with the first real object may be changed, a display information amount or the number of display menu kinds may be changed as a distance between the transparent image display apparatus and the first augmented object is decreased. Thus, it is possible to increase user convenience.

In accordance with an aspect of the present invention, a method for operating a transparent display apparatus comprising: detecting an object located proximate to the transparent image display apparatus; determining a position of the detected object relative to the transparent image display apparatus; selecting, from among multiple, different augmented object displays associated with the detected object, an augmented object display based on the determined position of the detected object relative to the transparent image display apparatus, the selecting comprising: selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display; and controlling display of the selected augmented object display on the transparent image display apparatus.

In addition, selecting the first augmented object display associated with the detected object comprises selecting a first augmented object display that includes at least one of product information or state information of the detected object; and selecting the second augmented object display associated with the detected object comprises selecting a second augmented object display that includes an associated menu for remotely controlling the detected object.

In addition, selecting the first augmented object display associated with the detected object comprises selecting a first augmented object display that includes at least one of product information or state information of the detected object; and selecting the second augmented object display associated with the detected object comprises selecting a second augmented object display that includes an associated menu for remotely controlling the detected object.

In addition, detecting the object located proximate to the transparent image display apparatus comprises detecting a first object located on a first side of the transparent image display apparatus, and determining the position of the detected object relative to the transparent image display apparatus comprises determining that the first object is located on the first side of the transparent image display apparatus, the method further comprising: detecting a second object located on a second side of the transparent image display apparatus, the second side of the transparent image display apparatus being opposite of the first side of the transparent image display apparatus and the transparent image display apparatus being positioned between the first object and the second object; and controlling display of an appropriate augmented object display for the second object simultaneously with the selected augmented object display for the first object.

In addition, controlling display of the selected augmented object display on the transparent image display apparatus comprises controlling display of the information or menu associated with the selected augmented object at a location that does not to overlap with a view of the detected object through the transparent image display apparatus.

In addition, determining the position of the detected object relative to the transparent image display apparatus comprises determining a side of the transparent image display apparatus on which the detected object is located, and selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined side of the transparent image display apparatus on which the detected object is located.

In addition, selecting the first augmented object display associated with the detected object based on the determined position being the first position relative to the transparent image display apparatus comprises selecting the first augmented object display associated with the detected object based on the determined side being a first side of the transparent image display apparatus on which a user is located, and selecting the second augmented object display associated with the detected object based on the determined position being the second position relative to the transparent image display apparatus that is different than the first position relative to the display comprises selecting the second augmented object display associated with the detected object based on the determined side being a second side of the transparent image display apparatus that is opposite of the first side of the transparent image display apparatus on which the user is located, at least one of a size, luminance and transparency of the information or menu associated with the first augmented object display is greater than that of the information or menu associated with the second augmented object display.

In addition, the method further comprises detecting a user position relative to the transparent image display apparatus, and selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined position of the detected object relative to the transparent image display apparatus and the detected user position relative to the transparent image display apparatus.

In addition, determining the position of the detected object relative to the transparent image display apparatus comprises determining a distance of the detected object from the transparent image display apparatus, and selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined distance of the detected object from the transparent image display apparatus.

In addition, detecting the object located proximate to the transparent image display apparatus comprises detecting the object in an image captured from a camera of the transparent image display apparatus or detecting the object based on near field communication with the object.

In addition, selecting the first augmented object display associated with the detected object based on the determined position being the first position relative to the transparent image display apparatus comprises selecting the first augmented object display associated with the detected object based on the determined position being a first position in which the detected object is perceived through a first surface of the transparent image display apparatus, and selecting the second augmented object display associated with the detected object based on the determined position being the second position relative to the transparent image display apparatus that is different than the first position relative to the display comprises selecting the second augmented object display associated with the detected object based on the determined position being a second position in which the detected object is perceived through a second surface of the transparent image display apparatus that is opposed to the first surface.

In addition, the method further comprises detecting a change in orientation of the detected object in a state in which a distance between the transparent image display apparatus and the detected object is maintained; and based on the detected change in orientation, controlling display of different information or different menus than displayed prior to the detected change in orientation.

In addition, the method further comprises detecting a change in distance between the detected object and the transparent image display apparatus; and based on detecting the change in distance between the detected object and the transparent image display apparatus, changing display size of information or menu data associated with the detected object, or changing an amount of information or a number of kinds of display menus.

In accordance with another aspect of the present invention, a transparent display apparatus comprising: a transparent display panel configured to display an augmented object display; and a controller configured to control the transparent display panel, wherein the controller is configured to perform operations comprising: detecting an object located proximate to the transparent image display apparatus; determining a position of the detected object relative to the transparent image display apparatus; selecting, from among multiple, different augmented object displays associated with the detected object, an augmented object display based on the determined position of the detected object relative to the transparent image display apparatus, the selecting comprising: selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display; and controlling display of the selected augmented object display on the transparent image display panel.

Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for operating a transparent image display apparatus, the method comprising:
   detecting an object located proximate to the transparent image display apparatus;
   determining a position of the detected object relative to the transparent image display apparatus;
   selecting, from among multiple, different augmented object displays associated with the detected object, an augmented object display based on the determined position of the detected object relative to the transparent image display apparatus, the selecting comprising:
      selecting a first augmented object display associated with the detected object based on the determined position being a first position relative to the transparent image display apparatus, and
      selecting a second augmented object display associated with the detected object based on the determined position being a second position relative to the transparent image display apparatus that is different than the first position relative to the display, the second augmented object display including different information or menu data than the first augmented object display; and
   controlling display of the selected augmented object display on the transparent image display apparatus,
   wherein selecting the first augmented object display associated with the detected object based on the determined position being the first position relative to the transparent image display apparatus comprises selecting the first augmented object display associated with the detected object based on the determined position being a first position in which the detected object is perceived through a first surface of the transparent image display apparatus, and
   wherein selecting the second augmented object display associated with the detected object based on the determined position being the second position relative to the transparent image display apparatus that is different than the first position relative to the display comprises selecting the second augmented object display associated with the detected object based on the determined position being a second position in which the detected object is perceived through a second surface of the transparent image display apparatus that is opposed to the first surface.

2. The method according to claim 1, wherein selecting the first augmented object display associated with the detected object comprises selecting a first augmented object display in which the information or menu associated with the first augmented object display is different from the information or menu associated with the second augmented object display in terms of at least one of display position, size, color, luminance and transparency.

3. The method according to claim 1:
   wherein selecting the first augmented object display associated with the detected object comprises selecting a first augmented object display that includes at least one of product information or state information of the detected object; and wherein selecting the second augmented object display associated with the detected object comprises selecting a second augmented object display that includes an associated menu for remotely controlling the detected object.

4. The method according to claim 1:
wherein detecting the object located proximate to the transparent image display apparatus comprises detecting a first object located on a first side of the transparent image display apparatus, and
wherein determining the position of the detected object relative to the transparent image display apparatus comprises determining that the first object is located on the first side of the transparent image display apparatus, further comprising:
detecting a second object located on a second side of the transparent image display apparatus, the second side of the transparent image display apparatus being opposite of the first side of the transparent image display apparatus and the transparent image display apparatus being positioned between the first object and the second object; and
controlling display of an appropriate augmented object display for the second object simultaneously with the selected augmented object display for the first object.

5. The method according to claim 1, wherein controlling display of the selected augmented object display on the transparent image display apparatus comprises controlling display of the information or menu associated with the selected augmented object at a location that does not to overlap with a view of the detected object through the transparent image display apparatus.

6. The method according to claim 1:
wherein determining the position of the detected object relative to the transparent image display apparatus comprises determining a side of the transparent image display apparatus on which the detected object is located, and
wherein selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined side of the transparent image display apparatus on which the detected object is located.

7. The method according to claim 6,
wherein selecting the first augmented object display associated with the detected object based on the determined position being the first position relative to the transparent image display apparatus comprises selecting the first augmented object display associated with the detected object based on the determined side being a first side of the transparent image display apparatus on which a user is located, and
wherein selecting the second augmented object display associated with the detected object based on the determined position being the second position relative to the transparent image display apparatus that is different than the first position relative to the display comprises selecting the second augmented object display associated with the detected object based on the determined side being a second side of the transparent image display apparatus that is opposite of the first side of the transparent image display apparatus on which the user is located, at least one of a size, luminance and transparency of the information or menu associated with the first augmented object display is greater than that of the information or menu associated with the second augmented object display.

8. The method according to claim 1, further comprising detecting a user position relative to the transparent image display apparatus,
wherein selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined position of the detected object relative to the transparent image display apparatus and the detected user position relative to the transparent image display apparatus.

9. The method according to claim 1:
wherein determining the position of the detected object relative to the transparent image display apparatus comprises determining a distance of the detected object from the transparent image display apparatus, and
wherein selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined distance of the detected object from the transparent image display apparatus.

10. The method according to claim 1, wherein detecting the object located proximate to the transparent image display apparatus comprises detecting the object in an image captured from a camera of the transparent image display apparatus or detecting the object based on near field communication with the object.

11. The method according to claim 1, further comprising:
detecting a change in orientation of the detected object in a state in which a distance between the transparent image display apparatus and the detected object is maintained; and
based on the detected change in orientation, controlling display of different information or different menus than displayed prior to the detected change in orientation.

12. The method according to claim 1, further comprising:
detecting a change in distance between the detected object and the transparent image display apparatus; and
based on detecting the change in distance between the detected object and the transparent image display apparatus, changing display size of information or menu data associated with the detected object, or changing an amount of information or a number of kinds of display menus.

13. A transparent image display apparatus comprising:
a transparent display panel configured to display an augmented object display; and
a controller configured to control the transparent display panel,
wherein the controller is configured to perform operations comprising:
detecting an object located proximate to the transparent image display apparatus;

determining a position of the detected object relative to the transparent image display apparatus;

selecting, from among multiple, different augmented object displays associated with the detected object, an augmented object display based on the determined position of the detected object relative to the transparent image display apparatus, the selecting comprising:

selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display; and controlling display of the selected augmented object display on the transparent image display panel, wherein selecting the first augmented object display associated with the detected object based on the determined position being the first position relative to the transparent image display apparatus comprises selecting the first augmented object display associated with the detected object based on the determined position being a first position in which the detected object is perceived through a first surface of the transparent image display apparatus, and wherein selecting the second augmented object display associated with the detected object based on the determined position being the second position relative to the transparent image display apparatus that is different than the first position relative to the display comprises selecting the second augmented object display associated with the detected object based on the determined position being a second position in which the detected object is perceived through a second surface of the transparent image display apparatus that is opposed to the first surface.

14. The transparent image display apparatus according to claim 13, wherein selecting the first augmented object display associated with the detected object comprises selecting a first augmented object display in which the information or menu associated with the first augmented object display is different from the information or menu associated with the second augmented object display in terms of at least one of display position, size, color, luminance and transparency.

15. The transparent image display apparatus according to claim 13:

wherein selecting the first augmented object display associated with the detected object comprises selecting a first augmented object display that includes at least one of product information or state information of the detected object; and wherein selecting the second augmented object display associated with the detected object comprises selecting a second augmented object display that includes an associated menu for remotely controlling the detected object.

16. The transparent image display apparatus according to claim 13, wherein controlling display of the selected augmented object display on the transparent image display panel comprises controlling display of the information or menu associated with the selected augmented object at a location that does not to overlap with a view of the detected object through the transparent image display panel.

17. The transparent image display apparatus according to claim 13, wherein the controller is configured to perform operations comprising:

detecting a change in orientation of the detected object in a state in which a distance between the transparent image display apparatus and the detected object is maintained; and based on the detected change in orientation, controlling display of different information or different menus than displayed prior to the detected change in orientation.

18. The transparent image display apparatus according to claim 13, wherein the controller is configured to perform operations comprising:

detecting a change in distance between the detected object and the transparent image display apparatus; and based on detecting the change in distance between the detected object and the transparent image display apparatus, changing display size of information or menu data associated with the detected object, or changing an amount of information or a number of kinds of display menus.

19. The transparent image display apparatus according to claim 13:

wherein determining the position of the detected object relative to the transparent image display apparatus comprises determining a side of the transparent image display apparatus on which the detected object is located, and wherein selecting, from among multiple, different augmented object displays associated with the detected object, an augmented object display based on the determined position of the detected object relative to the transparent image display apparatus comprises selecting, from among multiple, different augmented object displays associated with the detected object, an augmented object display based on the determined side of the transparent image display apparatus on which the detected object is located.

20. A method for operating a transparent image display apparatus, the method comprising:

detecting an object located proximate to the transparent image display apparatus;

determining a position of the detected object relative to the transparent image display apparatus;

selecting, from among multiple, different augmented object displays associated with the detected object, an augmented object display based on the determined position of the detected object relative to the transparent image display apparatus, the selecting comprising:

selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display;

controlling display of the selected augmented object display on the transparent image display apparatus;

detecting a change in orientation of the detected object in a state in which a distance between the transparent image display apparatus and the detected object is maintained; and based on the detected change in orientation, controlling display of different information or different menus than displayed prior to the detected change in orientation.

21. A transparent image display apparatus comprising:

a transparent display panel configured to display an augmented object display; and a controller configured to control the transparent display panel, wherein the controller is configured to perform operations comprising:

detecting an object located proximate to the transparent image display apparatus;

determining a position of the detected object relative to the transparent image display apparatus;

selecting, from among multiple, different augmented object displays associated with the detected object, an augmented object display based on the determined position of the detected object relative to the transparent image display apparatus, the selecting comprising:

selecting a first augmented object display associated with the detected object based on the determined position being a first position relative to the transparent image display apparatus, and selecting a second augmented object display associated with the detected object based on the determined position being a second position relative to the transparent image display apparatus that is different than the first position relative to the display, the second augmented object display including different information or menu data than the first augmented object display;

controlling display of the selected augmented object display on the transparent image display panel;

detecting a change in orientation of the detected object in a state in which a distance between the transparent image display apparatus and the detected object is maintained; and based on the detected change in orientation, controlling display of different information or different menus than displayed prior to the detected change in orientation.

\* \* \* \* \*